US009319375B2

(12) United States Patent
Gross, IV et al.

(10) Patent No.: US 9,319,375 B2
(45) Date of Patent: Apr. 19, 2016

(54) FLOW TEMPLATING IN LOGICAL L3 ROUTING

(71) Applicant: Nicira, Inc., Palo Alto, CA (US)

(72) Inventors: Jesse E. Gross, IV, San Francisco, CA (US); Ronghua Zhang, San Jose, CA (US); Teemu Koponen, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 198 days.

(21) Appl. No.: 13/757,619

(22) Filed: Feb. 1, 2013

(65) Prior Publication Data

US 2013/0142048 A1 Jun. 6, 2013

Related U.S. Application Data

(63) Continuation of application No. 13/589,062, filed on Aug. 17, 2012.

(60) Provisional application No. 61/524,754, filed on Aug. 17, 2011, provisional application No. 61/643,339, filed on May 6, 2012, provisional application No. 61/654,121, filed on Jun. 1, 2012, provisional application No. 61/666,876, filed on Jul. 1, 2012.

(51) Int. Cl.
*H04L 12/28* (2006.01)
*H04L 12/24* (2006.01)
(Continued)

(52) U.S. Cl.
CPC .......... *H04L 61/103* (2013.01); *H04L 41/0803* (2013.01); *H04L 45/04* (2013.01);
(Continued)

(58) Field of Classification Search
CPC ... H04L 61/10; H04L 61/103; H04L 61/6009; H04L 29/12018; H04L 29/12028; H04L 29/12811; H04L 61/2514; H04L 61/256; H04L 29/12367; H04L 29/4641; H04L 29/1249; H04L 29/12509; H04L 29/12528; H04L 29/12207; H04L 29/12264; H04L 29/12216
USPC ............ 370/395.54, 401, 392, 389, 254–255; 709/245, 226, 242
See application file for complete search history.

(56) References Cited

U.S. PATENT DOCUMENTS

| 5,504,921 A | 4/1996 | Dev et al. |
| 5,550,816 A | 8/1996 | Hardwick et al. |

(Continued)

FOREIGN PATENT DOCUMENTS

| AU | 2012296329 | 3/2014 |
| EP | 1653688 | 5/2006 |

(Continued)

OTHER PUBLICATIONS

Al-Fares, Mohammad, et al., "A Scalable, Commodity Data Center Network Architecture," Aug. 17-22, 2008, pp. 63-74, Seattle, Washington, USA.

(Continued)

*Primary Examiner* — Wutchung Chu
(74) *Attorney, Agent, or Firm* — Adeli LLP

(57) ABSTRACT

For a network controller for managing hosts in a network, a method for configuring a host to handle flow entries and template flow entries is described. The method generates a template flow entry to be populated in order to create a flow entry for a particular managed forwarding element. The method sends the template flow entry to the particular forwarding element in a host. The method configures a flow entry generating flow entry generating module in a host to create the flow entry by populating the template flow entry. The method configures the particular managed forwarding element to (1) send the template flow entry to the flow entry generating flow entry generating module (2) forward packets using the flow entry created by the flow entry generating flow entry generating module.

17 Claims, 69 Drawing Sheets

(51) Int. Cl.
*H04L 12/26* (2006.01)
*H04L 12/56* (2006.01)
*H04L 29/12* (2006.01)
*H04L 12/801* (2013.01)
*H04L 12/803* (2013.01)
*H04L 12/741* (2013.01)
*H04L 12/715* (2013.01)

(52) U.S. Cl.
CPC .............. *H04L 45/54* (2013.01); *H04L 45/74* (2013.01); *H04L 47/12* (2013.01); *H04L 47/125* (2013.01); *H04L 61/256* (2013.01)

(56) References Cited

U.S. PATENT DOCUMENTS

| | | | |
|---|---|---|---|
| 5,729,685 A | 3/1998 | Chatwani et al. | |
| 5,751,967 A | 5/1998 | Raab et al. | |
| 6,104,699 A | 8/2000 | Holender et al. | |
| 6,359,909 B1 | 3/2002 | Ito et al. | |
| 6,366,582 B1 | 4/2002 | Nishikado et al. | |
| 6,456,624 B1 | 9/2002 | Eccles et al. | |
| 6,493,767 B1* | 12/2002 | Ishida et al. | 709/249 |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,985,440 B1* | 1/2006 | Albert | H04L 29/12009 370/230 |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,260,648 B2 | 8/2007 | Tingley et al. | |
| 7,283,473 B2 | 10/2007 | Arndt et al. | |
| 7,342,916 B2 | 3/2008 | Das et al. | |
| 7,346,686 B2* | 3/2008 | Albert | H04L 67/1008 709/226 |
| 7,391,771 B2 | 6/2008 | Orava et al. | |
| 7,443,796 B1* | 10/2008 | Albert | H04L 29/06 370/235 |
| 7,450,598 B2 | 11/2008 | Chen et al. | |
| 7,463,579 B2 | 12/2008 | Lapuh et al. | |
| 7,478,173 B1* | 1/2009 | Delco | 709/250 |
| 7,512,744 B2 | 3/2009 | Banga et al. | |
| 7,555,002 B2 | 6/2009 | Arndt et al. | |
| 7,606,260 B2 | 10/2009 | Oguchi et al. | |
| 7,633,955 B1 | 12/2009 | Saraiya et al. | |
| 7,643,488 B2 | 1/2010 | Khanna et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,802,000 B1* | 9/2010 | Huang et al. | 709/228 |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,059,532 B2* | 11/2011 | Riddle | H04L 41/0893 370/230 |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,230,050 B1 | 7/2012 | Brandwine et al. | |
| 8,259,571 B1 | 9/2012 | Raphel et al. | |
| 8,265,075 B2 | 9/2012 | Pandey | |
| 8,300,532 B1 | 10/2012 | Venkatramani et al. | |
| 8,312,129 B1 | 11/2012 | Miller et al. | |
| 8,320,388 B2 | 11/2012 | Louati et al. | |
| 8,339,959 B1 | 12/2012 | Moisand et al. | |
| 8,339,994 B2 | 12/2012 | Gnanasekaran et al. | |
| 8,345,650 B2 | 1/2013 | Foxworthy et al. | |
| 8,351,418 B2 | 1/2013 | Zhao et al. | |
| 8,370,834 B2 | 2/2013 | Edwards et al. | |
| 8,391,289 B1* | 3/2013 | Yalagandula | H04L 12/2818 370/392 |
| 8,456,984 B2 | 6/2013 | Ranganathan et al. | |
| 8,504,718 B2 | 8/2013 | Wang et al. | |
| 8,538,919 B1 | 9/2013 | Nielsen et al. | |
| 8,571,031 B2 | 10/2013 | Davies et al. | |
| 8,578,003 B2 | 11/2013 | Brandwine et al. | |
| 8,611,351 B2 | 12/2013 | Gooch et al. | |
| 8,611,352 B2 | 12/2013 | Mizrahi et al. | |
| 8,612,627 B1 | 12/2013 | Brandwine | |
| 8,614,870 B2* | 12/2013 | Kheraluwala et al. | 361/63 |
| 8,625,594 B2 | 1/2014 | Safrai et al. | |
| 8,625,603 B1 | 1/2014 | Ramakrishnan et al. | |
| 8,627,313 B2 | 1/2014 | Edwards et al. | |
| 8,644,188 B1 | 2/2014 | Brandwine et al. | |
| 8,705,513 B2 | 4/2014 | Van Der Merwe et al. | |
| 8,762,501 B2* | 6/2014 | Kempf | H04L 12/4633 709/220 |
| 8,958,298 B2 | 2/2015 | Zhang et al. | |
| 2001/0043614 A1 | 11/2001 | Viswanadham et al. | |
| 2002/0013858 A1* | 1/2002 | Anderson | 709/245 |
| 2002/0093952 A1 | 7/2002 | Gonda | |
| 2002/0120720 A1* | 8/2002 | Moir | H04L 12/2856 709/220 |
| 2002/0161867 A1 | 10/2002 | Cochran et al. | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2004/0054799 A1* | 3/2004 | Meier et al. | 709/230 |
| 2004/0073659 A1 | 4/2004 | Rajsic et al. | |
| 2004/0098505 A1 | 5/2004 | Clemmensen | |
| 2004/0186914 A1 | 9/2004 | Shimada | |
| 2004/0267866 A1 | 12/2004 | Carollo et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0111445 A1 | 5/2005 | Wybenga et al. | |
| 2005/0132044 A1 | 6/2005 | Guingo et al. | |
| 2005/0249199 A1* | 11/2005 | Albert | H04L 67/1002 370/352 |
| 2006/0031432 A1 | 2/2006 | Patrick et al. | |
| 2006/0056412 A1 | 3/2006 | Page | |
| 2006/0092976 A1 | 5/2006 | Lakshman et al. | |
| 2006/0182118 A1 | 8/2006 | Lam et al. | |
| 2006/0206655 A1 | 9/2006 | Chappell et al. | |
| 2006/0221961 A1 | 10/2006 | Basso et al. | |
| 2007/0101323 A1* | 5/2007 | Foley et al. | 718/1 |
| 2007/0140128 A1 | 6/2007 | Klinker et al. | |
| 2007/0156919 A1 | 7/2007 | Potti et al. | |
| 2007/0201357 A1 | 8/2007 | Smethurst et al. | |
| 2007/0286209 A1* | 12/2007 | Wang et al. | 370/395.54 |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0049621 A1 | 2/2008 | McGuire et al. | |
| 2008/0071900 A1 | 3/2008 | Hecker et al. | |
| 2008/0151893 A1* | 6/2008 | Nordmark et al. | 370/392 |
| 2008/0159301 A1 | 7/2008 | de Her | |
| 2008/0175239 A1 | 7/2008 | Sistanizadeh et al. | |

(56) References Cited

U.S. PATENT DOCUMENTS

| | | | |
|---|---|---|---|
| 2008/0189769 A1* | 8/2008 | Casado et al. ............... | 726/4 |
| 2008/0198858 A1 | 8/2008 | Townsley et al. | |
| 2008/0225853 A1 | 9/2008 | Melman et al. | |
| 2008/0240122 A1 | 10/2008 | Richardson et al. | |
| 2008/0253366 A1 | 10/2008 | Zuk et al. | |
| 2008/0291910 A1 | 11/2008 | Tadimeti et al. | |
| 2008/0316922 A1* | 12/2008 | Riddle ............... | H04L 41/0893 370/230 |
| 2009/0031041 A1 | 1/2009 | Clemmensen | |
| 2009/0043823 A1 | 2/2009 | Iftode et al. | |
| 2009/0063665 A1 | 3/2009 | Bagepalli et al. | |
| 2009/0083445 A1 | 3/2009 | Ganga | |
| 2009/0092137 A1 | 4/2009 | Haigh et al. | |
| 2009/0122710 A1 | 5/2009 | Bar-Tor et al. | |
| 2009/0138577 A1* | 5/2009 | Casado ............... | H04L 41/06 709/220 |
| 2009/0150527 A1 | 6/2009 | Tripathi et al. | |
| 2009/0161547 A1 | 6/2009 | Riddle et al. | |
| 2009/0199177 A1 | 8/2009 | Edwards et al. | |
| 2009/0213869 A1 | 8/2009 | Rajendran et al. | |
| 2009/0249470 A1 | 10/2009 | Litvin et al. | |
| 2009/0249472 A1* | 10/2009 | Litvin et al. ............... | 726/14 |
| 2009/0249473 A1 | 10/2009 | Cohn | |
| 2009/0279536 A1 | 11/2009 | Unbehagen et al. | |
| 2009/0292858 A1 | 11/2009 | Lambeth et al. | |
| 2009/0300210 A1 | 12/2009 | Ferris | |
| 2009/0303880 A1 | 12/2009 | Maltz et al. | |
| 2009/0327781 A1 | 12/2009 | Tripathi | |
| 2010/0046531 A1 | 2/2010 | Louati et al. | |
| 2010/0107162 A1 | 4/2010 | Edwards et al. | |
| 2010/0115080 A1* | 5/2010 | Kageyama ............... | 709/223 |
| 2010/0115101 A1 | 5/2010 | Lain et al. | |
| 2010/0131636 A1 | 5/2010 | Suri et al. | |
| 2010/0153554 A1 | 6/2010 | Anschutz et al. | |
| 2010/0153701 A1 | 6/2010 | Shenoy et al. | |
| 2010/0165877 A1 | 7/2010 | Shukla et al. | |
| 2010/0169467 A1 | 7/2010 | Shukla et al. | |
| 2010/0192225 A1 | 7/2010 | Ma et al. | |
| 2010/0205479 A1 | 8/2010 | Akutsu et al. | |
| 2010/0214949 A1 | 8/2010 | Smith et al. | |
| 2010/0257263 A1 | 10/2010 | Casado et al. | |
| 2010/0275199 A1 | 10/2010 | Smith et al. | |
| 2010/0290485 A1 | 11/2010 | Martini et al. | |
| 2010/0318609 A1 | 12/2010 | Lahiri et al. | |
| 2010/0318665 A1* | 12/2010 | Demmer et al. ............... | 709/227 |
| 2010/0322255 A1 | 12/2010 | Hao et al. | |
| 2011/0002346 A1 | 1/2011 | Wu | |
| 2011/0004698 A1 | 1/2011 | Wu | |
| 2011/0004876 A1 | 1/2011 | Wu et al. | |
| 2011/0004877 A1 | 1/2011 | Wu | |
| 2011/0016215 A1 | 1/2011 | Wang | |
| 2011/0022695 A1 | 1/2011 | Dalal et al. | |
| 2011/0032830 A1 | 2/2011 | Merwe et al. | |
| 2011/0075664 A1 | 3/2011 | Lambeth et al. | |
| 2011/0075674 A1 | 3/2011 | Li et al. | |
| 2011/0085557 A1 | 4/2011 | Gnanasekaran et al. | |
| 2011/0085559 A1 | 4/2011 | Chung et al. | |
| 2011/0107331 A1* | 5/2011 | Evans et al. ............... | 718/1 |
| 2011/0119748 A1 | 5/2011 | Edwards et al. | |
| 2011/0134931 A1 | 6/2011 | Merwe et al. | |
| 2011/0142053 A1 | 6/2011 | Van Der Merwe et al. | |
| 2011/0194567 A1 | 8/2011 | Shen | |
| 2011/0205931 A1 | 8/2011 | Zhou et al. | |
| 2011/0261825 A1 | 10/2011 | Ichino | |
| 2011/0264610 A1* | 10/2011 | Armstrong et al. ............... | 706/12 |
| 2011/0283017 A1 | 11/2011 | Alkhatib et al. | |
| 2011/0299534 A1 | 12/2011 | Koganti et al. | |
| 2011/0299537 A1* | 12/2011 | Saraiya et al. ............... | 370/392 |
| 2011/0310899 A1 | 12/2011 | Alkhatib et al. | |
| 2011/0320821 A1* | 12/2011 | Alkhatib et al. ............... | 713/176 |
| 2012/0014386 A1 | 1/2012 | Xiong et al. | |
| 2012/0014387 A1* | 1/2012 | Dunbar et al. ............... | 370/395.53 |
| 2012/0044943 A1 | 2/2012 | Hinz et al. | |
| 2012/0131643 A1 | 5/2012 | Cheriton | |
| 2012/0159101 A1* | 6/2012 | Miyoshi ............... | 711/162 |
| 2012/0236734 A1 | 9/2012 | Sampath et al. | |
| 2012/0239790 A1 | 9/2012 | Doane et al. | |
| 2012/0257629 A1 | 10/2012 | Ramakrishnan et al. | |
| 2012/0300615 A1* | 11/2012 | Kempf ............... | H04W 24/02 370/216 |
| 2012/0307828 A1* | 12/2012 | Agarwal ............... | H04L 49/70 370/392 |
| 2012/0320929 A9 | 12/2012 | Subramanian et al. | |
| 2012/0323987 A1* | 12/2012 | Cantu et al. ............... | 709/201 |
| 2013/0044636 A1 | 2/2013 | Koponen et al. | |
| 2013/0051399 A1 | 2/2013 | Zhang et al. | |
| 2013/0058346 A1 | 3/2013 | Sridharan et al. | |
| 2013/0148505 A1 | 6/2013 | Koponen et al. | |
| 2013/0148541 A1 | 6/2013 | Zhang et al. | |
| 2013/0148542 A1 | 6/2013 | Zhang et al. | |
| 2013/0148543 A1 | 6/2013 | Koponen et al. | |
| 2013/0148656 A1 | 6/2013 | Zhang et al. | |
| 2013/0151661 A1 | 6/2013 | Koponen et al. | |
| 2013/0151676 A1 | 6/2013 | Thakkar et al. | |
| 2013/0163427 A1 | 6/2013 | Beliveau et al. | |
| 2013/0163475 A1 | 6/2013 | Beliveau et al. | |
| 2013/0227097 A1 | 8/2013 | Yasuda et al. | |
| 2013/0266019 A1 | 10/2013 | Qu et al. | |
| 2013/0332602 A1 | 12/2013 | Nakil et al. | |
| 2014/0003434 A1 | 1/2014 | Assarpour et al. | |
| 2014/0016501 A1 | 1/2014 | Kamath et al. | |
| 2014/0195666 A1* | 7/2014 | Dumitriu ............... | H04L 12/4625 709/223 |

FOREIGN PATENT DOCUMENTS

| | | |
|---|---|---|
| EP | 2745208 | 6/2014 |
| JP | 2003-069609 | 3/2003 |
| JP | 2003-124976 | 4/2003 |
| JP | 2003-318949 | 11/2003 |
| WO | WO 2005/112390 | 11/2005 |
| WO | WO 2008/095010 | 8/2008 |
| WO | WO 2013/026049 | 2/2013 |
| WO | WO 2013/184846 | 12/2013 |

OTHER PUBLICATIONS

Das, Suarav, et al., "Unifying Packet and Circuit Switched Networks with OpenFlow," Dec. 7, 2009, 10 pages.
Das, Suarav, et al. "Simple Unified Control for Packet and Circuit Networks," Month Unknown, 2009, pp. 147-148, IEEE.
Andersen, David, et al., "Resilient Overlay Networks," Oct. 2001, 15 pages, 18th ACM Symp. on Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Anwer, Muhammad Bilal, et al., "Building a Fast, Virtualized Data Plane with Programmable Hardware," Aug. 17, 2009, pp. 1-8, VISA'09, Barcelona, Spain, ACM.
Author Unknown , "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown , "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown , "Citrix Launches New XenServer Release as Market Share Growth Continues," Oct. 6, 2010, 3 pages, Citrix Systems, Inc. (http://www.citrix.com/English/ne/news/news.asp?newsID=2304355).
Author Unknown, "HP OpenView Enterprise Management Starter Solution," Jun. 2006, p. 1-4, Hewlett-Packard Development Company, HP.
Author Unknown, "HP OpenView Operations 8.0 for UNIX Developer's Toolkit," Month Unlknown, 2004, pp. 1-4, Hewlett-Packard Development Company, HP.

(56) References Cited

OTHER PUBLICATIONS

Author Unknown, "HP Web Jetadmin Integration into HP OpenView Network Node Manager," Feb. 2004, pp. 1-12, HP.
Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown, "Intel 82599 10 Gigabit Ethernet Controller: Datasheet, Revision: 2.73," Dec. 2011, 930 pages, Intel Corporation.
Author Unknown, "Introduction to VMware Infrastructure: ESX Server 3.5, ESX Server 3i version 3.5, VirtualCenter 2.5," Revision Dec. 13, 2007, pp. 1-46, VMware, Inc., Palo Alto, California, USA.
Author Unknown, "Open vSwitch, An Open Virtual Switch," Date Unknown but prior to Dec. 30, 2010, 2 pages, http://www.openvswitch.org/, Open vSwitch.
Author Unknown, "OpenFlow Switch Specification, Version 0.9.0 (Wire Protocol 0x98)," Jul. 20, 2009, pp. 1-36, Open Networking Foundation.
Author Unknown, OpenFlow Switch Specification, Version 1.0.0 (Wire Protocol 0x01), Dec. 31, 2009, pp. 1-42, Open Networking Foundation.
Author Unknown, "Private Network-Network Interface Specification Version 1.1 (PNNI 1.1)," The ATM Forum Technical Committee, Apr. 2002, 536 pages, The ATM Forum.
Author Unknown, "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Author Unknown, "VMare for Linux Networking Support," Date Unknown but prior to Nov. 17, 1999, pp. 1-5, VMWare, Inc.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Bhatia, Sapan, et al., "Trellis: A Platform for Building Flexible, Fast Virtual Networks on Commodity Hardware," ROADS'08, Dec. 9, 2008, pp. 1-6, Madrid, Spain, ACM.
Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.
Dobrescu, Mihai, et al., "RouteBricks: Exploiting Parallelism to Scale Software Routers," SOSP'09, Proceedings of the ACM SIGOPS 22nd Symposium on Operating Systems Principles, Oct. 2009, pp. 1-17, ACM New York, NY.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCS)-Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and the Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hamilton, James, et al., "Datacenter Networks Are In My Way," Principals of Amazon Series, Oct. 28, 2010, pp. 1-14.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Kim, Changhoon, et al., "Floodless in SEATTLE: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, 34 pp. vol. 18, No. 3.
Koponen, Teemu, et al., "Onix: A Distributed Control Platform for Large-scale Production Networks," in Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Mysore, Radhka Niranjan, et al., "PortLand: A Scalable Fault-Tolerant Layer 2 Data Center Network Fabric," Proc. of SIGCOMM, Aug. 17-21, 2009, pp. 1-12.
Pelissier, Joe, "Network Interface Virtualization Review," Jan. 2009, pp. 1-38.
Pelissier, Joe, "VNTag 101," May 2008, pp. 1-87.
Pettit, Justin, et al., "Virtual Switching in an Era of Advanced Edges," Sep. 2010, 7 pages.
Pfaff, Ben., et al., "Extending Networking into the Virtualization Layer," Proc. of HotNets, Oct. 2009, pp. 1-6.
Rosen, E., et al., "Applicability Statement for BGP/MPLS IP Virtual Private Networks (VPNs)," The Internet Society, RFC 4365, Feb. 2006, pp. 1-32.
Sherwood, Rob, et al., "Can the Production Network Be the Testbed?," Month Unknown, 2010, pp. 1-14.
Sherwood, Rob, et al., "Carving Research Slices Out of Your Production Networks with OpenFlow," ACM SIGCOMM Computer Communications Review, Jan. 2010, pp. 129-130, vol. 40, No. 1.

(56) References Cited

OTHER PUBLICATIONS

Sherwood, Rob, et al., "FlowVisor: A Network Virtualization Layer," Oct. 14, 2009, pp. 1-14, OPENFLOW-TR-2009-1.

Spalink, Tammo, et al., "Building a Robust Software-Based Router Using Network Processors," Month Unknown, 2001, pp. 216-229, ACM, Banff, CA.

Tavakoli, Arsalan, et al., "Applying NOX to the Datacenter," Proc. HotNets, Month Unknown, 2009, 6 pages.

Touch, J., et al., "Transparent Interconnection of Lots of Links (TRILL): Problem and Applicability Statement," May 2009, pp. 1-17, IETF Trust, RFC 5556.

Turner, Jonathan S., "A Proposed Architecture for the GENI Backbone Platform," ANCS'06, Dec. 3-5, 2006, 10 pages, ACM, San Jose, California, USA.

Turner, Jon, et al., "Supercharging PlanetLab—High Performance, Multi-Application Overlay Network Platform," SIGCOMM-07, Aug. 27-31, 2007, 12 pages, ACM, Koyoto, Japan.

Wang, Yi, et al., "Virtual Routers on the Move: Live Router Migration as a Network-management Primitive," SIGCOMM 08, Aug. 17-22, 2008, 12 pages, ACM, Seattle, Washington, USA.

Yang, L., et al., "Forwarding and Control Element Separation (ForCES) Framework," Apr. 2004, pp. 1-40, The Internet Society.

Yu, Minlan, et al., "Scalable Flow-Based Networking with DIFANE," In Proc. SIGCOMM Aug. 2010, 16 pages.

Portions of Prosecution History of U.S. Appl. No. 13/589,074, May 30, 2014, Zhang, Ronghua, et al.

Wang, Wei-Ming, et al., "Analysis and Implementation of an Open Programmable Router Based on Forwarding and Control Element Separation," Journal of Computer Science and Technology, Sep. 2008, pp. 769-779, vol. 23, No. 5.

International Preliminary Report on Patentability and Written Opinion for PCT/US2012/051504, Feb. 27, 2014 (mailing date), Nicira, Inc.

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.

Foster, Nate, et al., "Frenetic: A Network Programming Language," ICFP '11, Sep. 19-21, 2011, 13 pages, Tokyo, Japan.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.

Loo, Boon Thau, et al., "Declarative Routing: Extensible Routing with Declarative Queries," In Proc. of SIGCOMM, Aug. 21-26, 2005, 14 pages, Philadelphia, PA, USA.

Loo, Boon Thau, et al., "Implementing Declarative Overlays," in Proc. of SOSP, Oct. 2005, 16 pages. Brighton, UK.

Shenker, Scott, et al., "The Future of Networking, and the Past of Protocols," Dec. 2, 2011, pp. 1-30, USA.

Portions of prosecution history of U.S. Appl. No. 13/757,609, Mar. 4, 2015, Zhang, Ronghua, et al.

Portions of prosecution history of U.S. Appl. No. 13/589,062, Dec. 11, 2014, Koponen, Teemu, et al.

Updated portions of prosecution history of U.S. Appl. No. 13/589,074, Jan. 8, 2015, Zhang, Ronghua, et al.

Portions of prosecution history of U.S. Appl. No. 13/757,636, Dec. 19, 2014, Zhang, Ronghua, et al.

Portions of prosecution history of U.S. Appl. No. 13/757,642, Nov. 20, 2014, Koponen, Teemu, et al.

Portions of prosecution history of U.S. Appl. No. 13/757,659, Mar. 3, 2015, Koponen, Teemu, et al.

Portions of prosecution history of U.S. Appl. No. 13/757,594, Feb. 18, 2015, Zhang, Ronghua, et al.

Portions of prosecution history of U.S. Appl. No. 13/757,681, Feb. 3, 2015, Koponen, Teemu, et al.

Portions of prosecution history of U.S. Appl. No. 13/757,678, Mar. 5, 2015, Thakkar, Pankaj, et al.

Portions of prosecution history of AU2012296329, Mar. 10, 2015 (mailing date), Nicira, Inc.

Portions of prosecution history of EP12824178.3, date Oct. 1, 2014 (mailing date), Nicira, Inc.

Author Unknown, "OpenFlow Switch Specification," Feb. 28, 2011, pp. 1-56.

Dumitriu, Dan Mihai, et al. U.S. Appl. No. 61/514,990, filed Aug. 4, 2011.

\* cited by examiner

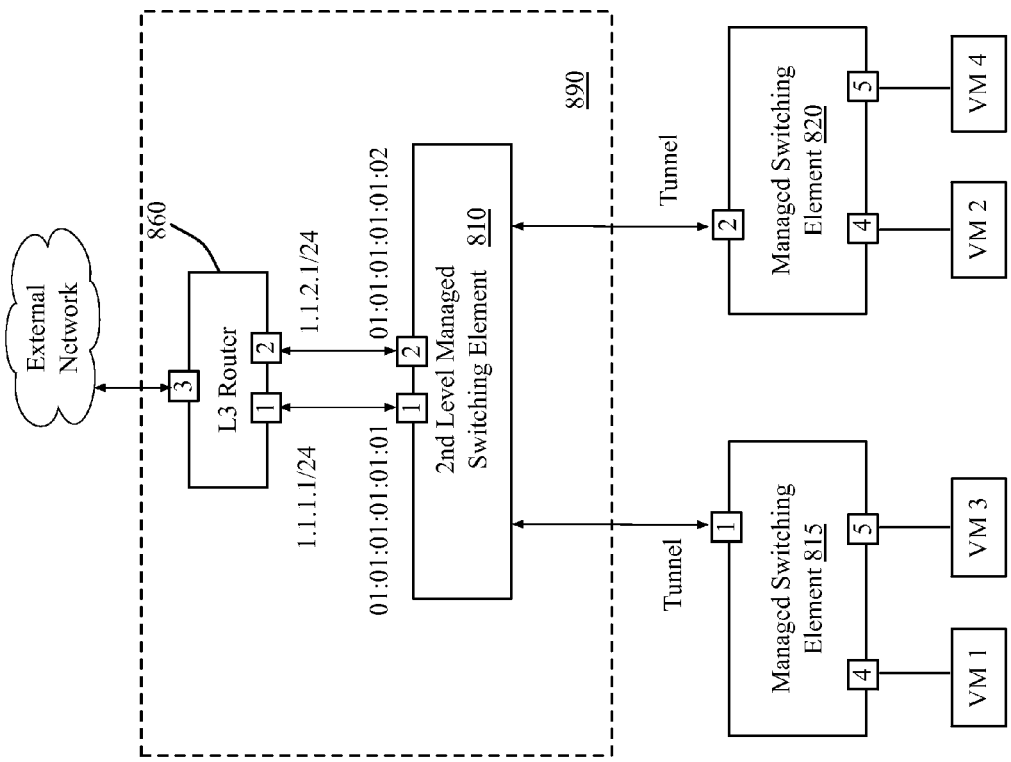
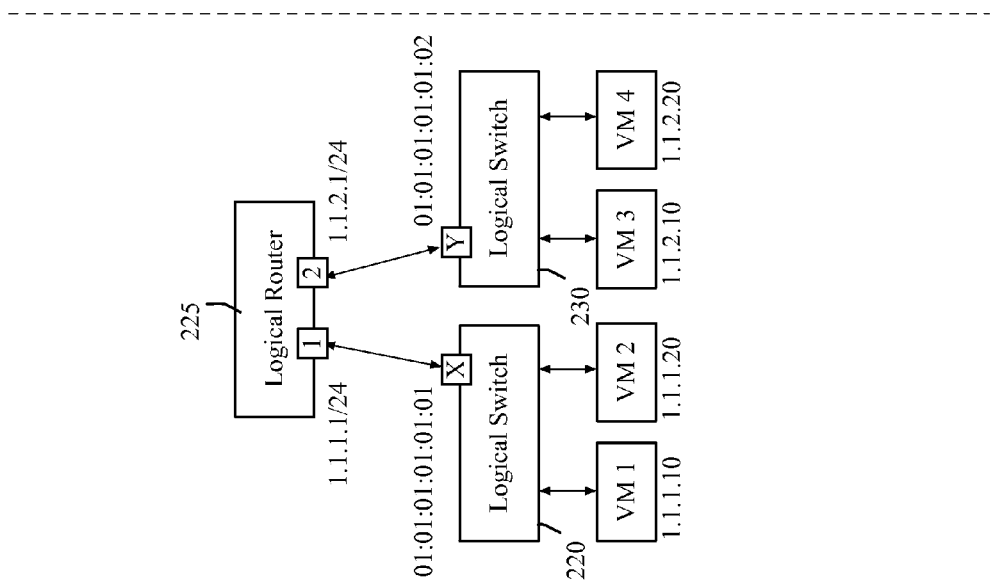
Figure 12

FLOW TEMPLATING IN LOGICAL L3 ROUTING

CLAIM OF BENEFIT TO PRIOR APPLICATIONS

This application is a continuation application of U.S. patent application Ser. No. 13/589,062, filed on Aug. 17, 2012, now published as U.S. Patent Publication 2013/0044636. U.S. patent application Ser. No. 13/589,062 claims the benefit of U.S. Provisional Patent Application 61/524,754, filed Aug. 17, 2011; U.S. Provisional Patent Application 61/643,339, filed May 6, 2012; U.S. Provisional Patent Application 61/654,121, filed Jun. 1, 2012; and U.S. Provisional Patent Application 61/666,876, filed Jul. 1, 2012. This application claims the benefit of U.S. Provisional Patent Application 61/643,339, filed May 6, 2012; U.S. Provisional Patent Application 61/654,121, filed Jun. 1, 2012; and U.S. Provisional Patent Application 61/666,876, filed Jul. 1, 2012. U.S. patent application Ser. No. 13/589,062 and U.S. Provisional Patent Applications 61/524,754, 61/643,339, 61/654,121, and 61/666,876 are incorporated herein by reference.

BACKGROUND

Many current enterprises have large and sophisticated networks comprising switches, hubs, routers, servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments in some cases model logical routing as an act of interconnecting two or more logical datapath (LDP) sets operating in L2 domains by a logical router that implements a logical datapath set (LDPS) operating in an L3 domain. A packet traversing from a logical L2 domain to another will take the following four steps in some embodiments. These four steps are described below in terms of the logical processing operations that the network control system implements. However, it is to be understood that these operations are performed by the managed switching elements of the network based on the physical control plane data that is produced by the network control system.

First, the packet will be processed through an L2 table pipeline of the originating logical L2 domain. The pipeline will conclude with the destination media access control (MAC) address being forwarded to a logical port attached to a logical port of a logical router.

Second, the packet will be processed though a logical router's L3 datapath, again by sending it through this router's L3 table pipeline. The L2 lookup stage common in physical routers is skipped in the router's L3 datapath in some embodiments, as the logical router will only receive packets requiring routing.

In some embodiments, the L3 forwarding decision will use the prefix (forwarding information base (FIB) entries that are provisioned by the logical control plane of the logical router. In some embodiments, a control application is used to receive the logical control plane data, and to convert this data to logical forwarding plane data that is then supplied to the network control system. For the L3 forwarding decision, some embodiments use the prefix FIB entries to implement longest prefix matching.

As a result, the L3 router will forward the packet to the logical port that is "connected" to the destination L2 LDPS. Before forwarding the packet further to that LDPS, the L3 router will change the originating MAC address to one that is defined in its domain as well as resolve the destination IP address to a destination MAC address. The resolution is executed by the last "IP output" stage of the L3 data pipeline in some embodiments. The same pipeline will decrement TTL and update the checksum (and respond with ICMP if TTL goes to zero).

It should be noted that some embodiments rewrite the MAC address before feeding the processed packet to the next LDPS, because without this rewriting a different forwarding decision could result at the next LDPS. It should also be noted that even though traditional routers execute the resolution of the destination IP address using Address Resolution Protocol (ARP), some embodiments do not employ ARP for this purpose in the L3 logical router because as long as the next-hop is a logical L2 datapath, this resolution remains internal to the virtualization application.

Third, the packet will be processed through an L2 table pipeline of the destination logical L2 domain. The destination L2 table pipeline determines the logical egress port along which it should send the packet. In case of an unknown MAC address, this pipeline would resolve the MAC address location by relying on some distributed lookup mechanism. In some embodiments, the managed switching elements rely on a MAC learning algorithm, e.g., they flood the unknown packets. In these or other embodiments, the MAC address location information can also be obtained by other mechanisms, for instance out-of-band. If such a mechanism is available in some embodiments, the last logical L2 table pipeline uses this mechanism to obtain the MAC address location.

Fourth, the packet gets sent to the logical port attached to the physical port representing the logical port attachment. At this stage, if the port is point-to-point media (e.g., virtual network interface, VIF), there's nothing left to do but to send the packet to the port. However, if the last LDPS was an L3 router and hence the attachment is a physical L3 subnet, the attachment point, in some embodiments, resolves the destination IP address by using ARP before sending the packet out. In that case, the source MAC address would be egress specific and not the logical MAC interface address in case of a VIF. In other embodiments, resolving the destination IP address by using ARP is performed during the second step by the L3 logical router.

In the example above, there's only a single logical router interconnecting logical L2 datapaths, but nothing limits the topologies. One of ordinary skill in the art will recognize that more LDP sets can be interconnected for richer topologies.

In some embodiments, the control application allows an L3 specific logical state to be defined in terms of one or more tables that specify a logical L3 pipeline. The corresponding logical control plane managing the LDPS pipeline can either rely on static route configuration, or peer with other LDP sets over a standard routing protocol.

In some embodiments, the virtualization application defines the physical realization of the above-described, four-step L2/L3 packet processing into physical control plane data, which when translated into physical forwarding data by the managed switching elements, effectuates a sequence of logical pipeline executions that are all or predominantly performed at the first-hop, managed edge switching element. In order to maintain the locality of the physical traffic, the first-hop executes the series of pipelines (with all state required) and directly sends the traffic towards the ultimate egress location in the physical network. When short cut tunnels are used, the virtualization application interconnects logical L2 datapaths with logical L3 datapaths by extending the short-cut tunnel mesh beyond a single LDPS to a union of ports of all the interconnected LDP sets. When everything is executed at the first-hop, the first-hop elements typically have access to all the states of the logical network through which the packet traverses.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 12 conceptually illustrates an example implementation of logical switches and logical routers in managed switching elements and L3 routers.

DETAILED DESCRIPTION

Figure 1:
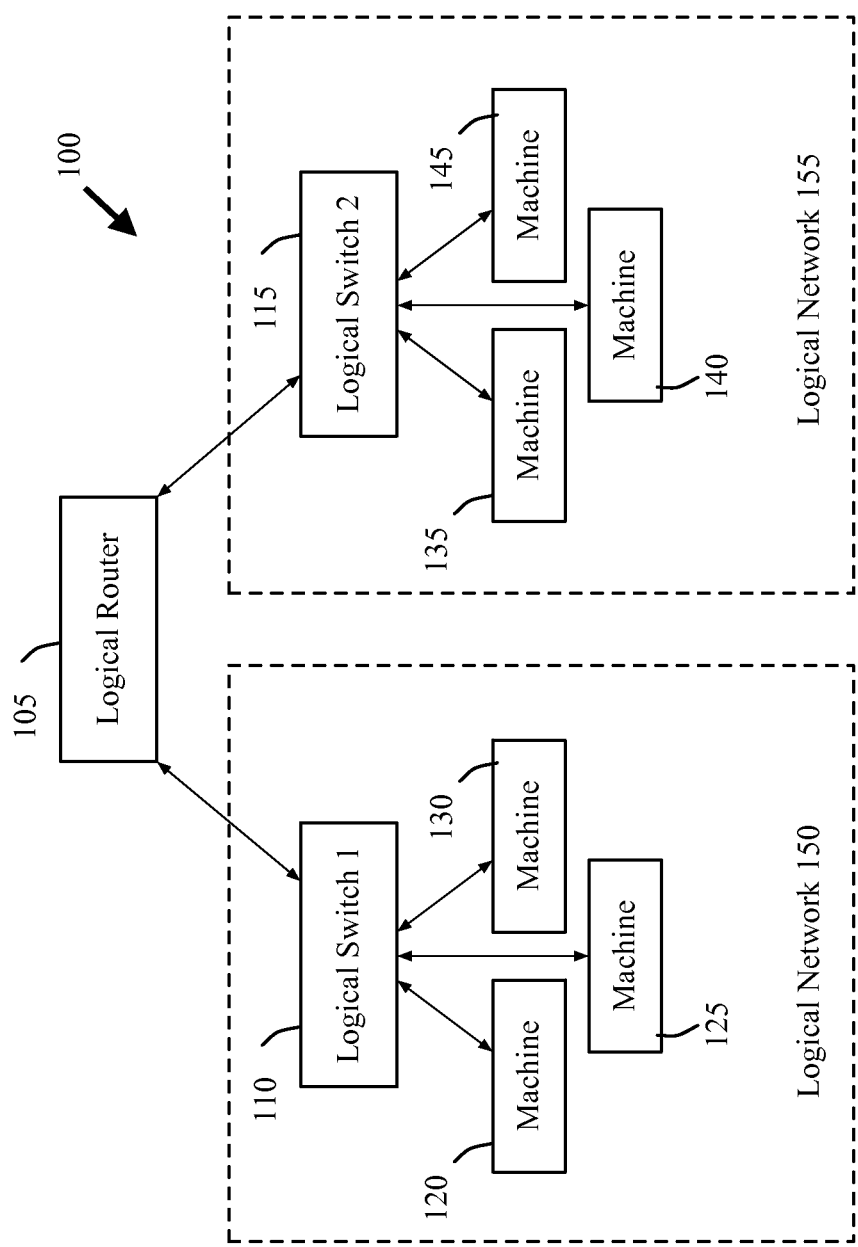
FIG. 1 conceptually illustrates a network architecture of some embodiments.

Some embodiments of the invention provide a network control system that allows logical datapath (LDP) sets (e.g., logical networks) to be implemented by switching elements of a physical network. To implement LDP sets, the network control system of some embodiments generates physical control plane data from logical forwarding plane data. The physical control plane data is then pushed to the managed switching elements, where it is typically converted into physical forwarding plane data that allows the managed switching elements to perform their forwarding decisions. Based on the physical forwarding data, the managed switching elements can process data packets in accordance with the logical processing rules specified within the physical control plane data.

A single logical datapath set provides switching fabric to interconnect a number of logical ports, which can be either attached to physical or virtual endpoints. In some embodiments, the creation and use of such LDP sets and logical ports provides a logical service model that corresponds to a virtual local area network (VLAN). This model, in some embodiments, limits the operations of the network control system to defining only logical L2 switching capabilities. However, other embodiments extend the operations of the network control system to both the logical L2 switching capabilities and the logical L3 switching capabilities.

The network control system of some embodiments supports the following logical L3 switching capabilities.

Logical routing. Instead of performing just L2 switching for packets, the network control system of some embodiments also defines the physical control plane data to direct the managed switching elements to forward packets based on Internet Protocol (IP) addresses when crossing L2 broadcast domains (IP subnets). Such logical L3 routing resolves the scalability issues of L2 networks.

Gateway virtualization. Instead of interfacing with external networks by using a purely L2 interface, the network control system of some embodiments can use an IP interface to interact with external networks. In some embodiments, the network control system defines such an IP interface by defining a single logical gateway even when multiple physical egress and ingress points to and from the external networks exist. Accordingly, some embodiments interface with external IP networks by using gateway virtualization.

Network Address Translation. An entire L3 subnet may be network address translated (NAT'ed). In some embodiments, the logical network uses private addresses and exposes only NAT'ed IP addresses for external networks. Moreover, in some embodiments, the subnets of the logical network interconnect over NATs or use destination NAT'ing to implement fine-grained application level routing decisions.

Stateful filtering. Similar to NAT'ing, some embodiments isolate subnets from the external network by using stateful access control lists (ACLs). Also, some embodiments place ACLs between the logical subnets.

Load-balancing. In some cases, the logical network is used to provide services. For these and other cases, the network control system provides virtual IP addresses for the application clusters. In some embodiments, the network control system specifies load-balancing operations that enable spreading incoming application traffic over a set of logical IP addresses.

DHCP. While a virtual machine (VM) can be set up to provide dynamic IP address allocation services within the logical network, a service provider may prefer more efficient realization of the dynamic host configuration protocol (DHCP) service at the infrastructure level. Accordingly, the network control system of some embodiments provides an efficient realization of the DHCP service at the infrastructure level.

The design for each of these L3 features will be described below. Implementation-wise the features are largely orthogonal, so one of ordinary skill will realize that these features do not all have to be offered by a network control system of some embodiments. Before describing the features further, several assumptions should be mentioned. These assumptions are as follows.

Large networks. Logical L3 networks spanning multiple L2 networks will be larger than the logical L2 networks. Some embodiments solve logical L3 problems for server clusters as large as 10K servers by using a map-reduce distributed processing technique.

Physical traffic non-locality. Logical subnets within a data center may exchange significant traffic within the data center. Some embodiments preserve the traffic locality to the extent that this is possible. In the above-mentioned map-reduce example, the traffic has no locality in terms of endpoints.

Logical traffic locality. There is indeed locality when it comes to the traffic exchanged between the logical subnets. In other words, not every logical network has clients for the map-reduce cluster mentioned above.

Placement of the functionalities. As mentioned in U.S. patent application Ser. No. 13/177,535, now issued as U.S. Pat. No. 8,750,164, which is incorporated herein by reference, the managed switching elements, in some embodiments, are (1) edge switching elements of a physical network (i.e., switching elements that have direct connections with the virtual or physical computing devices connected by the physical network), and (2) non-edge switching elements that are inserted in the managed-switching element hierarchy to simplify and/or facilitate the operation of the controlled edge switching elements. As further described in U.S. patent application Ser. No. 13/177,535, the edge switching elements include, in some embodiments, (1) switching elements that have direct connections with the virtual or physical computing devices connected by the network, and (2) integration elements (called extenders) that connect a first managed portion of the network to a second managed portion of the network (e.g., a portion in a different physical location than the first managed portion), or to an unmanaged portion of the network (e.g., to the internal network of an enterprise). Some embodiments perform the logical L3 routing ideally at the first managed edge switching element, i.e., at the first-hop edge switching element, which may be implemented in the hypervisor that also hosts the virtual machines interconnected by the physical network. Ideally, the first-hop switching element performs all or most of the L3 routing because the network control system of some embodiments can then consider the non-edge switching elements (internal network) as nothing but a fabric for interconnecting the devices.

Some of the embodiments described below are implemented in a novel distributed network control system that is formed by one or more controllers (also called controller instances below) for managing one or more shared forwarding elements. The shared forwarding elements in some embodiments can include virtual or physical network switches, software switches (e.g., Open vSwitch), routers, and/or other switching devices, as well as any other network elements (such as load balancers, etc.) that establish connections between these switches, routers, and/or other switching devices. Such forwarding elements (e.g., physical switches or routers) are also referred to below as switching elements. In contrast to an off the shelf switch, a software forwarding element is a switch that in some embodiments is formed by storing its switching table(s) and logic in the memory of a standalone device (e.g., a standalone computer), while in other embodiments, it is a switch that is formed by storing its switching table(s) and logic in the memory of a device (e.g., a computer) that also executes a hypervisor and one or more virtual machines on top of that hypervisor.

In some embodiments, the controller instances allow the system to accept logical datapath sets from users and to configure the switching elements to implement these logical datapath sets. In some embodiments, one type of controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate logical datapath set, while a virtualization module implements the specified logical datapath set by mapping the logical datapath set onto the physical switching infrastructure. In some embodiments, the control and virtualization applications are two separate applications, while in other embodiments they are part of the same application.

From the logical forwarding plane data for a particular logical datapath set, the virtualization module of some embodiments generates universal physical control plane (UPCP) data that is generic for any managed switching element that implements the logical datapath set. In some embodiments, this virtualization module is part of a controller instance that is a master controller for the particular logical datapath set. This controller is referred to as the logical controller.

In some embodiments, the UPCP data is then converted to customized physical control plane (CPCP) data for each particular managed switching element by a controller instance that is a master physical controller instance for the particular managed switching element, or by a chassis controller for the particular managed switching element, as further described in U.S. patent application Ser. No. 13/589,077, filed Aug. 17, 2012, now published as U.S. Patent Publication 2013/0103817, which is incorporated herein by reference. When the chassis controller generates the CPCP data, the chassis controller obtains the UPCP data from the virtualization module of the logical controller through the physical controller.

Irrespective of whether the physical controller or chassis controller generate the CPCP data, the CPCP data for a particular managed switching element needs to be propagated to the managed switching element. In some embodiments, the CPCP data is propagated through a network information base (NIB) data structure, which in some embodiments is an object-oriented data structure. Several examples of using the NIB data structure are described in U.S. patent application Ser. Nos. 13/177,529, now issued as U.S. Pat. No. 8,743,889 and 13/177,533, now issued as U.S. Pat. No. 8,817,620, which are incorporated herein by reference. As described in these applications, the NIB data structure is also used in some embodiments to may serve as a communication medium between different controller instances, and to store data regarding the logical datapath sets (e.g., logical switching elements) and/or the managed switching elements that implement these logical datapath sets.

However, other embodiments do not use the NIB data structure to propagate CPCP data from the physical controllers or chassis controllers to the managed switching elements, to communicate between controller instances, and to store data regarding the logical datapath sets and/or managed switching elements. For instance, in some embodiments, the physical controllers and/or chassis controllers communicate with the managed switching elements through OpenFlow entries and updates over the configuration protocol. Also, in some embodiments, the controller instances use one or more direct communication channels (e.g., RPC calls) to exchange data. In addition, in some embodiments, the controller instances (e.g., the control and virtualization modules of these instances) express the logical and/or physical data in terms of records that are written into the relational database data structure. In some embodiments, this relational database data structure are part of the input and output tables of a table mapping engine (called nLog) that is used to implement one or more modules of the controller instances.

I. Logical Routing

Some embodiments in some cases model logical routing as an act of interconnecting two or more LDP sets operating in L2 domains by a logical router that implements a LDPS operating in an L3 domain. A packet traversing from a logical L2 domain to another will take the following four steps in some embodiments. These four steps are described below in terms of the logical processing operations that the network control system implements. However, it is to be understood that these operations are performed by the managed switching elements of the network based on the physical control plane data that is produced by the network control system.

First, the packet will be processed through an L2 table pipeline of the originating logical L2 domain. The pipeline will conclude with the destination media access control (MAC) address being forwarded to a logical port attached to a logical port of a logical router.

Second, the packet will be processed though a logical router's L3 datapath, again by sending it through this router's L3 table pipeline. The L2 lookup stage common in physical routers is skipped in the router's L3 datapath in some embodiments, as the logical router will only receive packets requiring routing.

In some embodiments, the L3 forwarding decision will use the prefix (forwarding information base (FIB) entries that are provisioned by the logical control plane of the logical router. In some embodiments, a control application is used to receive the logical control plane data, and to convert this data to logical forwarding plane data that is then supplied to the network control system. For the L3 forwarding decision, some embodiments use the prefix FIB entries to implement longest prefix matching.

As a result, the L3 router will forward the packet to the logical port that is "connected" to the destination L2 LDPS. Before forwarding the packet further to that LDPS, the L3 router will change the originating MAC address to one that is defined in its domain as well as resolve the destination IP address to a destination MAC address. The resolution is executed by the last "IP output" stage of the L3 data pipeline in some embodiments. The same pipeline will decrement TTL and update the checksum (and respond with ICMP if TTL goes to zero).

It should be noted that some embodiments rewrite the MAC address before feeding the processed packet to the next LDPS, because without this rewriting a different forwarding decision could result at the next LDPS. It should also be noted that even though traditional routers execute the resolution of the destination IP address using ARP, some embodiments do not employ ARP for this purpose in the L3 logical router because as long as the next-hop is a logical L2 datapath, this resolution remains internal to the virtualization application.

Third, the packet will be processed through an L2 table pipeline of the destination logical L2 domain. The destination L2 table pipeline determines the logical egress port along which it should send the packet. In case of an unknown MAC address, this pipeline would resolve the MAC address location by relying on some distributed lookup mechanism. In some embodiments, the managed switching elements rely on a MAC learning algorithm, e.g., they flood the unknown packets. In these or other embodiments, the MAC address location information can also be obtained by other mechanisms, for instance out-of-band. If such a mechanism is available in some embodiments, the last logical L2 table pipeline uses this mechanism to obtain the MAC address location.

Fourth, the packet gets sent to the logical port attached to the physical port representing the logical port attachment. At this stage, if the port is point-to-point media (e.g., virtual network interface, VIF), there's nothing left to do but to send the packet to the port. However, if the last LDPS was an L3 router and hence the attachment is a physical L3 subnet, the attachment point, in some embodiments, resolves the destination IP address by using ARP before sending the packet out. In that case, the source MAC address would be egress specific and not the logical MAC interface address in case of a VIF. In other embodiments, resolving the destination IP address by using ARP is performed during the second step by the L3 logical router.

In the example above, there's only a single logical router interconnecting logical L2 datapaths, but nothing limits the topologies. One of ordinary skill in the art will recognize that more LDP sets can be interconnected for richer topologies.

In some embodiments, the control application allows an L3 specific logical state to be defined in terms of one or more tables that specify a logical L3 pipeline. The corresponding logical control plane managing the LDPS pipeline can either rely on static route configuration, or peer with other LDP sets over a standard routing protocol.

In some embodiments, the virtualization application defines the physical realization of the above-described, four-step L2/L3 packet processing into physical control plane data, which when translated into physical forwarding data by the managed switching elements, effectuates a sequence of logical pipeline executions that are all or predominantly performed at the first-hop, managed edge switching element. In order to maintain the locality of the physical traffic, the first-hop executes the series of pipelines (with all state required) and directly sends the traffic towards the ultimate egress location in the physical network. When short cut tunnels are used, the virtualization application interconnects logical L2 datapaths with logical L3 datapaths by extending the short-cut tunnel mesh beyond a single LDPS to a union of ports of all the interconnected LDP sets.

When everything is executed at the first-hop, the first-hop elements typically have access to all the states of the logical network through which the packet traverses. The dissemination (and its scaling implications) of the state for the execution of the logical pipelines at the first-hop switching element is described further below.

FIG. 1 conceptually illustrates a network architecture 100 of some embodiments.

Specifically, this figure illustrates that a logical router 105 routes packets between two LDP sets (e.g., logical networks) 150 and 155. As shown, the network architecture 100 includes the logical router 105, logical switches 110 and 115, and machines 120-145.

The logical switch 110 is a logical switch (or a logical switching element) described in U.S. patent application Ser. No. 13/177,535. The logical switch 110 is implemented across several managed switching elements (not shown). The logical switch 110 routes network traffic between the machines 120-130 at L2 (layer 2). That is, the logical switch 110 makes switching decisions to route network data at the data link layer between the machines 120-130 based on one or more forwarding tables (not shown) that the logical switch 110 has. The logical switch 110, along with several other logical switches (not shown), routes the network traffic for the logical network 150. The logical switch 115 is another logical switch. The logical switch 115 routes the traffic between machines 135-145 for the logical network 155.

A logical router in some embodiments routes traffic at L3 (layer 3—network layer) between different logical networks. Specifically, the logical router routes network traffic between two or more logical switches based on a set of routing tables. In some embodiments, a logical router is implemented in a single managed switching element while in other embodiments a logical router is implemented in several different managed switching elements in a distributed manner. A logical router of these different embodiments will be described in detail further below. The logical router 105 routes the network traffic at the L3 between the logical networks 150 and 155. Specifically, the logical router 105 routes the network traffic between the two logical switches 110 and 115.

The machines 120-145 are machines that are capable of exchanging data packets. For instance, each machine 120-145 has a network interface controller (NIC) so that applications that execute on the machine 120-145 can exchange data between them through the logical switches 110 and 115 and the logical router 105.

The logical networks 150 and 155 are different in that the machines in each network use different L3 addresses. For instance, the logical networks 150 and 155 are different IP subnets for two different departments of a company.

In operation, the logical switches 110 and 115 and the logical router 105 function like switches and routers. For instance, the logical switch 110 routes data packets originating from one of the machines 120-130 and heading to another of the machines 120-130. When the logical switch 110 in the logical network 150 receives a data packet that is destined for one of the machines 135-145 in the logical network 155, the logical switch 110 sends the packet to the logical router 105. The logical router 105 then routes the packet, based on the information included in the header of the packet, to the logical switch 115. The logical switch 115 then routes the packet to one of the machines 135-145. Data packets originating from one of the machines 135-145 are routed by the logical switches 110 and 115 and the logical router 105 in a similar manner.

FIG. 1 illustrates a single logical router that routes data between the two logical networks 150 and 155. One of ordinary skill in the art will recognize that there could be more than one logical routers involved in routing packets between two logical networks.

Figure 2:
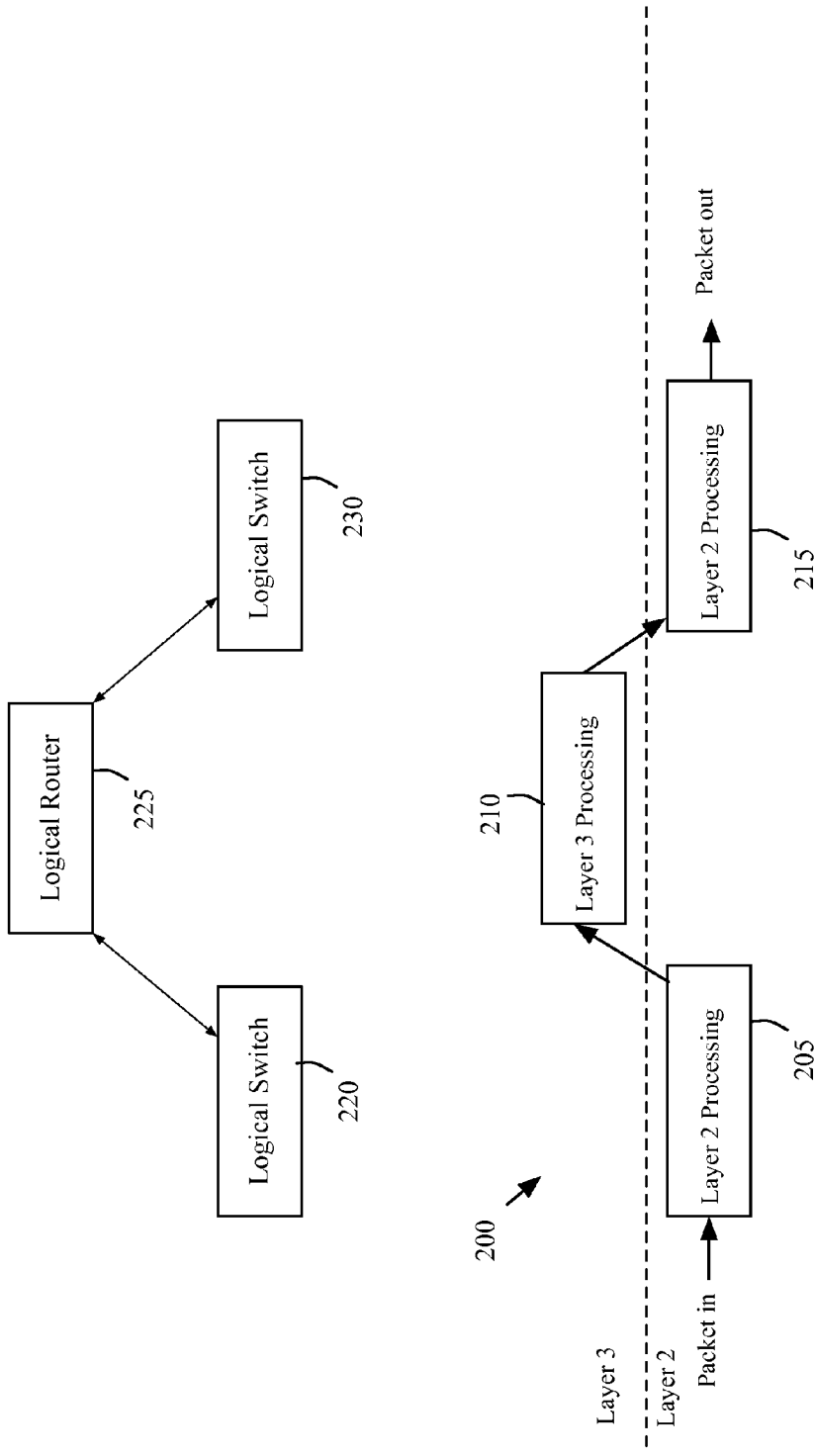
FIG. 2 conceptually illustrates a processing pipeline of some embodiments for processing network data through logical switches and logical routers.

FIG. 2 conceptually illustrates a processing pipeline 200 of some embodiments for processing network data through logical switches and logical routers. Specifically, the processing pipeline 200 includes three stages 205-215 for processing a data packet through a logical switch 220, a logical router 225, and then a logical switch 230, respectively. This figure illustrates the logical router 225 and the logical switches 220 and 230 in the top half of the figure and the processing pipeline 200 in the bottom half of the figure.

The logical router 225 is similar to the logical router 105 described above by reference to FIG. 1, in that the logical router 225 routes data packets between the logical switches 220 and 220. The logical switches 220 and 230 are similar to the logical switches 110 and 115. The logical switches 220 and 230 each forward the traffic at L2 for a logical network.

When the logical switch 220 receives a packet, the logical switch 220 performs stage 205 (L2 processing) of the logical processing pipeline 200 in order to forward the packet in one logical network. When the packet is destined for another logical network, the logical switch 220 forwards the packet to the logical router 225. The logical router 225 then performs stage 210 (L3 processing) of the logical processing pipeline 200 on the packet in order to route the data at L3. The logical router 225 sends this packet to another logical router (not shown) or, if the logical router 225 is coupled to the logical switch 230, the logical router 225 sends the packet to the logical switch 230 that would send the packet directly to the destination machine of the packet. The logical switch 230, which directly sends the packet to the packet's destination, performs stage 215 (L2 processing) of the logical processing pipeline 200 in order to forward the packet to the packet's destination.

In some embodiments, logical switches and logical routers are implemented by a set of managed switching elements (not shown). These managed switching elements of some embodiments implement the logical switches and logical routers by performing a logical processing pipeline such as the logical processing pipeline 200. The managed switching elements of some embodiments perform the logical processing pipelines based on flow entries in the managed switching elements. The flow entries (not shown) in the managed switching elements are configured by the network control system of some embodiments. More details of the logical processing pipeline 200 will be described further below.

Figure 3:
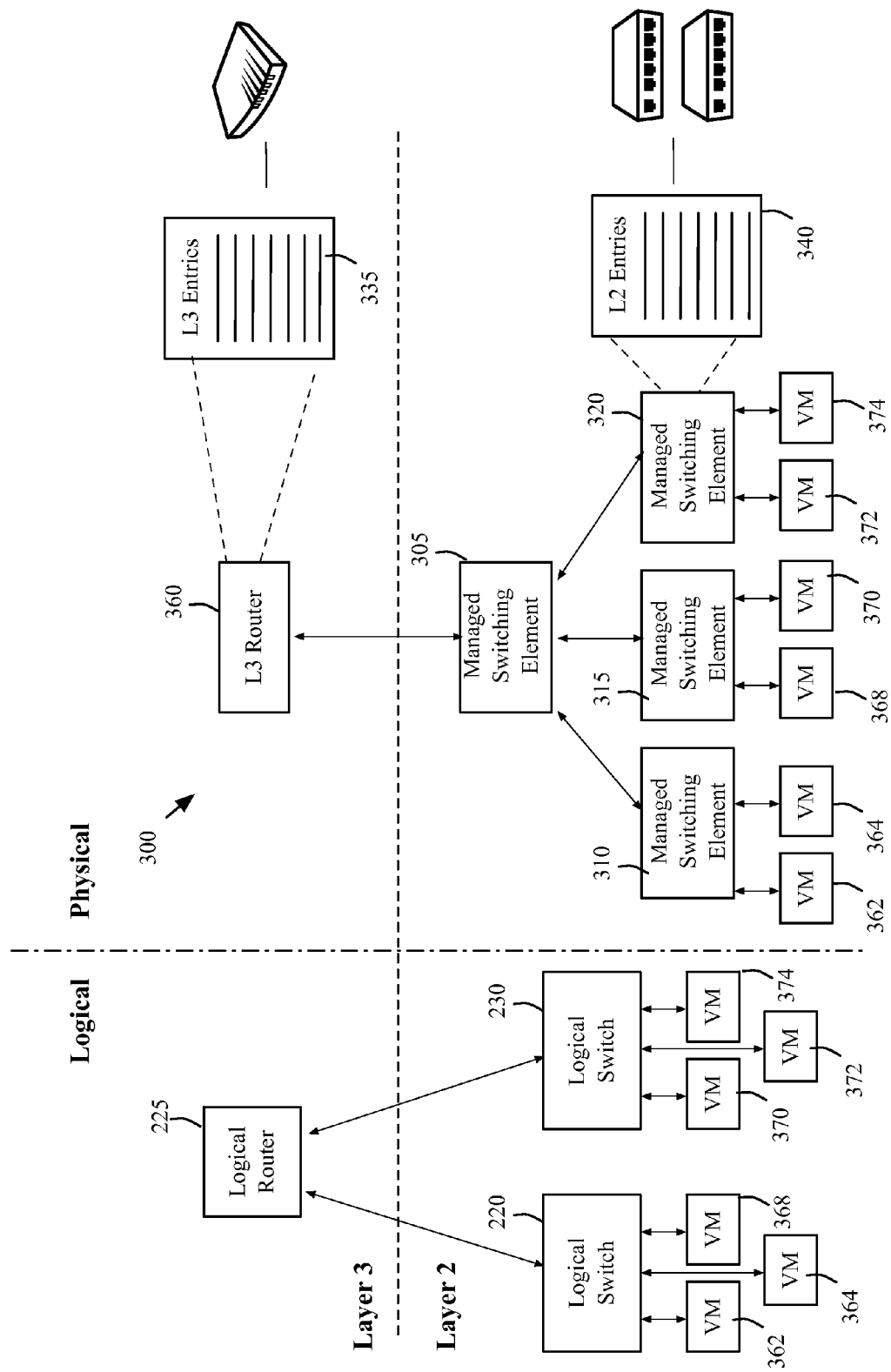
FIG. 3 conceptually illustrates a network architecture in which a logical router is implemented in a single L3 router.
Figure 4:
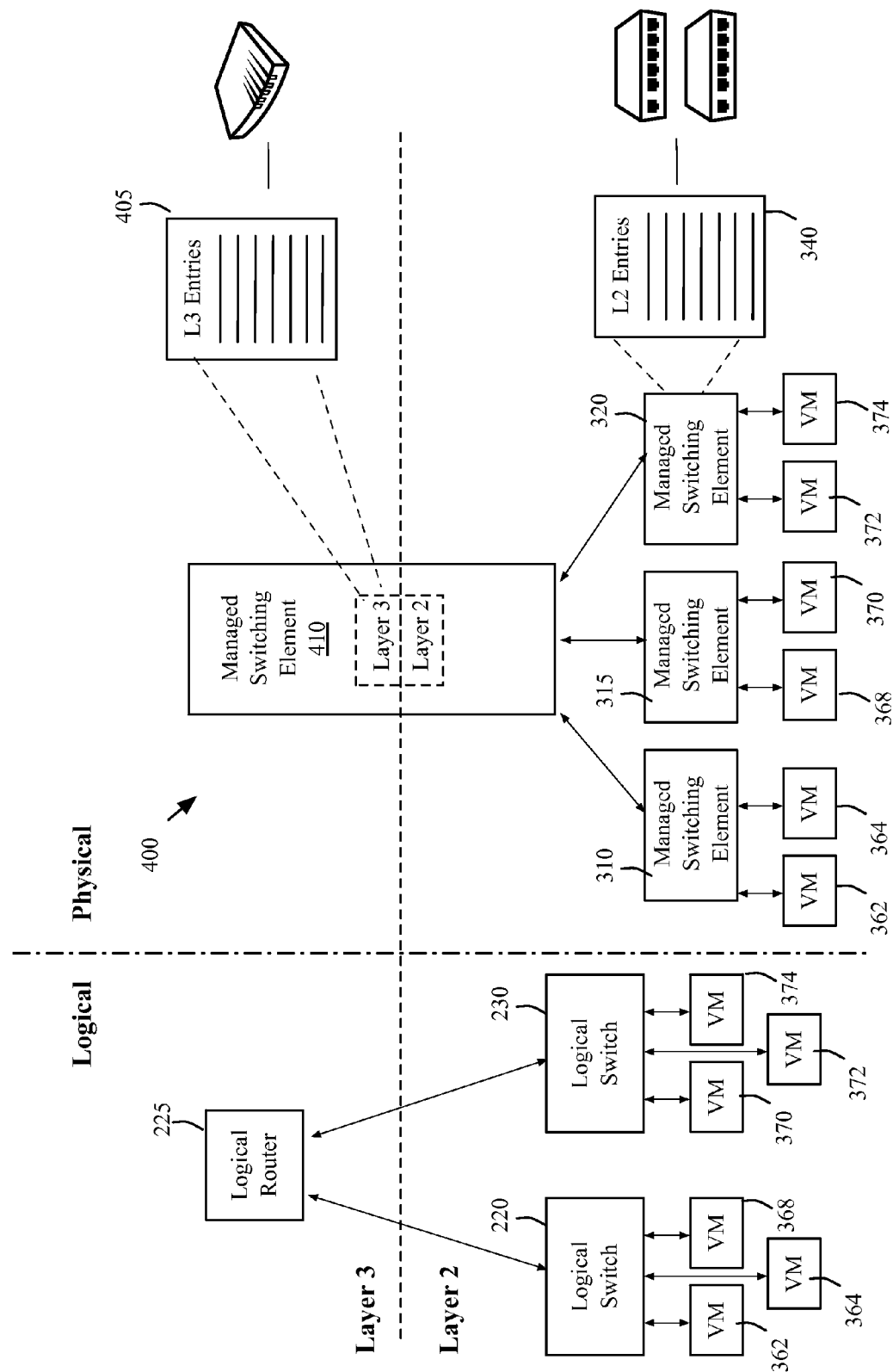
FIG. 4 conceptually illustrates a network architecture in which a logical router is implemented in a managed switching element.
Figure 5:
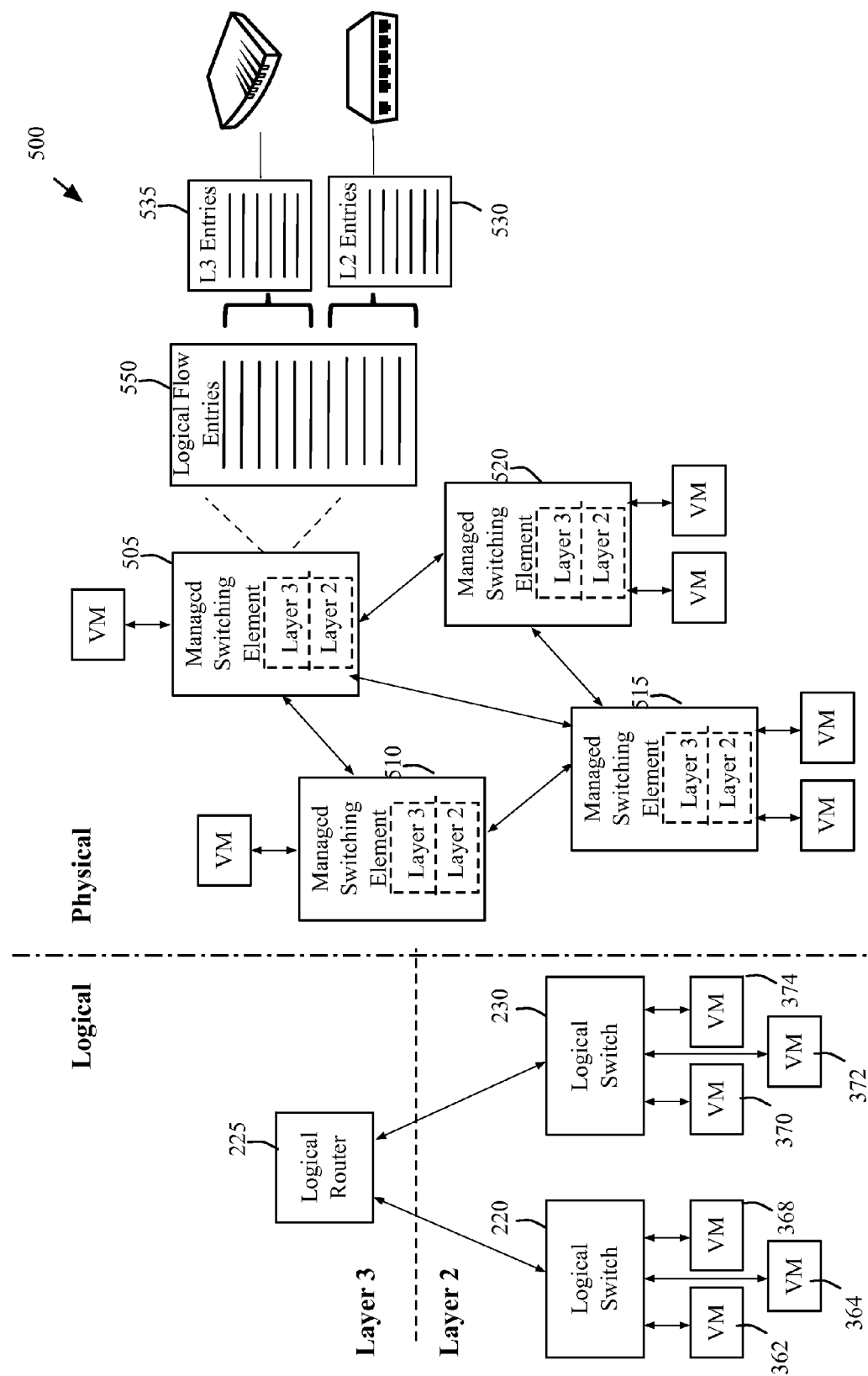
FIG. 5 conceptually illustrates a network architecture in which a router is implemented in a distributed manner such that each of several managed switching elements routes packets at L3.

The next three figures, FIGS. 3, 4, and 5 conceptually illustrates several implementations of logical switches and logical routers of some embodiments. FIGS. 3 and 4 illustrates two different implementations of centralized L3 routing while FIG. 5 illustrates a distributed L3 routing.

FIG. 3 conceptually illustrates a network architecture 300. Specifically, FIG. 3 illustrates that the logical router 225 is implemented in a single L3 router 360 (e.g., a hardware router or a software router). The L3 router 360 routes the packets for different logical networks each of which includes several logical switches implemented in several different managed switching elements. This figure is horizontally divided into a left half and a right half that represent logical and physical implementations, respectively. This figure is also vertically divided into a bottom half and a top half that represent layer 2 and layer 3, respectively. FIG. 3 illustrates the network architecture 300 includes the L3 router 360 and managed switching elements 305, 310, 315, and 320. This figure also illustrates that each of the logical switches 220 and 230 is logically coupled to three VMs.

The L3 router 360 implements the logical router 225. The L3 router 360 routes packets between different logical networks that include logical switches 220 and 230. The L3 router 360 routes the packets according to L3 entries 335 that specify the manner in which the packets should be routed at L3. For instance, the L3 entries of some embodiments are entries (e.g., routes) in routing tables that specify that a packet that has a destination IP address that falls in a particular range of IP addresses should be sent out through a particular logical port of the logical router 225. In some embodiments, the logical ports of the logical router 225 are mapped to the ports of the L3 router and the logical router 225 generates the L3 entries based on the mappings. Mapping ports of a logical router to an L3 router that implements the logical router will be described further below.

The managed switching elements 305-320 of some embodiments implement logical switches in a distributed manner. That is, a logical switch in these embodiments may be implemented across one or more of the managed switching elements 305-320. For instance, the logical switch 220 may be implemented across the managed switching elements 305, 310, and 315 and the logical switch 230 may be implemented across the managed switching elements 305, 315 and 320. The six VMs 362-374 logically coupled to the logical switches 220 and 230 are coupled to the managed switching elements 310-320 as shown.

The managed switching elements 305-320 of some embodiments each forwards the packets according to L2 flow entries that specify the manner in which the packets should be forwarded at L2. For instance, the L2 flow entries may specify that a packet that has a particular destination MAC address should be sent out through a particular logical port of the logical switch. Each of the managed switching elements 305-320 has a set of L2 flow entries 340 (Flow entries 340 for switching elements 305-315 are not depicted for simplicity). The L2 flow entries for each managed switching elements are configured in the managed switching element by the controller cluster. Configuring managed switching elements by configuring L2 flows entries for the managed switching elements will be described in detail further below.

The managed switching element 305 of some embodiments is a second-level managed switching element. A second-level managed switching element is a managed non-edge switching element, which, in contrast to a managed edge switching element, does not send and receive packets directly to and from the machines. A second-level managed switching element facilitates packet exchanges between non-edge managed switching elements and edge managed switching elements. A pool node and an extender, which are described in U.S. patent application Ser. No. 13/177,535, are also second-level managed switching elements. The managed switching element 305 of some embodiments functions as an extender. That is, the managed switching element 305 communicatively bridges remote managed networks (not shown) that are separated by one or more other networks (not shown).

The managed switching element 305 of some embodiments is communicatively coupled to the L3 router 360. When there are packets that need to be routed at L3, the managed switching elements 310-320 send the packets to the managed switching element 305 so that the L3 router 360 routes the packets at L3. More details about a centralized logical router that is implemented in an L3 router will be described further below by reference to FIGS. 6-16.

FIG. 4 conceptually illustrates a network architecture 400. Specifically, FIG. 4 illustrates that the logical router 225 is implemented in a managed switching element 410. In contrast to the network architecture 300 in which the L3 router 360 routes the packets at L3, the managed switching element 410 routes packets at L3 in the network architecture 400. This figure is horizontally divided into a left half and a right half that represent logical and physical implementations, respectively. This figure is also vertically divided into a bottom half and a top half that represent layer 2 and layer 3, respectively.

The network architecture 400 is similar to the network architecture 300 except that the network architecture 400 does not include the L3 router 360. The managed switching element 410 implements the logical router 225. That is, the managed switching element 410 routes packets between different logical networks that include logical switches 220 and 230. The managed switching element 410 of some embodiments routes the packets according to L3 entries 405 that specify the manner in which the packets should be routed at L3. However, in contrast to the L3 entries 335 of some embodiments, the L3 entries 405 are not entries for routing tables. Rather, the L3 entries 405 are flow entries. As described in U.S. patent application Ser. No. 13/177,535, a flow entry includes a qualifier and an action while the entries in routing tables are just lookup tables for finding the next hops for the packets. Also, the L3 flow entries may specify the manner in which to generate entries in the routing tables (not shown).

In addition to implementing a centralized logical router, the managed switching element 410 of some embodiments implements one or more logical switches that are implemented across several managed switching elements. The managed switching element 410 therefore has its own set of L2 flow entries 340 (not depicted). In the architecture 400, the managed switching elements 410 and 310-320 together implement the logical switches 220 and 230 in a distributed manner.

The managed switching element 410 of some embodiments thus implements both a centralized logical router and logical switches. In other embodiments, implementation of a centralized logical router and logical switches may be separated into two or more managed switching elements. For instance, one managed switching element (not shown) may implement a centralized logical router using flow entries and another managed switching element (not shown) may implement logical switches based on flow entries in a distributed manner. More details about a centralized logical router that is implemented in a managed switching element based on flow entries will be described further below by reference to FIGS. 17-24.

FIG. 5 conceptually illustrates a network architecture 500. Specifically, FIG. 5 illustrates that the logical router 225 is implemented in a distributed manner such that each of several managed switching elements routes packets at L3. FIG. 5 illustrates that the network architecture 500 includes four managed switching elements 505-520.

The managed switching elements 505-520 implement a logical router and several logical switches for several different logical networks. Each of the managed switching elements 505-520 of some embodiments is an edge switching element. That is, the managed switching element has one or more machines that are coupled to the managed switching element. The machines that are coupled to the managed switching elements are also logically coupled to the logical switches. The machines that are coupled to a managed switching element may or may not be logically coupled to the same logical switch.

Each of the managed switching elements 505-520 implements at least one logical router and at least one logical switch that will route and forward packets to and from the machines coupled to the managed switching element. In other words, when the managed switching element receives a packet from the machines coupled to the managed switching element, the managed switching element makes both logical forwarding decisions and logical routing decisions. Each of the managed switching elements 505-520 makes the logical forwarding and routing decisions according to the L2 entries and L3 entries in the logical flow entries 550. The logical flow entries 550 include a set of L2 flow entries 530 and a set of L3 flow entries 535. More details about a distributed logical router will be described further below by reference to FIGS. 25-30B.

Figure 6:
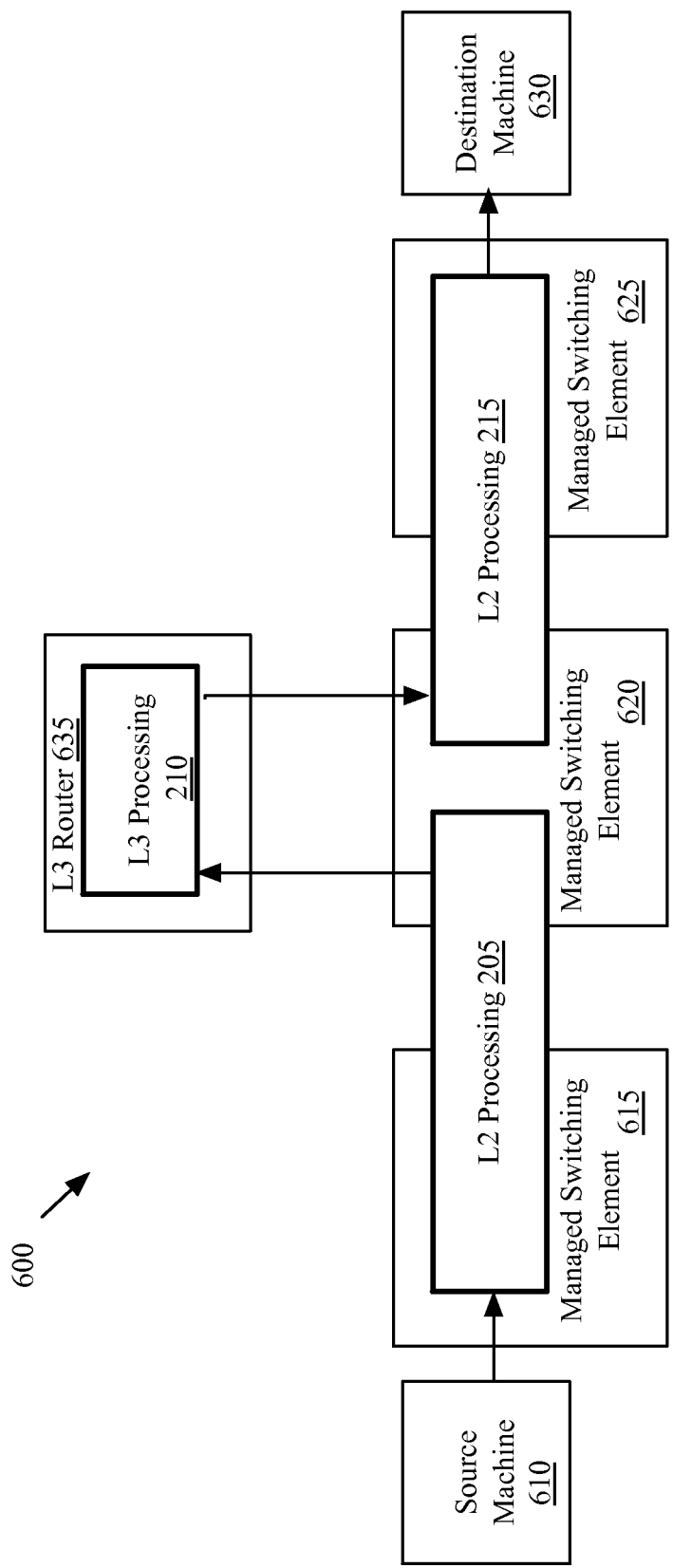
FIG. 6 conceptually illustrates an example implementation of the logical processing pipeline described above by reference to FIG. 2.

FIGS. 6-16 illustrate a centralized logical router implemented in a router. FIG. 6 conceptually illustrates an example implementation of the logical processing pipeline 200 described above by reference to FIG. 2. FIG. 6 illustrates a network architecture 600. In the network architecture 600, the logical processing pipeline 200 is performed by three managed switching elements 615, 620, and 625 and an L3 router 635. In particular, the L2 processing 205 and the L2 processing 215 are performed in a distributed manner across managed switching elements 615, 620, and 625. The L3 processing 210 is performed by the L3 router 635. FIG. 6 also illustrates source machine 610 and destination machine 630.

The managed switching element 615 is an edge switching element that directly receives the packets from a machine coupled to the edge switching element. The managed switching element 615 receives packets from the source machine 610. When the managed switching element 615 receives a packet from the source machine 610, the managed switching element 615 performs a portion of the L2 processing 205 on the packet in order to logically forward the packet.

There may be one or more managed switching elements (not shown) between the managed switching element 615 and the managed switching element 620. These managed switching elements have network constructs (e.g., PIFs, VIFs, etc.) to which the logical constructs (e.g., logical ports) of the logical switch 220 (not shown in FIG. 6) are mapped.

When the packet is headed to the destination machine 630, which is in another logical network, the packet is forwarded to the managed switching element 620. The managed switching element 620 then performs the rest of the L2 processing 205 and sends the packet to an L3 router 635, which implements a centralized logical router (not shown).

Similar to L3 router 360 described above by reference to FIG. 3, the L3 router 635 is a hardware router or a software router of which the ports are mapped to the ports of a logical router. The L3 router 635 performs the L3 processing 210 on the packet in order to logically route the packet. That is, the L3 router 635 sends the packet to another logical router (not shown) or to the managed switching element 620.

The managed switching element 620 is a second-level managed switching element that functions as an extender in some embodiments. The managed switching element 620 receives a packet from the L3 router 635 and starts performing the L2 processing 215 of the logical processing pipeline 200. There may be one of more managed switching elements (not shown) between the managed switching element 620 and the managed switching element 625. These managed switching elements have network constructs to which the logical constructs of the logical switch 230 (not shown in FIG. 6) are mapped.

The managed switching element 625 in the example receives the packet from the managed switching element 620. The managed switching element 625 performs the rest of the L2 processing 215 on the packet in order to logically forward the packet. In this example, the managed switching element 625 is also the switching element that directly sends the packet to the destination machine 630. However, there may be one or more managed switching elements (not shown) between the managed switching element 625 and the destination machine 630. These managed switching elements have network constructs to which the logical constructs of the logical switch 230 (not shown in FIG. 6) are mapped.

Although the L2 processing 205 and the L2 processing 215 are performed in a distributed manner in this example, the L2 processing 205 and the L2 processing 215 do not have to be performed in a distributed manner. For instance, the managed switching element 615 may perform the entire L2 processing 205 and the managed switching element 625 may perform the entire L2 processing 215. In such case, the managed switching element 620 would just relay the packets between the L3 router and the managed switching elements 615 and 625.

Figure 7:
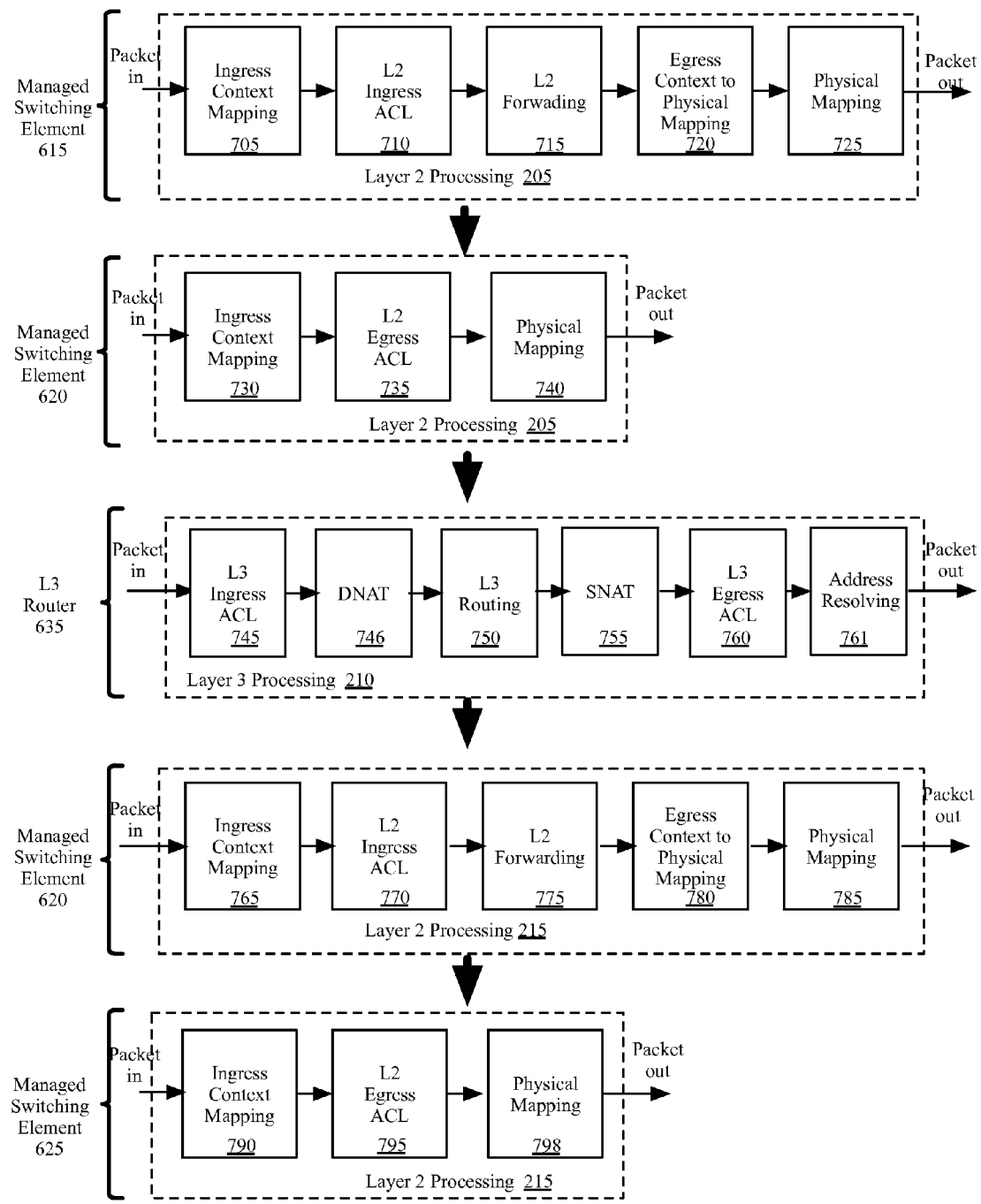
FIG. 7 conceptually illustrates the logical processing pipeline of some embodiments for processing a packet through a logical switch, a logical router, and a logical switch.

FIG. 7 conceptually illustrates the logical processing pipeline 200 of some embodiments for processing a packet through the logical switch 220, the logical router 225, and the logical switch 230. Specifically, this figure illustrates the logical processing pipeline 200 when performed in the network architecture 600 described above by reference to FIG. 6. As described above, in the network architecture 600, the L2 processing 205, the L3 processing 210, and the L2 processing 215 are performed by the managed switching elements 615, 620, and 625 and the L3 router 635.

The L2 processing 205, in some embodiments, includes eight stages 705-740 for processing a packet through the logical switch 220 (not shown in FIG. 7) in a logical network (not shown) that is implemented across the managed switching elements 615 and 620. In some embodiments, the managed switching element 615 that receives the packet performs a portion of the L2 processing 205 when the managed switching element 615 receives the packet. The managed switching element 620 then performs the rest of the L2 processing 205.

In some embodiments, a packet includes a header and a payload. The header includes, in some embodiments, a set of fields that contains information used for routing the packet through a network. Logical switches and logical routers may determine switching/routing decisions based on the information contained in the header fields and may, in some cases, modify some or all of the header fields.

In the stage 705 of the L2 processing 205, ingress context mapping is performed on the packet to determine the logical context of the packet. In some embodiments, the stage 705 is performed when the logical switch 220 receives the packet (e.g., the packet is initially received by the managed switching element 615). A logical context, in some embodiments, represents the state of the packet with respect to the logical switch. The logical context may, for example, specify the logical switch to which the packet belongs, the logical port of the logical switch through which the packet was received, the logical port of the logical switch through which the packet is to be transmitted, the stage of the logical forwarding plane of the logical switch the packet is at, etc.

Some embodiments determine the logical context of a packet based on the source MAC address of the packet (i.e., the machine from which the packet was sent). Some embodiments perform the logical context lookup based on the source MAC address of the packet and the inport (i.e., ingress port) of the packet (i.e., the port of the managed switching element 615 through which the packet was received). Other embodiments may use other fields in the packet's header (e.g., MPLS header, VLAN id, etc.) for determining the logical context of the packet.

After the first stage 705 is performed, some embodiments store the information that represents the logical context in one or more fields of the packet's header. These fields may also be referred to as a logical context tag or a logical context ID. Furthermore, the logical context tag may coincide with one or more known header fields (e.g., the VLAN id field) in some embodiments. As such, these embodiments do not utilize the known header field or its accompanying features in the manner that the header field is defined to be used. Alternatively, some embodiments store the information that represents the logical context as metadata that is associated with (instead of stored in the packet itself) and passed along with the packet.

In some embodiments, the second stage 710 is defined for the logical switch 220. In some such embodiments, the stage 710 operates on the packet's logical context to determine ingress access control of the packet with respect to the logical switch. For example, an ingress ACL is applied to the packet to control the packet's access to the logical switch when the logical switch receives the packet. Based on the ingress ACL defined for the logical switch, the packet may be further processed (e.g., by the stage 715) or the packet may be dropped, for example.

In the third stage 715 of the L2 processing 205, an L2 forwarding is performed on the packet in the context of the logical switch. In some embodiments, the third stage 715 operates on the packet's logical context to process and forward the packet with respect to the logical switch 220. For instance, some embodiments define a L2 forwarding table or L2 forwarding entries for processing the packet at layer 2.

Moreover, when the packet's destination is in another logical network (i.e., when the packet's destination logical network is different than the logical network whose traffic is processed by the logical switch 220), the logical switch 220 sends the packet to the logical router 225, which will then perform the L3 processing 210 in order to route the packet to the destination logical network. Thus, at the third stage 715, the managed switching element 615 of some embodiments determines that the packet should be forwarded to the logical router 225 through a logical port (not shown) of the logical switch that is associated with the logical router 225. In other embodiments, the managed switching element 615 does not necessarily determine whether the packet should be forwarded to the logical router 225. Rather, the packet would have an address of a port of the logical router 225 as a destination address and the managed switching element 615 forwards this packet through the logical port of the logical switch according to the destination address.

At the fourth stage 720, egress context mapping is performed to identify a physical result that corresponds to the result of the logical forwarding of the packet. For example, the logical processing of the packet may specify that the packet is to be sent out of one or more logical ports (e.g., a logical egress port) of the logical switch 220. As such, the egress context mapping operation identifies a physical port(s) of one or more of the managed switching elements (including the managed switching elements 615 and 620) that corresponds to the particular logical port of the logical switch 220. The managed switching element 615 determines that the physical port (e.g. a VIF) to which the logical port determined at the previous stage 715 is mapped is a port (not shown) of the managed switching element 620.

The fifth stage 725 of the L2 processing 205 performs a physical mapping based on the egress context mapping performed at the fourth stage 720. In some embodiments, the physical mapping determines operations for sending the packet towards the physical port that was determined in the fourth stage 720. For example, the physical mapping of some embodiments determines one or more queues (not shown) associated with one or more ports of the set of ports (not shown) of the managed switching element 615 that is performing the L2 processing 205 through which to send the packet in order for the packet to reach the physical port(s) determined in the fifth stage 725. This way, the managed switching elements can forward the packet along the correct path in the network for the packet to reach the determined physical port(s).

As shown, the sixth stage 730 of the L2 processing 205 is performed by the managed switching element 620. The sixth stage 730 is similar to the first stage 705. The stage 730 is performed when the managed switching element 620 receives the packet. At the stage 730, the managed switching element 620 looks up the logical context of the packet and determines that L2 egress access control is left to be performed.

The seventh stage 735 of some embodiments is defined for the logical switch 220. The seventh stage 735 of some such embodiments operates on the packet's logical context to determine egress access control of the packet with respect to the logical switch. For instance, an egress ACL may be applied to the packet to control the packet's access out of the logical switch 220 after logical forwarding has been performed on the packet. Based on the egress ACL defined for the logical switch, the packet may be further processed (e.g., sent out of a logical port of the logical switch or sent to a dispatch port for further processing) or the packet may be dropped, for example.

The eighth stage 740 is similar to the fifth stage 725. At the eighth stage 740, the managed switching element 620 determines a specific physical port (not shown) of the managed switching element 620 to which the logical egress port of the logical switch 220 is mapped.

The L3 processing 210 includes six stages 745-761 for processing a packet through the logical switch 220 (not shown in FIG. 7) that is implemented by the L3 router 635. As mentioned above, L3 processing involves performing a set of logical routing lookups for determining where to route the packet through a layer 3 network.

The first stage 745 performs a logical ingress ACL lookup for determining access control when the logical router 225 receives the packet (i.e., when the L3 router 635 which implements the logical router 225 receives the packet). The next stage 746 performs network address translation (NAT) on the packet. In particular, the stage 746 performs destination NAT (DNAT) to revert the destination address of the packet back to the real address of the destination machine that is hidden from the source machine of the packet. This stage 746 is performed when DNAT is enabled.

The next stage 750 performs a logical L3 routing for determining one or more logical ports to send the packet through the layer 3 network based on the L3 addresses (e.g., destination IP address) of the packet and routing tables (e.g., containing L3 entries). Since the logical router 225 is implemented by the L3 router 635, the routing tables are configured in the L3 router 635.

At the fourth stage 755, the L3 router 635 of some embodiments also performs source NAT (SNAT) on the packet. For instance, the L3 router 635 replaces the source IP address of the packet with a different IP address in order to hide the source IP address when the source NAT is enabled.

The fifth stage 760 performs logical L3 egress ACL lookups for determining access control before the logical router 225 routes the packet out of the logical router 225 through the port determined in the stage 740. The L3 egress ACL lookups are performed based on the L3 addresses (e.g., source and destination IP addresses) of the packet.

The sixth stage 761 performs address resolution in order to translate the destination L3 address (e.g., a destination IP address) into a destination L2 address (e.g., a destination MAC address). In some embodiments, the L3 router 635 uses a standard address resolution (e.g., by sending out ARP requests or looking up ARP cache) to find the destination L2 address that corresponds to the destination IP address.

When the logical router 225 is not coupled to the destination logical network, the logical switch 220 sends the packet to another logical router network towards the destination logical network. When the logical router 225 is coupled to the destination logical network, the logical switch 220 routes the packet to the destination logical network (i.e., the logical switch that forwards the packet for the destination logical network).

The L2 processing 215, in some embodiments, includes eight stages 765-798 for processing the packet through the logical switch 230 in another logical network (not shown in FIG. 7) that is implemented across the managed switching elements 620 and 625. In some embodiments, the managed switching element 625 in the managed network that receives the packet performs the L2 processing 215 when the managed switching element 625 receives the packet from the managed switching element 620. The stages 765-798 are similar to the stage 705-740, respectively, except that the stage 765-798 are performed by the logical switch 230 (i.e., by the managed switching elements 620 and 625 that implement the logical switch 230). That is, the stages 765-798 are performed to forward the packet received from the L3 router 635 to the destination through the managed switching elements 620 and 625.

Figure 8:
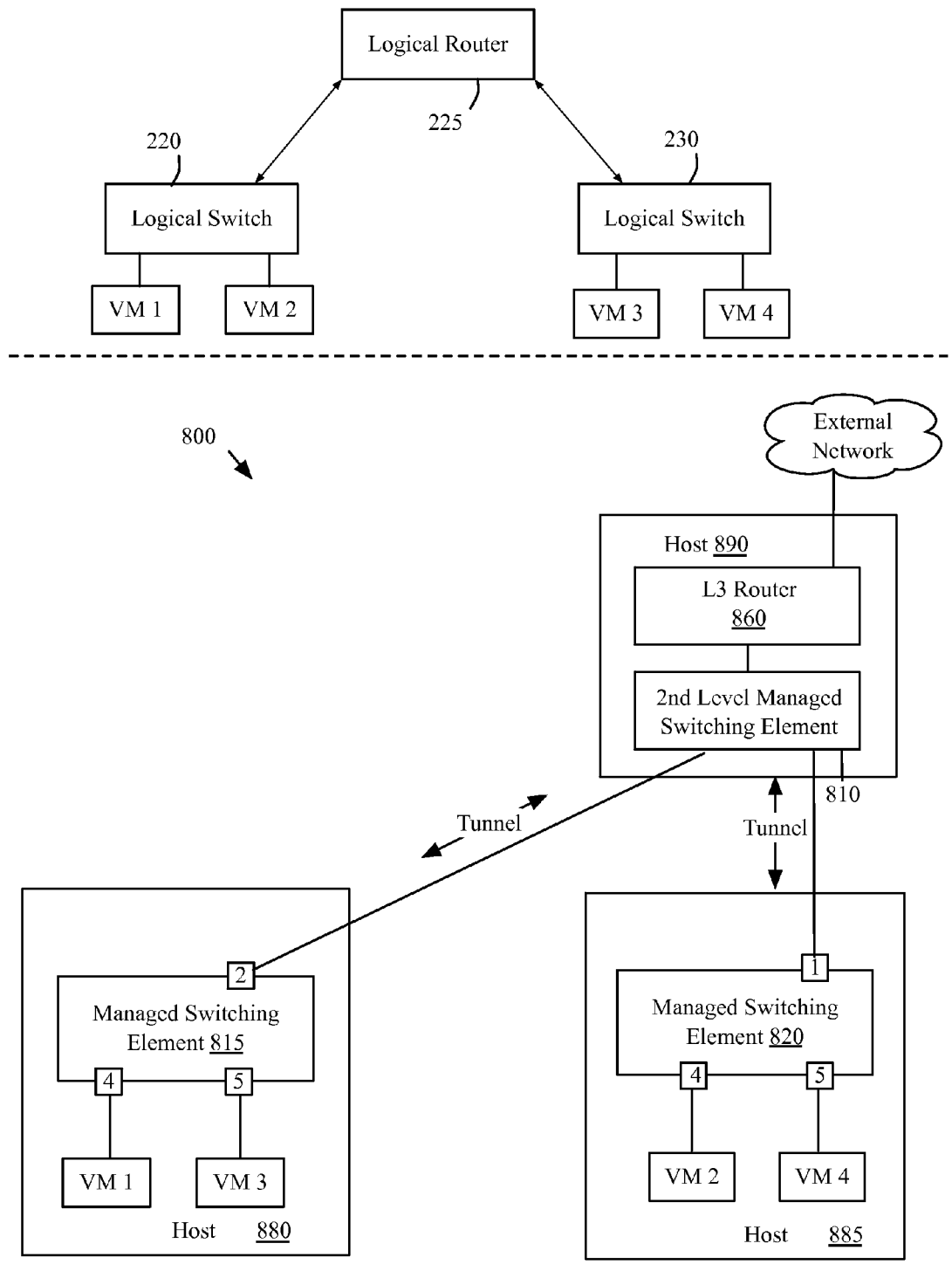
FIG. 8 conceptually illustrates an example network architecture of some embodiments which implements a logical router and logical switches.

FIG. 8 conceptually illustrates an example network architecture 800 of some embodiments which implements the logical router 225 and logical switches 220 and 230. Specifically, the network architecture 800 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates in the bottom half of the figure an L3 router 860. Also illustrated in the bottom half are a second-level managed switching element 810, managed switching elements 815 and 820 which are running in hosts 890, 880, and 885 (e.g., machines operated by operating systems such as Windows™ and Linux™), respectively. The figure illustrates VMs 1-4 in both the top and the bottom of the figure.

In this example, the logical switch 220 forwards data packets between the logical router 225, VM 1, and VM 2. The logical switch 230 forwards data packets between the logical router 225, VM 3, and VM 4. As mentioned above, the logical router 225 routes data packets between the logical switches 220 and 230 and possibly other logical routers and switches (not shown). The logical switches 220 and 230 and the logical router 225 are logically coupled through logical ports (not shown) and exchange packets through the logical ports. These logical ports are mapped to physical ports of the L3 router 860 and the managed switching elements 810, 815 and 820.

In some embodiments, each of the logical switches 220 and 230 is implemented across the managed switching elements 815 and 820 and possibly other managed switching elements (not shown). In some embodiments, the logical router 225 is implemented in the L3 router 860 which is communicatively coupled to the managed switching element 810.

In this example, the managed switching elements 810, 815 and 820 are software switching elements running in hosts 890, 880 and 885, respectively. The managed switching elements 810, 815 and 820 have flow entries which implement the logical switches 220 and 230. Using these flow entries, the managed switching elements 815 and 820 route network data (e.g., packets) between network elements in the network that are coupled to the managed switching elements 810, 815 and 820. For instance, the managed switching element 815 routes network data between VMs 1 and 3, and the second-level managed switching element 810. Similarly, the managed switching element 820 routes network data between VMs 2 and 4, and the second-level managed switching element 810. As shown, the managed switching elements 815 and 820 each have three ports (depicted as numbered squares) through which to exchange data packets with the network elements that are coupled to the managed switching elements 815 and 820.

The managed switching element 810 is similar to the managed switching element 305 described above by reference to FIG. 3 in that the managed switching element 810 is a second-level managed switching element that functions as an extender. The managed switching element 810 runs in the same host as the L3 router 860, which in this example is a software router.

In some embodiments, tunnels are established by the network control system (not shown) to facilitate communication between the network elements. For instance, the managed switching element 810 is coupled to the managed switching element 815, which runs in the host 880, through a tunnel that terminates at port 2 of the managed switching element 815 as shown. Similarly, the managed switching element 810 is coupled to the managed switching element 820 through a tunnel that terminates at port 1 of the managed switching element 820.

Different types of tunneling protocols are supported in different embodiments. Examples of tunneling protocols include control and provisioning of wireless access points (CAPWAP), generic route encapsulation (GRE), GRE Internet Protocol Security (IPsec), among other types of tunneling protocols.

In this example, each of the hosts 880 and 885 includes a managed switching element and several VMs as shown. VMs 1-4 are virtual machines that are each assigned a set of network addresses (e.g., a MAC address for L2, an IP address for L3, etc.) and can send and receive network data to and from other network elements. The VMs are managed by hypervisors (not shown) running on the hosts 880 and 885.

Several example data exchanges through the network architecture 800 will now be described. When VM 1 that is coupled to the logical switch 220 sends a packet to VM 2 that is also coupled to the same logical switch 220, the packet is first sent to the managed switching element 815. The managed switching element 815 then performs the L2 processing 205 on the packet because the managed switching element 815 is the edge switching element that receives the packet from VM 1. The result of the L2 processing 205 on this packet would indicate that the packet should be sent to the managed switching element 820 to get to VM 2 through port 4 of the managed switching element 820. Because VMs 1 and 2 are in the same logical network and therefore L3 routing for the packet is not necessary, no L3 processing needs to be performed on this packet. The packet is then sent to the managed switching element 820 via the second-level managed switching element 810 which is bridging between the managed switching element 815 and the managed switching element 820. The packet reaches VM 2 through port 4 of the managed switching element 820.

When VM 1 that is coupled to the logical switch 220 sends a packet to VM 3 that is coupled to the logical switch 230, the packet is first sent to the managed switching element 815. The managed switching element 815 performs a portion of L2 processing on the packet. However, because the packet is sent from one logical network to another (i.e., the logical L3 destination address of the packet is for another logical network), an L3 processing needs to be performed on this packet.

The managed switching element 815 sends the packet to the second-level managed switching element 810 so that the managed switching element 810 performs the rest of the L2 processing on the packet to forward the packet to the L3 router 860. The result of L3 processing performed at the L3 router 860 would indicate that the packet should be sent back to the managed switching element 810. The managed switching element 810 then performs a portion of another L2 processing and forwards the packet received from the L3 router 860 back to the managed switching element 815. The managed switching element 815 performs the L2 processing 215 on the packet received from the managed switching element 810 and the result of this L2 processing would indicate that the packet should be sent to VM 3 through port 5 of the managed switching element 815.

When VM 1 that is coupled to the logical switch 220 sends a packet to VM 4 that is coupled to the logical switch 230, the packet is first sent to the managed switching element 815. The managed switching element 815 performs the L2 processing 205 on the packet. However, because the packet is sent from one logical network to another, an L3 processing needs to be performed.

The managed switching element 815 sends the packet to the L3 router 860 via the managed switching element 810 so that the L3 router 860 performs the L3 processing 210 on the packet. The result of the L3 processing 210 performed at the L3 router 860 would indicate that the packet should be sent to the managed switching element 820. The managed switching element 810 then performs a portion of L2 processing on the packet received from the managed switching element and the result of this L2 processing would indicate that the packet should be sent to VM 4 through the managed switching element 820. The managed switching element 820 performs the rest of the L2 processing to determine that the packet should be sent to VM 4 through port 5 of the managed switching element 820.

Figure 9:
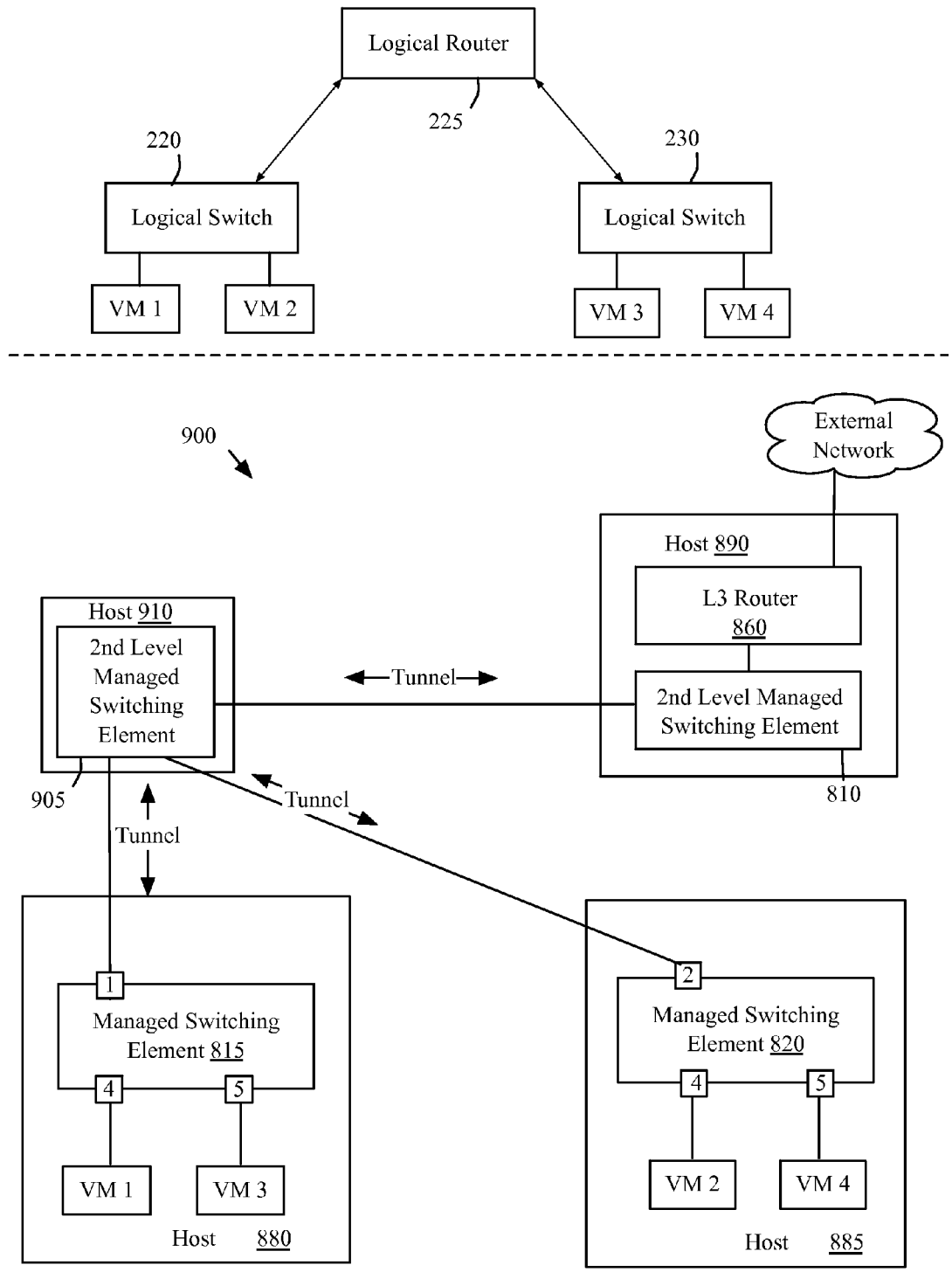
FIG. 9 conceptually illustrates an example network architecture of some embodiments which implements the logical router and logical switches.

FIG. 9 conceptually illustrates an example network architecture 900 of some embodiments which implements the logical router 225 and logical switches 220 and 230. Specifically, the network architecture 900 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates in the bottom half of the figure the L3 router 860. Also illustrated in the bottom half are a second-level managed switching element 905, the second-level managed switching element 810, and managed switching elements 815 and 820 which are running in hosts 910, 890, 880, and 885, respectively. The figure illustrates VMs 1-4 in both the top and the bottom of the figure.

The network architecture 900 is similar to the network architecture 800 except that the network architecture 900 additionally includes the managed switching element 905 which runs in the host 910. The managed switching element 905 of some embodiments is a second-level managed switching element that functions as a pool node.

In some embodiments, tunnels are established by the network control system (not shown) to facilitate communication between the network elements. For instance, the managed switching element 815 in this example is coupled to the managed switching element 905, which runs in the host 910, through a tunnel that terminates at port 1 of the managed switching element 815 as shown. Similarly, the managed switching element 820 is coupled to the managed switching element 905 through a tunnel that terminates at port 2 of the managed switching elements 820. Also, the managed switching elements 905 and 810 are coupled through a tunnel as shown.

The logical router 225 and the logical switches 220 and 230 are implemented in the L3 router 860 and the managed switching elements 810, 815, and 820 as described by reference to FIG. 8 above, except that the second-level managed switching element 905 is involved in the data packet exchange. That is, the managed switching elements 815 and 810 exchange packets through the managed switching element 905.

Figure 10:
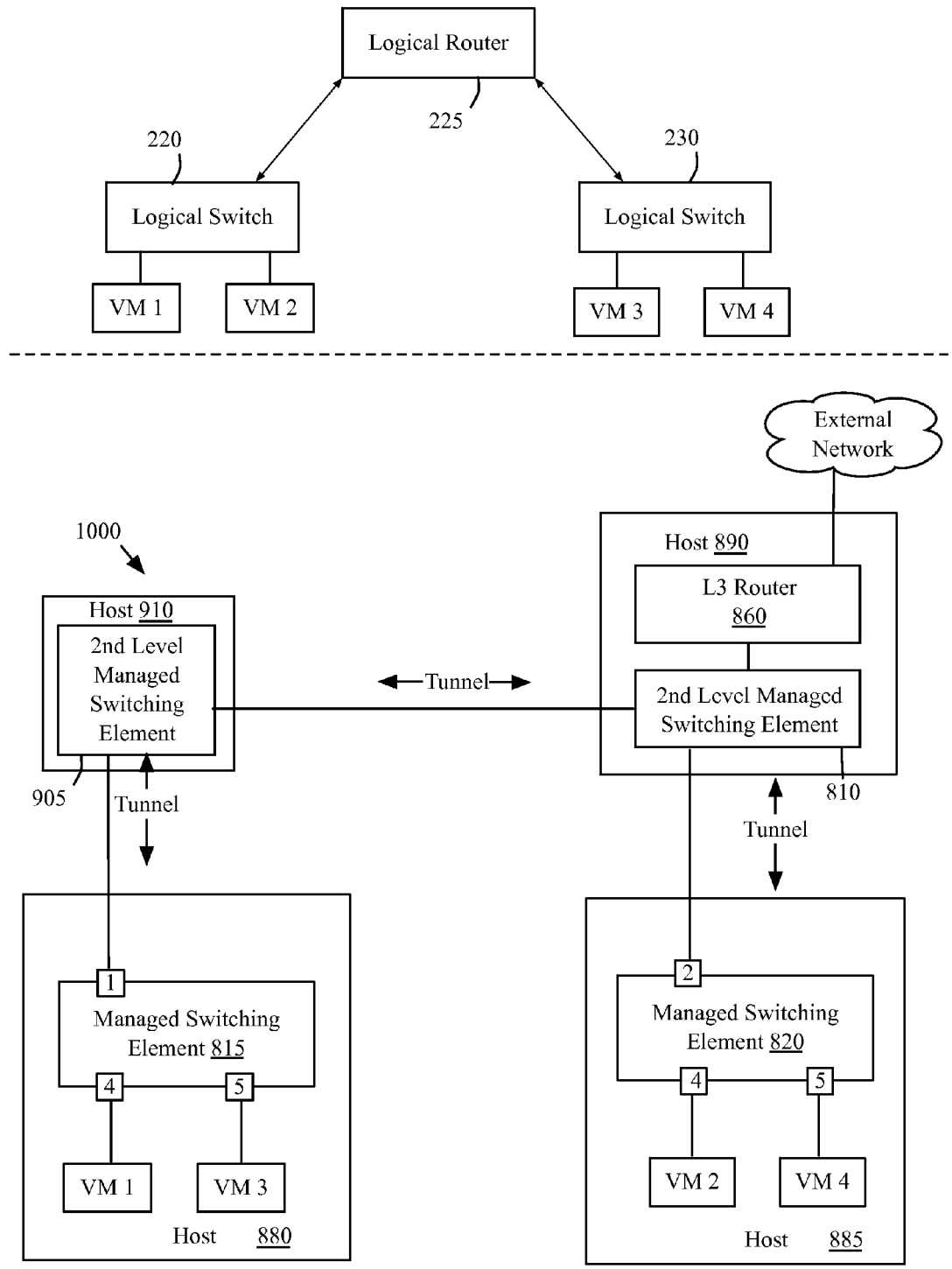
FIG. 10 conceptually illustrates an example network architecture of some embodiments which implements the logical router and logical switches.

FIG. 10 conceptually illustrates an example network architecture 1000 of some embodiments which implements the logical router 225 and logical switches 220 and 230. The network architecture 1000 is similar to the network architecture 800 except that there is a tunnel established between the managed switching element 810 and the managed switching element 820. This figure illustrates that the network architecture 1000 of some embodiments is a mixture of the network architecture 800 and the network architecture 900. That is, some managed edge switching elements have tunnels to a second-level managed switching element that is coupled to a centralized L3 router while other managed edge switching elements have to go through a second-level managed switching element that functions as a pool node in order to exchange packets with a second-level managed switching element that is coupled to the centralized L3 router.

Figure 11:
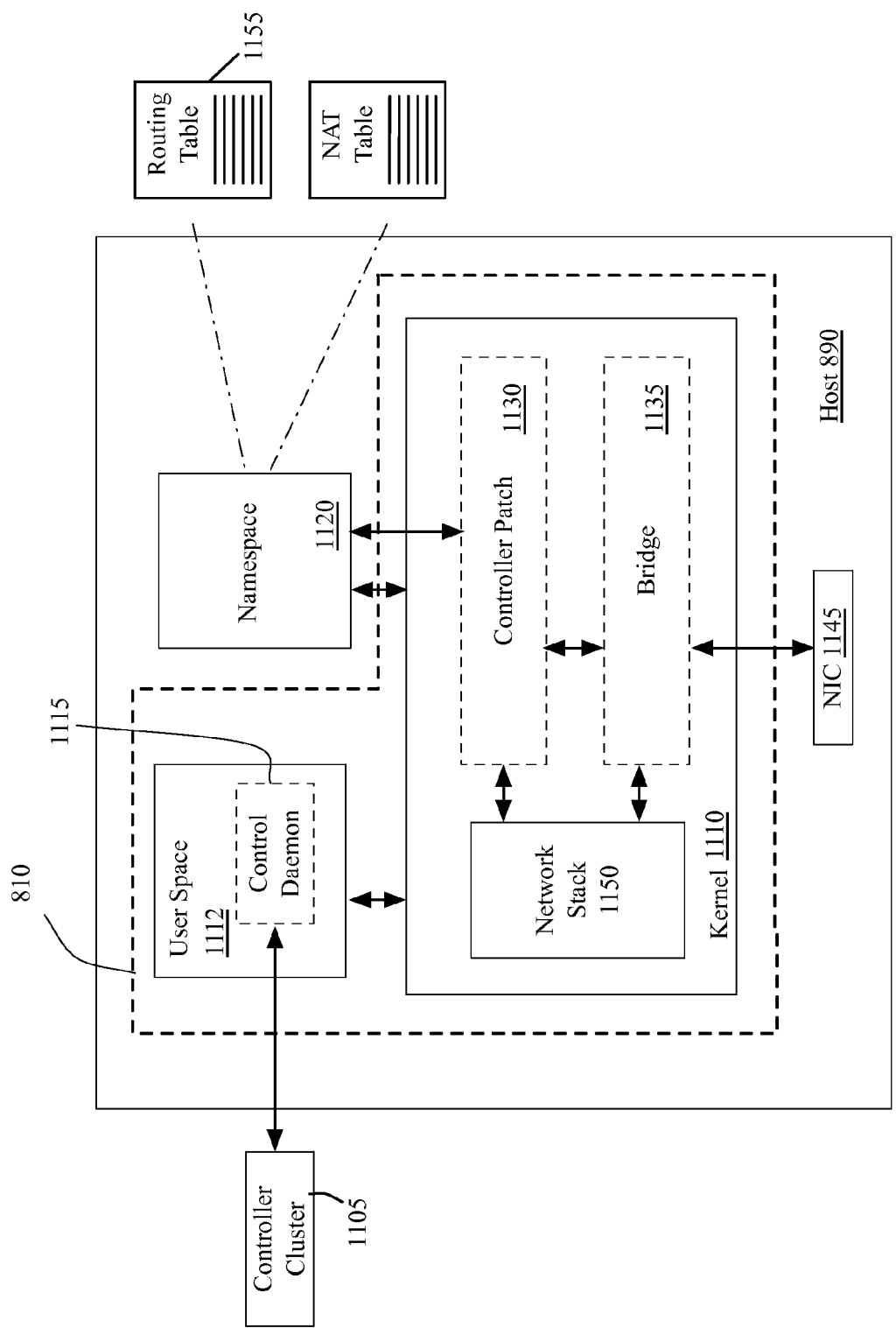
FIG. 11 conceptually illustrates an example architecture of a host of some embodiments that includes a managed switching element and a L3.

FIG. 11 conceptually illustrates an example architecture of the host 890 of some embodiments that includes the managed switching element 810 and the L3 router 860 (not shown). Specifically, this figure illustrates that the L3 router 860 is configured in a namespace 1120 of the host 890. The host 890, in some embodiments, is a machine that is managed by an operating system (e.g., Linux) that is capable of creating namespaces and virtual machines. As shown, the host 890 in this example includes a managed switching element 810, the namespace 1120, and a NIC 845. This figure also illustrates a controller cluster 1105.

The controller cluster 1105 is a set of network controllers or controller instances that manage the network elements, including the managed switching element 810. The managed switching element 810 in this example is a software switching element implemented in the host 890 that includes a user space 1112 and a kernel 1110. The managed switching element 810 includes a control daemon 1115 running in the user space 1115; and controller patch 1130 and a bridge 1135 running in the kernel 1110. The user space 1115 and the kernel 1110, in some embodiments, is of an operating system for the host 890 while in other embodiments the user space 1115 and the kernel 1110 is of a virtual machine that is running on the host 890.

In some embodiments, the controller cluster 1105 communicates with a control daemon 1115 (e.g., by using OpenFlow protocol or another communication protocol), which, in some embodiments, is an application running in the background of the user space 1112. The control daemon 1115 communicates with the controller cluster 1105 in order to process and route packets that the managed switching element 810 receives. Specifically, the control daemon 1115, in some embodiments, receives configuration information from the controller cluster 1105 and configures the controller patch 1130. For example, the control daemon 1115 receives commands from the controller cluster 1105 regarding operations for processing and routing packets that the managed switching element 810 receives.

The control daemon 1115 also receives configuration information for the controller patch 1130 to set up ports (not shown) connecting to the logical router (not shown) implemented in the namespace 1120 such that the logical router populates the routing tables and other tables with appropriate entries.

The controller patch 1130 is a module that runs in the kernel 1110. In some embodiments, the control daemon 1115 configures the controller patch 1130. When configured, the controller patch 1130 contains rules (e.g., flow entries) regarding processing and forwarding the packets to receive. The controller patch 1130 of some embodiments also creates a set of ports (e.g., VIFs) to exchange packets with the namespace 1120.

The controller patch 1130 receives packets from a network stack 1150 of the kernel 1110 or from the bridge 1135. The controller patch 1130 determines which namespace to which to send the packets based on the rules regarding processing and routing the packets. The controller patch 1130 also receives packets from the namespace 1120 and sends the packets to the network stack 1150 or the bridge 1135 based on the rules. More details about architecture of a managed switching element are described in U.S. patent application Ser. No. 13/177,535.

The namespace 1120 (e.g., Linux namespace) is a container created in the host 890. The namespace 1120 can implement network stacks, network devices, network addresses, routing tables, network address translation tables, network caches, etc. (not all of these are shown in FIG. 11). The namespace 1120 thus can implement a logical router when the namespace is configured to handle packets with logical source or destination addresses. The namespace 1120 can be configured to handle such packets, for example, by configuring the routing tables 1155 of the namespace. In some embodiments, the namespace 1120 populates the routing tables 1155 as the namespace 1120 connects to the managed switching element 810 and exchanges packets (i.e., dynamic routing). In other embodiments, the controller cluster 1105 may directly configure the routing tables 1155 by populating the routing tables 1155 with routes.

Moreover, the namespace, in some embodiments, also performs network address translation (NAT) on the packets that the namespaces route. For instance, when the namespace changes the source network address of the received packet into another network address (i.e., performs source NAT).

The bridge 1135 routes network data between the network stack 1150 and network hosts external to the host (i.e., network data received through the NIC 1145). As shown, the bridge 1135 routes network data between the network stack 1150 and the NIC 1145 and between the controller patch 1130 and the NIC 1145. The bridge 1135 of some embodiments performs standard L2 packet learning and routing.

The network stack 1150 can receive packets from network hosts external to the managed switching element 810 through the NIC 1145. The network stack 1150 then sends the packets to the controller patch 1130. In some cases, the packets are received from network hosts external to the managed switching element through tunnels. In some embodiments, the tunnels terminate at the network stack 1150. Thus, when the network stack 1150 receives a packet through a tunnel, the network stack 1150 unwraps the tunnel header (i.e., decapsulates the payload) and sends the unwrapped packet to the controller patch 1130.

An example operation of the managed switching element 810 and the namespace 1120 will now be described. In this example, tunnels are established between the managed switching element 810 and the managed switching elements 815 and 820 (not shown in FIG. 11) that are external to the host 890. That is, the managed switching elements 810, 815, and 820 are connected through the tunnels as illustrated in FIG. 8. The tunnels terminate at the network stack 1150.

The managed switching element 815 sends a packet, sent by VM1 to VM 4, to the managed switching element 810. The packet is received by the NIC 1145 and then is sent to the bridge 1135. Based on the information in the packet header, the bridge 1135 determines that the packet is sent over the established tunnel and sends the packet to the network stack 1150. The network stack 1150 unwraps the tunnel header and sends the unwrapped packet to the controller patch 1130.

According to the rules that the controller patch 1130 has, the controller patch 1130 sends the packet to the namespace 1120 because the packet is sent from one logical network to another logical network. For instance, the rules may say a packet with certain destination MAC address should be sent to the namespace 1120. In some cases, the controller patch 1130 removes logical context from the packet before sending the packet to the namespace. The namespace 1120 then performs an L3 processing on the packet to route the packet between the two logical networks.

By performing the L3 processing, the namespace 1120 determines that the packet should be sent to the controller patch 1130 because the destination network layer address should go to a logical switch that belongs to the destination logical network. The controller patch 1130 receives the packet and sends the packet through the network stack 1150, the bridge 1135, and the NIC 1145 over the tunnel to the managed switching element 820 that implements the logical switch that belongs to the destination logical network.

As described above, some embodiments implement the L3 router 860 in the namespace 1120. Other embodiments, however, may implement the L3 router 860 in a VM that runs on the host 890.

FIG. 12 conceptually illustrates an example implementation of logical switches and logical routers in managed switching elements and L3 routers. Specifically, this figure illustrates implementation of the logical router 225 and the logical switches 220 and 230 in the host 890, which includes the second-level managed switching element 810 and the L3 router 860, and the managed switching elements 815 and 820. The figure illustrates in the left half of the figure, the logical router 225 and the logical switches 220 and 230. This figure illustrates in the right half of the figure, the second-level managed switching element 810, and managed switching elements 815 and 820. The figure illustrates VMs 1-4 in both the right and the left halves of the figure. For simplicity, this figure does not illustrate all the components of the managed switching element, e.g., the network stack 1150.

The logical switches 220 and 230 and the logical router 225 are logically coupled through logical ports. As shown, a logical port X of the logical switch 220 is coupled to the logical port 1 of the logical router 225. Similarly, a logical port Y of the logical switch 230 is coupled to the logical port 2 of the logical router 225. The logical switches 220 and 230 exchange data packets with the logical router 225 through these logical ports. Also, in this example, the logical switch 220 associates the logical port X with a MAC address 01:01:01:01:01:01 which is a MAC address of the logical port 1 of the logical router 225. When the logical switch 220 receives a packet that needs an L3 processing, the logical switch 220 sends the packet out to the logical router 225 through port X. Similarly, the logical switch 230 associates the logical port Y with a MAC address 01:01:01:01:01:02 which is a MAC address of the logical port 2 of the logical router 225. When the logical switch 230 receives a packet that needs an L3 processing, the logical switch 230 sends the packet out to the logical router 225 through port Y.

In this example, the controller cluster 1105 (not shown in FIG. 12) configures the managed switching element 810 such that port 1 of the managed switching element 810 is associated with the same MAC address, 01:01:01:01:01:01, that is associated with port X of the logical switch 220. Accordingly, when the managed switching element 810 receives a packet that has this MAC address as destination MAC address, the managed switching element 810 sends the packet out to the L3 router 860 (configured in the namespace 1120) through the port 1 of the managed switching element 810. As such, port X of the logical switch 220 is mapped to port 1 of the managed switching element 810.

Similarly, port 2 of the managed switching element 810 is associated with the same MAC address, 01:01:01:01:01:02, that is associated with port Y of the logical switch 230. Accordingly, when the managed switching element 810 receives a packet that has this MAC address as destination MAC address, the managed switching element 810 sends the packet out to the L3 router 860 through the port 2 of the managed switching element 810. As such, port Y of the logical switch 230 is mapped to port 2 of the managed switching element 810.

In this example, the logical router 225 has logical ports 1 and 2 and other logical ports (not shown). Port 1 of the logical router 225 is associated with an IP address 1.1.1.1/24, which represents a subnet behind port 1. That is, when the logical router 225 receives a packet to route and the packet has a destination IP address, e.g., 1.1.1.10, the logical router 225 sends this packet towards the destination logical network (e.g., a logical subnet) through port 1.

Similarly, port 2 of the logical router 225 in this example is associated with an IP address 1.1.2.1/24, which represents a subnet behind port 2. The logical router 225 sends a packet with a destination IP address, e.g., 1.1.2.10, to the destination logical network through port 2.

In this example, the L3 router 860 implements the logical router 225 by populating the L3 router 860's routing tables (not shown) with routes. In some embodiments, the L3 router 860 populates its routing tables when the managed switching element 810 establishes connection with the L3 router 860 and send a packet. For instance, when the L3 router receives an initial packet from the managed switching element, the L3 router 860 finds out that packets that have the initial packet's source address as destination addresses should be sent to the managed switching element 810. The L3 router may also perform a standard address resolution (e.g., by sending out ARP requests) to find out where to send the initial packet. The L3 router 860 will store these "routes" in the routing tables and look up these tables when making routing decisions for the packets that the L3 router receives subsequently. Other L3 routers (not shown) may populate their routing tables in a similar manner.

In other embodiments, the controller cluster configures the routing table of the L3 router 860 such that port 1 of the L3 router 860 is associated with the same IP address that is associated with port 1 of the logical router 225. Similarly, port 2 of the L3 router 860 is associated with the same IP address that is associated with port 2 of the logical router 225. In a similar manner, another logical switch (not shown) may be implemented in another L3 router (not shown) of the managed switching element. In some of these embodiments, the control cluster may employ one or more routing protocols to configure the L3 router.

Figure 13A:
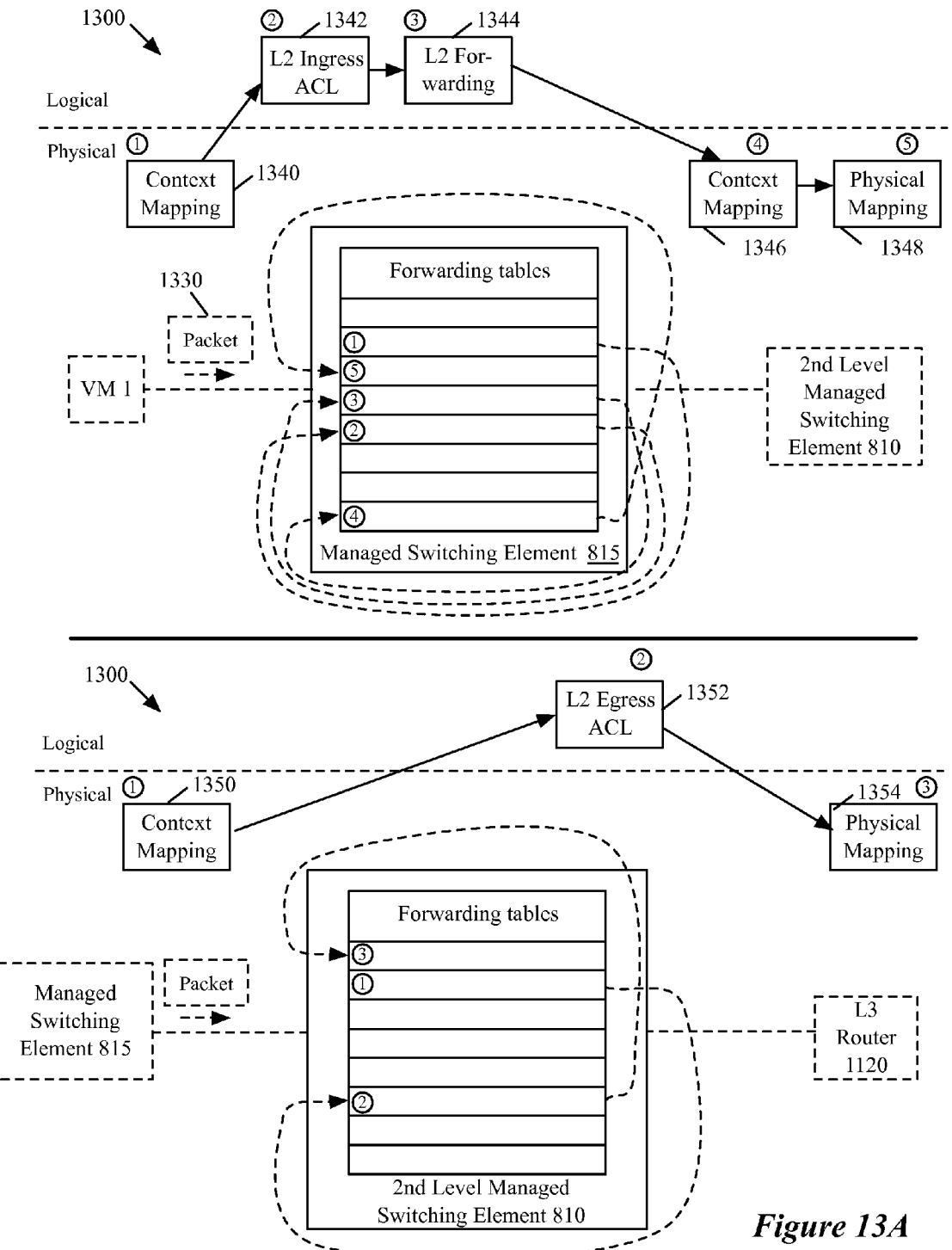
FIGS. 13A-13C conceptually illustrate an example operation of logical switches, a logical router implemented in managed switching elements and a L3 router described above by reference to FIG. 12.
Figure 13B:
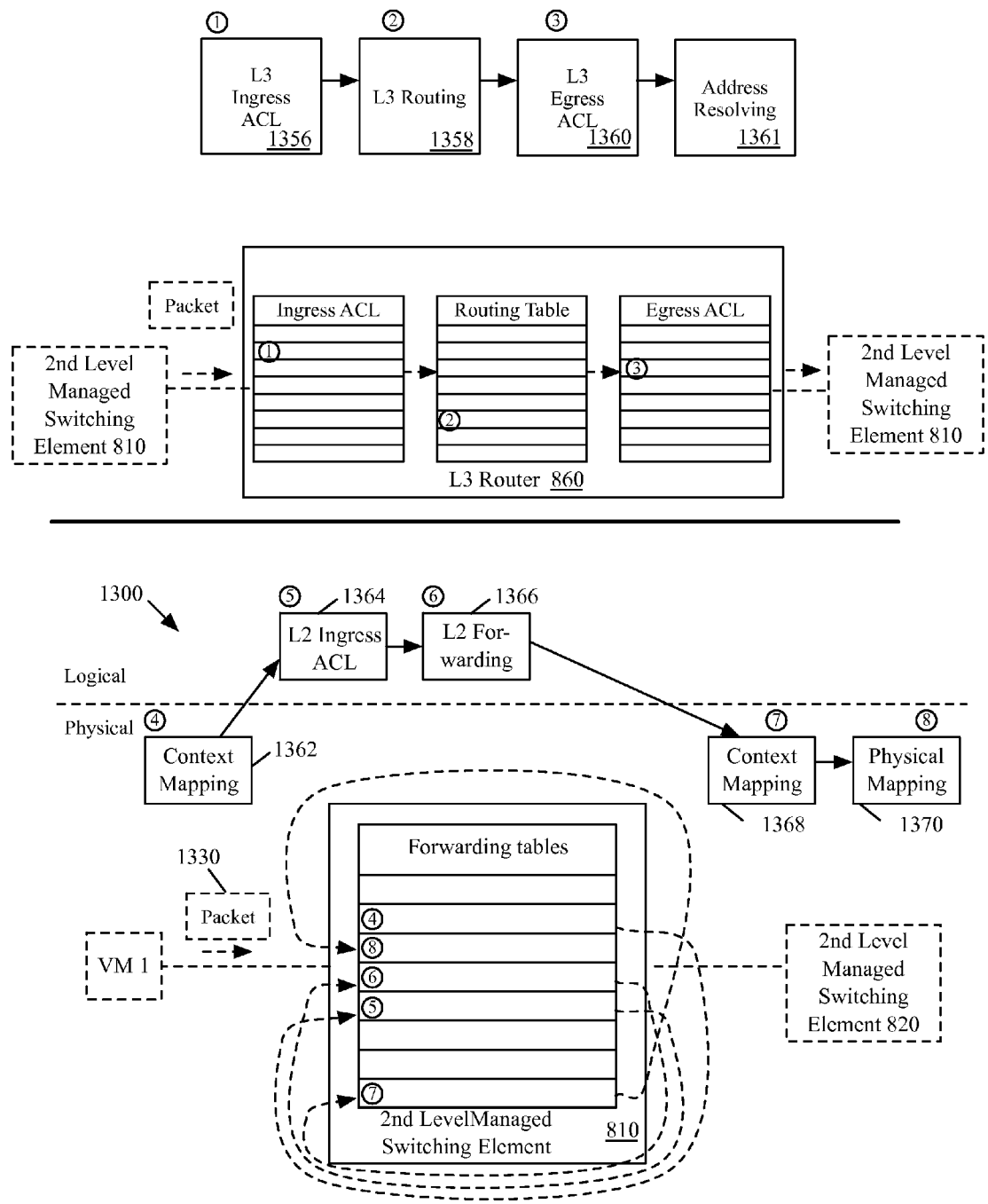
Figure 13C:
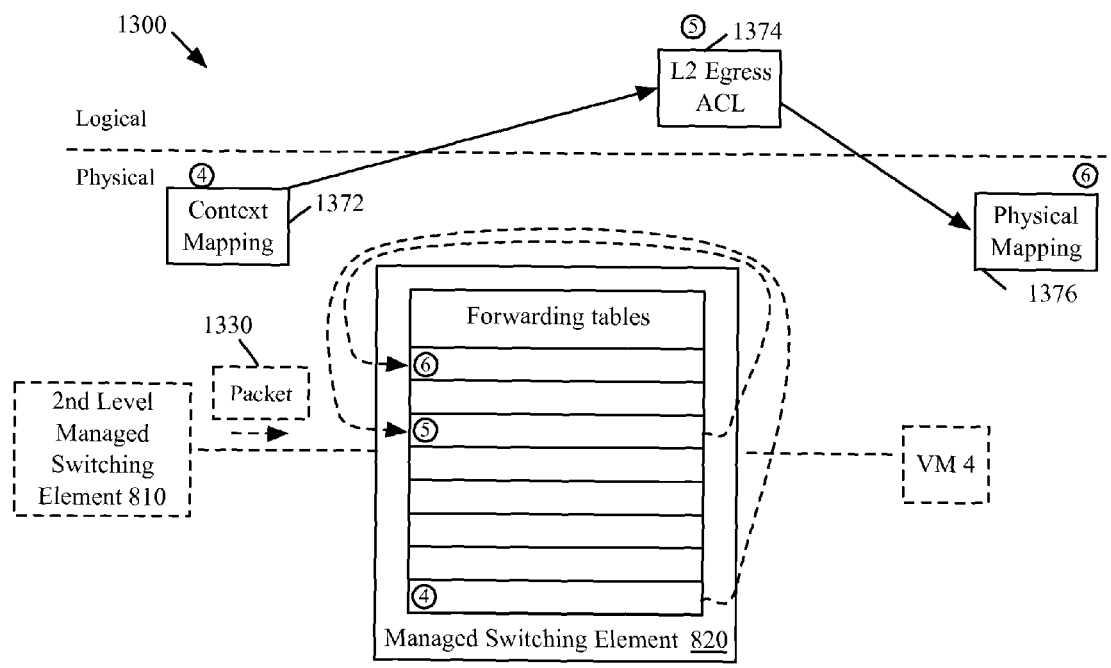

FIGS. 13A-13C conceptually illustrate an example operation of the logical switches 220 and 230, the logical router 225 implemented in the managed switching elements 810, 815 and 820 and the L3 router 860 described above by reference to FIG. 12. Specifically, FIG. 13A-13C illustrate how a packet sent from VM 1 to VM 4 reaches VM 4.

When VM 1 that is coupled to the logical switch 220 sends a packet 1330 to VM 4 that is coupled to the logical switch 230, the packet is first sent to the managed switching element 815 through port 4 of the managed switching element 815. The managed switching element 815 performs an L2 processing on the packet.

As shown in the top half of FIG. 13A, the managed switching element 815 includes a forwarding table that includes rules (e.g., flow entries) for processing and forwarding the packet 1330. When the managed switching element 815 receives the packet 1330 from VM 1 through port 4 of the managed switching element 815, the managed switching element 815 begins processing the packet 1330 based on the forwarding tables of the managed switching element 815. In this example, the packet 1330 has a destination IP address of 1.1.2.10, which is the IP address of VM 4. The packet 1330's source IP address is 1.1.1.10. The packet 1330 also has VM 1's MAC address as a source MAC address and the MAC address of the logical port 1 (i.e., 01:01:01:01:01:01) of the logical router 225 as a destination MAC addresses.

The managed switching element 815 identifies a record indicated by an encircled 1 (referred to as "record 1") in the forwarding tables that implements the context mapping of the stage 1340. The record 1 identifies the packet 1330's logical context based on the inport, which is the port 4 through which the packet 1330 is received from VM 1. In addition, the record 1 specifies that the managed switching element 815 store the logical context of the packet 1330 in a set of fields (e.g., a VLAN id field) of the packet 1330's header in some embodiments. In other embodiments, the managed switching element 815 stores the logical context (i.e., the logical switch to which the packet belongs as well as the logical ingress port of that logical switch) in a register, or meta field, of the switch, rather than in the packet. The record 1 also specifies the packet 1330 be further processed by the forwarding tables (e.g., by sending the packet 1330 to a dispatch port). A dispatch port is described in U.S. patent application Ser. No. 13/177,535.

Based on the logical context and/or other fields stored in the packet 1330's header, the managed switching element 815 identifies a record indicated by an encircled 2 (referred to as "record 2") in the forwarding tables that implements the ingress ACL of the stage 1342. In this example, the record 2 allows the packet 1330 to be further processed (i.e., the packet 1330 can get through the ingress port of the logical switch 220) and, thus, specifies the packet 1330 be further processed by the forwarding tables (e.g., by sending the packet 1330 to a dispatch port). In addition, the record 2 specifies that the managed switching element 815 store the logical context (i.e., the packet 1330 has been processed by the second stage 1342 of the processing pipeline 1300) of the packet 1330 in the set of fields of the packet 1330's header.

Next, the managed switching element 815 identifies, based on the logical context and/or other fields stored in the packet 1330's header, a record indicated by an encircled 3 (referred to as "record 3") in the forwarding tables that implements the logical L2 forwarding of the stage 1344. The record 3 specifies that a packet with the MAC address of the logical port 1 of the logical router 225 as a destination MAC address is to be sent to the logical port X of the logical switch 220.

The record 3 also specifies that the packet 1330 be further processed by the forwarding tables (e.g., by sending the packet 1330 to a dispatch port). Also, the record 3 specifies that the managed switching element 815 store the logical context (i.e., the packet 1330 has been processed by the third stage 1344 of the processing pipeline 1300) in the set of fields of the packet 1330's header.

Based on the logical context and/or other fields stored in the packet 1330's header, the managed switching element 815 identifies a record indicated by an encircled 4 (referred to as "record 4") in the forwarding tables that implements the context mapping of the stage 1346. In this example, the record 4 identifies port 1 of the managed switching element 810, to which port 1 of the L3 router 860 is coupled, as the port that corresponds to the logical port X of the logical switch 220 to which the packet 1330 is to be forwarded. The record 4 additionally specifies that the packet 1330 be further processed by the forwarding tables (e.g., by sending the packet 1330 to a dispatch port).

Based on the logical context and/or other fields stored in the packet 1330's header, the managed switching element 815 then identifies a record indicated by an encircled 5 (referred to as "record 5") in the forwarding tables that implements the physical mapping of the stage 1348. The record 5 specifies that the packet 1330 is to be sent through port 1 of the managed switching element 815 in order for the packet 1330 to reach the managed switching element 810. In this case, the managed switching element 815 is to send the packet 1330 out of the port 1 of managed switching element 815 that is coupled to the managed switching element 810.

As shown in the bottom half of FIG. 13A, the managed switching element 810 includes a forwarding table that includes rules (e.g., flow entries) for processing and routing the packet 1330. When the managed switching element 810 receives the packet 1330 from the managed switching element 815, the managed switching element 810 begins processing the packet 1330 based on the forwarding tables of the managed switching element 810. The managed switching element 810 identifies a record indicated by an encircled 1 (referred to as "record 1") in the forwarding tables that implements the context mapping of the stage 1350. The record 1 identifies the packet 1330's logical context based on the logical context that is stored in the packet 1330's header. The logical context specifies that the packet 1330 has been processed by the second and third stages 1342 and 1344, which were performed by the managed switching element 815. As such, the record 1 specifies that the packet 1330 be further processed by the forwarding tables (e.g., by sending the packet 1330 to a dispatch port).

Next, the managed switching element 810 identifies, based on the logical context and/or other fields stored in the packet 1330's header, a record indicated by an encircled 2 (referred to as "record 2") in the forwarding tables that implements the egress ACL of the stage 1352. In this example, the record 2 allows the packet 1330 to be further processed (e.g., the packet 1330 can get out of the logical switch 220 through port "X" of the logical switch 220) and, thus, specifies the packet 1330 be further processed by the forwarding tables (e.g., by sending the packet 1330 to a dispatch port). In addition, the record 2 specifies that the managed switching element 810 store the logical context (i.e., the packet 1330 has been processed by the stage 1352 of the processing pipeline 1300) of the packet 1330 in the set of fields of the packet 1330's header.

Next, the managed switching element 810 identifies, based on the logical context and/or other fields stored in the packet 1330's header, a record indicated by an encircled 3 (referred to as "record 3") in the forwarding tables that implements the physical mapping of the stage 1354. The record 3 specifies the port of the managed switching element 810 through which the packet 1330 is to be sent in order for the packet 1330 to reach the L3 router 860. In this case, the managed switching element 810 is to send the packet 1330 out of port 1 of managed switching element 810 that is coupled to the port 1 of the L3 router 860. In some embodiments, the managed switching element 810 removes the logical context from the packet 1330 before sending the packet to the L3 router 860.

As shown in the top half of FIG. 13B, the L3 router 860 includes an ingress ACL table, a routing table, and an egress ACL table that includes entries for processing and routing the packet 1330. When the L3 router 860 receives the packet 1330 from the managed switching element 810, the L3 router 860 begins processing the packet 1330 based on these tables of the L3 router 860. The L3 router 860 identifies an entry indicated by an encircled 1 (referred to as "entry 1") in the ingress ACL table that implements L3 ingress ACL by specifying that the L3 router 860 should accept the packet based on the information in the header of the packet 1330. The L3 router 860 then identifies an entry indicated by an encircled 2 (referred to as "entry 2") in the routing table that implements L3 routing 558 by specifying that the packet 1330 with its destination IP address (i.e., 1.1.2.10) should be sent to the logical switch 230 through port 2 of the logical router 225. The L3 router 860 then identifies an entry indicated by an encircled 3 (referred to as "entry 3") in the egress ACL table that implements L3 egress ACL by specifying that the L3 router 860 can send the packet out through port 2 of the logical router 225 based on the information in the header of the packet 1330. Also, the L3 router 860 rewrites the source MAC address for the packet 1330 to the MAC address of port 2 of the L3 router 860 (i.e., 01:01:01:01:01:02).

The L3 router 860 then performs an address resolution to translate the destination IP address into the destination MAC address. In this example, the L3 router 860 looks up an ARP cache to find the destination MAC address to which the destination IP address is mapped. The L3 router 860 may send out ARP requests if the ARP cache does not have a corresponding MAC address for the destination IP address. The destination IP address would be resolved to the MAC address of VM 4. The L3 router 860 then rewrites the destination MAC of the packet 1330 using the MAC address to which the destination IP address is resolved. The L3 router 860 would send the packet 1330 to the logical switch 230 through the logical port 2 of the L3 router 860 based on the new destination MAC address.

As shown in the bottom half of FIG. 13B, the managed switching element 810 includes a forwarding table that includes rules (e.g., flow entries) for processing and forwarding the packet 1330. When the managed switching element 810 receives the packet 1330 from the L3 router 860 through port 2 of the managed switching element 810, the managed switching element 810 begins processing the packet 1330 based on the forwarding tables of the managed switching element 810. The managed switching element 810 identifies a record indicated by an encircled 4 (referred to as "record 4") in the forwarding tables that implements the context mapping of the stage 1362. The record 4 identifies the packet 1330's logical context based on the inport, which is the port 2 through which the packet 1330 is received from the L3 router 860. In addition, the record 4 specifies that the managed switching element 810 store the logical context of the packet 1330 in a set of fields (e.g., a VLAN id field) of the packet 1330's header. The record 4 also specifies the packet 1330 be further processed by the forwarding tables (e.g., by sending the packet 1330 to a dispatch port).

Based on the logical context and/or other fields stored in the packet 1330's header, the managed switching element 810 identifies a record indicated by an encircled 5 (referred to as "record 5") in the forwarding tables that implements the ingress ACL of the stage 1364. In this example, the record 5 allows the packet 1330 to be further processed and, thus, specifies the packet 1330 be further processed by the forwarding tables (e.g., by sending the packet 1330 to a dispatch port). In addition, the record 5 specifies that the managed switching element 810 store the logical context (i.e., the packet 1330 has been processed by the stage 1362 of the processing pipeline 1300) of the packet 1330 in the set of fields of the packet 1330's header.

Next, the managed switching element 810 identifies, based on the logical context and/or other fields stored in the packet 1330's header, a record indicated by an encircled 6 (referred to as "record 6") in the forwarding tables that implements the logical L2 forwarding of the stage 1366. The record 6 specifies that a packet with the MAC address of VM 4 as the destination MAC address should be forwarded through the logical port (not shown) of the logical switch 230.

The record 6 also specifies that the packet 1330 be further processed by the forwarding tables (e.g., by sending the packet 1330 to a dispatch port). Also, the record 6 specifies that the managed switching element 810 store the logical context (i.e., the packet 1330 has been processed by the stage 1366 of the processing pipeline 1300) in the set of fields of the packet 1330's header.

Based on the logical context and/or other fields stored in the packet 1330's header, the managed switching element 810 identifies a record indicated by an encircled 7 (referred to as "record 7") in the forwarding tables that implements the context mapping of the stage 1368. In this example, the record 7 identifies port 5 of the managed switching element 820 to which VM 4 is coupled as the port that corresponds to the logical port (determined at stage 1366) of the logical switch 230 to which the packet 1330 is to be forwarded. The record 7 additionally specifies that the packet 1330 be further processed by the forwarding tables (e.g., by sending the packet 1330 to a dispatch port).

Based on the logical context and/or other fields stored in the packet 1330's header, the managed switching element 810 then identifies a record indicated by an encircled 8 (referred to as "record 8") in the forwarding tables that implements the physical mapping of the stage 1370. The record 8 specifies a port (not shown) of the managed switching element 810 through which the packet 1330 is to be sent in order for the packet 1330 to reach the managed switching element 820. In this case, the managed switching element 810 is to send the packet 1330 out of the port of managed switching element 810 that is coupled to the managed switching element 820.

As shown in FIG. 13C, the managed switching element 820 includes a forwarding table that includes rules (e.g., flow entries) for processing and routing the packet 1330. When the managed switching element 820 receives the packet 1330 from the managed switching element 810, the managed switching element 820 begins processing the packet 1330 based on the forwarding tables of the managed switching element 820. The managed switching element 820 identifies a record indicated by an encircled 4 (referred to as "record 4") in the forwarding tables that implements the context mapping of the stage 1372. The record 4 identifies the packet 1330's logical context based on the logical context that is stored in the packet 1330's header. The logical context specifies that the packet 1330 has been processed by the stages 1364 and 1366, which were performed by the managed switching element 810. As such, the record 4 specifies that the packet 1330 be further processed by the forwarding tables (e.g., by sending the packet 1330 to a dispatch port).

Next, the managed switching element 820 identifies, based on the logical context and/or other fields stored in the packet 1330's header, a record indicated by an encircled 5 (referred to as "record 5") in the forwarding tables that implements the egress ACL of the stage 1374. In this example, the record 5 allows the packet 1330 to be further processed and, thus, specifies the packet 1330 be further processed by the forwarding tables (e.g., by sending the packet 1330 to a dispatch port). In addition, the record 5 specifies that the managed switching element 820 store the logical context (i.e., the packet 1330 has been processed by the stage 1374 of the processing pipeline 1300) of the packet 1330 in the set of fields of the packet 1330's header.

Next, the managed switching element 820 identifies, based on the logical context and/or other fields stored in the packet 1330's header, a record indicated by an encircled 6 (referred to as "record 6") in the forwarding tables that implements the physical mapping of the stage 1376. The record 6 specifies the port 5 of the managed switching element 820 through which the packet 1330 is to be sent in order for the packet 1330 to reach VM 4. In this case, the managed switching element 820 is to send the packet 1330 out of port 5 of managed switching element 820 that is coupled to VM 4. In some embodiments, the managed switching element 820 removes the logical context from the packet 1330 before sending the packet to VM 4.

Figure 14:
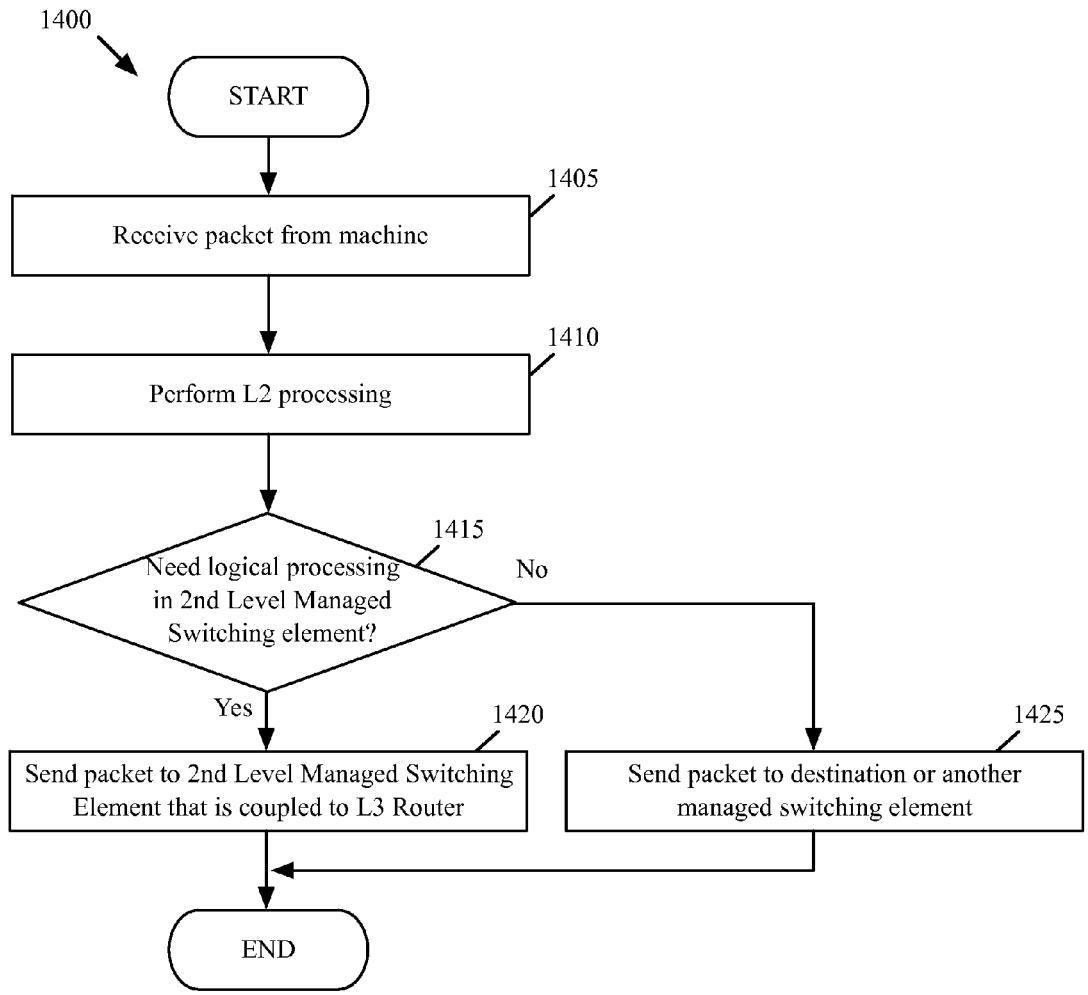
FIG. 14 conceptually illustrates a process that some embodiments perform to forward a packet to determine to which managed switching element to send a packet.

FIG. 14 conceptually illustrates a process 1400 that some embodiments perform to forward a packet to determine to which managed switching element to send a packet. The process 1400, in some embodiments, is performed by a managed edge switching element that receives a packet and forwards that packet to another managed switching element or a destination machine for the packet.

The process 1400 begins by receiving (at 1405) a packet from a source machine. The process 1400 then performs (at 1410) a portion of L2 processing. As the process performs the L2 processing, the process 1400 determines (at 1415) whether the packet needs to be sent to a second level managed switching element for further processing of the packet. In some embodiments, the process makes this determination based on the destination L2 address of the packet. The process looks at the destination L2 address and sends out the packet through a port that is associated with the destination L2 address. For instance, when the packet's destination L2 address is an L2 address of an L3 router, the process sends the packet out of a port that is associated with the managed switching element that is associated with an L3 router. When the packet's destination L2 address is an L2 address of the destination machine, the process sends the packet to the managed switching element that is directly connected to the destination machine or to the managed switching element that is closer in the route to the destination machine.

When the process 1400 determines (at 1415) that the packet needs to be sent to a second level managed switching element, the process 1400 sends (at 1420) the packet to a second-level managed switching element that is communicatively coupled to an L3 router that implements the logical router. Otherwise, the process 1400 sends (at 1425) the packet to the destination machine or to another managed switching element. The process then ends.

Figure 15:
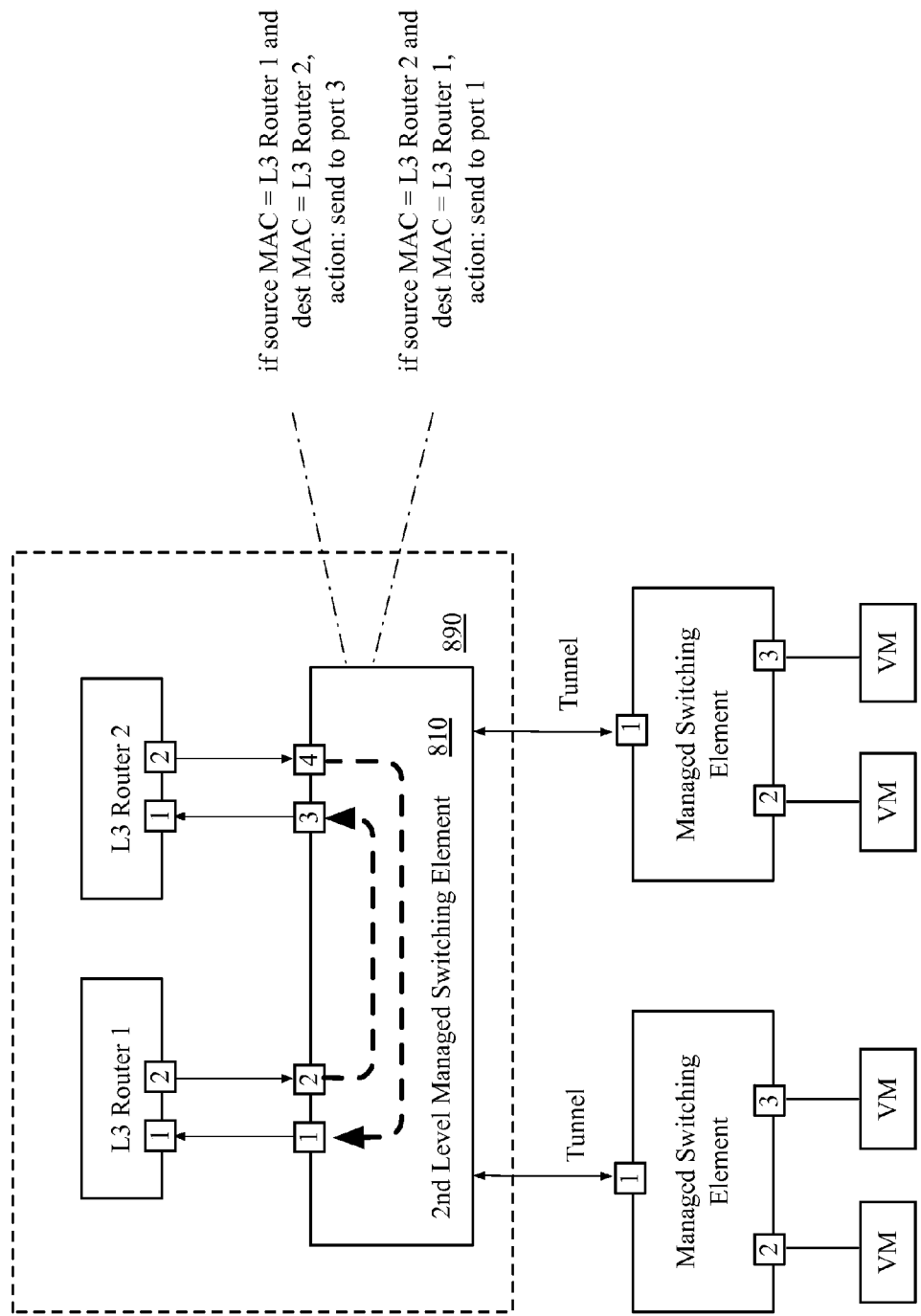
FIG. 15 conceptually illustrates the host as described above by reference to FIG. 8.

FIG. 15 conceptually illustrates the host 890 described above. Specifically, when the managed switching element 810 receives a packet from an L3 router and the packet is headed to another L3 router implemented in the same host 890, the managed switching element 810 directly bridges the two L3 routers based on the flow entries.

As shown, the managed switching element 810 is coupled to two L3 routers 1 and 2. The flow entries that the managed switching element 810 contains are shown on the right side of the figure. The flow entries indicate that the traffic that is addressed to go from one L3 router to another L3 router should directly go to the other L3 router.

Also, this figure illustrates that the additional router can be provisioned in the host 890 in order to provide additional routing resources when more managed switching elements are provisioned and rely on the existing L3 router to route additional network traffic.

Figure 16:
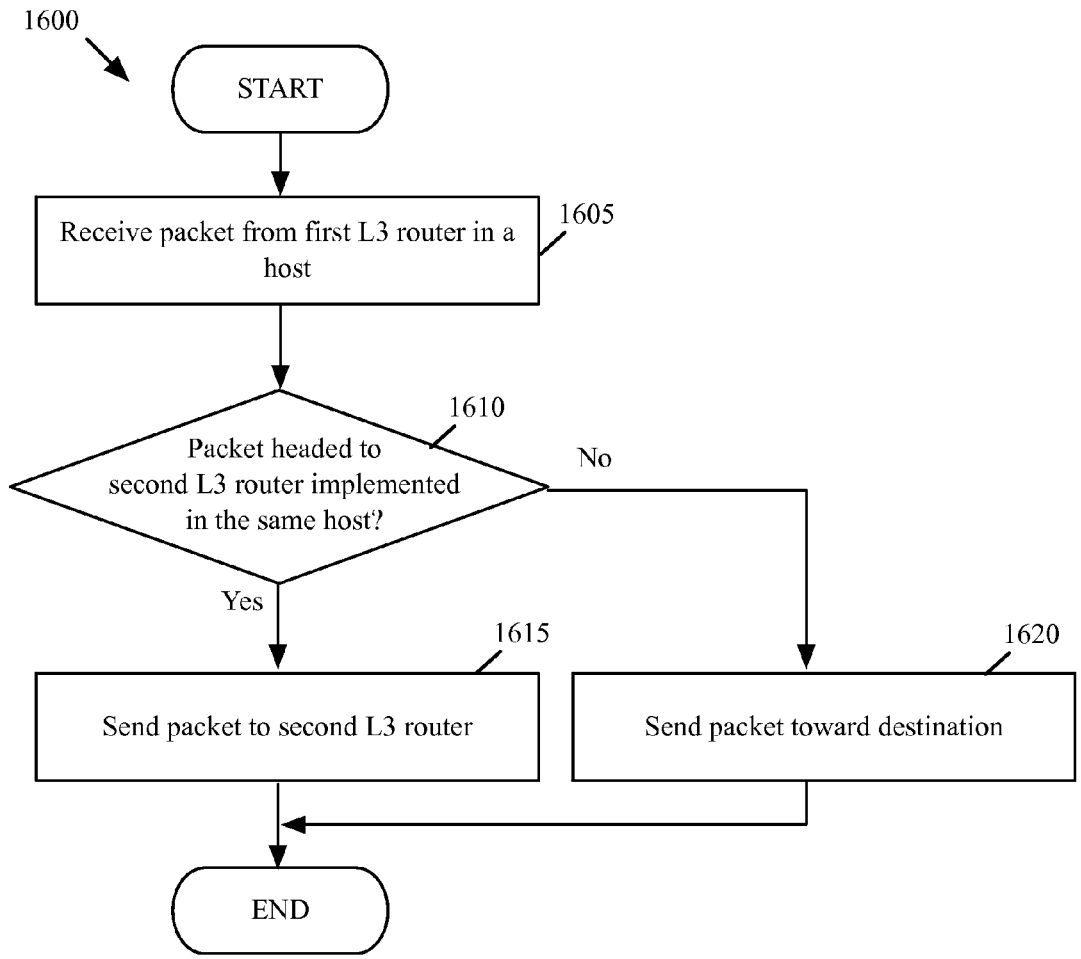
FIG. 16 conceptually illustrates a process that some embodiments use to directly forward a packet from a first L3 router to a second L3 router when the first and the second L3 routers are implemented in the same host.

FIG. 16 conceptually illustrates a process 1600 that some embodiments use to directly forward a packet from a first L3 router to a second L3 router when the first and the second L3 routers are implemented in the same host. The process 1600, in some embodiments, is performed by a managed switching element, such as the managed switching element 810 described above, which exchanges packets with two or more L3 routers implemented in a single host.

The process 1600 begins by receiving (at 1605) a packet from a first L3 router. The process 1600 then determines (at 1610) whether the packet is addressed to a second L3 router that is implemented in the same host in which the first L3 router is implemented. The process 1600 determines this by examining the information in the header of the packet (e.g., destination MAC address).

When the process 1600 determines (at 1610) that the packets are headed to the second L3 router, the process 1600 sends the packet to the second L3 router. Otherwise, the process 1600 sends the packet toward the destination of the packet (e.g., another managed switching element or a destination machine). The process 1600 then ends.

Figure 17:
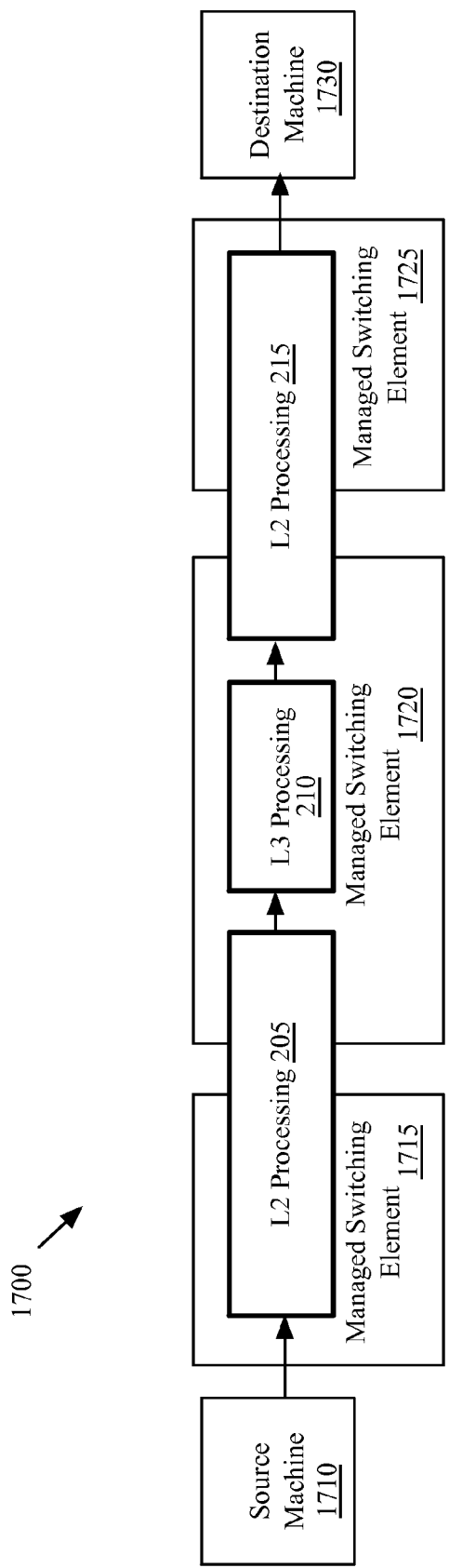
FIG. 17 conceptually illustrates an example implementation of the logical processing pipeline described above by reference to FIG. 2.

FIGS. 17-24 illustrate a centralized logical router implemented in a managed switching element based on flow entries of the managed switching element. FIG. 17 conceptually illustrates an example implementation of the logical processing pipeline 200 described above by reference to FIG. 2. FIG. 17 illustrates a network architecture 1700. In the network architecture 1700, the logical processing pipeline 200 is performed by three managed switching elements 1715, 1720, and 1725. In particular, the L2 processing 205 and the L2 processing 215 are performed in a distributed manner across managed switching elements 1715, 1720, and 1725. The L3 processing 210 is performed by the managed switching element 1720 based on flow entries of the managed switching element 1720. FIG. 17 also illustrates source machine 1710 and destination machine 1730.

The managed switching element 1715 is similar to the managed switching element 615 described above by reference to FIG. 6 in that the managed switching element 1715 is also an edge switching element that directly receives the packets from a machine coupled to the edge switching element. The managed switching element 1715 receives packets from the source machine 1710. When the managed switching element 1715 receives a packet from the source machine 1710, the managed switching element 1715 performs a portion of the L2 processing 205 on the packet in order to logically forward the packet. When the packet is headed to the destination machine 1730, which is in another logical network, the packet is forwarded to the managed switching element 1720

There may be one or more managed switching elements (not shown) between the managed switching element 1715 and the managed switching element 1720. These managed switching elements have network constructs (e.g., PIFs, VIFs, etc.) to which the logical constructs (e.g., logical ports) of the logical switch 220 (not shown in FIG. 17) are mapped.

The managed switching element 1720 is a second-level managed switching element that functions as an extender in some embodiments. The managed switching element 1720 performs the rest of the L2 processing 205 and also performs the L3 processing 210. The managed switching element 1720 also performs a portion of the L2 processing 215 of the logical processing pipeline 200. The managed switching element 1720 then sends the packet to the managed switching element 1725.

There may be one of more managed switching elements (not shown) between the managed switching element 1720 and the managed switching element 1725. These managed switching elements have network constructs to which the logical constructs of the logical switch 220 (not shown in FIG. 17) are mapped.

The managed switching element 1725 in the example receives the packet from the managed switching element 1720. The managed switching element 1725 performs the rest of the L2 processing 215 on the packet in order to logically forward the packet. In this example, the managed switching element 1725 is also the switching element that directly sends the packet to the destination machine 1730. However, there may be one or more managed switching elements (not shown) between the managed switching element 1725 and the destination machine 1130. These managed switching elements have network constructs to which the logical constructs of the logical switch 230 (not shown in FIG. 17) are mapped.

Although the L2 processing 205 and the L2 processing 215 are performed in a distributed manner in this example, the L2 processing 205 and the L2 processing 215 do not have to be performed in a distributed manner. For instance, the managed switching element 1715 may perform the entire L2 processing 205 and the managed switching element 1725 may perform the entire L2 processing 215. In such case, the managed switching element 1720 would perform only the L3 processing 210 of the logical processing pipeline 200.

Figure 18:
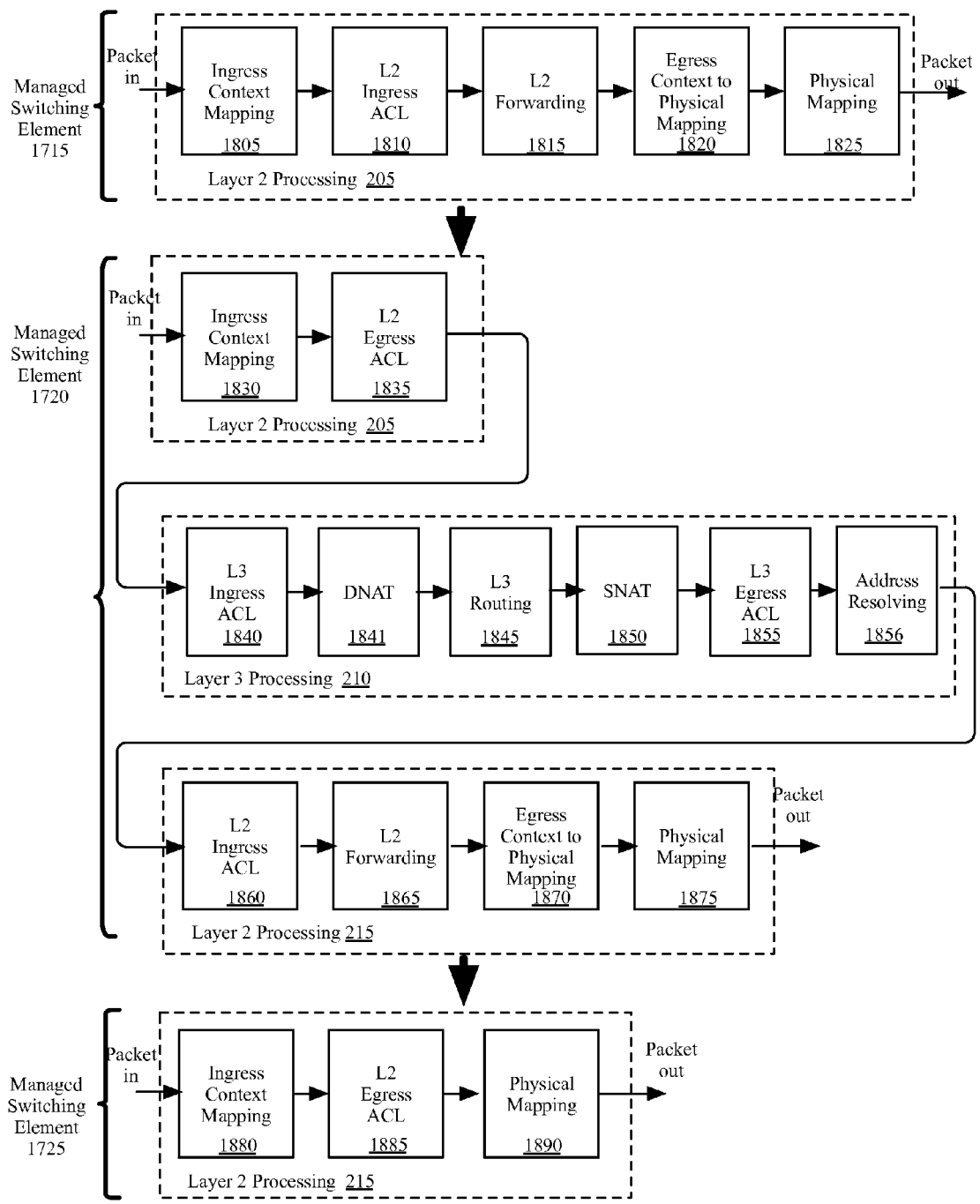
FIG. 18 conceptually illustrates a logical processing pipeline of some embodiments for processing a packet through a logical switch, a logical router, and another logical switch.

FIG. 18 conceptually illustrates the logical processing pipeline 200 of some embodiments for processing a packet through the logical switch 220, the logical router 225, and the logical switch 230. Specifically, this figure illustrates the logical processing pipeline 200 when performed in the network architecture 1700 described above by reference to FIG. 17. As described above, in the network architecture 1700, the L2 processing 205, the L3 processing 210, and the L2 processing 215 are performed by the managed switching elements 1715, 1720, and 1725.

The L2 processing 205, in some embodiments, includes seven stages 1805-1835 for processing a packet through the logical switch 220 (not shown in FIG. 18) in a logical network (not shown) that is implemented across the managed switching elements 1715 and 1720. In some embodiments, the managed switching element 1715 that receives the packet performs a portion of the L2 processing 205 when the managed switching element 1715 receives the packet. The managed switching element 1720 then performs the rest of the L2 processing 205.

The first five stages 1805-1825 are similar to the first five stages 705-725 described above by reference to FIG. 7. In the stage 1805 of the L2 processing 205, ingress context mapping is performed on the packet to determine the logical context of the packet. In some embodiments, the stage 1805 is performed when the logical switch 220 receives the packet (e.g., the packet is initially received by the managed switching element 1715). After the first stage 1805 is performed, some embodiments store the information that represents the logical context in one or more fields of the packet's header.

In some embodiments, the second stage 1810 is defined for the logical switch 220. In some such embodiments, the stage 1810 operates on the packet's logical context to determine ingress access control of the packet with respect to the logical switch. For example, an ingress ACL is applied to the packet to control the packet's access to the logical switch when the logical switch receives the packet. Based on the ingress ACL defined for the logical switch, the packet may be further processed (e.g., by the stage 1815) or the packet may be dropped, for example.

In the third stage 1815 of the L2 processing 205, an L2 forwarding is performed on the packet in the context of the logical switch. In some embodiments, the third stage 1815 operates on the packet's logical context to process and forward the packet with respect to the logical switch 220. For instance, some embodiments define an L2 forwarding table or L2 forwarding entries for processing the packet at layer 2. Moreover, when the packet's destination is in another logical network (i.e., when the packet's destination logical network is different than the logical network whose traffic is processed by the logical switch 220), the logical switch 220 sends the packet to the logical router 225, which will then perform the L3 processing 210 in order to route the packet to the destination logical network. Thus, at the third stage 1815, the managed switching element 1715 determines that the packet should be forwarded to the logical router 225 through a logical port (not shown) of the logical switch that is associated with the logical router 225.

At the fourth stage 1820, egress context mapping is performed to identify a physical result that corresponds to the result of the logical forwarding of the packet. For example, the logical processing of the packet may specify that the packet is to be sent out of one or more logical ports (e.g., a logical egress port) of the logical switch 220. As such, the egress context mapping operation identifies a physical port(s) of one or more of the managed switching elements (including the managed switching elements 1715 and 1720) that corresponds to the particular logical port of the logical switch 220. The managed switching element 1715 determines that the physical port (e.g. a VIF) to which the logical port determined at the previous stage 1815 is mapped is a port (not shown) of the managed switching element 1720.

The fifth stage 1825 of the L2 processing 205 performs a physical mapping based on the egress context mapping performed at the fourth stage 1820. In some embodiments, the physical mapping determines operations for sending the packet towards the physical port that was determined in the fourth stage 1820. For example, the physical mapping of some embodiments determines one or more queues (not shown) associated with one or more ports of the set of ports (not shown) of the managed switching element 1715 that is performing the L2 processing 205 through which to send the packet in order for the packet to reach the physical port(s) determined in the fourth stage 1820. This way, the managed switching elements can forward the packet along the correct path in the network for the packet to reach the determined physical port(s).

As shown, the sixth stage 1830 of the L2 processing 205 is performed by the managed switching element 1720. The sixth stage 1830 is similar to the first stage 1805. The stage 1830 is performed when the managed switching element 1720 receives the packet. At the stage 1830, the managed switching element 1720 looks up the logical context of the packet and determines that L2 egress access control is left to be performed.

The seventh stage 1835 of some embodiments is defined for the logical switch 220. The seventh stage 1835 of some such embodiments operates on the packet's logical context to determine egress access control of the packet with respect to the logical switch 220. For instance, an egress ACL may be applied to the packet to control the packet's access out of the logical switch 220 after logical forwarding has been performed on the packet. Based on the egress ACL defined for the logical switch, the packet may be further processed (e.g., sent out of a logical port of the logical switch or sent to a dispatch port for further processing) or the packet may be dropped, for example.

The L3 processing 210 includes six stages 1840-1856 for processing a packet through the logical switch 220 (not shown in FIG. 18) that is implemented in the managed switching element 1720 based on the L3 flow entries of the managed switching element 1720. As mentioned above, L3 processing involves performing a set of logical routing lookups for determining where to route the packet through a layer 3 network.

The first stage 1840 performs a logical ingress ACL lookup for determining access control when the logical router 225 receives the packet (i.e., when the managed switching element 1720 which implements the logical router 225 receives the packet). The next stage 1841 performs DNAT to revert the destination address of the packet back to the real address of the destination machine that is hidden from the source machine of the packet. This stage 1841 is performed when DNAT is enabled.

The next stage 1845 performs a logical L3 routing for determining one or more logical ports to which send the packet through the layer 3 network based on the L3 addresses (e.g., destination IP address) of the packet and routing tables (e.g., containing L3 entries). Since the logical router 225 is implemented by the managed switching element 1720, the L3 flow entries are configured in the managed switching element 1720.

At the fourth stage 1850, the managed switching element 1720 of some embodiments also performs SNAT on the packet. For instance, the managed switching element 1720 replaces the source IP address of the packet with a different IP address in order to hide the source IP address when the source NAT is enabled. Also, as will be described further below, the managed switching element may use a NAT daemon to receive flow entries for translating network addresses. A NAT daemon will be described further below by reference to FIG. 31.

The fifth stage 1855 performs logical L3 egress ACL lookups for determining access control before the logical router 225 routes the packet out of the logical router 225 through the port determined in the stage 1845. The L3 egress ACL lookups are performed based on the L3 addresses (e.g., source and destination IP addresses) of the packet.

The sixth stage 1856 performs address resolution in order to translate the destination L3 address (e.g., a destination IP address) into a destination L2 address (e.g., a destination MAC address). In some embodiments, the managed switching element 1720 uses a standard address resolution (e.g., by sending out ARP requests or looking up ARP cache) to find the destination L2 address that corresponds to the destination IP address. Also, as will be described further below, the managed switching element 1720 of some embodiments may use an L3 daemon to receive flow entries for resolving L3 addresses into L2 addresses. An L3 daemon will be described further below by reference to FIGS. 48-50.

When the logical router 225 is not coupled to the destination logical network, the logical switch 220 sends the packet to another logical router network towards the destination logical network. When the logical router 225 is coupled to the destination logical network, the logical switch 220 routes the packet to the destination logical network (i.e., the logical switch that forwards the packet for the destination logical network).

The L2 processing 215, in some embodiments, includes seven stages 1860-1890 for processing the packet through the logical switch 230 in another logical network (not shown in FIG. 18) that is implemented across the managed switching elements 1720 and 1725 (not shown). The stages 1860-1890 are similar to the stage 1805-1835, respectively, except that the stage 1860-1890 are performed by the logical switch 230 (i.e., by the managed switching elements 1720 and 1725 that implement the logical switch 230).

Figure 19:
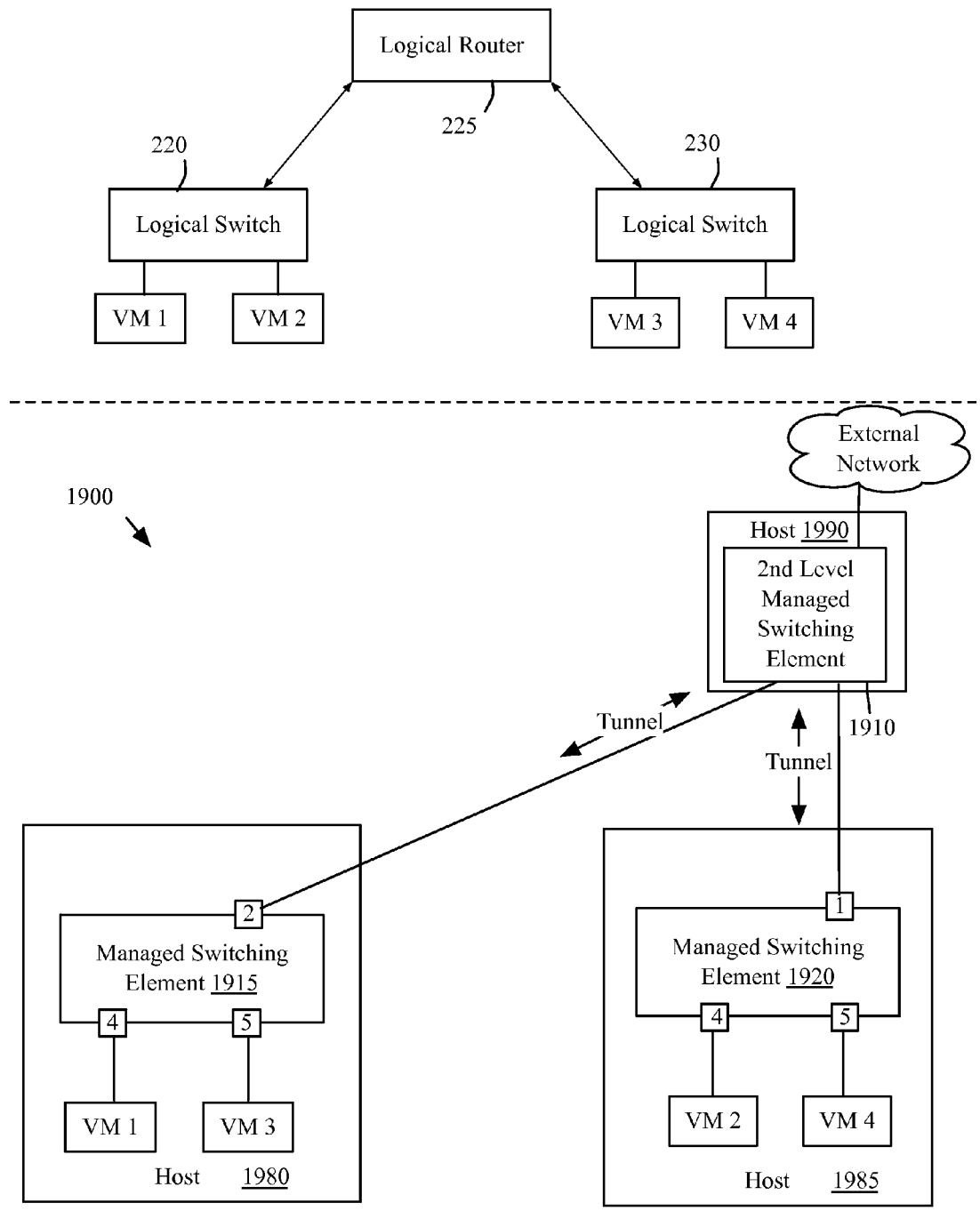
FIG. 19 conceptually illustrates an example network architecture of some embodiments which implements a logical router and logical switches.

FIG. 19 conceptually illustrates an example network architecture 1900 of some embodiments which implements the logical router 225 and logical switches 220 and 230. Specifically, the network architecture 1900 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates in the bottom half of the figure a second-level managed switching element 1910, managed switching elements 1915 and 1920 which are running in hosts 1990, 1980, and 1985 (e.g., machines operated by operating systems such as Windows™ and Linux™), respectively. The figure illustrates VMs 1-4 in both the top and the bottom of the figure.

In this example, the logical switch 220 forwards data packets between the logical router 225, VM 1, and VM 2. The logical switch 230 forwards data packets between the logical router 225, VM 3, and VM 4. As mentioned above, the logical router 225 routes data packets between the logical switches 220 and 230 and possibly other logical routers and switches (not shown). The logical switches 220 and 230 and the logical router 225 are logically coupled through logical ports (not shown) and exchange packets through the logical ports. These logical ports are mapped to physical ports of the L3 router 1960 and the managed switching elements 1910, 1915 and 1920.

In some embodiments, each of the logical switches 220 and 230 is implemented across the managed switching elements 1915 and 1920 and possibly other managed switching elements (not shown). In some embodiments, the logical router 225 is implemented in the L3 router 1960 which is communicatively coupled to the managed switching element 1910.

In this example, the managed switching elements 1910, 1915 and 1920 are software switching elements running in hosts 1990, 1980 and 1985, respectively. The managed switching elements 1910, 1915 and 1920 have flow entries which implement the logical switches 220 and 230. Using these flow entries, the managed switching elements 1915 and 1920 forward network data (e.g., packets) between network elements in the network that are coupled to the managed switching elements 1910, 1915 and 1920. For instance, the managed switching element 1915 routes network data between VMs 1 and 3, and the second-level managed switching element 1910. Similarly, the managed switching element 1920 routes network data between VMs 2 and 4, and the second-level managed switching element 1910. As shown, the managed switching elements 1915 and 1920 each have three ports (depicted as numbered squares) through which to exchange data packets with the network elements that are coupled to the managed switching elements 1915 and 1920.

The managed switching element 1910 is similar to the managed switching element 305 described above by reference to FIG. 4 in that the managed switching element 1910 is a second-level managed switching element that functions as an extender. The managed switching element 560 also implements the logical router 225 based on the flow entries. Using these flow entries, the managed switching element 1910 route packets at L3. In this example, the logical router 225 implemented in the managed switching element 1910 routes packets between the logical switch 220 that is implemented across the managed switching elements 1910 and 1915 and the logical switch 230 implemented across the managed switching element 1910 and 1920.

In this example, the managed switching element 1910 is coupled to the managed switching element 1915, which runs in the host 1980, through a tunnel that terminates at port 2 of the managed switching element 1915 as shown. Similarly, the managed switching element 1910 is coupled to the managed switching element 1920 through a tunnel that terminates at port 1 of the managed switching elements 1920.

In this example, each of the hosts 1980 and 1985 includes a managed switching element and several VMs as shown. The VMs 1-4 are virtual machines that are each assigned a set of network addresses (e.g., a MAC address for L2, an IP address for L3, etc.) and can send and receive network data to and from other network elements. The VMs are managed by hypervisors (not shown) running on the hosts 1980 and 1985.

Several example data exchanges through the network architecture 1900 will now be described. When VM 1 that is coupled to the logical switch 220 sends a packet to VM 2 that is also coupled to the same logical switch 220, the packet is first sent to the managed switching element 1915. The managed switching element 1915 then performs the L2 processing 205 on the packet because the managed switching element 1915 is the edge switching element that receives the packet from VM 1. The result of the L2 processing 205 on this packet would indicate that the packet should be sent to the managed switching element 1920 to get to VM 2 through port 4 of the managed switching element 1920. Because VMs 1 and 2 are in the same logical network and therefore L3 routing for the packet is not necessary, no L3 processing needs to be performed on this packet. The packet is then sent to the managed switching element 1920 via the second-level managed switching element 1910 which is bridging between the managed switching element 1915 and the managed switching element 1920. The packet reaches VM 2 through port 4 of the managed switching element 1920.

When VM 1 that is coupled to the logical switch 220 sends a packet to VM 3 that is coupled to the logical switch 230, the packet is first sent to the managed switching element 1915. The managed switching element 1915 performs a portion of L2 processing on the packet. However, because the packet is sent from one logical network to another (i.e., the logical L3 destination address of the packet is for another logical network), an L3 processing needs to be performed on this packet.

The managed switching element 1915 sends the packet to the second-level managed switching element 1910 so that the managed switching element 1910 performs the rest of the L2 processing and the L3 processing 210 on the packet. The managed switching element 1910 then performs a portion of another L2 processing and forwards the packet to the managed switching element 1920. The managed switching element 1915 performs the L2 processing 215 on the packet received from the managed switching element 1910 and the result of this L2 processing would indicate that the packet should be sent to VM 3 through port 5 of the managed switching element 1915.

When VM 1 that is coupled to the logical switch 220 sends a packet to VM 4 that is coupled to the logical switch 230, the packet is first sent to the managed switching element 1915. The managed switching element 1915 performs the L2 processing 205 on the packet. However, because the packet is sent from one logical network to another, an L3 processing needs to be performed.

The managed switching element 1915 sends the packet to the managed switching element 1910 so that the managed switching element 1910 performs the rest of L2 processing 205 and the L3 processing 210 on the packet. The result of the L3 processing 210 performed at the managed switching element 1910 would indicate that the packet should be sent to the managed switching element 1915. The managed switching element 1910 then performs a portion of L2 processing on the packet and the result of this L2 processing would indicate that the packet should be sent to VM 4 through the managed switching element 1920. The managed switching element 1920 performs the rest of the L2 processing to determine that the packet should be sent to VM 4 through port 5 of the managed switching element 1920.

Figure 20:
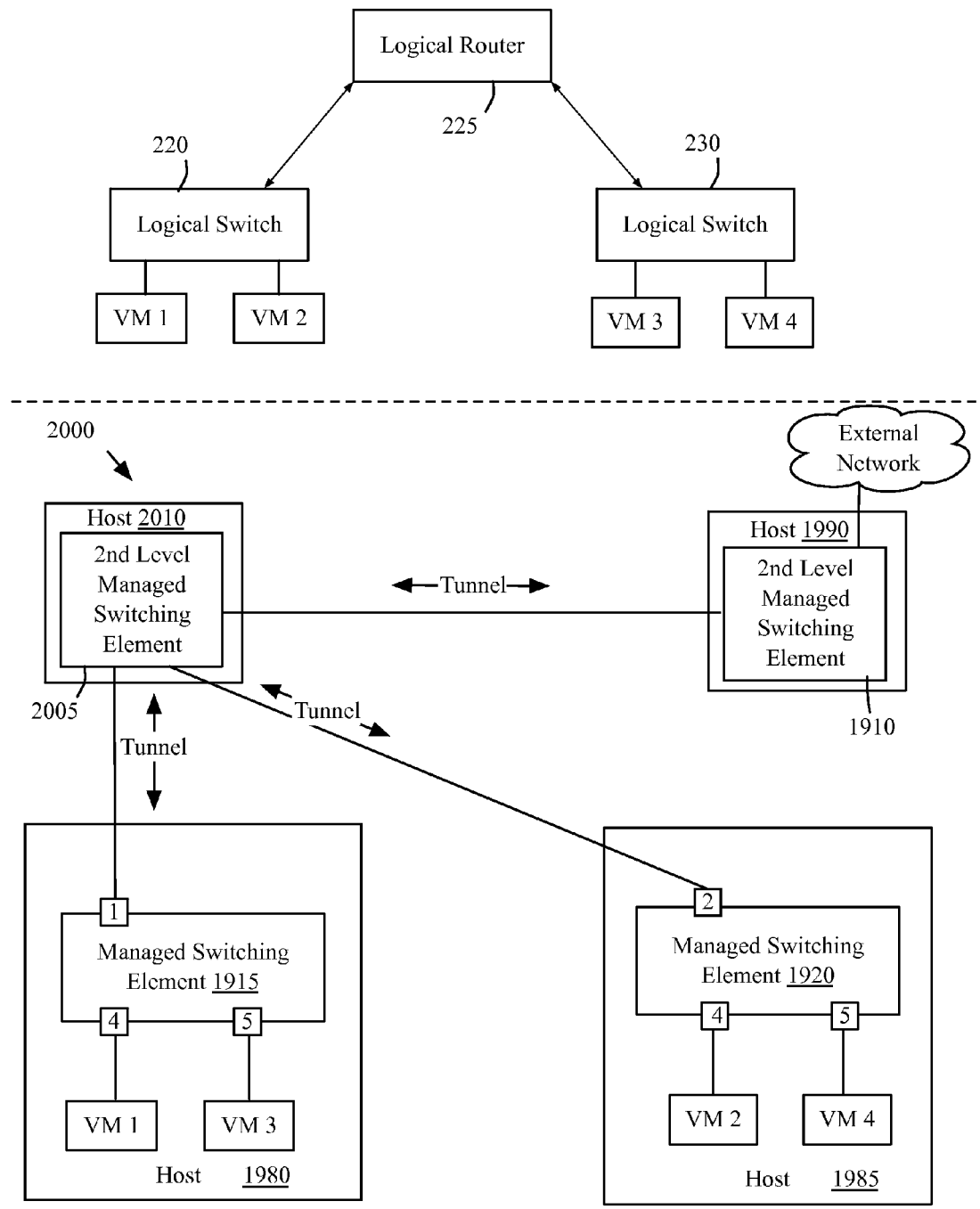
FIG. 20 conceptually illustrates an example network architecture of some embodiments which implements a logical router and logical switches.

FIG. 20 conceptually illustrates an example network architecture 2000 of some embodiments which implements the logical router 225 and logical switches 220 and 230. Specifically, the network architecture 2000 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates in the bottom half of the figure the second-level managed switching element 1910, managed switching elements 1915 and 1920 which are running in hosts 1990, 1980, and 1985 respectively. The figure illustrates VMs 1-4 in both the top and the bottom of the figure.

The network architecture 2000 is similar to the network architecture 1900 except that the network architecture 2000 additionally includes the managed switching element 2005 which runs in the host 2010. The managed switching element 2005 of some embodiments is a second-level managed switching element that functions as a pool node.

In some embodiments, tunnels are established by the network control system (not shown) to facilitate communication between the network elements. For instance, the managed switching element 1915 in this example is coupled to the managed switching element 2005, which runs in the host 2010, through a tunnel that terminates at port 1 of the managed switching element 1915 as shown. Similarly, the managed switching element 1920 is coupled to the managed switching element 2005 through a tunnel that terminates at port 2 of the managed switching elements 1920. Also, the managed switching elements 2005 and 1910 are coupled through a tunnel as shown.

The logical router 225 and the logical switches 220 and 230 are implemented in the managed switching elements 1910, 1915, and 1920 as described by reference to FIG. 19 above, except that the second-level managed switching element 2005 is involved in the data packet exchange. That is, the managed switching elements 1915 and 1910 exchange packets through the managed switching element 2005. The managed switching elements 1920 and 1910 exchange packets through the managed switching element 2005. The managed switching elements 1915 and 1920 exchange packets through the managed switching element 2005.

Figure 21:
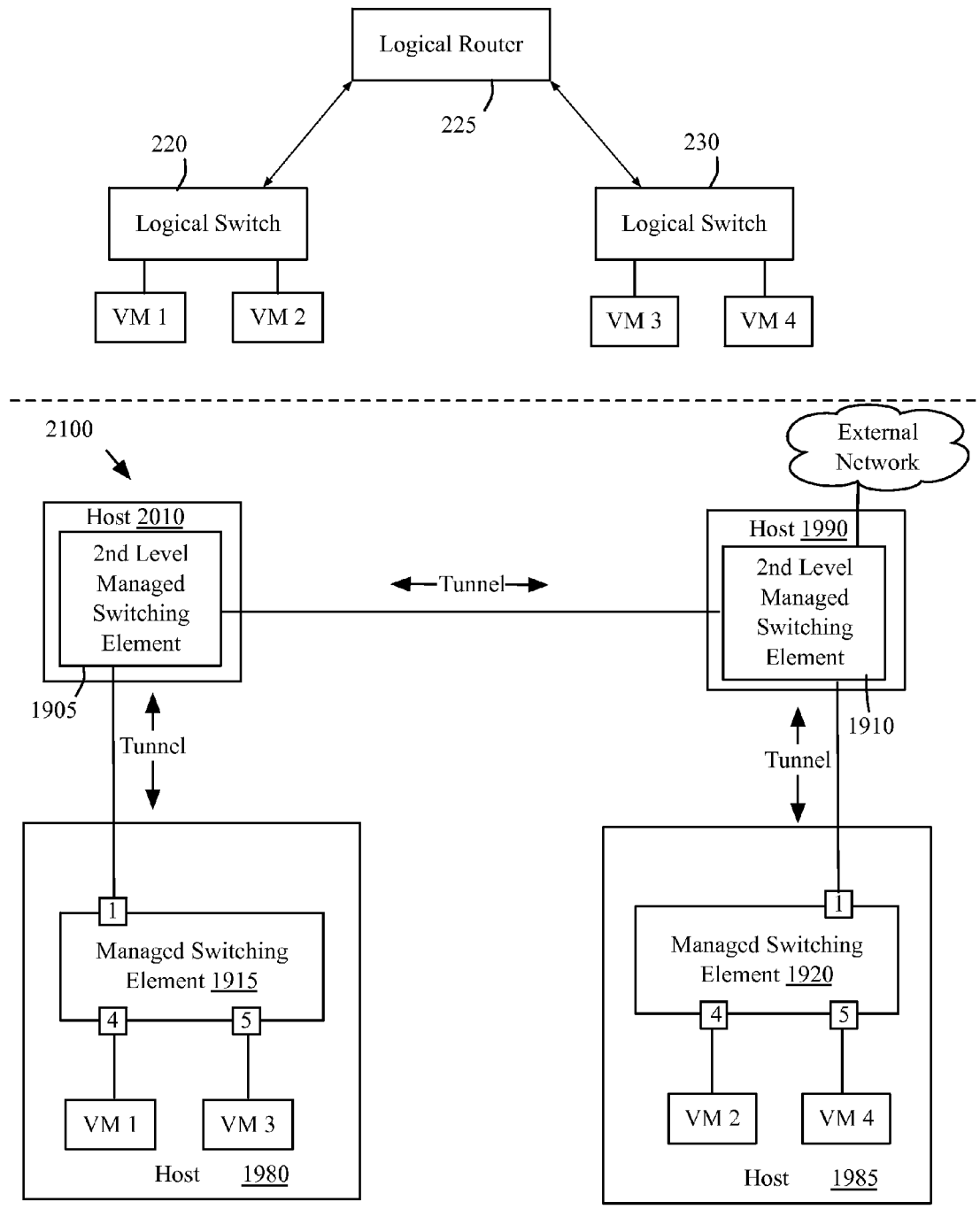
FIG. 21 conceptually illustrates an example network architecture of some embodiments which implements a logical router and logical switches.

FIG. 21 conceptually illustrates an example network architecture 2100 of some embodiments which implements the logical router 225 and logical switches 220 and 230. The network architecture 2100 is similar to the network architecture 1900 except that there is a tunnel established between the managed switching element 1910 and the managed switching element 1920. This figure illustrates that the network architecture 2100 of some embodiments is a mixture of the network architecture 1900 and the network architecture 2000. That is, some managed edge switching elements have tunnels to a second-level managed switching element that is coupled to a centralized L3 router while other managed edge switching elements have to go through a second-level managed switching element that functions as a pool node in order to exchange packets with a second-level managed switching element that is coupled to the centralized L3 router.

Figure 22:
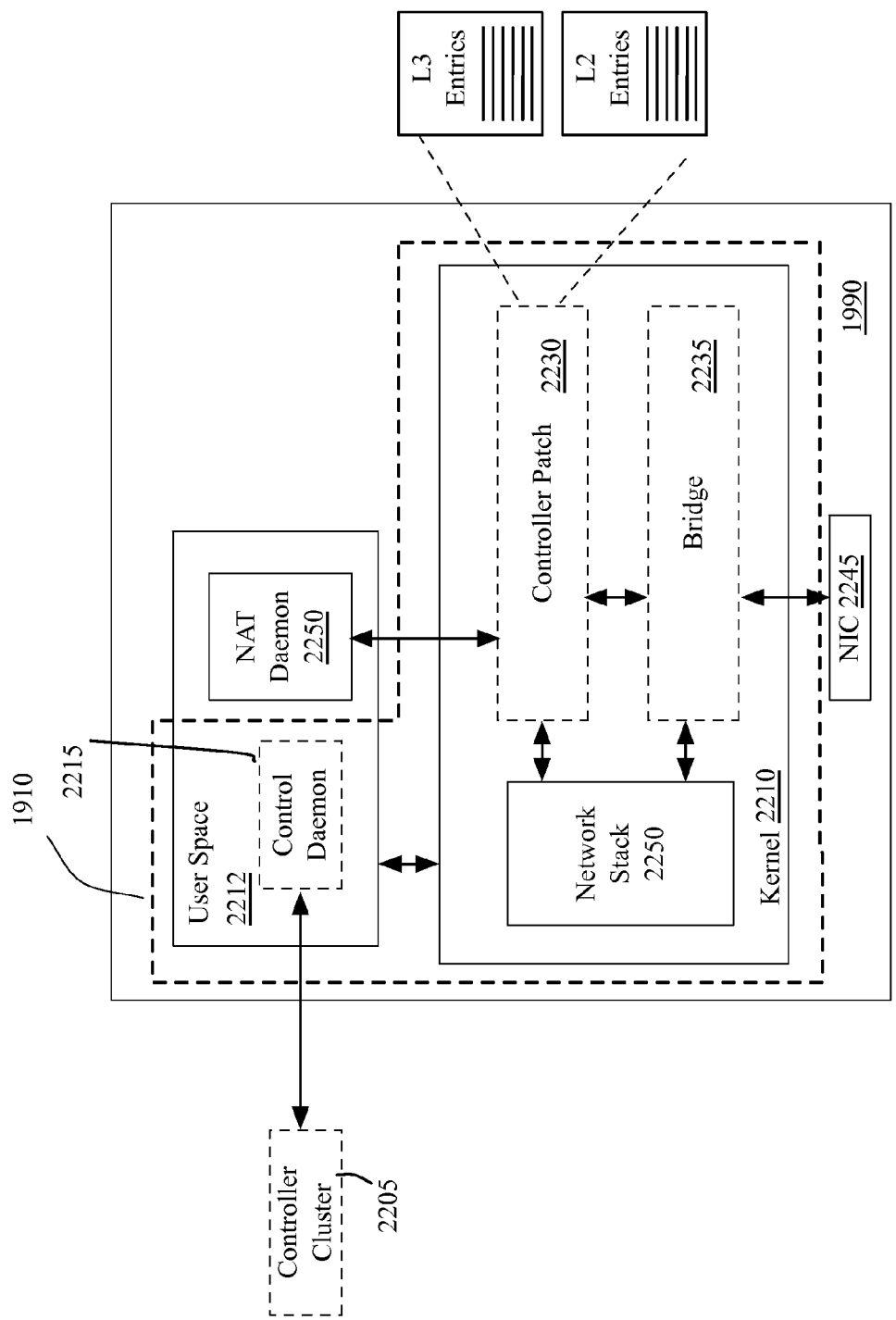
FIG. 22 conceptually illustrates an example architecture of a host of some embodiments that includes a managed switching element that implements a logical router based on flow entries.

FIG. 22 conceptually illustrates an example architecture of the host 1990 of some embodiments that includes the managed switching element 1910 that implements a logical router based on flow entries. The host 1990, in some embodiments, is a machine that is managed by an operating system (e.g., Linux) that is capable of creating virtual machines. As shown, the host 1990 in this example includes a managed switching element 1910, and a NIC 2245. This figure also illustrates a controller cluster 2205.

The controller cluster 2205 is a set of network controllers or controller instances that manage the network elements, including the managed switching element 1910. The managed switching element 1910 in this example is a software switching element implemented in the host 1990 that includes a user space 2212 and a kernel 2210. The managed switching element 1910 includes a control daemon 2215 running in the user space 2212, and a controller patch 2230 and a bridge 2235 running in the kernel 2210. Also running in the user space 2212 is a NAT daemon 2250, which will be described further below. The user space 2212 and the kernel 2210, in some embodiments, are of an operating system for the host 1990 while in other embodiments the user space 2212 and the kernel 2210 are of a virtual machine that is running on the host 1990.

In some embodiments, the controller cluster 2205 communicates with a control daemon 2215 (e.g., by using OpenFlow protocol or some other communication protocol), which, in some embodiments, is an application running in the background of the user space 2212. The control daemon 2215 communicates with the controller cluster 2205 in order to process and route packets that the managed switching element 1910 receives. Specifically, the control daemon 2215, in some embodiments, receives configuration information from the controller cluster 2205 and configures the controller patch 2230. For example, the control daemon 2215 receives commands from the controller cluster 2205 regarding operations for processing and routing packets at L2 and L3 that the managed switching element 1910 receives.

The controller patch 2230 is a module that runs in the kernel 2210. In some embodiments, the control daemon 2215 configures the controller patch 2230. When configured, the controller patch 2230 contains rules (e.g., flow entries) regarding processing, forwarding, and routing the packets to receive. The controller patch 2230 implements both logical switches and a logical router.

In some embodiments, the controller patch 2230 uses the NAT daemon for network address translation. As will be described further below, the NAT daemon 2250 generates flow entries regarding network address translation and sends back the flow entries to the managed switching element 1910 to use. A NAT daemon will be described further below.

The controller patch 2230 receives packets from a network stack 2250 of the kernel 2210 or from the bridge 2235. The bridge 2235 routes network data between the network stack 2250 and network hosts external to the host (i.e., network data received through the NIC 2245). As shown, the bridge 2235 routes network data between the network stack 2250 and the NIC 2245 and between the network stack 2250 and the NIC 2245. The bridge 2235 of some embodiments performs standard L2 packet learning and routing.

The network stack 2250 can receive packets from network hosts external to the managed switching element 1910 through the NIC 2245. The network stack 2250 then sends the packets to the controller patch 2230. In some cases, the packets are received from network hosts external to the managed switching element through tunnels. In some embodiments, the tunnels terminate at the network stack 2250. Thus, when the network stack 2250 receives a packet through a tunnel, the network stack 2250 unwraps the tunnel header (i.e., decapsulates the payload) and sends the unwrapped packet to the controller patch 2230.

An example operation of the managed switching element 1910 will now be described. In this example, tunnels are established between the managed switching element 1910 and the managed switching elements 1915 and 1920 (not shown in FIG. 22) that are external to the host 1990. That is, the managed switching elements 1910, 1915, and 1920 are connected through the tunnels as illustrated in FIG. 19. The tunnels terminate at the network stack 2250.

The managed switching element 1915 sends a packet, sent by VM1 to VM 4, to the managed switching element 1910. The packet is received by the NIC 2245 and then is sent to the bridge 2235. Based on the information in the packet header, the bridge 2235 determines that the packet is sent over the established tunnel and sends the packet to the network stack 2250. The network stack 2250 unwraps the tunnel header and sends the unwrapped packet to the controller patch 2230.

According to the flow entries that the controller patch 2230 has, the controller patch 2230 performs L3 processing to route the packet because the packet is sent from one logical network to another logical network. By performing the L3 processing and some L2 processing, the managed switching element 1910 determines that the packet should be sent to the managed switching element 1920 because the destination network layer address should go to a logical switch that belongs to the destination logical network. The controller patch 2230 sends the packet through the network stack 2250, the bridge 2235, and the NIC 2245 over the tunnel to the managed switching element 1920 that implements the logical switch that belongs to the destination logical network.

Figure 23:
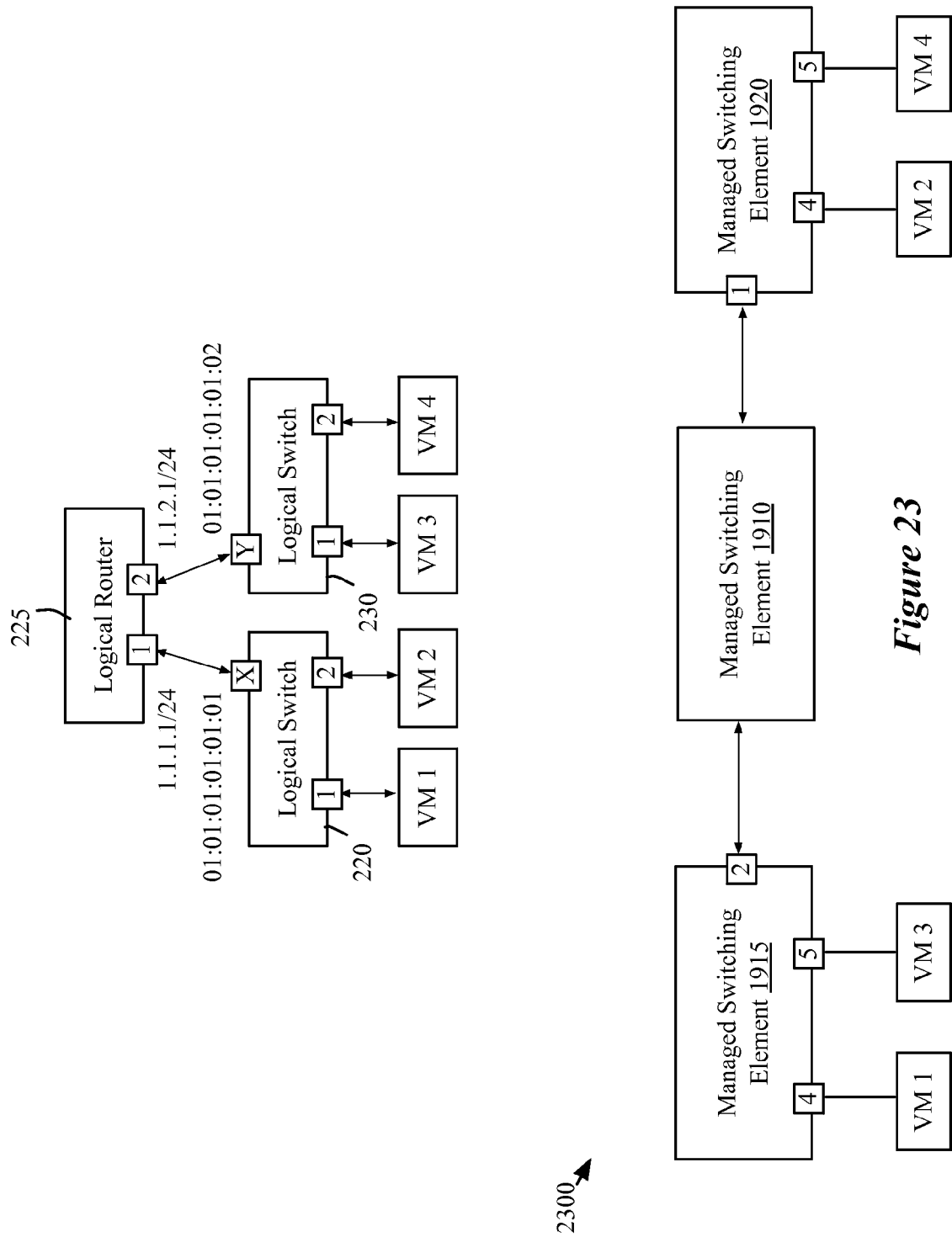
FIG. 23 conceptually illustrates an example implementation of logical switches and logical routers in managed switching elements.

FIG. 23 conceptually illustrates an example implementation of logical switches and logical routers in managed switching elements. Specifically, this figure illustrates implementation of the logical router 225 and the logical switches 220 and 230 in the second-level managed switching element 1910 and the managed switching elements 1915 and 1920. The figure illustrates in the top half of the figure the logical router 225 and the logical switches 220 and 230. This figure illustrates in the bottom half of the figure the managed switching elements 1910-1920. The figure illustrates VMs 1-4 in both the top and the bottom halves of the figure.

The logical switches 220 and 230 and the logical router 225 are logically coupled through logical ports. This particular configuration of the logical switches 220 and 230 is the same as the configuration illustrated in an example described above by reference to FIG. 12.

In the example of FIG. 23, the controller cluster 2205 (not shown in FIG. 23) configures the managed switching element 1910 by supplying flow entries to the managed switching element 1910 such that the managed switching element implements the logical router 225 based on the flow entries.

Figure 24:
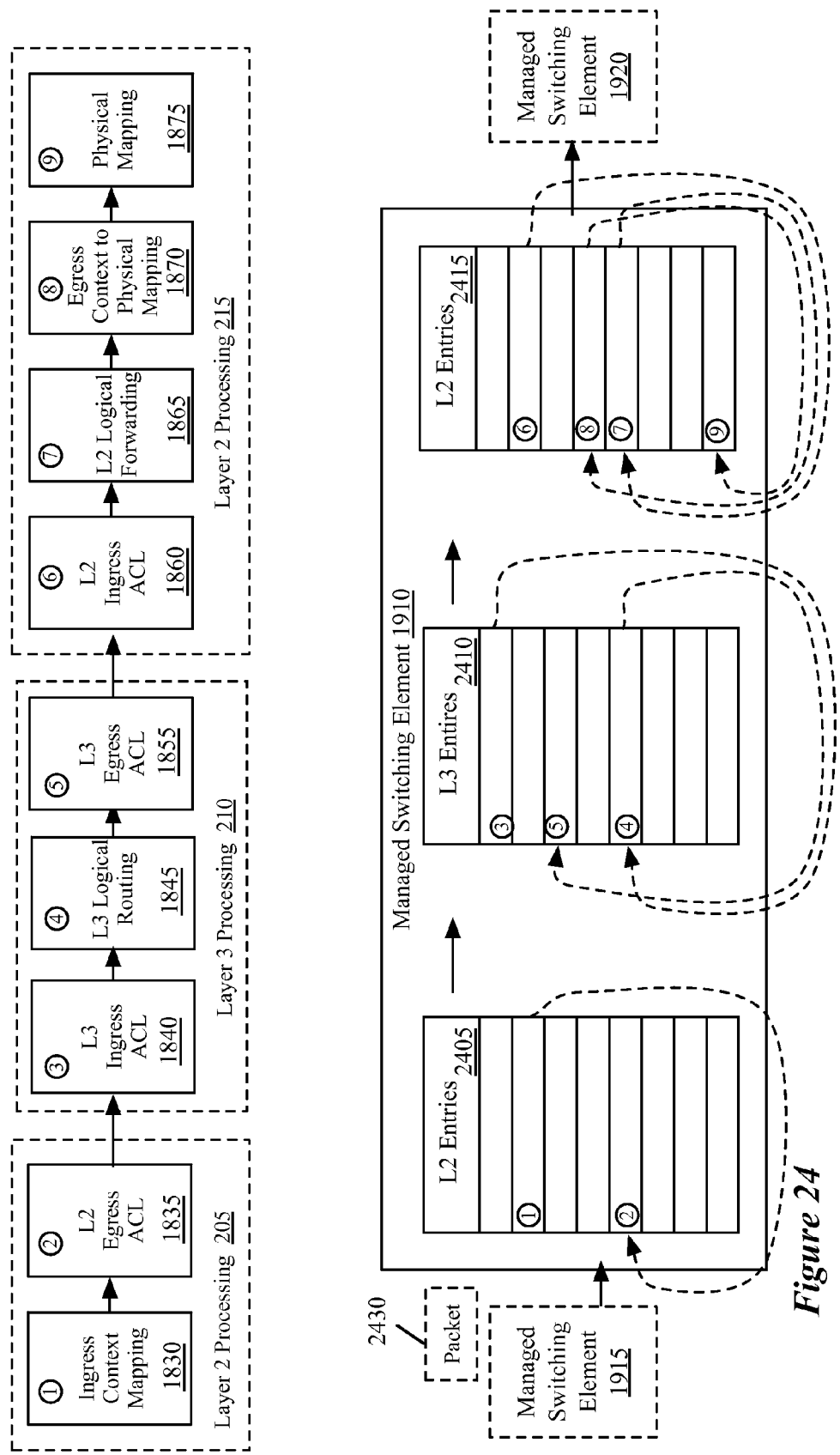
FIG. 24 conceptually illustrates an example operation of logical switches, a logical router, and managed switching elements described above by reference to FIG. 23.

FIG. 24 conceptually illustrates an example operation of the logical switches 220 and 230, the logical router 225, and the managed switching elements 1910, 1915 and 1920 described above by reference to FIG. 23. Specifically, FIG. 24 illustrates an operation of the managed switching element 1910, which implements the logical router 225. Portions of the logical processing pipeline that the managed switching elements 1915 and 1920 perform are not depicted in FIG. 24 for simplicity. These portions of the logical processing pipeline are similar to the portions of logical processing performed by the managed switching elements 815 and 820 in the example illustrated in the top half of FIG. 13A and FIG. 13C. That is, for illustrating the example of FIG. 24, FIG. 24 replaces the bottom half of FIG. 13A and FIG. 13B.

As shown in the bottom half of FIG. 24, the managed switching element 1910 includes L2 entries 2405 and 2415 and L3 entries 2410. These entries are flow entries that the controller cluster 2205 (not shown) supplies to the managed switching element 1910. Although these entries are depicted as three separate tables, the tables do not necessarily have to be separate tables. That is, a single table may include all these flow entries.

When the managed switching element 1910 receives a packet 2430 from the managed switching element 1915 that is sent from VM 1 towards VM 4, the managed switching element 1910 begins processing the packet 2430 based on the flow entries 2405 of the managed switching element 1910. The managed switching element 1910 identifies a record indicated by an encircled 1 (referred to as "record 1") in the forwarding tables that implements the context mapping of the stage 1830. The record 1 identifies the packet 2430's logical context based on the logical context that is stored in the packet 2430's header. The logical context specifies that the packet 2430 has been processed by the portion of logical processing (i.e., L2 ingress ACL, L2 forwarding) performed by the managed switching element 1915. As such, the record 1 specifies that the packet 2430 be further processed by the forwarding tables (e.g., by sending the packet 2430 to a dispatch port).

Next, the managed switching element 1910 identifies, based on the logical context and/or other fields stored in the packet 2430's header, a record indicated by an encircled 2 (referred to as "record 2") in the forwarding tables that implements the egress ACL of the stage 1835. In this example, the record 2 allows the packet 2430 to be further processed (e.g., the packet 2430 can get out of the logical switch 220 through port "X" of the logical switch 220) and, thus, specifies the packet 2430 be further processed by the flow entries of the managed switching element 1910 (e.g., by sending the packet 2430 to a dispatch port). In addition, the record 2 specifies that the managed switching element 1910 store the logical context (i.e., the packet 2430 has been processed by the stage 2452 of the processing pipeline 2400) of the packet 2430 in the set of fields of the packet 2430's header. (It is to be noted that all records specify that a managed switching element performing logical processing update the logical context store in the set of fields whenever a managed switching element performs some portion of logical processing based on a record.)

The managed switching element 1910 continues processing the packet 2430 based on the flow entries. The managed switching element 1910 identifies, based on the logical context and/or other fields stored in the packet 2430's header, a record indicated by an encircled 3 (referred to as "record 3") in the L3 entries 2410 that implements L3 ingress ACL by specifying that the managed switching element 1910 should accept the packet through the logical port 1 of the logical router 225 based on the information in the header of the packet 2430.

The managed switching element 1910 then identifies a flow entry indicated by an encircled 4 (referred to as "record 4") in the L3 entries 2410 that implements L3 routing 1845 by specifying that the packet 2430 with its destination IP address (e.g., 1.1.2.10) should be allowed to exit out of port 2 of the logical router 225. Also, the record 4 (or another record in the routing table, not shown) indicates that the source MAC address for the packet 2430 is to be rewritten to the MAC address of port 2 of the logical router 225 (i.e., 01:01:01:01:01:02). The managed switching element 1910 then identifies a flow entry indicated by an encircled 5 (referred to as "record 5") in the L3 entries 2410 that implements L3 egress ACL by specifying that the managed switching element 1910 can send the packet out through port 2 of the logical router 225 based on the information (e.g., source IP address) in the header of the packet 2430.

Based on the logical context and/or other fields stored in the packet 2430's header, the managed switching element 1910 identifies a record indicated by an encircled 6 (referred to as "record 6") in the L2 entries 2415 that implements the ingress ACL of the stage 1860. In this example, the record 6 allows the packet 2430 to be further processed and, thus, specifies the packet 2430 be further processed by the managed switching element 1910 (e.g., by sending the packet 2430 to a dispatch port). In addition, the record 6 specifies that the managed switching element 1910 store the logical context (i.e., the packet 2430 has been processed by the stage 2462 of the processing pipeline 2400) of the packet 2430 in the set of fields of the packet 2430's header.

Next, the managed switching element 1910 identifies, based on the logical context and/or other fields stored in the packet 2430's header, a record indicated by an encircled 7 (referred to as "record 7") in the forwarding tables that implements the logical L2 forwarding of the stage 1865. The record 7 specifies that a packet with the MAC address of VM 4 as destination MAC address should be forwarded through a logical port (not shown) of the logical switch 230 that is connected to VM 4.

The record 7 also specifies that the packet 2430 be further processed by the forwarding tables (e.g., by sending the packet 2430 to a dispatch port). Also, the record 7 specifies that the managed switching element 1910 store the logical context (i.e., the packet 2430 has been processed by the stage 1865 of the processing pipeline 2400) in the set of fields of the packet 2430's header.

Based on the logical context and/or other fields stored in the packet 2430's header, the managed switching element 1910 identifies a record indicated by an encircled 8 (referred to as "record 8") in the forwarding tables that implements the context mapping of the stage 1870. In this example, the record 8 identifies port 5 of the managed switching element 1920 to which VM 4 is coupled as the port that corresponds to the logical port (determined at stage 1865) of the logical switch 230 to which the packet 2430 is to be forwarded. The record 8 additionally specifies that the packet 2430 be further processed by the forwarding tables (e.g., by sending the packet 2430 to a dispatch port).

Based on the logical context and/or other fields stored in the packet 2430's header, the managed switching element 1910 then identifies a record indicated by an encircled 9 (referred to as "record 9") in the L2 entries 2415 that implements the physical mapping of the stage 1875. The record 9 specifies a port (not shown) of the managed switching element 1910 through which the packet 2430 is to be sent in order for the packet 2430 to reach the managed switching element 1920. In this case, the managed switching element 1910 is to send the packet 2430 out of that port of managed switching element 1910 that is coupled to the managed switching element 1920.

FIGS. 25-30B illustrate a distributed logical router implemented in several managed switching elements based on flow entries of the managed switching element. In particular, FIGS. 25-30B illustrate that the entire logical processing pipeline that includes source L2 processing, L3 routing, and destination L2 processing is performed by a first hop managed switching element (i.e., the switching element that receives a packet directly from a machine).

Figure 25:
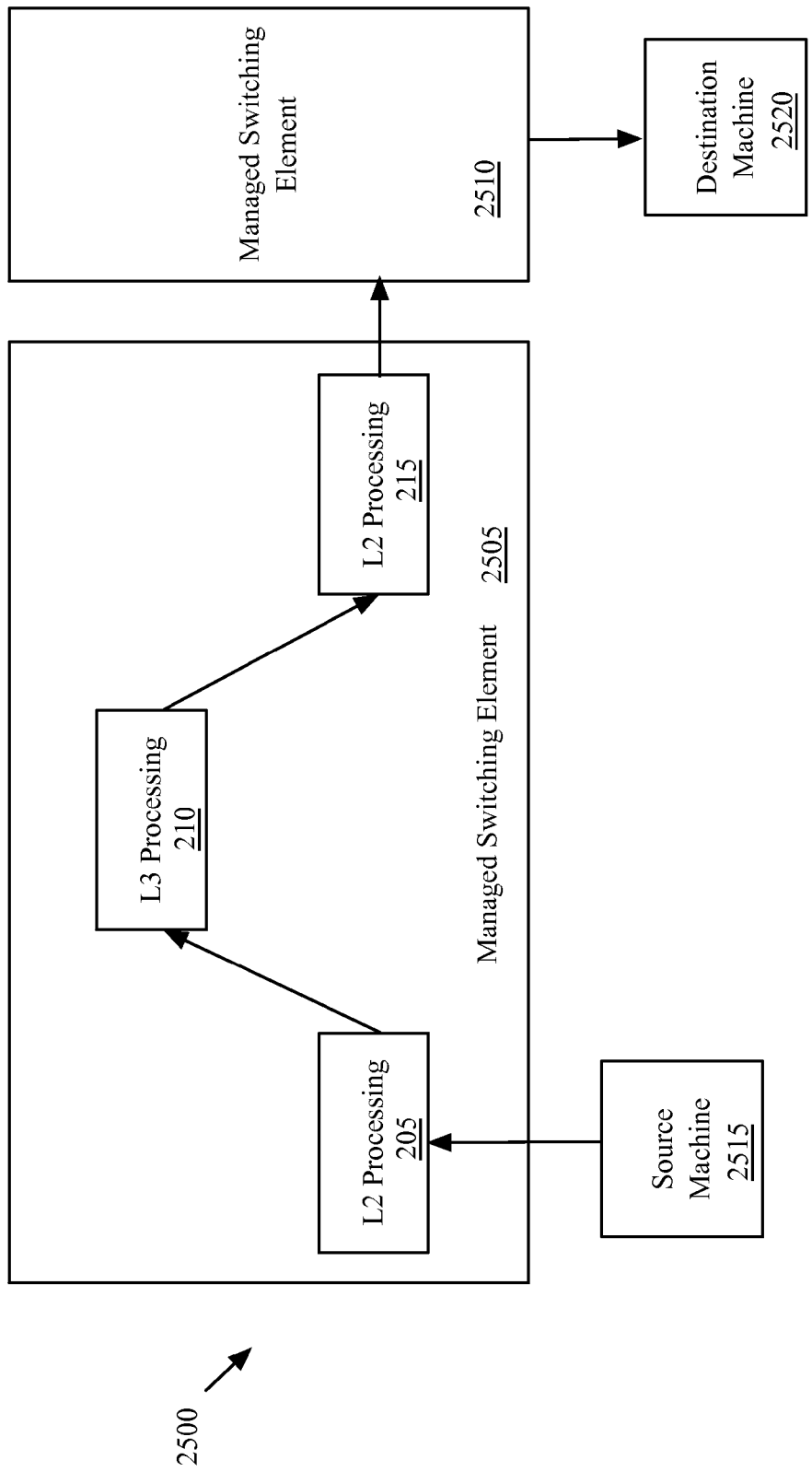
FIG. 25 conceptually illustrates an example implementation of a logical processing pipeline described above by reference to FIG. 2.

FIG. 25 conceptually illustrates an example implementation of the logical processing pipeline 200 described above by reference to FIG. 2. In particular, FIG. 25 illustrates that the L3 processing 210 can be performed by any managed switching elements that directly receives a packet from a source machine. FIG. 25 illustrates a network architecture 2500. In the network architecture 2500, the logical processing pipeline 200 is performed by a managed switching element 2505. In this example, the L3 processing 210 is performed by the managed switching element 2505 based on flow entries of the managed switching element 2505. FIG. 25 also illustrates source machine 2515 and destination machine 2520.

The managed switching element 2505 is an edge switching element that directly receives the packets from a machine coupled to the edge switching element. The managed switching element 2505 receives packets from the source machine 2515. When the managed switching element 2505 receives a packet from the source machine 2515, the managed switching element 805, in some embodiments, performs the entire logical processing pipeline 200 on the packet in order to logically forward and route the packet.

When a received packet is headed to the destination machine 2520, which is in another logical network in this example, the managed switching element 2505 functions as a logical switch that is in the logical network to which the source machine 2515 belongs; a logical switch that is in the logical network to which the destination machine 2520 belongs; and a logical router that routes packets between these two logical switches. Based on the result of performing logical processing pipeline 200, the managed switching element 2505 forwards the packet to the managed switching element 2510 through which the destination machine 2520 receives the packet.

Figure 26:
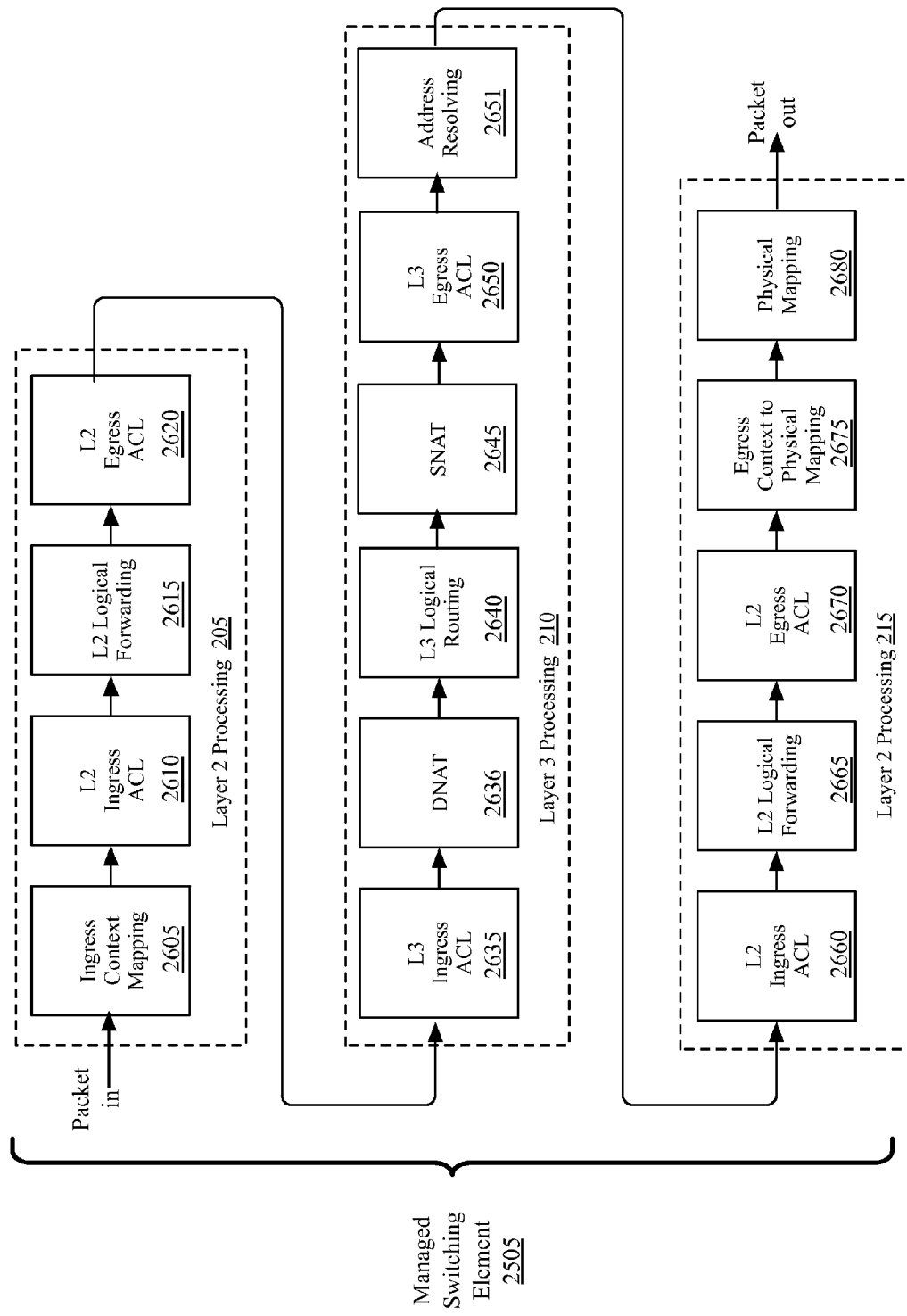
FIG. 26 conceptually illustrates a logical processing pipeline of some embodiments for processing a packet through a logical switch, a logical router, and another logical switch.

FIG. 26 conceptually illustrates the logical processing pipeline 200 of some embodiments for processing a packet through the logical switch 220, the logical router 225, and the logical switch 230. Specifically, this figure illustrates the logical processing pipeline 200 when performed in the network architecture 2500 described above by reference to FIG. 25. As described above, in the network architecture 2500, the L2 processing 205, the L3 processing 210, and the L2 processing 215 are performed by the single managed switching element 2505, which is an edge switching element that receives packet from machine. Hence, in these embodiments, the first-hop switching element performs the entire logical processing pipeline 200.

The L2 processing 205, in some embodiments, includes four stages 2605-2620 for processing a packet through the logical switch 220 (not shown in FIG. 26). In the stage 2605, ingress context mapping is performed on the packet to determine the logical context of the packet. In some embodiments, the stage 2605 is performed when the logical switch 220 receives the packet (e.g., the packet is initially received by the managed switching element 2505).

In some embodiments, the second stage 2610 is defined for the logical switch 220. In some such embodiments, the stage 2610 operates on the packet's logical context to determine ingress access control of the packet with respect to the logical switch. For example, an ingress ACL is applied to the packet to control the packet's access to the logical switch when the logical switch receives the packet. Based on the ingress ACL defined for the logical switch, the packet may be further processed (e.g., by the stage 2615) or the packet may be dropped, for example.

In the third stage 2615 of the L2 processing 205, an L2 forwarding is performed on the packet in the context of the logical switch. In some embodiments, the third stage 2615 operates on the packet's logical context to process and forward the packet with respect to the logical switch 220. For instance, some embodiments define an L2 forwarding table or L2 forwarding entries for processing the packet at layer 2.

The fourth stage 2620 of some embodiments is defined for the logical switch 220. The fourth stage 2620 of some such embodiments operates on the packet's logical context to determine egress access control of the packet with respect to the logical switch. For instance, an egress ACL may be applied to the packet to control the packet's access out of the logical switch 220 after logical forwarding has been performed on the packet. Based on the egress ACL defined for the logical switch, the packet may be further processed (e.g., sent out of a logical port of the logical switch or sent to a dispatch port for further processing) or the packet may be dropped, for example.

When the packet's destination is in another logical network (i.e., when the packet's destination logical network is different than the logical network whose traffic is processed by the logical switch 220), the logical switch 220 sends the packet to the logical router 225, which then performs the L3 processing at stage 210 in order to route the packet to the destination logical network. The L3 processing 210 includes six stages 2635-2651 for processing a packet through the logical router 225 (not shown in FIG. 26) that is implemented by the managed switching element 2505 (not shown in FIG. 26). As mentioned above, L3 processing involves performing a set of logical routing lookups for determining where to route the packet through a layer 3 network.

The first stage 2635 performs a logical ingress ACL lookup for determining access control when the logical router 225 receives the packet (i.e., when the managed switching element 2505 which implements the logical router 225 receives the packet). In some embodiments, the stage 2635 operates on the packet's logical context to determine ingress access control of the packet with respect to the logical router 225. The next stage 2636 performs DNAT to revert the destination address of the packet back to the real address of the destination machine that is hidden from the source machine of the packet. This stage 2636 is performed when DNAT is enabled.

The next stage 2640 performs a logical L3 routing for determining one or more logical ports to send the packet through the layer 3 network based on the L3 addresses (e.g., destination IP address) of the packet, forwarding tables containing L3 flow entries, and the packet's logical context.

The fourth stage 2645 of some embodiments performs SNAT on the packet. For instance, the managed switching element 2505 replaces the source IP address of the packet with a different IP address in order to hide the source IP address when the SNAT is enabled. Also, as will be described further below, the managed switching element may use a NAT daemon to receive flow entries for translating network addresses. A NAT daemon will be described further below by reference to FIG. 31.

The fifth stage 2650 performs logical egress ACL lookups for determining access control before the logical router 225 routes the packet out of the logical router 225 through the port determined in the stage 2640. The egress ACL lookups are performed based on the L3 addresses (e.g., source and destination IP addresses) of the packet. In some embodiments, the stage 2650 operates on the packet's logical context to determine egress access control of the packet with respect to the logical router 225.

The sixth stage 2651 performs address resolution in order to translate the destination L3 address (e.g., a destination IP address) into a destination L2 address (e.g., a destination MAC address). In some embodiments, the managed switching element 2505 uses a standard address resolution (e.g., by sending out ARP requests or looking up ARP cache) to find the destination L2 address that corresponds to the destination IP address. Also, as will be described further below, the managed switching element 2505 of some embodiments may use an L3 daemon to receive flow entries for resolving L3 addresses into L2 addresses. An L3 daemon will be described further below by reference to FIGS. 48-50.

When the logical router 225 is not coupled to the destination logical network, the logical switch 220 sends the packet to another logical router network towards the destination logical network. A portion of the logical processing that corresponds to the operation of the other logical router would also be implemented in the managed switching element 2505. When the logical router 225 is coupled to the destination logical network, the logical switch 220 routes the packet to the destination logical network (i.e., the logical switch that forwards the packet for the destination logical network).

The L2 processing 215, in some embodiments, includes five stages 2660-2680 for processing the packet through the logical switch 225 (not shown in FIG. 26). In some embodiments, the first stage 2660 is defined for the logical switch 225. In some such embodiments, the stage 2660 operates on the packet's logical context to determine ingress access control of the packet with respect to the logical switch 230. For example, an ingress ACL is applied to the packet to control the packet's access to the logical switch 230 when the logical switch 230 receives the packet from the logical router 225. Based on the ingress ACL defined for the logical switch, the packet may be further processed (e.g., by the stage 2665) or the packet may be dropped, for example.

In the second stage 2665 of the L2 processing pipeline 215, an L2 forwarding is performed on the packet in the context of the logical switch. In some embodiments, the third stage 2665 operates on the packet's logical context to process and forward the packet with respect to the logical switch 220. For instance, some embodiments define an L2 forwarding table or L2 forwarding entries for processing the packet at layer 2.

The third stage 2670 of some embodiments is defined for the logical switch 220. The third stage 2670 of some such embodiments operates on the packet's logical context to determine egress access control of the packet with respect to the logical switch. For instance, an egress ACL may be applied to the packet to control the packet's access out of the logical switch 230 after logical forwarding has been performed on the packet. Based on the egress ACL defined for the logical switch, the packet may be further processed (e.g., sent out of a logical port of the logical switch or sent to a dispatch port for further processing) or the packet may be dropped, for example.

In the fourth stage 2675, egress context mapping is performed to identify a physical result that corresponds to the result of the logical forwarding of the packet. For example, the logical processing of the packet may specify that the packet is to be sent out of one or more logical ports (e.g., a logical egress port) of the logical switch 230. As such, the egress context mapping operation identifies a physical port(s) of one or more of the managed switching elements (including the managed switching element 2505) that corresponds to the particular logical port of the logical switch.

The fifth stage 2680 of the L2 processing 215 performs a physical mapping based on the egress context mapping performed at the fourth stage 2675. In some embodiments, the physical mapping determines operations for forwarding the packet to the physical port that was determined in the fourth stage 2675. For example, the physical mapping of some embodiments determines one or more queues (not shown) associated with one or more ports of the set of ports (not shown) of the managed switching element 2505 through which to send the packet in order for the packet to reach the physical port(s) determined in the fourth stage 2675. This way, the managed switching elements can route the packet along the correct path in the network for the packet to reach the determined physical port(s). Also, some embodiments remove the logical context after the fifth stage 2680 is completed in order to return the packet to its original state before the logical processing pipeline 2600 was performed on the packet.

Figure 27:
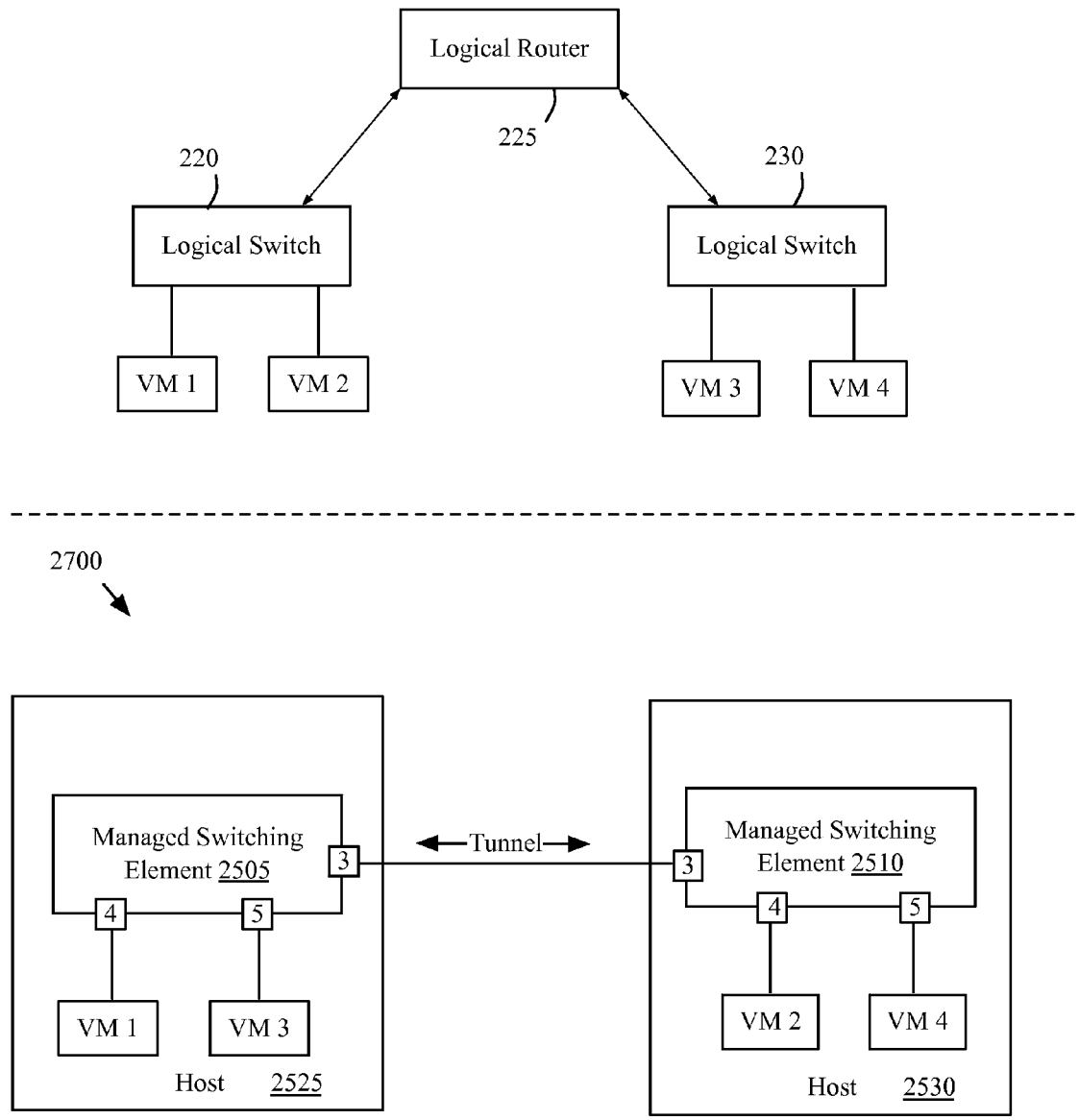
FIG. 27 conceptually illustrates an example network architecture of some embodiments which implements a logical router and logical switches.

FIG. 27 conceptually illustrates an example network architecture 2700 of some embodiments which implements the logical router 225 and logical switches 220 and 230. Specifically, the network architecture 2700 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates, in the bottom half of the figure, the managed switching elements 2505 and 2510. The figure illustrates VMs 1-4 in both the top and the bottom of the figure.

In this example, the logical switch 220 forwards data packets between the logical router 225, VM 1, and VM 2. The logical switch 230 forwards data packets between the logical router 225, VM 3, and VM 4. As mentioned above, the logical router 225 routes data packets between the logical switches 220 and 230 and other logical routers and switches (not shown). The logical switches 220 and 230 and the logical router 225 are logically coupled through logical ports (not shown) and exchange data packets through the logical ports. These logical ports are mapped or attached to physical ports of the managed switching elements 2505 and 2510.

In some embodiments, a logical router is implemented in each managed switching element in the managed network. When the managed switching element receives a packet from a machine that is coupled to the managed switching element, the managed switching element performs the logical routing. In other words, a managed switching element of these embodiments that is a first-hop switching element with respect to a packet performs the L3 processing 210.

In this example, the managed switching elements 2505 and 2510 are software switching elements running in hosts 2525 and 2530, respectively. The managed switching elements 2505 and 2510 have flow entries which implement the logical switches 220 and 230 to forward and route the packets that the managed switching element 2505 and 2510 receive from VMs 1-4. The flow entries also implement the logical router 225. Using these flow entries, the managed switching elements 2505 and 2510 can forward and route packets between network elements in the network that are coupled to the managed switching elements 2505 and 2510. As shown, the managed switching elements 2505 and 2510 each have three ports (e.g., VIFs) through which to exchange data packets with the network elements that are coupled to the managed switching elements 2505 and 2510. In some cases, the data packets in these embodiments will travel through a tunnel that is established between the managed switching elements 2505 and 2510 (e.g., the tunnel that terminates at port 3 of the managed switching element 2505 and port 3 of the managed switching element 2510).

In this example, each of the hosts 2525 and 2530 includes a managed switching element and several VMs as shown. The VMs 1-4 are virtual machines that are each assigned a set of network addresses (e.g., a MAC address for L2, an IP address for network L3, etc.) and can send and receive network data to and from other network elements. The VMs are managed by hypervisors (not shown) running on the hosts 2525 and 2530.

Several example data exchanges through the network architecture 2700 will now be described. When VM 1, that is coupled to the logical switch 220, sends a packet to VM 2 that is also coupled to the same logical switch 220, the packet is first sent to the managed switching element 2505. The managed switching element 2505 then performs the L2 processing 205 on the packet. The result of L2 processing would indicate that the packet should be sent to the managed switching element 2510 over the tunnel established between the managed switching elements 2505 and 2510 and get to VM 2 through port 4 of the managed switching element 2510. Because VMs 1 and 2 are in the same logical network, the managed switching element 2505 does not perform the L3 processing 210 and the L2 processing 215.

When VM 1 that is coupled to the logical switch 220 sends a packet to VM 3 that is coupled to the logical switch 230, the packet is first sent to the managed switching element 2505. The managed switching element 2505 performs the L2 processing 205 on the packet. However, because the packet is sent from one logical network to another (i.e., the logical L3 destination address of the packet is for another logical network), the L3 processing 210 needs to be performed. The managed switching element 2505 also performs the L2 processing 215. That is, the managed switching element 2505 as the first-hop switching element that receives the packet performs the entire logical processing pipeline 200 on the packet. The result of performing the logical processing pipeline 200 would indicate that the packet should be sent to VM 3 through port 5 of the managed switching element 2505. Thus, the packet did not have to go to another managed switching element although the packet did go through two logical switches and a logical router.

When VM 1 that is coupled to the logical switch 220 sends a packet to VM 4 that is coupled to the logical switch 230, the packet is first sent to the managed switching element 2505. The managed switching element 2505, as the first-hop switching element for the packet, performs the entire logical processing pipeline 200 on the packet. The result of performing the logical processing pipeline 200 on this packet would indicate that the packet should be sent to the managed switching element 2510 over the tunnel established between the managed switching elements 2505 and 2510 and get to VM 4 through port 5 of the managed switching element 2510.

Figure 28:
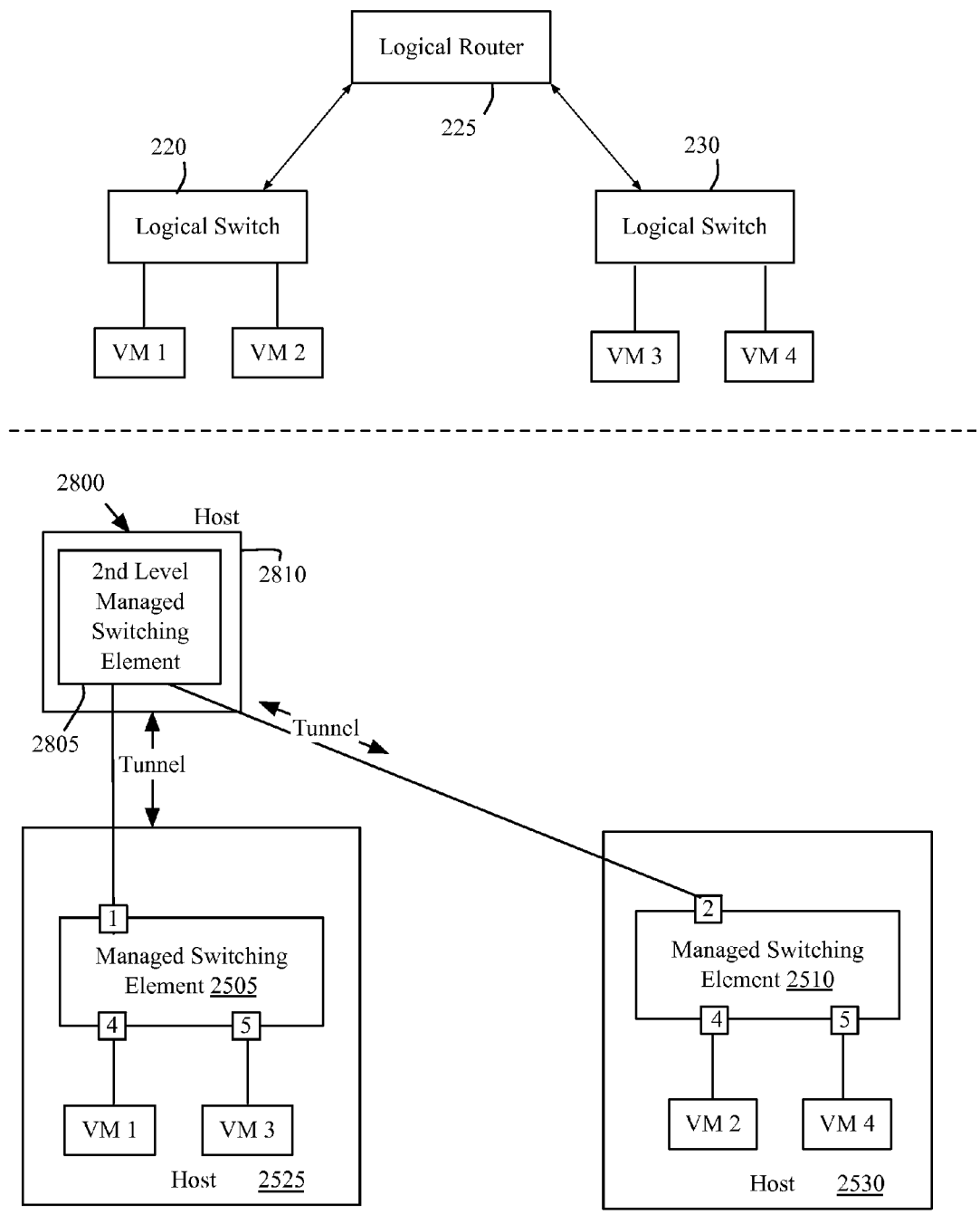
FIG. 28 conceptually illustrates an example network architecture of some embodiments which implements a logical router and logical switches.

FIG. 28 conceptually illustrates an example network architecture 2800 of some embodiments which implements the logical router 225 and logical switches 220 and 230. Specifically, the network architecture 2800 represents a physical network that effectuate logical networks whose data packets are switched and/or routed by the logical router 225 and the logical switches 220 and 230. The figure illustrates in the top half of the figure the logical router 225 and the logical switches 220 and 230. This figure illustrates in the bottom half of the figure the managed switching elements 2505 and 2510. The figure illustrates VMs 1-4 in both the top and the bottom of the figure.

The network architecture 2800 is similar to the network architecture 2700 except that the network architecture 2800 additionally includes the managed switching element 2805. The managed switching element 2805 of some embodiments is a second-level managed switching element that functions as a pool node.

In some embodiments, tunnels are established by the network control system (not shown) to facilitate communication between the network elements. For instance, the managed switching element 2505 in this example is coupled to the managed switching element 2805, which runs in the host 2810, through a tunnel that terminates at port 1 of the managed switching element 2505 as shown. Similarly, the managed switching element 2510 is coupled to the managed switching element 2805 through a tunnel that terminates at port 2 of the managed switching elements 2510. In contrast to the example architecture 2700 illustrated in FIG. 27 above, no tunnel is established between the managed switching elements 2505 and 2510.

The logical router 225 and the logical switches 220 and 230 are implemented in the managed switching element 2505 and the second-level managed switching element 2805 is involved in the data packet exchange. That is, the managed switching elements 2505 and 2510 exchange packets through the managed switching element 2805.

Figure 29:
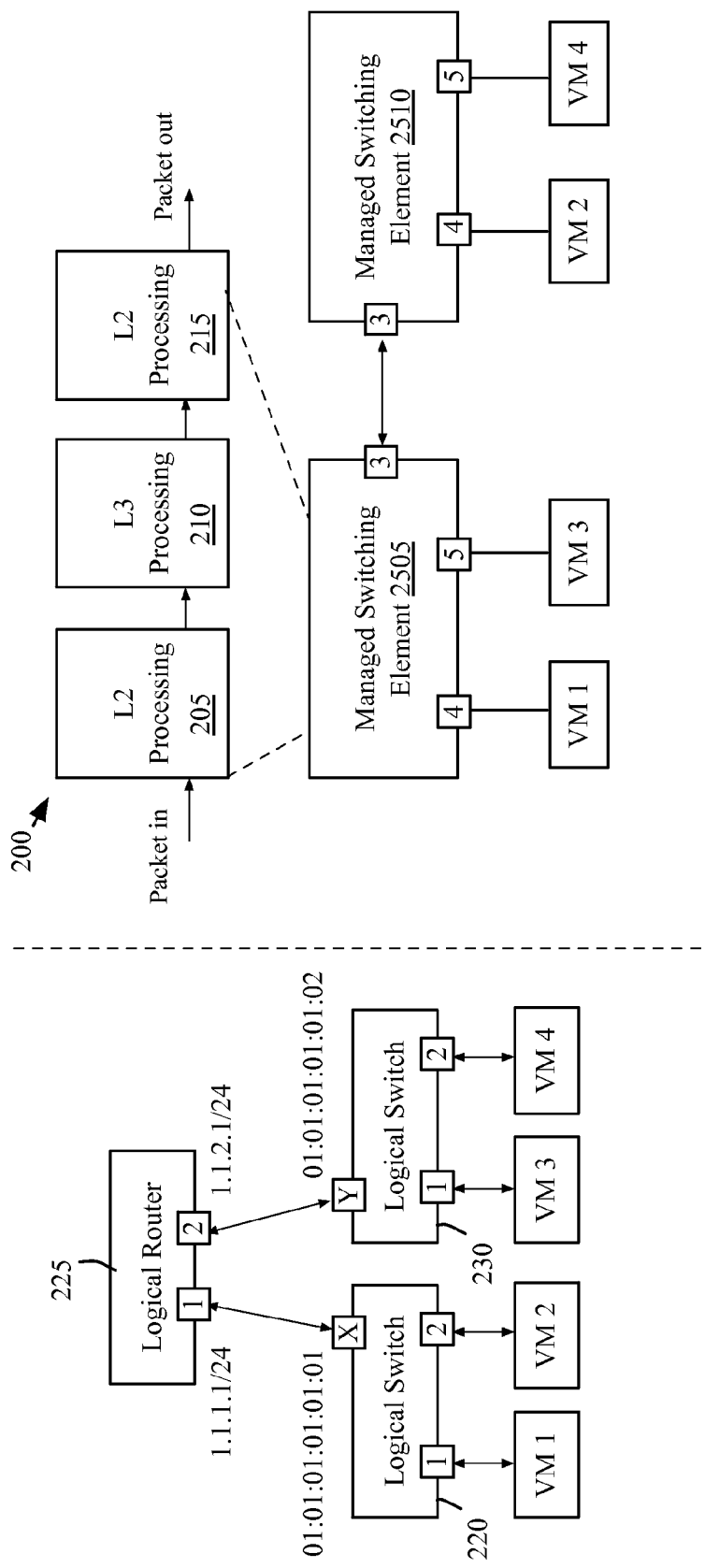
FIG. 29 conceptually illustrates an example of a first-hop switching element that performs all of L2 and L3 processing on a received packet to forward and route.

FIG. 29 conceptually illustrates an example of a first-hop switching element that performs all of L2 and L3 processing on a received packet to forward and route. FIG. 29 illustrates implementation of the logical router 225 and the logical switches 220 and 230 by the managed switching elements 2505 and 2510. As shown, the entire logical processing pipeline 200 is performed by the managed switching element 2505 when the managed switching element 2505 is a first-hop switching element. The figure illustrates in the left half of the figure the logical router 225 and the logical switches 220 and 230. This figure illustrates in the right half of the figure the managed switching elements 2505 and 2510. The figure illustrates VMs 1-4 in both the right and the left halves of the figure.

When VM 1 that is coupled to the logical switch 220 sends a packet to VM 2 that is also coupled to the same logical switch 220, the packet is first sent to the managed switching element 2505 through port 4 of the managed switching element 2505 because a logical port 1 of the logical switch 220 through which the packet goes into the logical switch 220 is attached or mapped to port 4 of the managed switching element 2505.

The managed switching element 2505 then performs the L2 processing 205 on the packet. Specifically, the managed switching element 2505 first performs a logical context look up to determine the logical context of the packet based on the information included in the header fields of the packet. In this example, the source MAC address of the packet is a MAC address of VM 1 and the source IP address of the packet is an IP address of VM 1. The destination MAC address of the packet is a MAC address of VM 2 and destination IP address of the packet is an IP address of VM 2. In this example, the logical context specifies that logical switch 220 is the logical switch that is to forward the packet and that logical port 1 of the logical switch 220 is the port through which the packet was received. The logical context also specifies that port 2 of the logical switch 220 is the port through which to send the packet out to VM 2 because port 2 is associated with the MAC address of VM 2.

The managed switching element 2505 then performs logical forwarding lookups based on the determined logical context of the packet. The managed switching element 2505 determines access control for the packet. For instance, the managed switching element 2505 determines that the packet does not have network addresses (e.g., source/destination MAC/IP addresses, etc.) that will cause the logical switch 220 to reject the packet that came through port 1 of the logical switch 220. The managed switching element 2505 also identifies from the logical context that port 2 of the logical switch 220 is the port to send out the packet. Furthermore, the managed switching element 2505 determines access control for the packet with respect to port 2 of the logical switch 220. For instance, the managed switching element 2505 determines that the packet does not have network addresses that will cause the logical switch 220 not to send the packet through the port 2 of the logical switch 220.

The managed switching element 2505 then performs a mapping lookup to determine a physical port to which the logical port 2 of the logical switch 220 is mapped. In this example, the managed switching element 2505 determines that logical port 2 of the logical switch 220 is mapped to port 4 of the managed switching element 2510. The managed switching element 2505 then performs a physical lookup to determine operations for forwarding the packet to the physical port. In this example, the managed switching element 2505 determines that the packet should be sent to the managed switching element 2510 over the tunnel established between the managed switching elements 2505 and 2510 and get to VM 2 through port 4 of the managed switching element 2510. Because VMs 1 and 2 are in the same logical network, the managed switching element 2505 does not perform an L3 processing. The managed switching element 2510 does not perform any logical processing on the packet but just forwards the packet to VM 2 through port 4 of the managed switching element 2510.

When VM 1 that is coupled to the logical switch 220 sends a packet to VM 3 that is coupled to the logical switch 230 (i.e., when VMs 1 and 3 are in different logical networks), the packet is first sent to the managed switching element 2505 through port 4 of the managed switching element 2505. The managed switching element 2505 performs the L2 processing 205 on the packet. Specifically, the managed switching element 2505 first performs a logical context look up to determine the logical context of the packet based on the information included in the header fields of the packet. In this example, the source MAC address of the packet is a MAC address of VM 1 and the source IP address of the packet is an IP address of VM 1. Because the packet is sent from VM 1 to VM 3 that is in a different logical network, the packet has a MAC address associated with port X as the destination MAC address (i.e., 01:01:01:01:01:01 in this example). The destination IP address of the packet is an IP address of VM 3 (e.g., 1.1.2.10). In this example, the logical context specifies that logical switch 220 is the logical switch that is to forward the packet and that logical port 1 of the logical switch 220 is the port through which the packet was received. The logical context also specifies that port X of the logical switch 220 is the port through which to send the packet out to the logical router 225 because port X is associated with the MAC address of port 1 of the logical router 225.

The managed switching element 2505 then determines access control for the packet. For instance, the managed switching element 2505 determines that the packet does not have network addresses (e.g., source/destination MAC/IP addresses, etc.) that will cause the logical switch 220 to reject the packet that came through port 1 of the logical switch 220. The managed switching element 2505 also identifies from the logical context that port X of the logical switch 220 is the port to send out the packet. Furthermore, the managed switching element 2505 determines access control for the packet with respect to port X. For instance, the managed switching element 2505 determines that the packet does not have network addresses that will cause the logical switch 220 not to send the packet through the port X.

The managed switching element 2505 then performs the L3 processing 210 on the packet because the packet's destination IP address, 1.1.2.10, is for another logical network (i.e., when the packet's destination logical network is different than the logical network whose traffic is processed by the logical switch 220). The managed switching element 2505 determines access control for the packet at L3. For instance, the managed switching element 2505 determines that the packet does not have network addresses that will cause the logical router 225 to reject the packet that came through logical port 1 of the logical router 225. The managed switching element 2505 also looks up the L3 flow entries and determines that the packet is to be sent to the logical port 2 of the logical router 225 because the destination IP address of the packet, 1.1.2.10, belongs to the subnet address of 1.1.2.1/24 that is associated with the logical port 2 of the logical router 225. Furthermore, the managed switching element 2505 determines access control for the packet with respect to the logical port 2 of the logical router 225. For instance, the managed switching element 2505 determines that the packet does not have network addresses that will cause the logical switch 220 not to send the packet through the logical port 2.

The managed switching element 2505 modifies the logical context of the packet or the packet itself while performing the L3 processing 210. For instance, the managed switching element 2505 modifies the logical source MAC address of the packet to be the MAC address of the logical port 2 of the logical router 225 (i.e., 01:01:01:01:01:02 in this example). The managed switching element 2505 also modifies the destination MAC address of the packet to be a MAC address of VM 3.

The managed switching element 2505 then performs the L2 processing 215. Specifically, the managed switching element 2505 determines access control for the packet. For instance, the managed switching element 2505 determines that the packet does not have network addresses (e.g., source/destination MAC/IP addresses, etc.) that will cause the logical switch 230 to reject the packet that came through port Y of the logical switch 230. The managed switching element 2505 then determines that port 1 of the logical switch 230 is the port through which to send the packet out to the destination, VM 3. Furthermore, the managed switching element 2505 determines access control for the packet with respect to port 1 of the logical switch 230. For instance, the managed switching element 2505 determines that the packet does not have network addresses that will cause the logical switch 230 not to send the packet through the port 1 of the logical switch 230.

The managed switching element 2505 then performs a mapping lookup to determine a physical port to which the logical port 1 of the logical switch 230 is mapped. In this example, the managed switching element 2505 determines that logical port 1 of the logical switch 230 is mapped to port 5 of the managed switching element 2505. The managed switching element 2505 then performs a physical lookup to determine operations for forwarding the packet to the physical port. In this example, the managed switching element 2505 determines that the packet should be sent to VM 3 through port 5 of the managed switching element 2505. The managed switching element 2505 in this example removes the logical context from the packet before sending out the packet to VM 3. Thus, the packet did not have to go to another managed switching element although the packet did go through two logical switches and a logical router.

When VM 1 that is coupled to the logical switch 220 sends a packet to VM 4 that is coupled to the logical switch 230, the packet is sent to VM 4 in a similar manner in which the packet sent from VM 1 to VM 3 is sent to VM 3, except that the packet heading to VM 4 is sent from the managed switching element 2505 to the managed switching element 2510 over the tunnel established between the managed switching elements 2505 and 2510 and gets to VM 4 through port 5 of the managed switching element 2510.

Figure 30A:
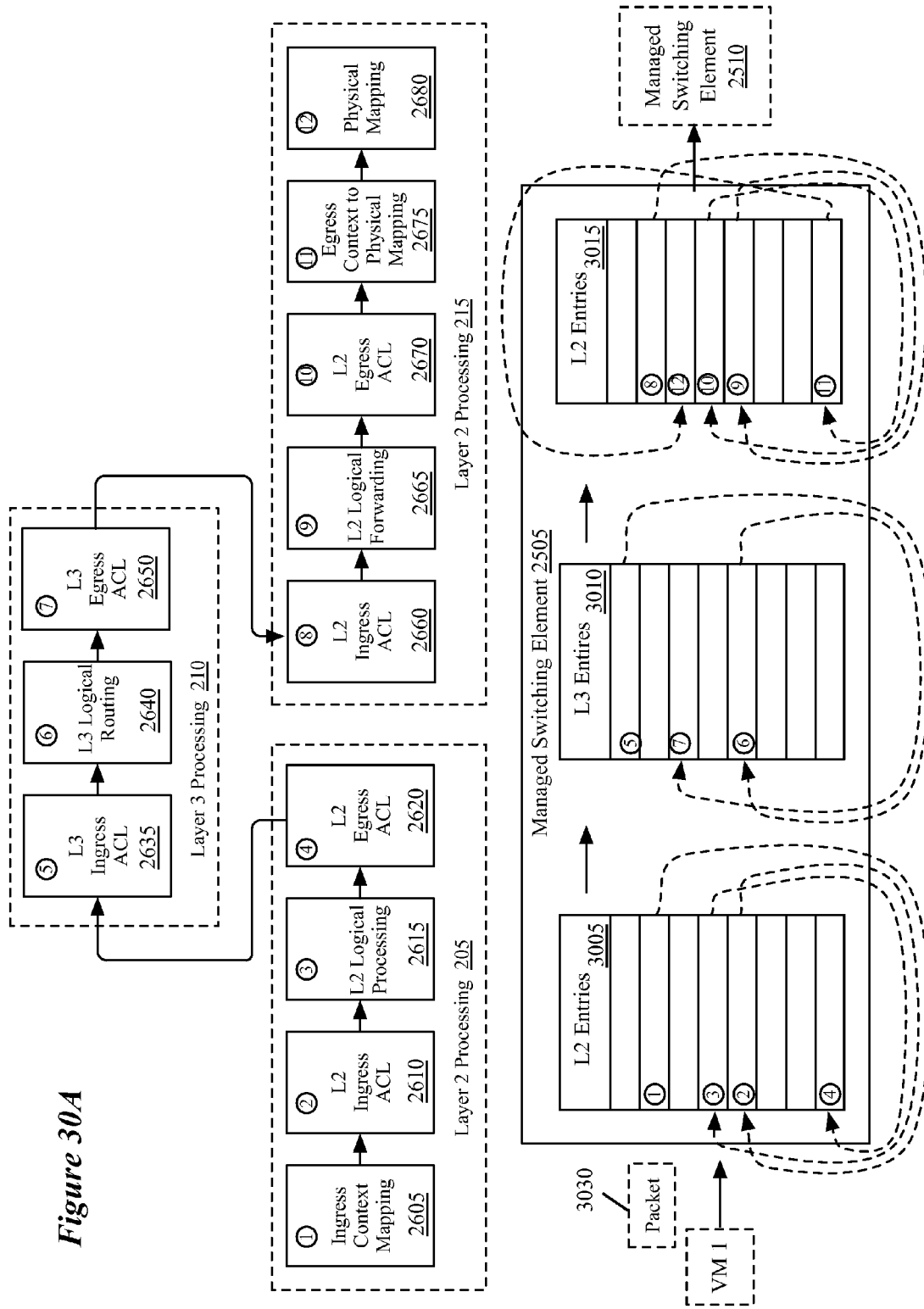
FIGS. 30A-30B conceptually illustrate an example operation of logical switches, a logical router, and managed switching elements described above by reference to FIG. 29.
Figure 30B:
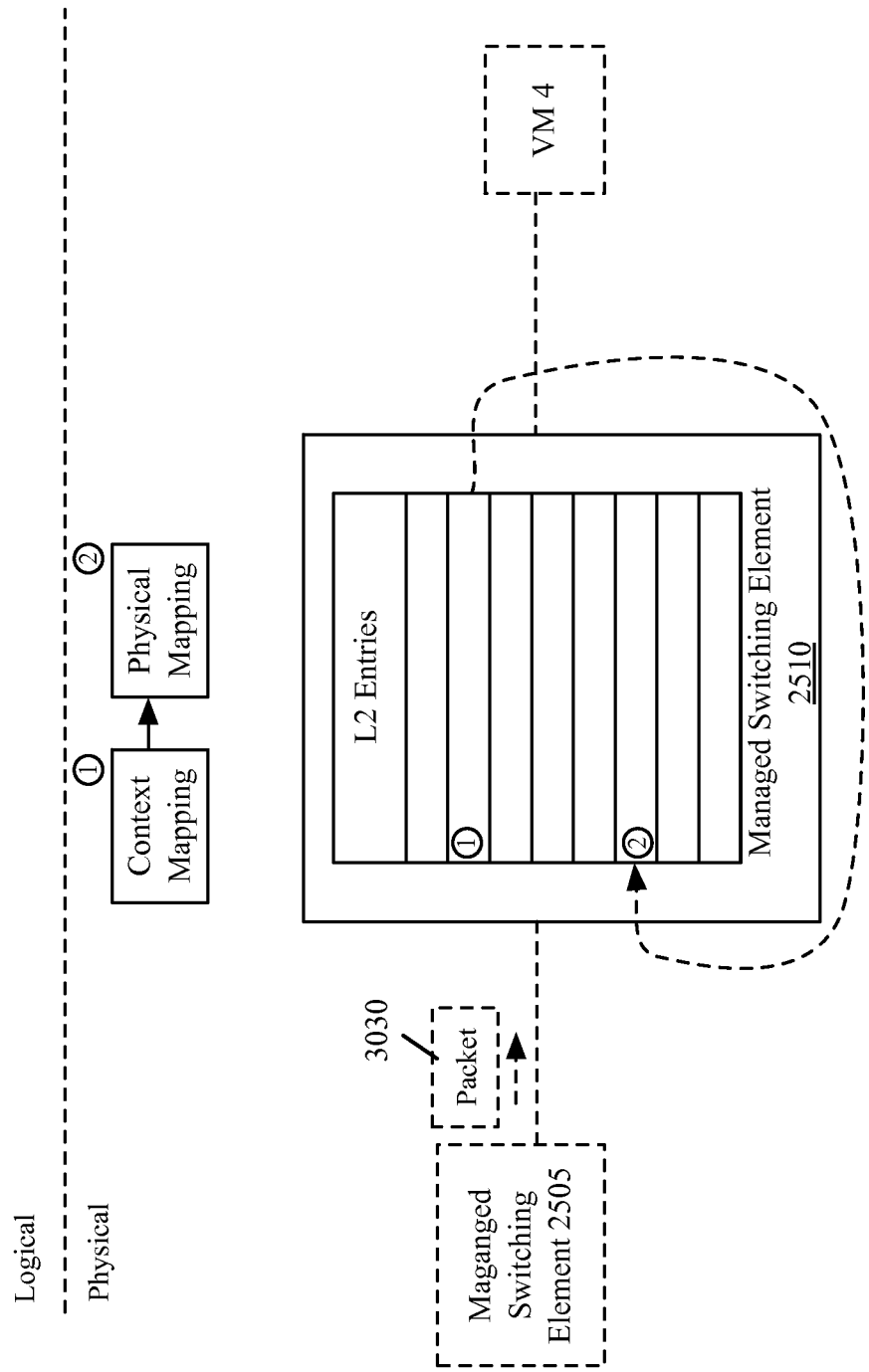

FIGS. 30A-30B conceptually illustrate an example operation of the logical switches 220 and 230, the logical router 225, and the managed switching elements 2505 and 2510 described above by reference to FIG. 29. Specifically, FIG. 30A illustrates an operation of the managed switching element 2505, which implements the logical switches 220 and 230 and logical router 225. FIG. 30B illustrates an operation of the managed switching element 2505.

As shown in the bottom half of FIG. 30A, the managed switching element 2505 includes L2 entries 3005 and 3015 and L3 entries 3010. These entries are flow entries that a controller cluster (not shown) supplies to the managed switching element 2505. Although these entries are depicted as three separate tables, the tables do not necessarily have to be separate tables. That is, a single table may include all these flow entries.

When VM 1 that is coupled to the logical switch 220 sends a packet 3030 to VM 4 that is coupled to the logical switch 230, the packet is first sent to the managed switching element 2505 through port 4 of the managed switching element 2505. The managed switching element 2505 performs an L2 processing on the packet based on the forwarding tables 3005-3015 of the managed switching element 2505. In this example, the packet 3030 has a destination IP address of 1.1.2.10, which is the IP address of VM 4. The packet 3030's source IP address is 1.1.1.10. The packet 3030 also has VM 1's MAC address as a source MAC address and the MAC address of the logical port 1 (e.g., 01:01:01:01:01:01) of the logical router 225 as a destination MAC address.

The managed switching element 2505 identifies a record indicated by an encircled 1 (referred to as "record 1") in the forwarding tables that implements the context mapping of the stage 2605. The record 1 identifies the packet 3030's logical context based on the inport, which is the port 4 through which the packet 3030 is received from VM 1. In addition, the record 1 specifies that the managed switching element 2505 store the logical context of the packet 3030 in a set of fields (e.g., a VLAN id field) of the packet 3030's header. The record 1 also specifies the packet 3030 be further processed by the forwarding tables (e.g., by sending the packet 3030 to a dispatch port). A dispatch port is described in U.S. patent application Ser. No. 13/177,535.

Based on the logical context and/or other fields stored in the packet 3030's header, the managed switching element 2505 identifies a record indicated by an encircled 2 (referred to as "record 2") in the forwarding tables that implements the ingress ACL of the stage 2610. In this example, the record 2 allows the packet 3030 to be further processed (i.e., the packet 3030 can get through the ingress port of the logical switch 220) and, thus, specifies the packet 3030 be further processed by the forwarding tables (e.g., by sending the packet 3030 to a dispatch port). In addition, the record 2 specifies that the managed switching element 2505 store the logical context (i.e., the packet 3030 has been processed by the second stage 3042 of the processing pipeline 3000) of the packet 3030 in the set of fields of the packet 3030's header.

Next, the managed switching element 2505 identifies, based on the logical context and/or other fields stored in the packet 3030's header, a record indicated by an encircled 3 (referred to as "record 3") in the forwarding tables that implements the logical L2 forwarding of the stage 2615. The record 3 specifies that a packet with the MAC address of the logical port 1 of the logical router 225 as a destination MAC address is to be sent to the logical port X of the logical switch 220.

The record 3 also specifies that the packet 3030 be further processed by the forwarding tables (e.g., by sending the packet 3030 to a dispatch port). Also, the record 3 specifies that the managed switching element 2505 store the logical context (i.e., the packet 3030 has been processed by the third stage 2615 of the processing pipeline 3000) in the set of fields of the packet 3030's header.

Next, the managed switching element 2505 identifies, based on the logical context and/or other fields stored in the packet 3030's header, a record indicated by an encircled 4 (referred to as "record 4") in the forwarding tables that implements the egress ACL of the stage 2620. In this example, the record 4 allows the packet 3030 to be further processed (e.g., the packet 3030 can get out of the logical switch 220 through port "X" of the logical switch 220) and, thus, specifies the packet 3030 be further processed by the flow entries of the managed switching element 2505 (e.g., by sending the packet 3030 to a dispatch port). In addition, the record 4 specifies that the managed switching element 2505 store the logical context (i.e., the packet 3030 has been processed by the stage 2620 of the processing pipeline 3000) of the packet 3030 in the set of fields of the packet 3030's header. (It is to be noted that all records specify that a managed switching element update the logical context store in the set of fields whenever the managed switching element performs some portion of logical processing based on a record.)

The managed switching element 2505 continues processing the packet 3030 based on the flow entries. The managed switching element 2505 identifies, based on the logical context and/or other fields stored in the packet 3030's header, a record indicated by an encircled 5 (referred to as "record 5") in the L3 entries 3010 that implements L3 ingress ACL by specifying that the managed switching element 2505 should accept the packet through the logical port 1 of the logical router 225 based on the information in the header of the packet 3030.

The managed switching element 2505 then identifies a flow entry indicated by an encircled 6 (referred to as "record 6") in the L3 entries 3010 that implements L3 routing 2640 by specifying that the packet 3030 with its destination IP address (e.g., 1.1.2.10) should exit out of port 2 of the logical router 225. Also, the record 6 (or another record in the routing table, not shown) indicates that the source MAC address for the packet 3030 is to be rewritten to the MAC address of port 2 of the logical router 225 (i.e., 01:01:01:01:01:02).

The managed switching element 2505 then identifies a flow entry indicated by an encircled 7 (referred to as "record 7") in the L3 entries 3010 that implements L3 egress ACL by specifying that the managed switching element 2505 allow the packet to exit out through port 2 of the logical router 225 based on the information (e.g., source IP address) in the header of the packet 3030.

Based on the logical context and/or other fields stored in the packet 3030's header, the managed switching element 2505 identifies a record indicated by an encircled 8 (referred to as "record 8") in the L2 entries 3015 that implements the ingress ACL of the stage 2660. In this example, the record 8 specifies the packet 3030 be further processed by the managed switching element 2505 (e.g., by sending the packet 3030 to a dispatch port). In addition, the record 8 specifies that the managed switching element 2505 store the logical context (i.e., the packet 3030 has been processed by the stage 2660 of the processing pipeline 3000) of the packet 3030 in the set of fields of the packet 3030's header.

Next, the managed switching element 2505 identifies, based on the logical context and/or other fields stored in the packet 3030's header, a record indicated by an encircled 9 (referred to as "record 9") in the L2 entries 3015 that implements the logical L2 forwarding of the stage 2665. The record 9 specifies that a packet with the MAC address of VM 4 as the destination MAC address should be forwarded through a logical port (not shown) of the logical switch 230 that is connected to VM 4.

The record 9 also specifies that the packet 3030 be further processed by the forwarding tables (e.g., by sending the packet 3030 to a dispatch port). Also, the record 9 specifies that the managed switching element 2505 store the logical context (i.e., the packet 3030 has been processed by the stage 2665 of the processing pipeline 3000) in the set of fields of the packet 3030's header.

Next, the managed switching element 2505 identifies, based on the logical context and/or other fields stored in the packet 3030's header, a record indicated by an encircled 10 (referred to as "record 10") in the forwarding tables that implements the egress ACL of the stage 2670. In this example, the record 10 allows the packet 3030 to exit through a logical port (not shown) that connects to VM 4 and, thus, specifies the packet 3030 be further processed by the forwarding tables (e.g., by sending the packet 3030 to a dispatch port). In addition, the record 10 specifies that the managed switching element 2505 store the logical context (i.e., the packet 3030 has been processed by the stage 2670 of the processing pipeline 3000) of the packet 3030 in the set of fields of the packet 3030's header.

Based on the logical context and/or other fields stored in the packet 3030's header, the managed switching element 2505 identifies a record indicated by an encircled 11 (referred to as "record 11") in the L2 entries 3015 that implements the context mapping of the stage 2675. In this example, the record 11 identifies port 5 of the managed switching element 2510 to which VM 4 is coupled as the port that corresponds to the logical port (determined at stage 2665) of the logical switch 230 to which the packet 3030 is to be forwarded. The record 11 additionally specifies that the packet 3030 be further processed by the forwarding tables (e.g., by sending the packet 3030 to a dispatch port).

Based on the logical context and/or other fields stored in the packet 3030's header, the managed switching element 2505 then identifies a record indicated by an encircled 12 (referred to as "record 12") in the L2 entries 3015 that implements the physical mapping of the stage 2680. The record 12 specifies port 3 of the managed switching element 2505 as a port through which the packet 3030 is to be sent in order for the packet 3030 to reach the managed switching element 2510. In this case, the managed switching element 2505 is to send the packet 3030 out of port 3 of managed switching element 2505 that is coupled to the managed switching element 2510.

As shown in FIG. 30B, the managed switching element 2510 includes a forwarding table that includes rules (e.g., flow entries) for processing and routing the packet 3030. When the managed switching element 2510 receives the packet 3030 from the managed switching element 2505, the managed switching element 2510 begins processing the packet 3030 based on the forwarding tables of the managed switching element 2510. The managed switching element 2510 identifies a record indicated by an encircled 1 (referred to as "record 1") in the forwarding tables that implements the context mapping. The record 1 identifies the packet 3030's logical context based on the logical context that is stored in the packet 3030's header. The logical context specifies that the packet 3030 has been processed by the entire logical processing 200, which were performed by the managed switching element 2505. As such, the record 4 specifies that the packet 3030 be further processed by the forwarding tables (e.g., by sending the packet 3030 to a dispatch port).

Next, the managed switching element 2510 identifies, based on the logical context and/or other fields stored in the packet 3030's header, a record indicated by an encircled 2 (referred to as "record 2") in the forwarding tables that implements the physical mapping. The record 2 specifies the port 5 of the managed switching element 2510 through which the packet 3030 is to be sent in order for the packet 3030 to reach VM 4. In this case, the managed switching element 2510 is to send the packet 3030 out of port 5 of managed switching element 2510 that is coupled to VM 4. In some embodiments, the managed switching element 2510 removes the logical context from the packet 3030 before sending the packet to VM 4.

Figure 31:
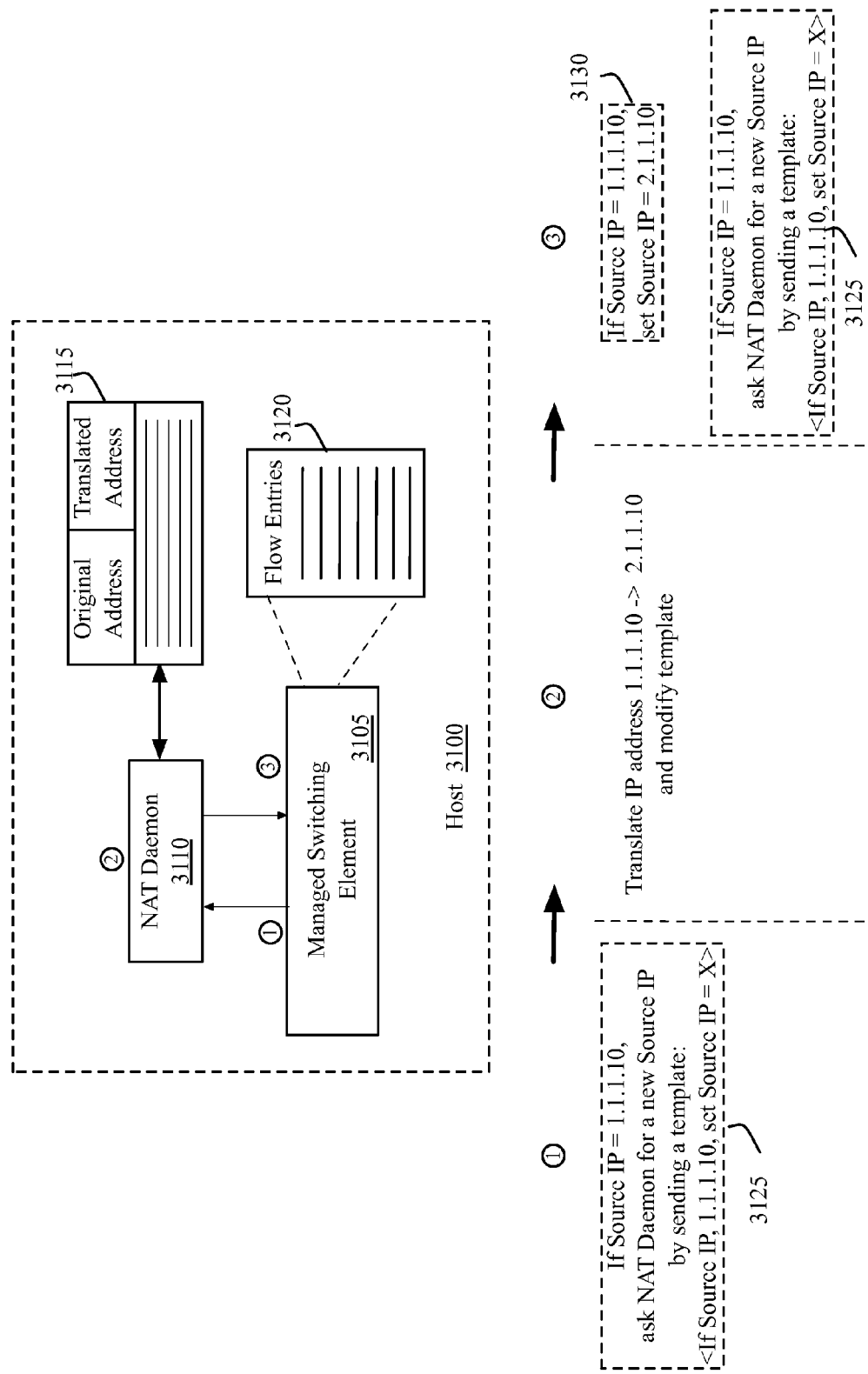
FIG. 31 conceptually illustrates an example software architecture of a host on which a managed switching element runs.

FIG. 31 conceptually illustrates an example software architecture of a host on which a managed switching element runs. Specifically, this figure illustrates that the managed switching element that runs a logical processing pipeline to logically forward and route packets uses a NAT daemon for translating network addresses. This figure illustrates a host 3100, a managed switching element 3105, a forwarding table 3120, a NAT daemon 3110, and a NAT table 3115 in the top half of the figure. This figure illustrates flow entries 3125 and 3130.

The flow entries 3125 and 3130 are flow entries that each has a qualifier and an action. The text illustrated as flow entries 3125 and 3130 may not be the actual format. Rather, the text is just a conceptual illustration of a qualifier and an action pair. In some embodiments, flow entries have priorities and a managed switching element takes the action of the flow entry with the highest priority when qualifiers for more than one flow entry are satisfied.

The host 3100, in some embodiments, is a machine operated by an operating system (e.g., Windows™ and Linux™) that is capable of running a set of software applications. The managed switching element 3105 of some embodiments is a software switching element (e.g., Open vSwitch) that executes in the host 3100. As mentioned above, a controller cluster (not shown) configures a managed switching element by supplying flow entries that specify the functionality of the managed switching element. The managed switching element 3105 of some embodiments does not itself generate flow entries.

The managed switching element 3105 of some embodiments runs all or part of the logical processing pipeline 200 described above. In particular, the managed switching element 3105 is a managed switching element (e.g., the managed switching elements 1720 or 2505) that performs the L3 processing 210 to route packets received from the machines if necessary, based on flow entries in the forwarding table 3120. In some embodiments, the managed switching element 3105 is an edge switching element that receives a packet from a machine (not shown) that is coupled to the managed switching element. In some such embodiments, one or more virtual machines (not shown) are running in the host 3100 and are coupled to the managed switching elements 3105. In other embodiments, the managed switching element is a second-level managed switching element.

When the managed switching element 3105 is configured to perform network address translation (NAT), the managed switching element 3105 of some embodiments uses the NAT daemon 3110 for performing NAT on packets. In some embodiments, the managed switching element 3105 does not maintain a lookup table for finding an address to which to translate from a given address. Instead, the managed switching element 3105 asks the NAT daemon 3110 for addresses.

The NAT daemon 3110 of some embodiments is a software application running on the host 3100. The NAT daemon 3110 maintains the table 3115 which includes pairings of addresses where each pair includes two addresses to be translated into each other. When the managed switching element 3105 asks for an address to which to translate from a given address, the NAT daemon looks up the table 3115 to find the address into which the given address should be translated.

The managed switching element 3105 and the NAT daemon 3110 of different embodiments use different techniques to ask for and supply addresses. For instance, the managed switching element 3105 of some embodiments sends a packet, which has an original address but does not have a translated address, to the NAT daemon. The NAT daemon 3110 of these embodiments translates the original address into a translated address. The NAT daemon 3110 sends the packet back to the managed switching element 3105, which will perform logical forwarding and/or routing to send the packet towards the destination machine. In some embodiments, the managed switching element 3105 initially sends metadata, along with the packet that contains an original address to resolve, to the NAT daemon 3110. This metadata includes information (e.g., register values, logical pipeline state, etc.) that the managed switching element 3105 uses to resume performing the logical processing pipeline when the managed switching element 3105 receives the packet back from the NAT daemon 3110.

In other embodiments, the managed switching element 3105 of some embodiments requests addresses by sending a flow template, which is a flow entry that does not have actual values for the addresses, to the NAT daemon 3110. The NAT daemon finds out the addresses to fill in the flow template by looking up the table 3115. The NAT daemon 3110 then sends the flow template that is filled in with actual addresses back to the managed switching element 3110 by putting the filled-in flow template into the forwarding table 3120. In some embodiments, the NAT daemon assigns a priority value to the filled-in flow template that is higher than the priority value of the flow template that is not filled in. Moreover, when the NAT daemon 3110 fails to find a translated address, the NAT daemon would specify in the flow template to drop the packet.

An example operation of the managed switching element 3105 and the NAT daemon 3110 will now be described in terms of three different stages 1-3 (encircled 1-3). In this example, the managed switching element 3105 is a managed edge switching element that receives a packet to forward and route from a machine (not shown). The managed switching element 3105 receives a packet and performs the L3 processing 210 based on the flow entries in the forwarding table 3120.

While performing the L3 processing 210 on the packet, the managed switching element 3105 (at stage 1) identifies the flow entry 3125 and performs the action specified in the flow entry 3125. As shown, the flow entry 3125 indicates that a flow template having an IP address 1.1.1.10 to be translated to X should be sent to the NAT daemon 3110. In this example, the flow entry 3125 has a priority value of N, which is a number in some embodiments.

At stage 2, the NAT daemon 3110 receives the flow template and finds out that 1.1.1.10 is to be translated into 2.1.1.10 by looking up the NAT table 3115. The NAT daemon fills out the flow template and inserts the filled-in template (now the flow entry 3130) into the forwarding table 3120. In this example, the NAT daemon assigns a priority of N+1 to the filled-in template.

At stage 3, the managed switching element 3110 uses the flow entry 3130 to change the address for the packet. Also, for the packets that the managed switching element 3105 subsequently processes, the managed switching element 3105 uses flow entry 3130 over the flow entry 3125 when a packet has the source IP address of 1.1.1.10.

In some embodiments, the NAT daemon 3110 and the managed switching element run in a same virtual machine that is running on the host 3100 or in different virtual machines running on the host 3100. The NAT daemon 3110 and the managed switching element may also run in separate hosts.

Figure 32:
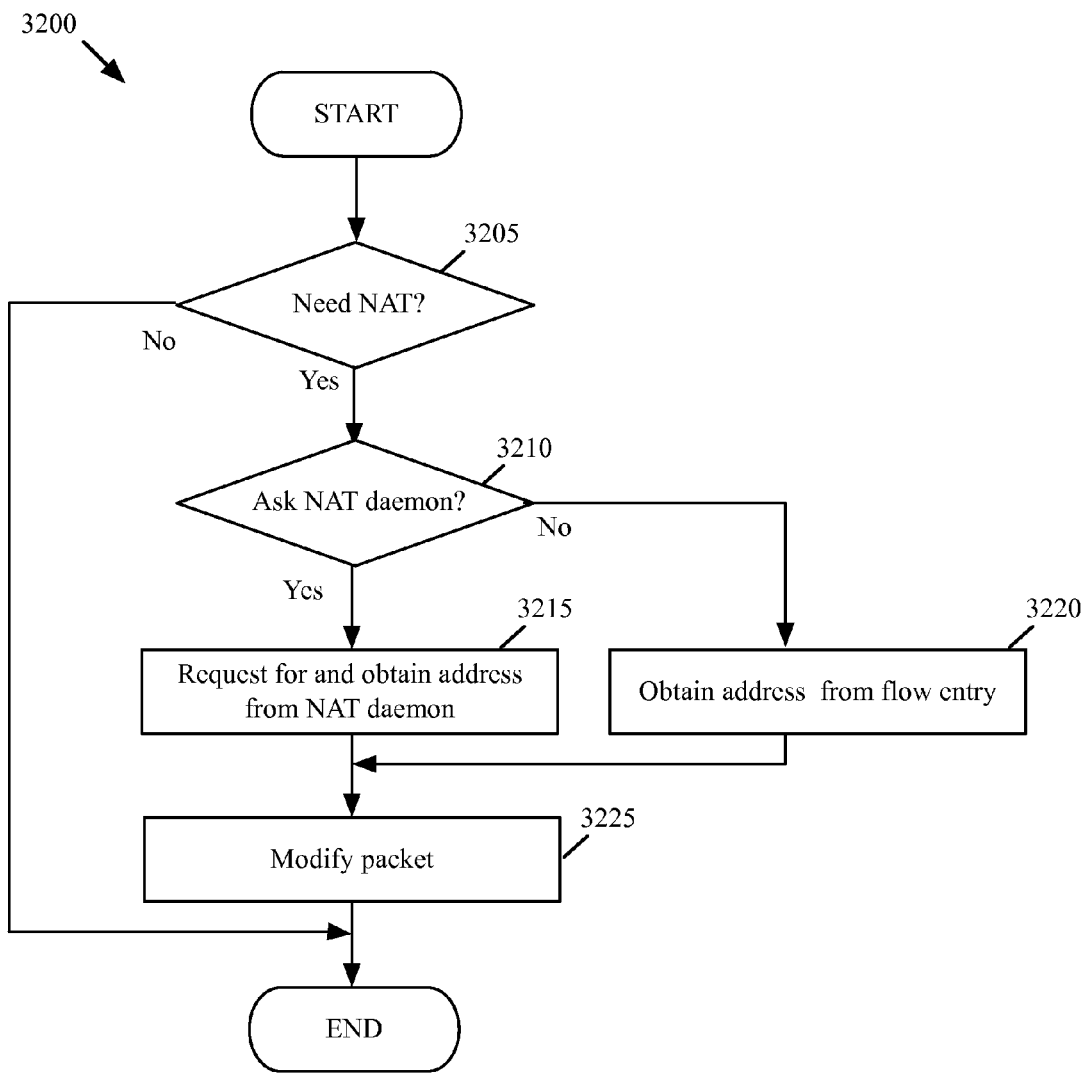
FIG. 32 conceptually illustrates a process that some embodiments perform to translate network addresses.

FIG. 32 conceptually illustrates a process 3200 that some embodiments perform to translate network addresses. In some embodiments, the process 3200 is performed by a managed switching element that performs an L3 processing 210 to route packets at L3 (e.g., the managed switching elements 1720, 2505, or 3105). The process 3200, in some embodiments, starts when the process receives a packet that is to be logically routed at L3.

The process 3200 begins by determining (at 3205) whether the packet needs network address translation (NAT). In some embodiments, the process determines whether the packet needs NAT based on flow entry. The flow entry, of which the qualifier matches the information stored in the packet's header or logical context, specifies that the packet needs NAT. As mentioned above, NAT could be SNAT or DNAT. The flow entry would also specify which NAT is to be performed on the packet.

When the process 3200 determines (at 3205) that the packet does not need NAT, the process ends. Otherwise, the process 3200 determines (at 3210) whether the process 3200 needs to request for an address into which to translate a packet's address (e.g., source IP address) from a NAT daemon. In some embodiments, the process 3200 determines whether the process needs to ask the NAT daemon based on the flow entry. For instance, the flow entry may specify that the address into which to translate the packet's address should be obtained by requesting for the address from the NAT daemon. In some embodiments, the process determines that the NAT daemon should provide the translated address when the flow entry is a flow template that has an empty field for the translated address or some other value in the field for indicating the translated address should be obtained from the NAT daemon.

When the process determines (at 3210) that the process does not need to request for an address from the NAT daemon, the process obtains (at 3220) the translated address from the flow entry. For instance, the flow entry would provide the translated address. The process then proceeds to 3225, which will be described further below. When the process determines (at 3210) that the process needs to request for an address from the NAT daemon, the process 3200 at 3215 requests for and obtains the translated address from the NAT daemon. In some embodiments, the process 3200 requests for the translated address by sending a flow template to the NAT daemon. The NAT daemon would fill the flow template with the translated address and will place that filled-in flow template in the forwarding table (not shown) that the process uses.

Next, the process 3200 modifies (at 3225) the packet with the translated address. In some embodiments, the process modifies an address field in the header of the packet. Alternatively or conjunctively, the process modifies the logical context to replace the packet's address with the translated address. The process then ends.

It is to be noted that the MAC addresses, IP addresses, and other network addresses used above and below in this application are examples for illustrative purpose and may not have the values in the allowable ranges unless specified otherwise.

II. Next-Hop Virtualization

Logical networks interfacing external networks need to interact with a next-hop router. The virtualization applications of different embodiments use different models to interface a logical L3 network with external networks through a next-hop router.

First, in a fixed attachment model, the physical infrastructure interacts with a set of managed integration elements that will receive all the ingress traffic for a given IP prefix and will send all the egress traffic back to the physical network. In this model, logical abstraction can be a single logical uplink port for the logical L3 router per a given set of managed integration elements. In some embodiments, there could be more than a single integration cluster. The logical control plane that is provided by the control application is responsible for routing outbound, egress traffic towards the uplink(s). In some embodiments, examples of managed integration elements include second-level managed switching elements that function as extenders, which are described in U.S. patent application Ser. No. 13/177,535. The examples of managed integration elements also include the managed switching element described above by reference to FIGS. 8, 9, and 10.

Second, in a distributed attachment model, the virtualization application distributes the attachment throughout managed edge switching elements that it connects. To do so, the managed edge switching elements have to integrate to the physical routing infrastructure. In other words, each managed edge switching element has to be able to communicate with the physical routing infrastructure outside of the group of managed switching elements. In some embodiments, these switching elements use the IGP protocol (or other routing protocol) to communicate with the physical switching elements (e.g., the physical routers) that send packets into the logical network (implemented by the managed switching elements) and receive packets from the logical network. Using this protocol the managed edge switching elements of some embodiments can advertise host routes (/32) to attract direct ingress traffic to its proper location. While, in some embodiments, there is no centralized traffic hotspot as the ingress and egress traffic is completely distributed over the managed switching elements, the logical abstraction is still a single logical uplink port for the logical L3 router and the logical control plane is responsible for routing traffic to the uplink. Nothing prevents having more than a single uplink port exposed for the logical control plane if that is beneficial for the control plane. However, the number of uplink ports does not have to match with the number of attachment points in this model.

Third, in a control plane driven model, the logical control plane is responsible for integrating with the external network. Control plane is exposed with one-to-one routing integration; for every attachment point in the physical network, there's a logical port. Logical control plane has the responsibility to peer with next-hop routers at the routing protocol level.

The three models all hit different design trade-offs: fixed attachment model implies non-optimal physical traffic routes, but require less integration with the physical infrastructure. Of the distributed models, the fully distributed model scales best, in some embodiments, as the logical control plane is not responsible for all the peering traffic, which in the extreme could be thousands of peering sessions. However, the control plane driven model gives the maximal control for the logical control plane. The maximal control requires policy routing, though, as the egress port has to depend on the ingress port if optimal physical routes are desired.

III. Stateful Packet Operations

Stateful packet operations place NAT on a logical L3 datapath for the routed traffic. In the logical pipeline, network address translation is done in an extra NAT stage before or after the actual standard L3 pipeline. In other words, network address translation hits the packet before or after the routing. In some embodiments, NAT configuration is done via flow templates that create the actual address translation entries. Flow templates will be further described below.

Placing the NAT functionality is one feature that deviates from the approach of performing all or most of the logical packet processing in first hop. The basic model of executing most or all of the operations at the first-hop places the processing of packets flowing in opposite directions at different first-hop switching elements in some embodiments: for a given transport level flow, the packets in one direction would be sent through the logical pipeline at one end, and the packets in the reverse direction would be sent through the pipeline at the other end. Unfortunately, the per flow NAT state can be fairly rich (especially if NAT supports higher level application protocols) and the state has to be shared between the directions, for a given transport flow.

Hence, some embodiments let the first-hop switching elements of the logical port receive the opening packet of the transport flow to execute the logical pipelines to both directions. For example, if VM A opens a TCP connection to VM B, then the edge switching element connected to the hypervisor (which may run on the same machine as the hypervisor) of VM A becomes responsible for sending the packets through the logical pipelines to both directions. This allows for purely distributed NAT functionality, as well as having multiple NATs in the logical network topology. The first-hop switching element will execute all the necessary NAT translations, regardless how many there are, and the network address translation just becomes an extra step in the LDPS pipelines the packet traverses (within that switching element).

However, placing the feeding of the packets sent in the reverse direction through the logical pipelines requires additional measures; otherwise, the first-hop switching element for the reverse packets will execute the processing (without having the NAT state locally available). For this purpose, some embodiments allow the first packet sent from the source edge switching element (of VM A above) to the destination edge switching element (of VM B above), to establish a special "hint state" that makes the destination switching element send the reverse packets of that transport flow directly to the source switching element without processing. The source switching element will then execute the pipelines in the reverse direction and reverse the NAT operations using the local NAT state for the reverse packets. Some embodiments use the flow templates (which are described below) to establish this reverse hint state at the destination switching element, so that the controller does not need to be involved per flow operations.

Figure 33:
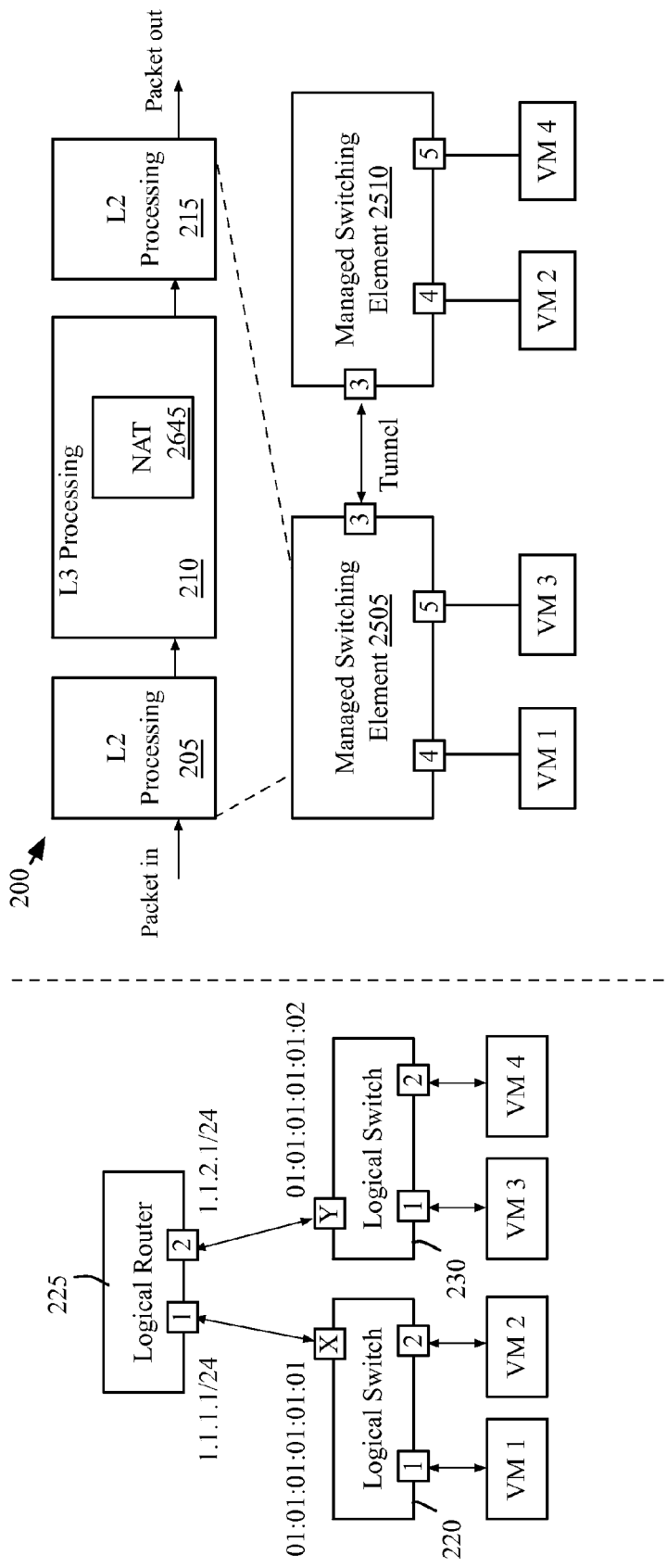
FIG. 33 conceptually illustrates that a first-hop switching element of some embodiments performs the entire logical processing pipeline including the NAT operation.
Figure 34:
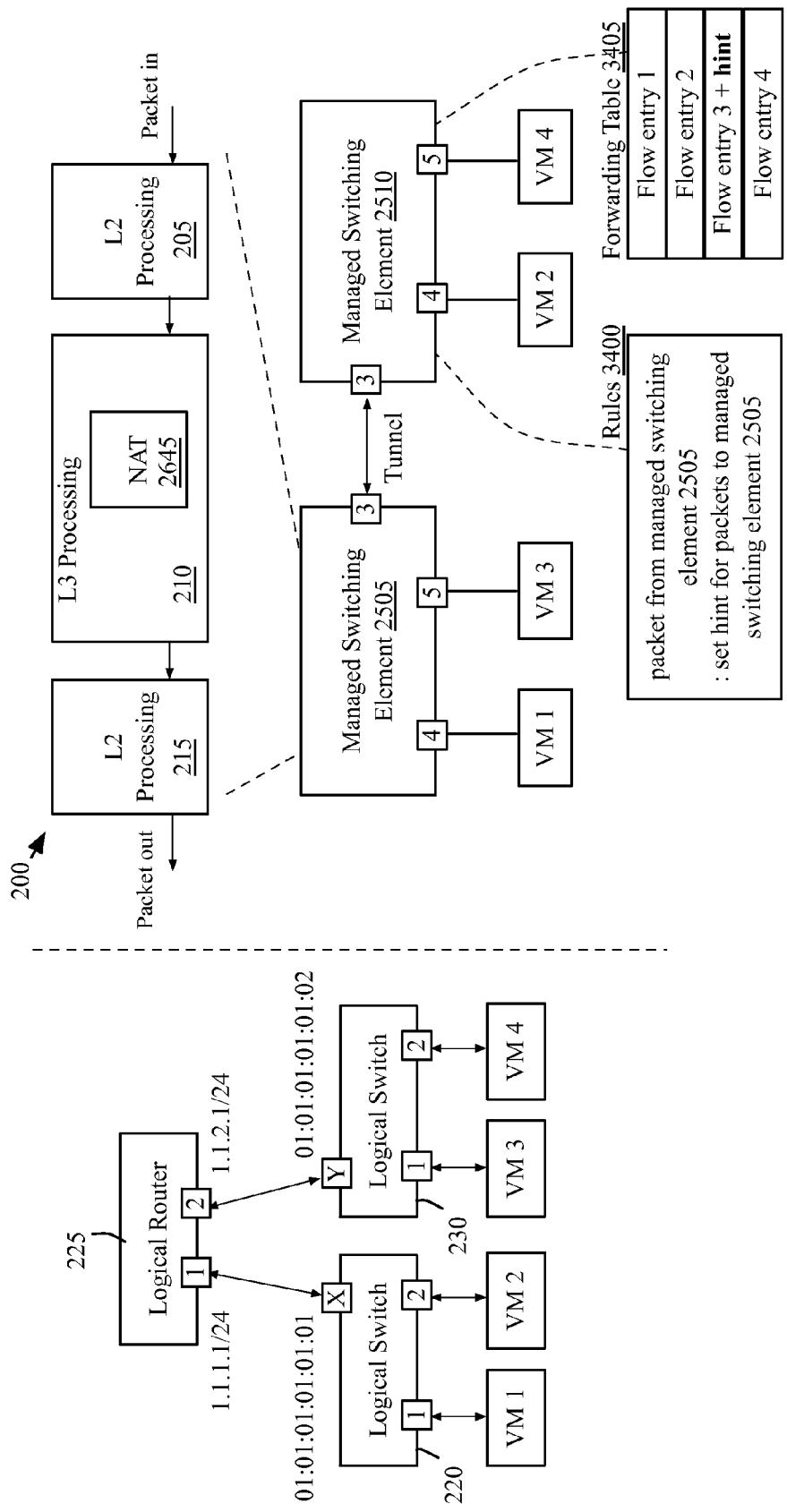
FIG. 34 conceptually illustrates an example that a managed switching element does not perform a logical processing pipeline when sending a returning packet to a managed switching element.

The next two figures, FIGS. 33 and 34 illustrate placing NAT functionality and the hint state. FIG. 33 conceptually illustrates that a first-hop switching element of some embodiments performs the entire logical processing pipeline 200 including the NAT operation 2645. FIG. 33 is identical with FIG. 29 except that the logical processing pipeline 200 includes the NAT operation 2645 depicted in the L3 processing 220 to indicate that the NAT operation 2645 is performed.

A managed switching element of some embodiments that implements a logical router performs a NAT operation on a packet after the packet is routed by the logical router. For instance, when VM 1 that is coupled to the logical switch 220 sends a packet to VM 4 that is coupled to the logical switch 230, the managed switching element 2505 translates the source IP address (e.g., 1.1.1.10) of the packet into a different IP address (e.g., 3.1.1.10) before sending the packet out to the managed switching element 2510. The managed switching element 2505 performs the NAT operation 2645 based on a set of NAT rules (e.g., flow entries) configured in the managed switching element 2505 by the controller cluster (not shown) that manages the managed switching element 2505.

The packet that VM 4 receives has the translated IP address, 3.1.1.10, as the packet's source IP address. A return packet from VM 4 to VM 1 will have this translated address as the packet's destination IP address. Thus, the translated IP address has to be translated back to VM 1's IP address in order for this packet to reach VM 1. However, the managed switching element 2510 of some embodiments would not perform the NAT operation 2645 to recover VM 1's IP address for the returning packet because the NAT rules for performing NAT operations are only in the managed switching element 2505 and are not in the managed switching element 2510. In this manner, the NAT rules and the state do not have to be shared by all potential managed edge switching elements.

FIG. 34 conceptually illustrates an example of such embodiments. Specifically, FIG. 34 illustrates that the managed switching element 2510 does not perform a logical processing pipeline when sending the returning packet to the managed switching element 2505. This figure also illustrates that the managed switching element 2505, upon receiving a returning packet from the managed switching element 2510, performs the logical processing pipeline 200 as if the managed switching element 2505 were the first-hop switching element with respect to this returning packet. FIG. 34 is identical with FIG. 33 except the logical processing pipeline is depicted in the opposite direction (with arrows pointing to the left). FIG. 34 also illustrates a rule 3400 and a forwarding table 3405.

The rule 3400, in some embodiments, is a flow entry in the forwarding table 3405 that is configured by a controller cluster (not shown) that manages the managed network switching element 2510. The rule 3400 specifies (or "hints") that when the managed switching element 2510 receives a packet originating from the managed switching element 2505, the managed switching element 2510 should not perform a logical processing pipeline on the returning packets to the managed switching element 2505.

When the managed switching element 2510 receives from the managed switching element 2505 a packet on which the managed switching element 2505 has performed a NAT operation, the managed switching element 2510 finds the rule 3400 based on the information included in the packet's header (e.g., logical context). Also, the managed switching element 2510, in some embodiments, modifies one or more other flow entries to indicate that no logical processing pipeline should be performed on packets from the destination machine (e.g., VM 4) of the received packet that are headed to the source machine (e.g., VM 1).

The managed switching element 2510 then forwards this packet to the destination machine, e.g., VM 4. When the managed switching element 2510 receives a returning packet from VM 4 that is headed to VM 1, the managed switching element 2510 will not perform a logical processing pipeline on this packet. That is, the managed switching element 2510 will not perform logical forwarding at L2 or logical routing at L3. The managed switching element 2510 will simply indicate in the logical context for this packet that no logical processing has been performed on the packet.

When the managed switching element 2505 receives this packet from the managed switching element 2510, the managed switching element 2505 performs the logical processing pipeline 200. Specifically, the managed switching element 2505 first performs a logical context look up to determine the logical context of the packet based on the information included in the header fields of the packet. In this example, the source MAC address of the packet is a MAC address of VM 4 and the source IP address of the packet is an IP address of VM 4. Because the packet is sent from VM 4 to VM 1 that is in a different logical network, the packet has a MAC address associated with port Y of the logical switch 230 as the destination MAC address (i.e., 01:01:01:01:01:02 in this example). The destination IP address of the packet is the NAT'ed IP address of VM 1 (i.e., 3.1.1.10).

The managed switching element 2505 then determines access control for the packet with respect to the logical switch 230. For instance, the managed switching element 2505 determines that the packet does not have network addresses (e.g., source/destination MAC/IP addresses, etc.) that will cause the logical switch 230 to reject the packet that came through port 2 of the logical switch 230. The managed switching element 2505 also identifies from the logical context that port Y of the logical switch 230 is the port to send out the packet. Furthermore, the managed switching element 2505 determines access control for the packet with respect to port Y. For instance, the managed switching element 2505 determines that the packet does not have network addresses that will cause the logical switch 230 not to send the packet through the port Y.

Next, the managed switching element 2505 performs the NAT operation 2645 on the packet to translate the destination IP address back to the IP address of VM 1. That is, the managed switching element 2505 in this example replaces 3.1.1.10 with 1.1.1.10 based on the NAT rules. The managed switching element 2505 then performs an L3 processing on the packet because the packet's destination IP address, now 1.1.1.10, is for another logical network. The managed switching element 2505 determines ingress access control for the packet at L3 with respect to port 2 of the logical router 225. The managed switching element 2505 also looks up the flow entries and determines that the packet is to be sent to the logical port 1 of the logical router 225 because the destination IP address of the packet, 1.1.1.10, belongs to the subnet address of 1.1.1.1/24 that is associated with the logical port 1 of the logical router 225. Furthermore, the managed switching element 2505 determines egress access control for the packet with respect to the logical port 1 of the logical router 225. The managed switching element 2505 also modifies the destination MAC address of the packet to be a MAC address of VM 1.

The managed switching element 2505 then performs the L2 processing 215. In this example, the source MAC address of the packet is now a MAC address of logical port 1 of the logical router 225 and the source IP address of the packet is still the IP address of VM 4. The destination IP address of the packet is the IP address of VM 1 (i.e., 1.1.1.10). In this example, the logical context specifies that logical switch 220 is the logical switch that is to forward the packet and that logical port X of the logical switch 220 is the port through which the packet was received. The logical context also specifies that port 1 of the logical switch 220 is the port through which to send the packet out to the destination, VM 1, because port 1 is associated with the MAC address of VM 1.

The managed switching element 2505 then performs logical forwarding lookups based on the logical context of the packet, including determining ingress and egress access control with respect to port X and port 1 of the logical switch 220, respectively. The managed switching element 2505 performs a mapping lookup to determine a physical port to which the logical port 1 of the logical switch 220 is mapped. In this example, the managed switching element 2505 determines that logical port 1 of the logical switch 220 is mapped to port 4 of the managed switching element 2505. The managed switching element 2505 then performs a physical lookup to determine operations for forwarding the packet to the physical port. In this example, the managed switching element 2505 determines that the packet should be sent to VM 1 through port 4 of the managed switching element 2505.

Figure 35:
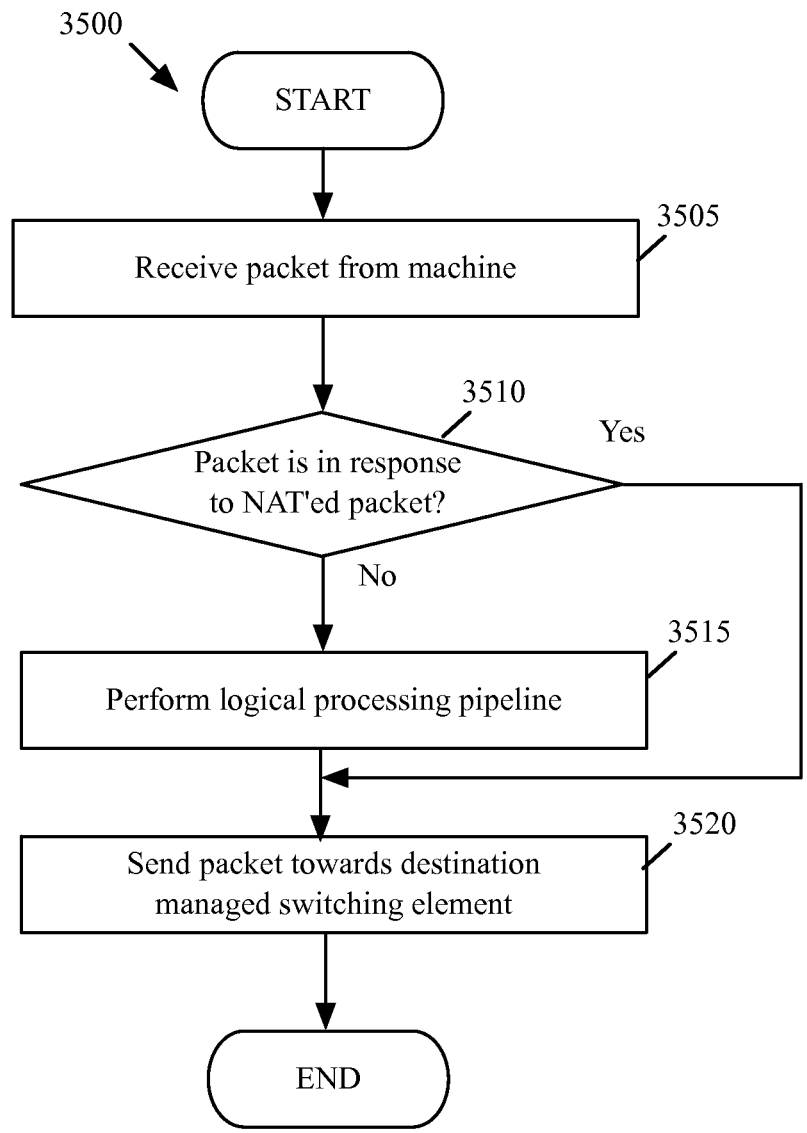
FIG. 35 conceptually illustrates a process that some embodiments perform to send a packet to a destination machine whose address is NAT'ed.

FIG. 35 conceptually illustrates a process 3500 that some embodiments perform to send a packet to a destination machine whose address is NAT'ed. The process 3500, in some embodiments, is performed by a managed edge switching element that receives a packet directly from a source machine.

The process 3500 begins by receiving (at 3505) a packet from a source machine. The process then determines (at 3510) whether the packet is headed to a destination machine whose address is NAT'ed. In some embodiments, the process determines whether the packet is headed to such destination machine by looking up flow entries that match the information included in the header of the packet (e.g., destination IP address). One or more flow entries specify that no logical processing (e.g., logical forwarding at L2 or logical routing at L3) should be performed on this packet when the packet is addressed to a destination machine whose address is NAT'ed. Other flow entries specify that logical processing should be performed when the packet is addressed to a destination machine whose address is not NAT'ed.

When the process 3500 determines (at 3510) that the packet is headed to a destination machine whose address is NAT'ed, the process 3515 proceeds to 3520 which will be described further below. When the process 3500 determines (at 3510) that the packet is headed to a destination machine whose address is not NAT'ed, the process 3500 performs logical processing on the packet (e.g., logical forwarding at L2 and/or logical routing at L3).

The process 3500 then sends (at 3520) the packet to the next hop managed switching element in route to the destination machine. The process 3500 then ends.

Note above, the controllers are not involved in the per packet operations. The logical control plane only provisions the FIB rules identifying what should be network address translated. All per flow state is established by the datapath (Open vSwitch).

The embodiments described above utilize Source NAT'ing. However, some embodiments use Destination NAT'ing (DNAT'ing) along the same lines. In the case of DNAT'ing, all the processing can be done at the source managed edge switching element.

Moreover, in the case of placing the NAT functionality between the external and logical network, the operations are no different from the one described above. In this case, for the flows incoming from the external network, the NAT state will be held at the extender (which in this case would be the first-hop managed edge switching element) for both directions. On the other hand, for transport flows initiated towards the external network, the state will be held at the managed edge switching element attached to the originating host/VM.

With this purely distributed approach for the network address translation, VM mobility support requires migrating the established NAT state with the VM to the new hypervisor. Without migrating the NAT state, the transport connections will break. For such conditions, some embodiments are designed to expect the NAT to respond with TCP reset to packets sent to closed/non-existing TCP flows. More advanced implementations will integrate with the VM management system facilitating the migration of the NAT state together with the VM; in this case, the transport connections do not have to break.

Figure 36:
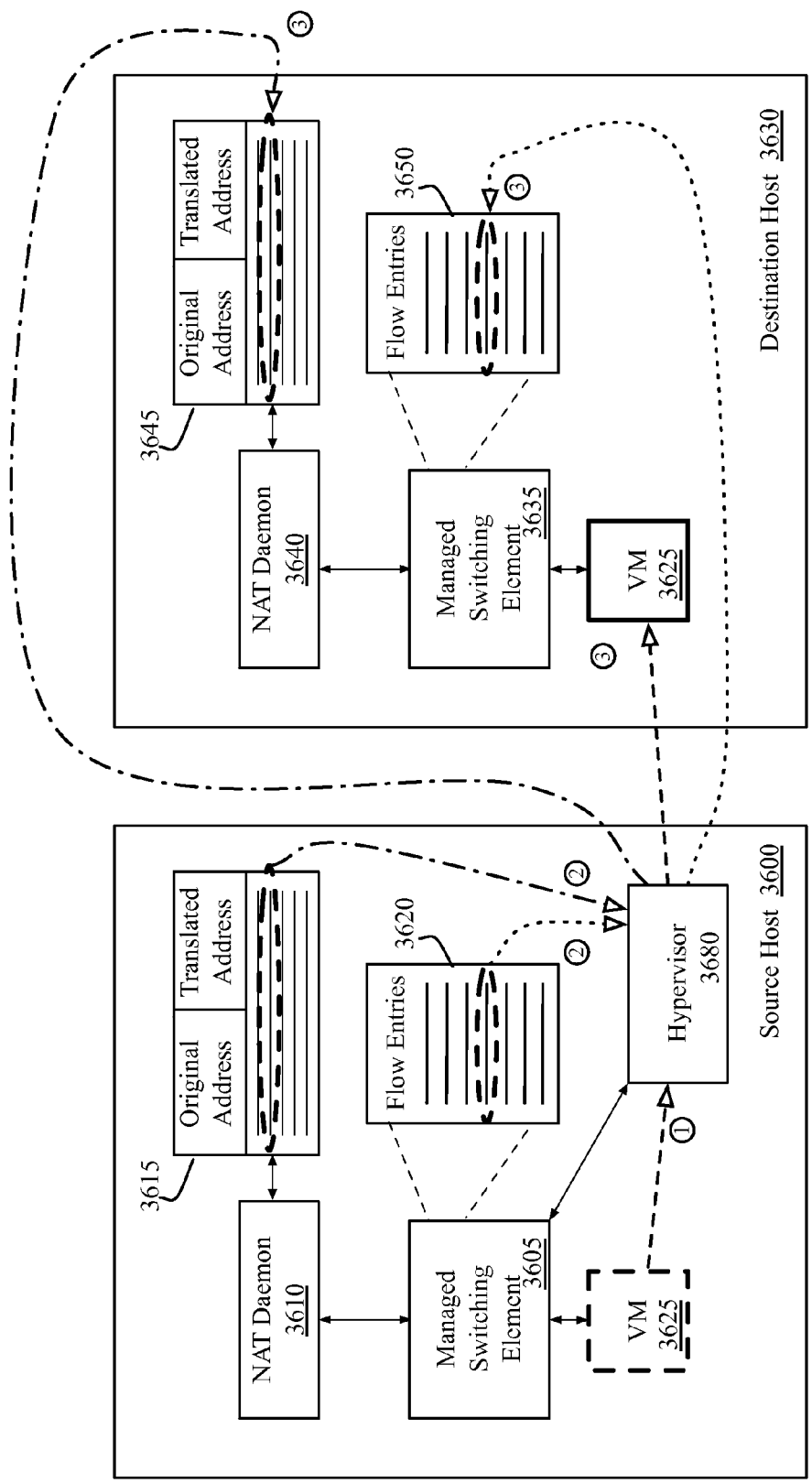
FIG. 36 illustrates an example of migrating NAT state from a first host to a second host as a VM migrates from the first host to the second host.

FIG. 36 illustrates an example of migrating NAT state from a first host to a second host as a VM migrates from the first host to the second host. Specifically, this figure illustrates using a hypervisor of the first host to migrate the VM and the NAT state associated with the VM. The figure illustrates two hosts 3600 and 3630.

As shown, the host 3600 in this example is a source host from which a VM 3625 is migrating to the host 3630. In the host 3600, a NAT daemon 3610 and a managed switching element 3605 are running. The NAT daemon 3610 is similar to the NAT daemon 3110 described above by reference to FIG. 31. The NAT daemon 3610 maintains the NAT table 3115 which includes mappings of original and translated addresses. The managed switching element 3605 uses the NAT daemon 3610 to obtain translated address. The managed switching element, in some embodiments, sends flow templates to the NAT daemon 3610 to send original addresses and to obtain translated addresses as described above.

The hypervisor 3680 creates and manages VMs running in the host 3600. In some embodiments, the hypervisor 3680 notifies the managed switching element 3605 and/or the NAT daemon 3610 of a migration of a VM running in the host 3600 out of the host 3600 before the VM migrates to another host. The managed switching element 3605 and/or the NAT daemon 3610 gets such notifications by registering for callbacks in the event of a VM migration in some embodiments.

In some such embodiments, the managed switching element 3605 asks the NAT daemon to fetch the NAT state (e.g., address mapping for the VM and protocol information, etc.) associated with the migrating VM and to provide the NAT state to the hypervisor 3680. In some embodiments, the NAT daemon 3610 provides the NAT state associated with the migrating VM to the hypervisor 3680 when the NAT daemon 3610 is directly notified of the migration by the hypervisor 3680. The hypervisor 3680 then migrates the NAT state to the destination host along with the migrating VM.

In some embodiments, the NAT daemon 3610 sends the NAT state associated with the migrating VM directly to the NAT daemon running in the destination host. In these embodiments, the NAT daemon 3610 and/or the managed switching element 3605 notifies the hypervisor 3680 of the completion of the migration of the NAT state so that the hypervisor 3680 can start migrating the VM to the destination host.

In some embodiments, the managed switching element 3605 also provides the flow entries related to the migrating VM to the hypervisor 3680 or to the managed switching element running in the destination host. When the hypervisor 3680 is provided with the flow entries, the hypervisor 3680 sends the flow entries to the flow table of the managed switching element running in the destination host. The migration of flow entries to the destination host is optional since the NAT state alone will enable the managed switching element running in the destination host to obtain translated addresses for the migrating VM.

An example operation of the source host 3600 will now be described. When the hypervisor 3680 is to migrate VM 3625 (e.g., per user input or inputs from a control cluster), the hypervisor 3680 notifies the managed switching element 3605. The managed switching element 3605 in this example then asks the NAT daemon 3610 to fetch the NAT state associated with VM 3625 and send the fetched state to the hypervisor 3680.

The hypervisor 3680 then migrates the VM 3625 to the destination host 3630 by moving the data of the VM. In some embodiments, the hypervisor 3680 is capable of live migration by capturing the running state of the VM 3625 and sending the state to the VM 3625. The hypervisor 3680 also moves the fetched NAT state to the NAT table 3645 of the host 3630 so that the managed switching element 3635 running in the host 3630 can obtain translated addresses from the NAT daemon 3640 for VM 3625 just migrated into the host 3630.

Figure 37:
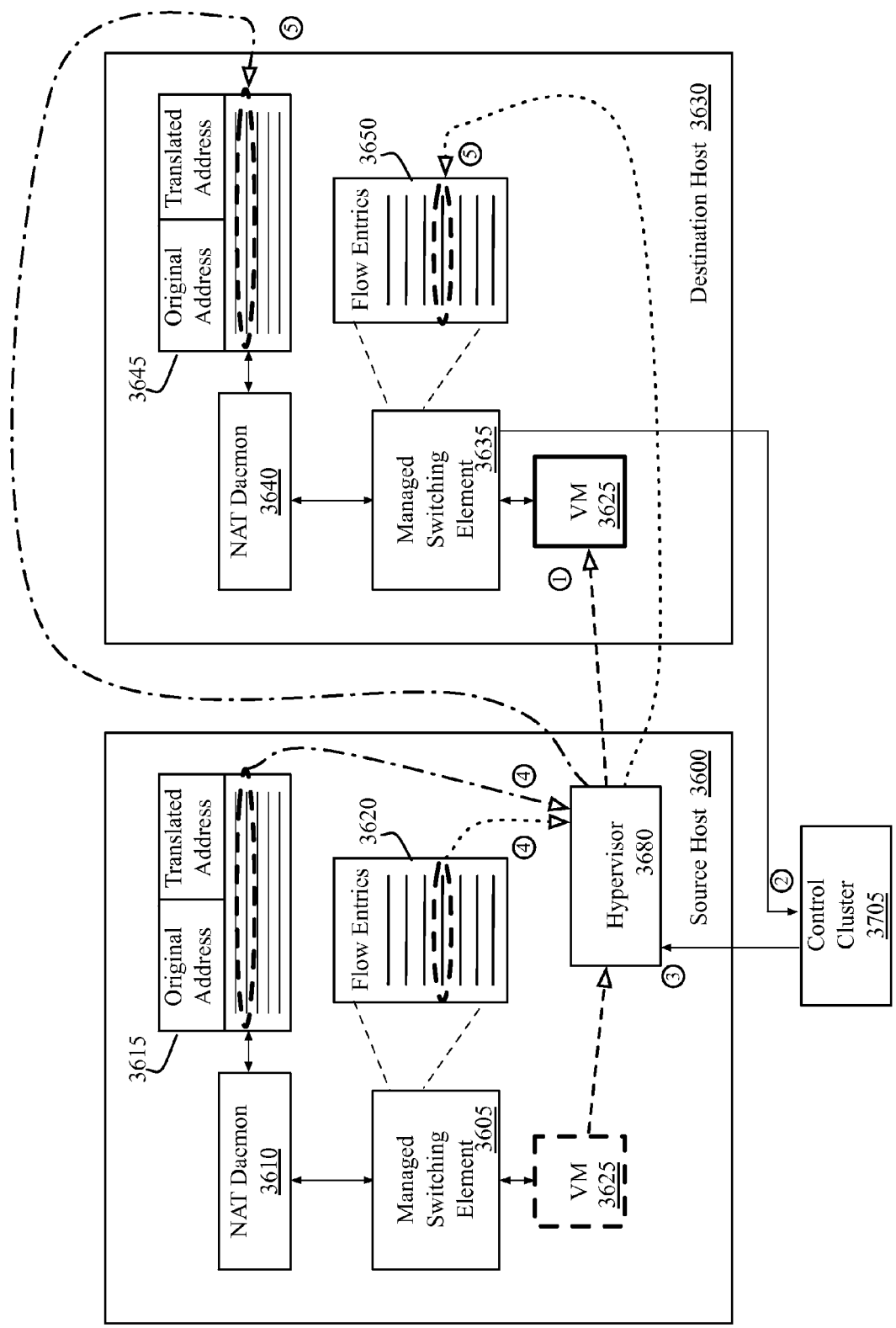
FIG. 37 illustrates another example of migrating NAT state from a first host to a second host as a VM migrates from the first host to the second host.

FIG. 37 illustrates another example of migrating NAT state from a first host to a second host as a VM migrates from the first host to the second host. Specifically, this figure illustrates using a control cluster to ask a hypervisor of the first host to fetch the NAT state associated with the migrating VM and to send the NAT state to the second host. The figure illustrates two hosts 3600 and 3630. However, a hypervisor 3680 running in the host 3600 in this example does not support notifications to the managed switching element or the NAT daemon running in the source host.

Because the hypervisor 3680 of some embodiments does not notify the managed switching element or the NAT daemon of a migration of a VM to a destination host, the NAT state associated with the migrating VM is sent to the destination host after the hypervisor 3680 starts or completes migrating a VM to the destination host. In particular, the managed switching element 3635, in some embodiments, would detect migration of VM 3625 by, e.g., detecting the MAC address of 3625 that is new to the managed switching element 3635. The managed switching element 3635 notifies the control cluster 3705 the addition of VM 3625 (therefore a new port of the managed switching element 3635 for the VM 3625).

The control cluster 3705 is similar to the control clusters 1105 and 2205 described above. Upon receiving the notification from the managed switching element 3635 of the addition of VM, the control cluster 3705 asks the hypervisor 3680 running in the source host 3600 to fetch the NAT state associated with the migrated VM 3625 and update the NAT table 3645 with the fetched NAT state. In some embodiments, the control cluster 3705 additionally asks to fetch flow entries associated with the migrated VM 3625 and put those flow entries in the flow table 3650 of the destination host 3630.

In some embodiments, the control cluster 3705 may directly ask the managed switching element and/or the NAT daemon 3610 to send the NAT state and/or flow entries to the NAT daemon 3640 and/or the managed switching element 3635 so that the NAT table 3645 and/or 3650 are updated with the NAT state and/or flow entries associated with the migrated VM 3625.

An example operation of the source host 3600, the destination host 3630, and the control cluster 3705 will now be described. When the hypervisor 3680 is to migrate VM 3625 (e.g., per user input or inputs from a control cluster), the hypervisor 3680 migrates the VM 3625 by moving the configuration data or the running state of the VM 3625 to the host 3630. The VM 3625, now running in the host 3630, sends a packet to the managed switching element 3635. The managed switching element 3635 in this example detects the migration of VM 3625 to the host 3630 by recognizing that the source MAC address of the packet is new to the managed switching element 3635. The managed switching element 3605 in this example then notifies the control cluster 3705 of the addition of VM 3625 (or, a creation of a new port for the VM 3625).

The control cluster 3705 then asks the hypervisor 3680 to fetch the NAT state associated with VM 3625 and to send the NAT state to the destination host 3630. The managed switching element 3635 running in the destination host 3630 can obtain translated addresses from the NAT daemon 3640 for VM 3625 that has just migrated into the host 3630.

IV. Load-Balancing

Some embodiments implement load balancing as an extra step in the L3 pipeline. For instance, some embodiments implement a logical bundle based load-balancing step followed by a destination network address translation. In some embodiments, the logical router (that provides the load-balance service) hosts the virtual IP address, and hence will respond to the ARP requests sent to the virtual IP address (VIP). With this, the virtual IP will remain functional even if the traffic is sent to the VIP from the same L2 domain in which the cluster members exist.

Figure 38:
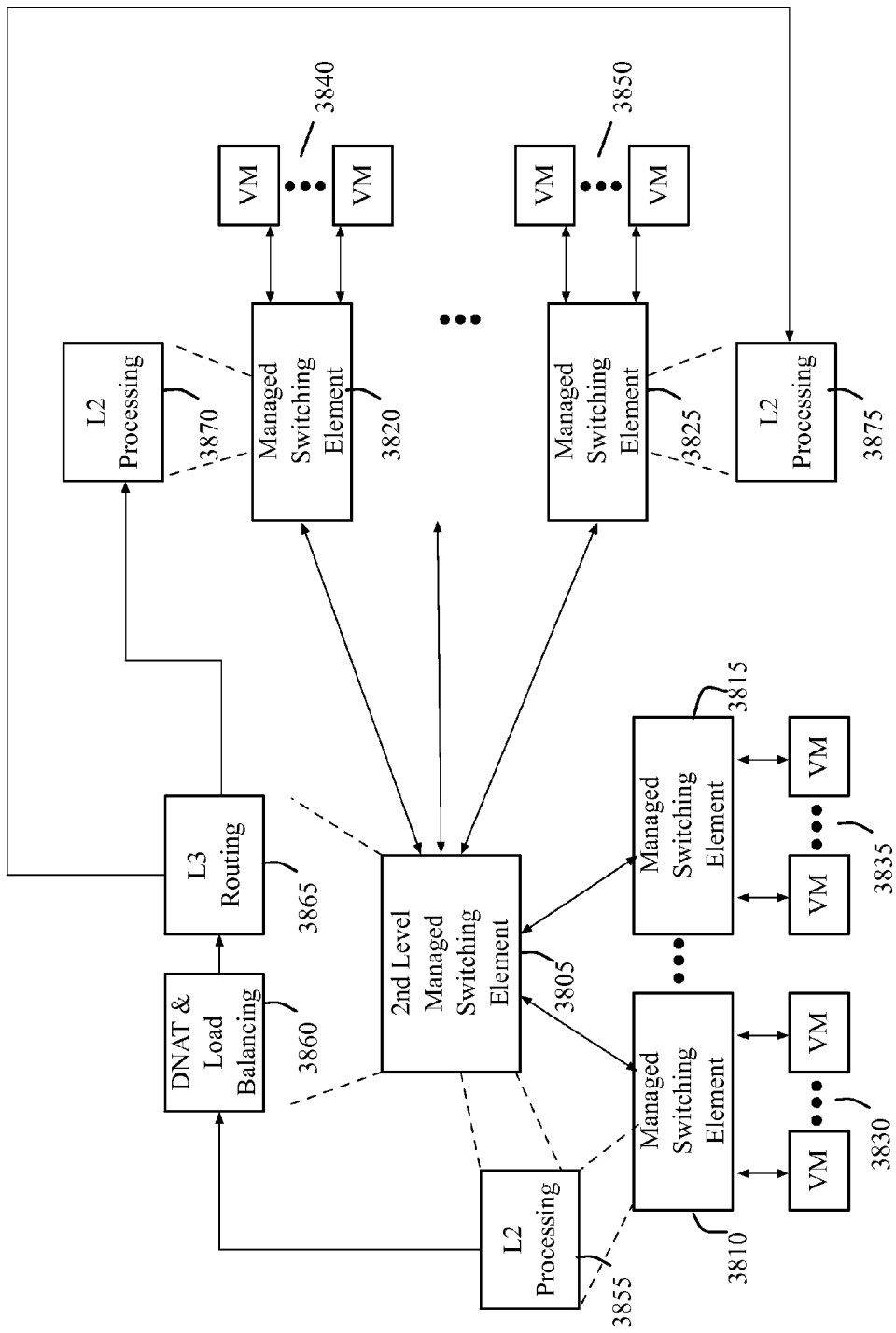
FIG. 38 illustrates an example physical implementation of logical switches and a logical router that performs load balancing.

FIG. 38 illustrates an example physical implementation of logical switches and a logical router that performs load balancing. In particular, this figure illustrates a centralized L3 routing model in which the logical router is implemented by an L3 router or a managed switching element based on flow entries. This figure illustrates managed switching elements 3805-3825 and VMs 3830-3850. This figure also illustrates a logical processing pipeline that includes L2 processing 3855, DNAT and load balancing 3860, L3 routing 3865, and L2 processing 3870 and 3875.

The managed switching element 3805 of some embodiments is a second-level managed switching element functioning as an extender. The managed switching element 3805 in some such embodiments is similar to the managed switching elements 810 and 1910 described above in that the managed switching element 3805 implements a logical router (not shown) based on flow entries (not shown) or is running in the same host on which an L3 router that implements the logical router is running. In addition, the managed switching element 3805 performs DNAT and load balancing 3860 to translate a destination address into another address and balance the load among different machines (e.g., VMs) that provide the same service (e.g., a web service).

The managed switching elements 3805-3825 implement logical switches (not shown) to which VMs 3830-3850 are connected. The VMs 3840 and 3850 in this example provide the same service. That is, the VMs 3840 and 3850, in some embodiments, collectively act as a server that provides the same service. However, the VMs 3850 and 3850 are separate VMs that have different IP addresses. The managed switching element 3805 or the L3 router (not shown) used by the managed switching element 3805 perform a load balancing to distribute workload among the VMs 3840 and 3850.

In some embodiments, load balancing is achieved by translating the destination address of the packets requesting the service into different addresses of the VMs providing the service. In particular, the managed switching element 3805 or the L3 router (not shown) used by the managed switching element 3805 translates the destination addresses of the request packets into addresses of the several VMs 3840 and 3850 such that no particular VM of the VMs gets too much more workload than the other VMs do. More details about finding the current workload of the service-providing VMs will be described further below.

In some embodiments, the managed switching element 3805 or the L3 router perform an L3 routing 3865 after performing DNAT and load balancing 3860 of the logical processing pipeline. Therefore, the managed switching element 3805 or the L3 router route the packets to different managed switching elements based on the translated destination addresses in these embodiments. The managed switching elements 3820 and 3825 are edge switching elements and thus send and receive packets to and from the VMs 3840 and 3850 directly. In other embodiments, the managed switching element 3805 or the L3 router performs the L3 routing 3865 before performing DNAT and load balancing 3860 of the logical processing pipeline.

An example operation of the managed switching element 3805 will now be described. The managed switching element 3810 receives a packet requesting a service collectively provided by the VMs 3840 and 3850. This packet comes from one of VM 3830, specifically, from an application that uses a particular protocol. The packet in this example includes a protocol number that identifies the particular protocol. The packet also includes an IP address that represents the server providing the service as destination IP address. The details of performing source L2 processing 3855 on this packet are omitted for simplicity of description because it is similar to the source L2 processing examples described above and below.

After the source L2 processing 3855 is performed to route the packet to the managed switching element 3805 for performing an L3 processing that includes L3 routing 3865. In this example, the managed switching element 3805 performs the DNAT and load balancing 3860 on the packet. That is, the managed switching element 3805 translates the destination IP address of the packet into an IP address of one of the VMs that provides the service. In this example, the managed switching element 3805 selects one of VMs 3840-3850 that has the least workload among the VMs 3840-3850. The managed switching element 3805 performs L3 routing 3865 on the packet (i.e., routes the packet) based on the new destination IP address.

The managed switching element 3820 receives the packet because the destination IP address is of one of the VMs 3840 and this destination IP is resolved into the MAC address of the VM. The managed switching element 3820 forwards the packet to the VM. This VM will return packets to the application that originally requested the service. These returning packets will reach the managed switching element 3805 and the managed switching element 3805 will perform NATs and identify that the application is the destination of these packets.

Figure 39:
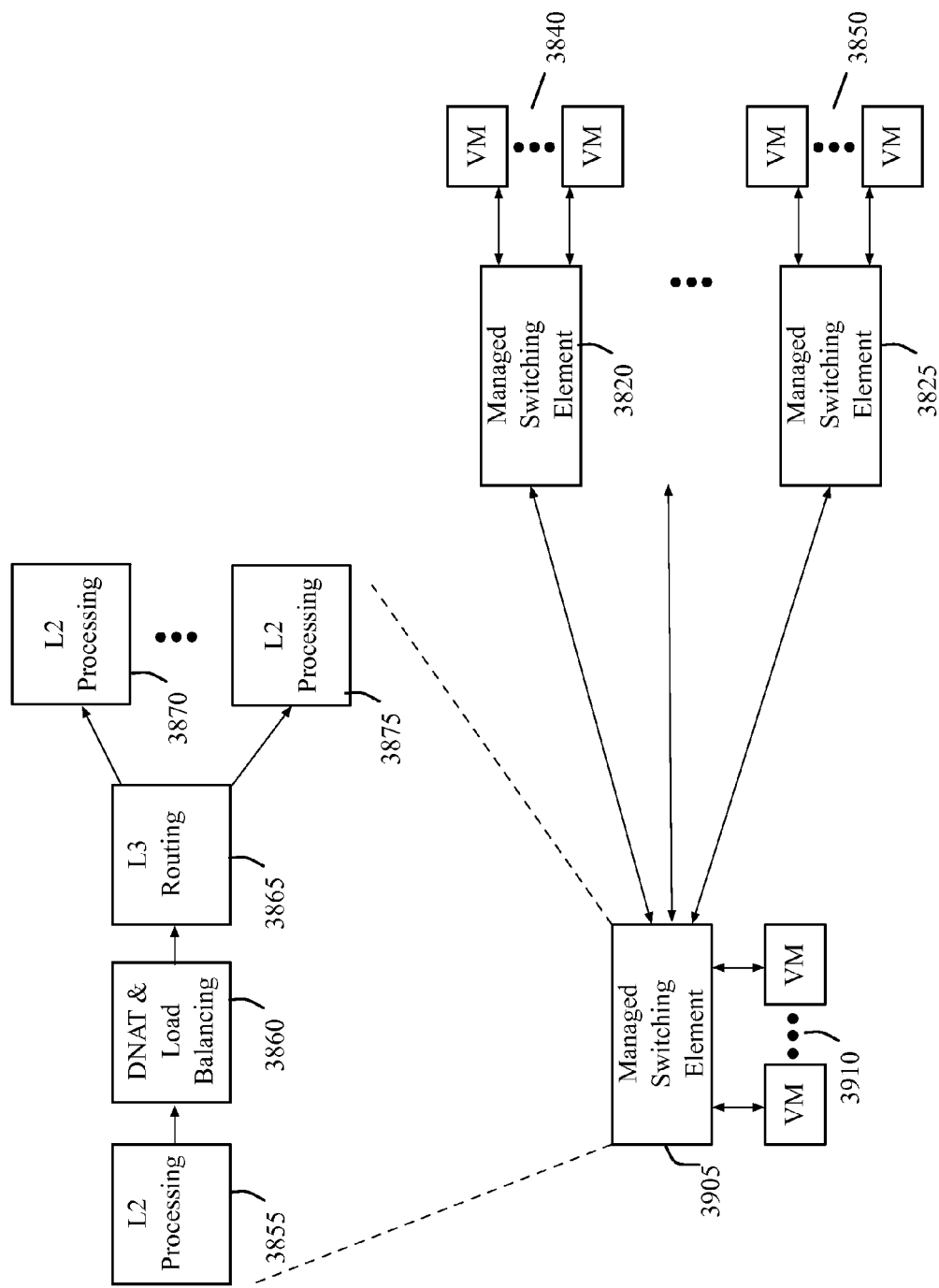
FIG. 39 illustrates another example physical implementation of logical switches and a logical router that performs load balancing.

FIG. 39 illustrates another example physical implementation of logical switches and a logical router that performs load balancing. In particular, this figure illustrates a distributed L3 routing model in which the logical router is implemented by a managed switching element that also performs source and destination L2 processing. That is, this managed switching element performs the entire logical processing pipeline. This figure illustrates managed switching elements 3905 and 3820-3825 and VMs 3910 and 3840-3850. This figure also illustrates a logical processing pipeline that includes the L2 processing 3855, the DNAT and load balancing 3860, the L3 routing 3865, and the L2 processing 3870-3875.

The managed switching element 3905 of some embodiments is similar to the managed switching elements 2505 described above by reference to FIG. 29 in that the managed switching element 3905 implements the entire logical processing pipeline. That is, the managed switching element 3905 implements the logical router and logical switches. In addition, the managed switching element 3905 performs DNAT and load balancing 3860 to translate a destination address into another address and balance the load among different machines (e.g., VMs) that provide the same service (e.g., a web service).

As mentioned above, the managed switching element 3905 implements logical switches (not shown) to which VMs 3910 and 3840-3850 are connected. The managed switching element 3905 also performs a load balancing to distribute workload among the VMs 3840 and 3850. In particular, the managed switching element 3905 translates the destination addresses of the request packets into addresses of the several VMs 3840 and 3850 such that no particular VM of the VMs gets too much more workload than the other VMs do. More details about finding current workload of the service-providing VMs will be described further below.

In some embodiments, the managed switching element 3905 performs an L3 routing 3865 after performing DNAT and load balancing 3860 of the logical processing pipeline. Therefore, the managed switching element 3905 routes the packets to different managed switching elements based on the translated destination addresses. The managed switching elements 3820 and 3825 are edge switching elements and thus send and receive packets to and from the VMs 3840 and 3850 directly. In other embodiments, the managed switching element 3905 performs the L3 routing 3865 before performing DNAT and load balancing 3860 of the logical processing pipeline.

The operation of the managed switching element 3905 would be similar to the example operation described above by reference to FIG. 38, except that the managed switching element 3905 performs the entire logical processing pipeline including the DNAT and load balancing 3860.

Figure 40:
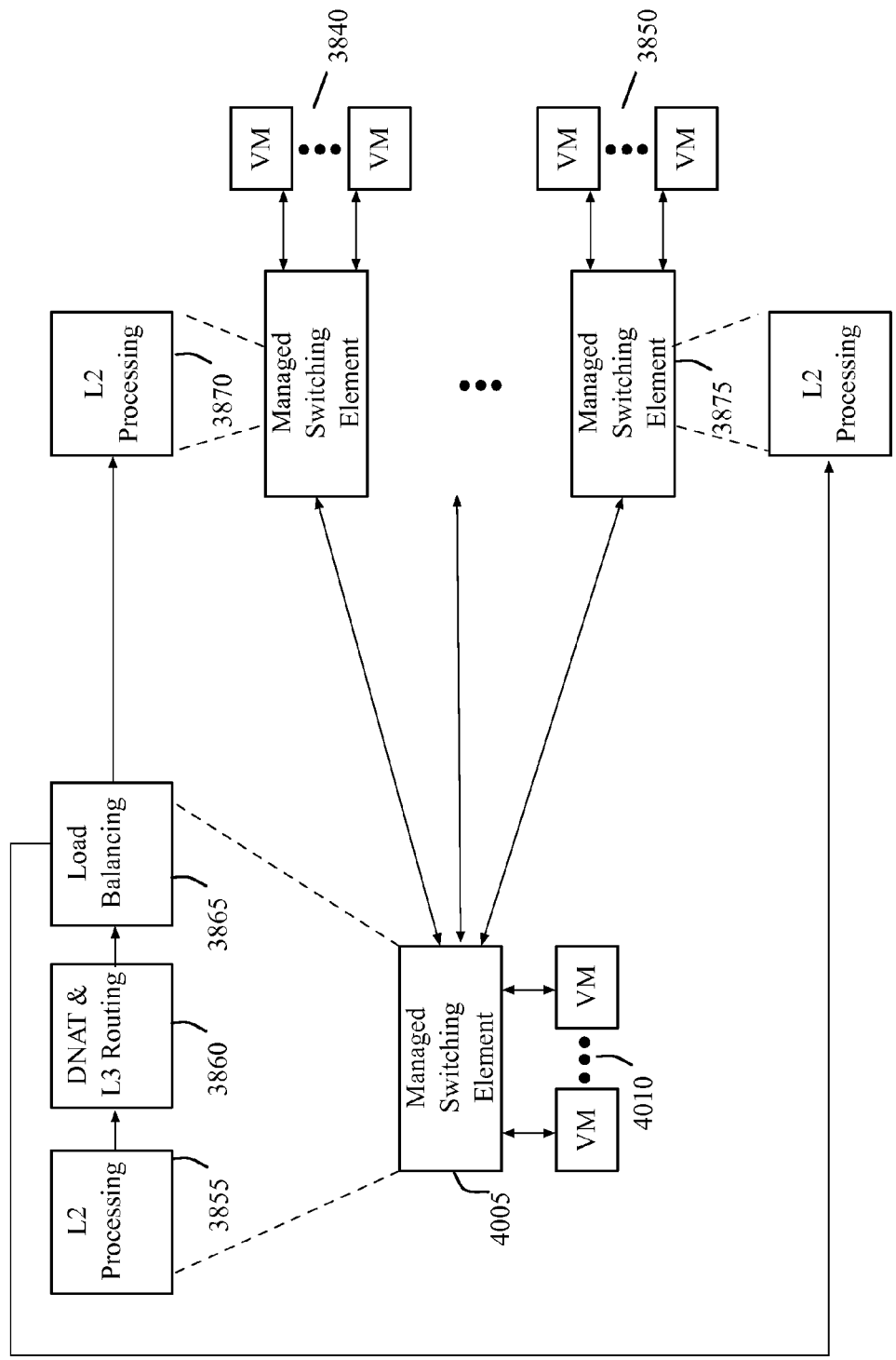
FIG. 40 illustrates yet another example physical implementation of logical switches and a logical router that performs load balancing.

FIG. 40 illustrates yet another example physical implementation of logical switches and a logical router that performs load balancing. In particular, this figure illustrates a distributed L3 routing model in which the logical router is implemented by a managed switching element that also performs source L2 processing. That is, this managed switching element as a first-hop managed switching element performs the source L2 processing and the L3 processing. The destination L2 processing is performed by another managed switching element that is a last-hop managed switching element. This figure illustrates managed switching elements 4005 and 3820-3825 and VMs 4010 and 3840-3850. This figure also illustrates a logical processing pipeline that includes the L2 processing 3855, the DNAT and load balancing 3860, the L3 routing 3865, and the L2 processing 3870-3875.

The managed switching element 4005 of some embodiments is similar to the managed switching elements 2505 described above by reference to FIG. 46 in that the managed switching element 4005 performs the source L2 processing and the L3 processing of the logical processing pipeline. That is, the managed switching element 4005 implements the logical router and a logical switch that is connected to a source machine. In addition, the managed switching element 4005 performs DNAT and load balancing 3860 to translate destination address into another address and balance the load among different machines (e.g., VMs) that provide the same service (e.g., a web service).

As mentioned above, the managed switching element 4005 implements a logical switch (not shown) to which one or more of VMs 4010 are connected. The managed switching element 4005 also performs a load balancing to distribute workload among the VMs 3840 and 3850. In particular, the managed switching element 4005 translates the destination addresses of the request packets into addresses of the several VMs 3840 and 3850 such that no particular VM of the VMs gets too much more workload than the other VMs do. More details about finding the current workload of the service-providing VMs will be described further below.

In some embodiments, the managed switching element 4005 performs an L3 routing 3865 after performing DNAT and load balancing 3860 of the logical processing pipeline. Therefore, the managed switching element 4005 routes the packets to different managed switching elements based on the translated destination addresses. The managed switching elements 3820 and 3825 are edge switching elements and thus send and receive packets to and from the VMs 3840 and 3850 directly. In other embodiments, the managed switching element 4005 performs the L3 routing 3865 before performing DNAT and load balancing 3860 of the logical processing pipeline.

The operation of the managed switching element 4005 would be similar to the example operation described above by reference to FIG. 38, except that different managed switching elements perform different portions of the logical processing pipeline.

Figure 41:
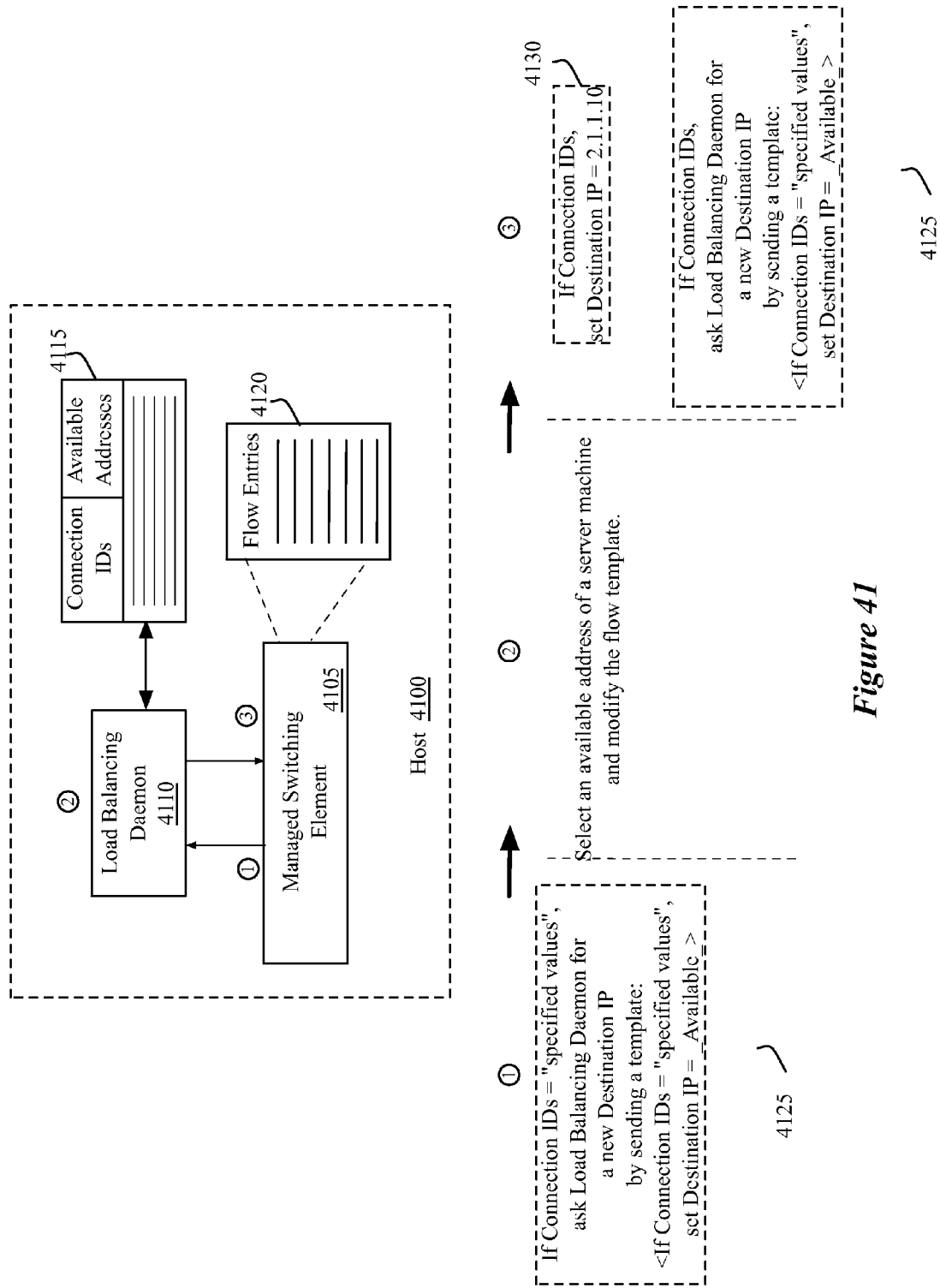
FIG. 41 conceptually illustrates a load balancing daemon that balances load among the machines that collectively provides a service (e.g., web service).

FIG. 41 conceptually illustrates a load balancing daemon that balances load among the machines that collectively provides a service (e.g., web service). Specifically, this figure illustrates that a managed switching element that runs a logical processing pipeline to logically forward and route packets uses a load balancing daemon for balancing workload among the machines providing the service. This figure illustrates a host 4100, a managed switching element 4105, a forwarding table 4120, a load balancing daemon 4110, and a connection table 4115 in the top half of the figure. This figure illustrates flow entries 4125 and 4130.

The flow entries 4125 and 4130 each has a qualifier and an action. The text illustrated as flow entries 4125 and 4130 may not be in an actual format. Rather, the text is just a conceptual illustration of a qualifier and an action pair. The host 4100, in some embodiments, is a machine operated by an operating system (e.g., Windows™ and Linux™) that is capable of running a set of software applications. The managed switching element 4105 of some embodiment is a software switching element (e.g., Open vSwitch) that executes in the host

4100. As mentioned above, a controller cluster (not shown) configures a managed switching element by supplying flow entries that specify the functionality of the managed switching element. The managed switching element 4105 of some embodiments does not itself generate flow entries.

The managed switching element 4105 of some embodiments runs all or part of the logical processing pipeline described above by reference to FIGS. 38-40. In particular, the managed switching element 4105 performs the L3 processing to route packets received from the machines if necessary, based on flow entries in the forwarding table 4120. In some embodiments, the managed switching element 4105 is an edge switching element that receives a packet from a machine (not shown) that is coupled to the managed switching element. In some such embodiments, one or more virtual machines (not shown) are running in the host 4100 and are coupled to the managed switching elements 4105.

When the managed switching element 4105 is configured to perform load balancing, the managed switching element 4105 of some embodiments uses the load balancing daemon 4110 for performing load balancing on packets. The load balancing daemon 4110 is similar to the NAT daemon 3110 in that the load balancing daemon 4110 provides a translated destination address (e.g., a destination IP address). In addition, the load balancing daemon 4110 selects a destination into which to translate the original destination address based on the current load of the machines, the IP addresses of which are included in the table 4115.

The load balancing daemon 4110 of some embodiments is a software application running on the host 4100. The load balancing daemon 4110 maintains the connection table 4115 which includes pairings of connection identifiers and available addresses of the machines that provide the service. Though not depicted, the connection table 4115 of some embodiments may also include the current workload quantified for a machine associated with an address. In some embodiments, the load balancing daemon 4110 periodically communicates with the VMs providing the service to get the updated state of the VMs, including the current workload on the VMs.

When the managed switching element 4105 asks for an address to select based on connection identifiers, the load balancing daemon, in some embodiments, looks up the table 4115 to find the address into which the given destination address should be translated. In some embodiments, the load balancing daemon runs a scheduling method to identify a server VM in order to balance the load among the server VMs. Such a scheduling algorithm considers the current load on the machine associated with the address. More details and examples of load balancing methods are described in the U.S. Provisional Patent Application 61/560,279, which is incorporated herein by reference.

The connection identifiers uniquely identify a connection between the requester of the service (i.e., the origin or source of the packet) and the machine that ends up providing the requested service so that the packets returning from the machine can be accurately relayed back to the requester. The source IP addresses of these returning packets will be translated back to an IP address (referred to as "virtual IP address") that represents a server providing the service. The mapping between these connection identifiers will also be used for the packets that are subsequently sent from the source. In some embodiments, the connection identifiers include a source port, a destination port, a source IP address, a destination IP address, a protocol identifier, etc. The source port is a port from which the packet was sent (e.g., a TCP port). The destination port is a port to which the packet is to be sent. The protocol identifier identifies the type of protocol (e.g., TCP, UDP, etc.) used for formatting the packet.

The managed switching element 4105 and the load balancing daemon 4110 of different embodiments use different techniques to ask for and supply addresses. For instance, the managed switching element 4105 of some embodiments sends a packet, which has an original address but does not have a translated address, to the load balancing daemon. The load balancing daemon 4110 of these embodiments translates the original address into a translated address. The load balancing daemon 4110 sends the packet back to the managed switching element 4105, which will perform logical forwarding and/or routing to send the packet towards the destination machine. In some embodiments, the managed switching element 4105 initially sends metadata, along the with packet that contains an original address to resolve, to the load balancing daemon 4110. This metadata includes information (e.g., register values, logical pipeline state, etc.) that the managed switching element 4105 uses to resume performing the logical processing pipeline when the managed switching element 4105 receives the packet back from the load balancing daemon 4110.

In other embodiments, the managed switching element 4105 of some embodiments requests an address by sending a flow template, which is a flow entry that does not have actual values for the addresses, to the load balancing daemon 4110. The load balancing daemon finds out the addresses to fill in the flow template by looking up the table 4115. The load balancing daemon 4110 then sends the flow template that is filled in with actual addresses back to the managed switching element 4110 by putting the filled-in flow template into the forwarding table 4120. In some embodiments, the load balancing daemon assigns to the filled-in flow template a priority value that is higher than the priority value of the flow template that is not filled in. Moreover, when the load balancing daemon 4110 fails to find a translated address, the load balancing daemon would specify in the flow template to drop the packet.

An example operation of the managed switching element 4105 and the load balancing daemon 4110 will now be described in terms of three different stages 1-3 (encircled 1-3). In this example, the managed switching element 4115 is a managed edge switching element that receives a packet to forward and route from a machine (not shown). In particular, the packet in this example is a request for a service. The packet has an IP address that represents a server that provides the requested service.

The managed switching element 4105 receives this packet and performs the L3 processing based on the flow entries in the forwarding table 4120. While performing the L3 processing 210 on the packet, the managed switching element 4105 (at stage 1) identifies the flow entry 4125 and performs the action specified in the flow entry 4125. As shown, the flow entry 4125 indicates that a flow template having connection identifiers should be sent to the load balancing daemon 4110 to have the load balancing daemon 4110 to provide a new destination IP address. In this example, the flow entry 4125 has a priority value of N, which is a number in some embodiments.

At stage 2, the load balancing daemon 4110 receives the flow template and finds out that the destination IP address of a packet that has the specified connection IDs is to be translated into 2.1.1.10 by looking up the connection table 4115 and by running a scheduling algorithm. The load balancing daemon fills out the flow template and inserts the filled-in template (now the flow entry 4130) into the forwarding table 4130. In this example, the load balancing daemon assigns a priority of N+1 to the filled-in template.

At stage 3, the managed switching element 4110 uses the flow entry 4130 to change the destination IP address for the packet. Also, for the packets that the managed switching element 4110 subsequently processes, the managed switching element 4105 uses flow entry 4130 over the flow entry 4125 when a packet has the specified connection identifiers.

In some embodiments, the load balancing daemon 4110 and the managed switching element run in a same virtual machine that is running on the host 4100 or in different virtual machines running on the host 4100. The load balancing daemon 4110 and the managed switching element may also run in separate hosts.

V. DHCP

The virtualization application, in some embodiments, defines forwarding rules that route DHCP requests to a DHCP daemon that is running in a shared host. Using a shared host for this functionality avoids the extra cost of running a DHCP daemon per customer.

Figure 42:
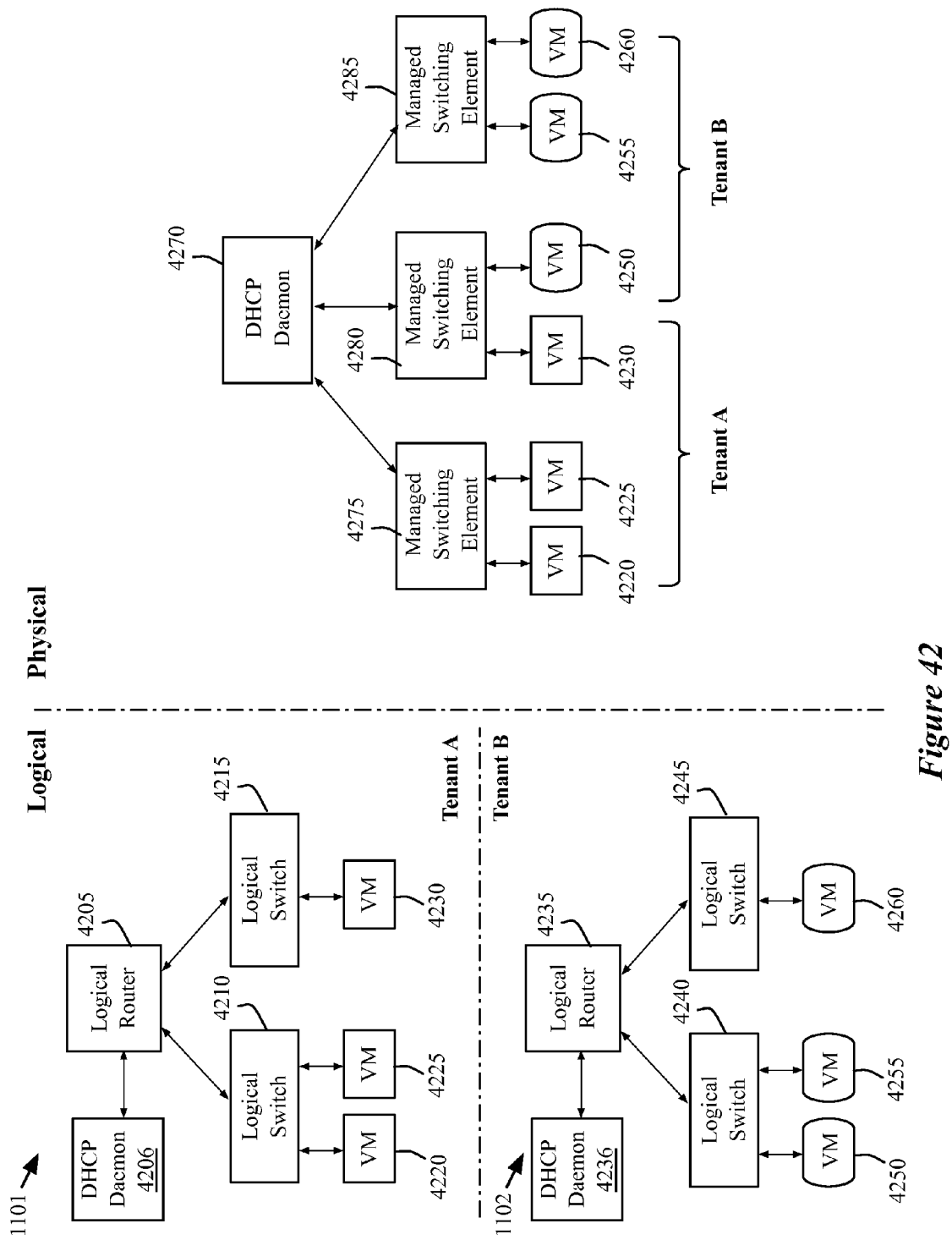
FIG. 42 illustrates a DHCP daemon that provides DHCP service to different logical networks for different users.

FIG. 42 illustrates a DHCP daemon that provides DHCP service to different logical networks for different users. This figure illustrates in the left half of the figure the implementation of example logical networks 4201 and 4202 for two different users A and B, respectively. An example physical implementation of the logical networks 4201 and 4202 is illustrated in the right half of the figure.

As shown in the left half of the figure, the logical network 4201 includes a logical router 4205 and two logical switches 4210 and 4215. VMs 4220 and 4225 are connected to the logical switch 4210. That is, VMs 4220 and 4225 send and receive packets forwarded by the logical switch 4210. VM 4230 is connected to the logical switch 4215. The logical router 4205 routes packets between the logical switches 4210 and 4215. The logical router 4205 is also connected to a DHCP Daemon 4206 which provides DHCP service to the VMs in the logical network 4201, which are VMs of the user A.

The logical network 4202 for the user B includes a logical router 4235 and two logical switches 4240 and 4245. VMs 4250 and 4255 are connected to the logical switch 4240. VM 4260 is connected to the logical switch 4245. The logical router 4235 routes packets between the logical switches 4240 and 4245. The logical router 4235 is also connected to a DHCP Daemon 4236 which provides DHCP service to the VMs in the logical network 4202, which are VMs of the user B.

In the logical implementation shown in the left half of the figure, each logical network for a user has its own DHCP daemon. In some embodiments, the DHCP daemons 4206 and 4236 may be physically implemented as separate DHCP daemons running in different hosts or VMs. That is, each user would have a separate DHCP daemon for the user's machines only.

In other embodiments, the DHCP daemons for different users may be physically implemented as a single DHCP daemon that provides DHCP service to VMs of different users. That is, different users share the same DHCP daemon. The DHCP daemon 4270 is a shared DHCP daemon that serves VMs of both users A and B. As shown in the right half of figure, the managed switching elements 4275-4285 that implement the logical routers 4205 and 4235 and the logical switches 4210, 4215, 4240 and 4245 for users A and B use the single DHCP daemon 4270. Therefore, VMs 4220-4260 of the users A and B use the DHCP daemon 4270 to dynamically obtain an address (e.g., an IP address).

The DHCP daemon 4270 of different embodiments may run in different hosts. For instance, the DHCP daemon 4270 of some embodiments runs in the same host (not shown) in which one of the managed switching elements 4275-4285 is running. In other embodiments, the DHCP daemon 4270 does not run in a host on which a managed switching element is running and instead runs in a separate host that is accessible by the managed switching elements.

Figure 43:
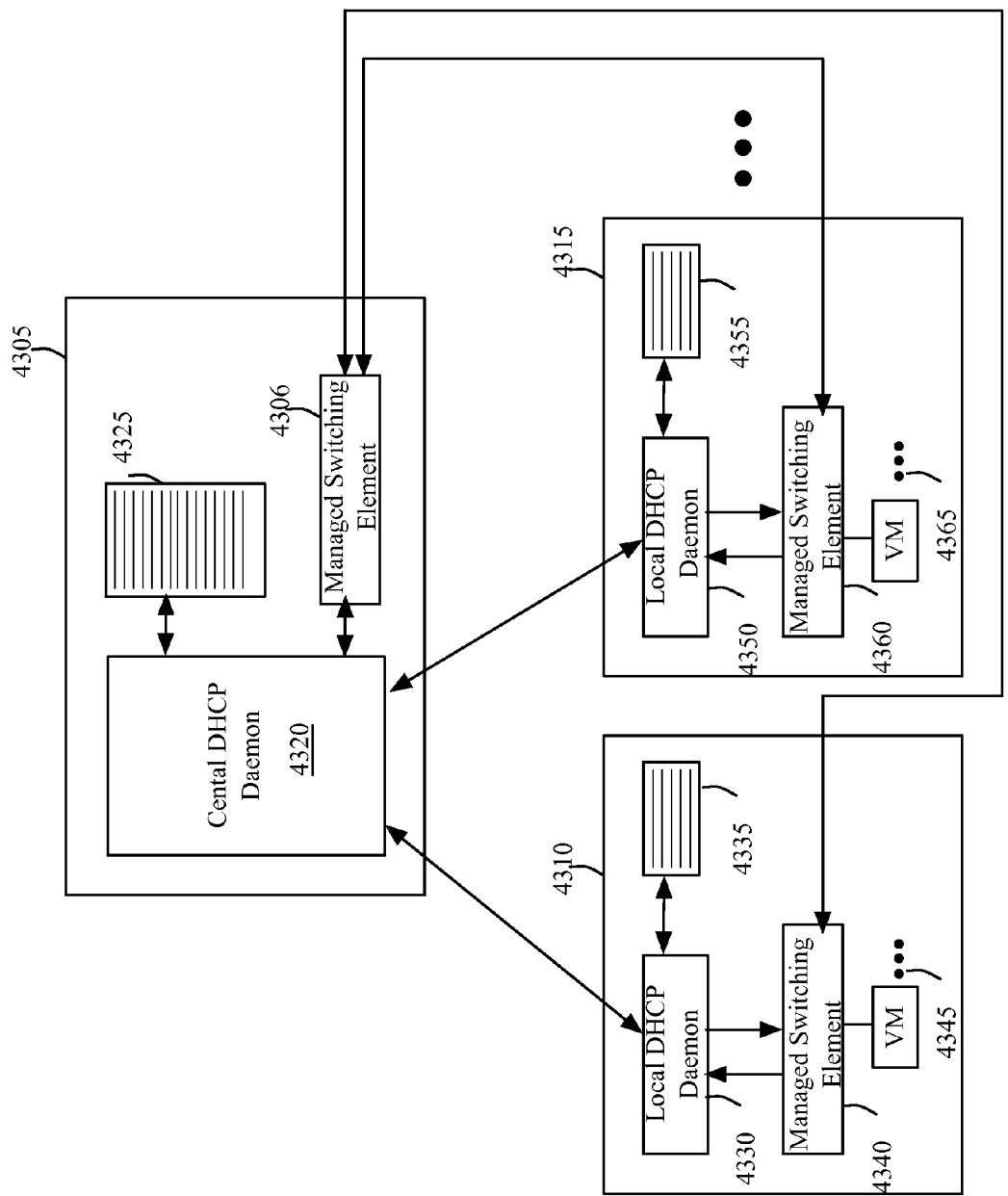
FIG. 43 illustrates a central DHCP daemon and several local DHCP daemons.

FIG. 43 illustrates a central DHCP daemon and several local DHCP daemons. The central DHCP daemon provides DHCP service to VMs of different users through local DHCP daemons. Each local DHCP daemon maintains and manages a batch of addresses to offload the central DHCP daemon's service to the local DHCP daemons. This figure illustrates an example architecture that includes a central DHCP daemon 4320 and two local DHCP daemons 4330 and 4350.

As shown, the central DHCP daemon 4320 runs in a host 4305 in which a managed switching element 4306 also runs. The managed switching element 4306 of some embodiments is a second-level managed switching element functioning as a pool node for managed switching elements 4340 and 4360. The central DHCP daemon 4320 provides DHCP services to different VMs 4345 and 4365 of different users. In some embodiments, the central DHCP daemon 4320 distributes the available addresses (e.g., IP addresses) 4325 in batches of addresses to different local DHCP daemons including local DHCP daemons 4330 and 4350 in order to offload the DHCP service to these local DHCP daemons. The central DHCP daemon 4320 provides more addresses to a local DHCP daemon when the local DHCP daemon runs out of available address to assign in its own batch of addresses.

The local DHCP daemon 4330 runs in a host 4310 in which a managed switching element 4340 also runs. The managed switching element 4340 is an edge switching element that directly sends and receives packets to and from VMs 4345. The managed switching element 4340 implements one or more logical switches and logical routers of different users. That is, the VMs 4345 may belong to different users. The local DHCP daemon 4330 provides DHCP service to VMs 4345 using the batch of addresses 4335 that the local DHCP daemon 4330 obtains from the central DHCP daemon 4320. The local DHCP daemon 4330 resorts to the central DHCP daemon 4320 when the local DHCP daemon 4330 runs out of available addresses to assign in the batch of addresses 4335. In some embodiments, the local DHCP daemon 4330 communicates with the central DHCP daemon 4320 via the managed switching elements 4340 and 4306. The managed switching elements 4340 and 4306 has a tunnel established between them in some embodiments.

Similarly, the local DHCP daemon 4350 runs in a host 4315 in which a managed switching element 4360 also runs. The managed switching element 4360 is an edge switching element that directly sends and receives packets to and from VMs 4365. The managed switching element 4360 implements one or more logical switches and logical routers of different users. The local DHCP daemon 4350 provides DHCP service to VMs 4365 using the batch of addresses 4355 that the local DHCP daemon 4350 obtains from the central DHCP daemon 4320. In some embodiments, the batch of addresses 4355 does not include addresses that are in the batch of addresses 4335 that are allocated to the local DHCP daemon running in the host 4310. The local DHCP daemon 4350 also resorts to the central DHCP daemon 4320 when the local DHCP daemon 4350 runs out of available addresses to assign in its own batch of addresses 4355. In some embodiments, the local DHCP daemon 4350 communicates with the central DHCP daemon 4320 via the managed switching elements 4360 and 4306. The managed switching elements 4360 and 4306 have a tunnel established between them in some embodiments.

VI. Interposing Service VMs

In the discussion above, various L3 services that are provided by the virtualization application of some embodiments were described. To maximize the network control system's flexibility, some embodiments interpose service machines that provide similar functionality to those provided by the "middleboxes" that users use today in the physical networks.

Accordingly, the network control system of some embodiments includes at least one "middlebox" VM that is attached to a LDPS of a logical network. Then the pipeline state of the LDP sets is programmed by the control application (that populates the logical control plane) so that the relevant packets are forwarded to the logical port of this VM. After the VM has processed the packet, the packet is sent back to the logical network so that its forwarding continues through the logical network. In some embodiments, the network control system utilizes many such "middlebox" VMs. The middlebox VMs interposed in this manner may be very stateful and implement features well beyond the L3 services described in this document.

VII. Scalability

The scalability implications of the logical L3 switching design of some embodiments along three dimensions are addressed below. These three dimensions are: (1) logical state, (2) physical tunneling state, and (3) distributed binding lookups. Most of the logical pipeline processing occurs at the first hop. This implies that all the logical (table) state, of all interconnected LDP sets, is disseminated, in some embodiments, to everywhere in the network where the pipeline execution may take place. In other words, the combined logical state of all interconnected LDP sets is disseminated to every managed edge switching element attached to any of these LDP sets in some embodiments. However, in some embodiments, the "meshiness" of the logical topology does not increase the dissemination load of the logical state.

To limit the state dissemination, some embodiments balance the pipeline execution between the source and destination devices so that the last LDPS pipeline would be executed not at the first hop but at the last hop. However, in some cases, this may result in not disseminating enough state for every managed switching element to do the logical forwarding decision of the last LDPS; without that state, the source managed switching elements might not even be able to deliver the packets to the destination managed switching elements. Accordingly, some embodiments will constrain the general LDPS model, in order to balance the pipeline execution between the source and destination devices.

The logical state itself is not likely to contain more than at most O(N) entries (N is the total number of logical ports in the interconnected LDP sets) as the logical control plane is designed, in some embodiments, to mimic the physical control planes that are used today, and the physical control planes are limited by the capabilities of existing hardware switching chipsets. Therefore, disseminating the logical state might not be the primary bottleneck of the system but eventually it might become one, as the logical control plane design grows.

Some embodiments partition the managed switching elements of a network into cliques interconnected by higher-level aggregation switching elements. Instead of implementing partitioning to reduce logical state with an "everything on the first-hop" model, some embodiments partition to reduce the tunneling state, as discussed below. Examples of cliques are described in the above-mentioned U.S. patent application Ser. No. 13/177,535. This application also describes various embodiments that perform all or most of the logical data processing at the first-hop, managed switching elements.

The physical tunneling state maintained in the whole system is $O(N^2)$ where N is the number of logical ports in the interconnected LDP sets total. This is because any managed edge switching element with a logical port has to be able to directly send the traffic to the destination managed edge switching element. Therefore, maintaining tunneling state in an efficient manner, without imposing $O(N^2)$ load to any centralized control element becomes even more important than with pure L2 LDP sets. The aggregation switching elements are used, in some embodiments, to slice the network into cliques. In some of these embodiments, the packet is still logically routed all the way in the source managed edge switching element but instead of tunneling it directly to the destination edge switching element, it is sent to a pool node that routes it towards the destination based on the destination MAC address. In essence, the last L2 LDPS spans multiple cliques, and pool nodes are used to stitch together portions of that L2 domain.

Figure 44:
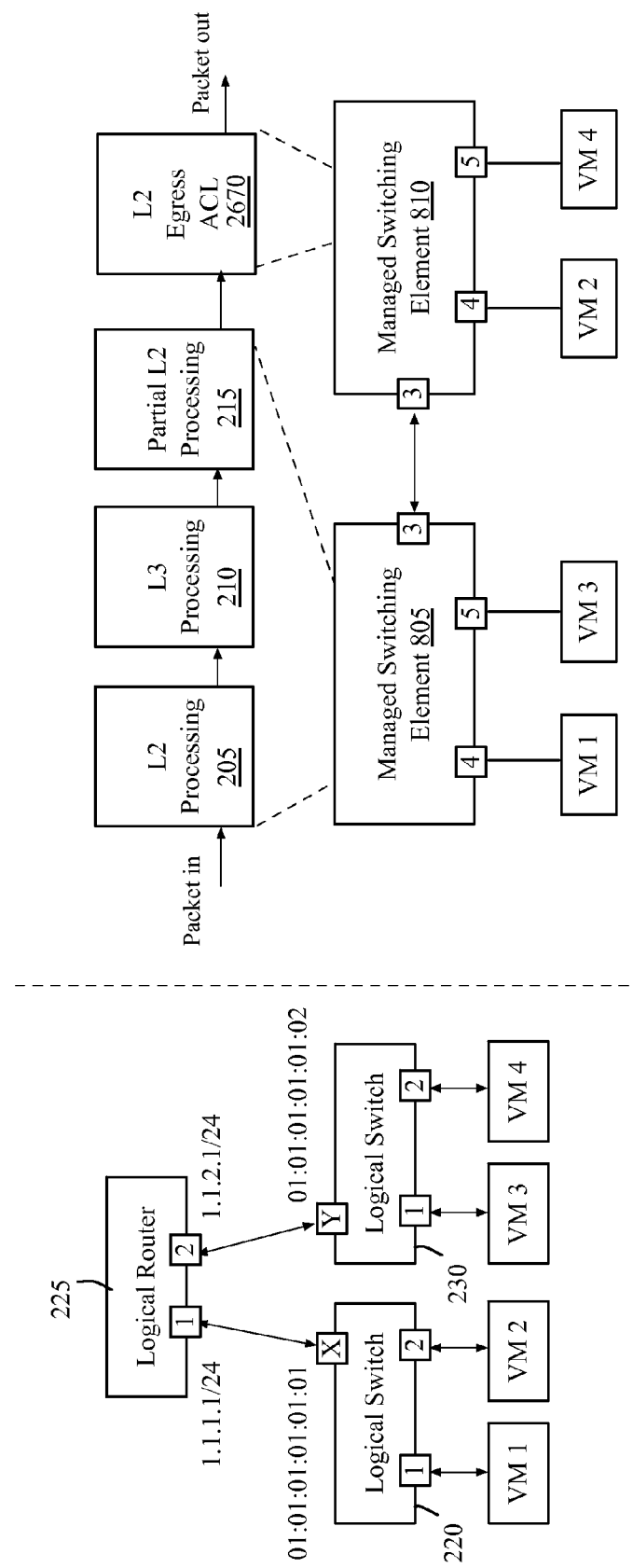
FIG. 44 conceptually illustrates an example of performing some logical processing at the last hop switching element.
Figure 45A:
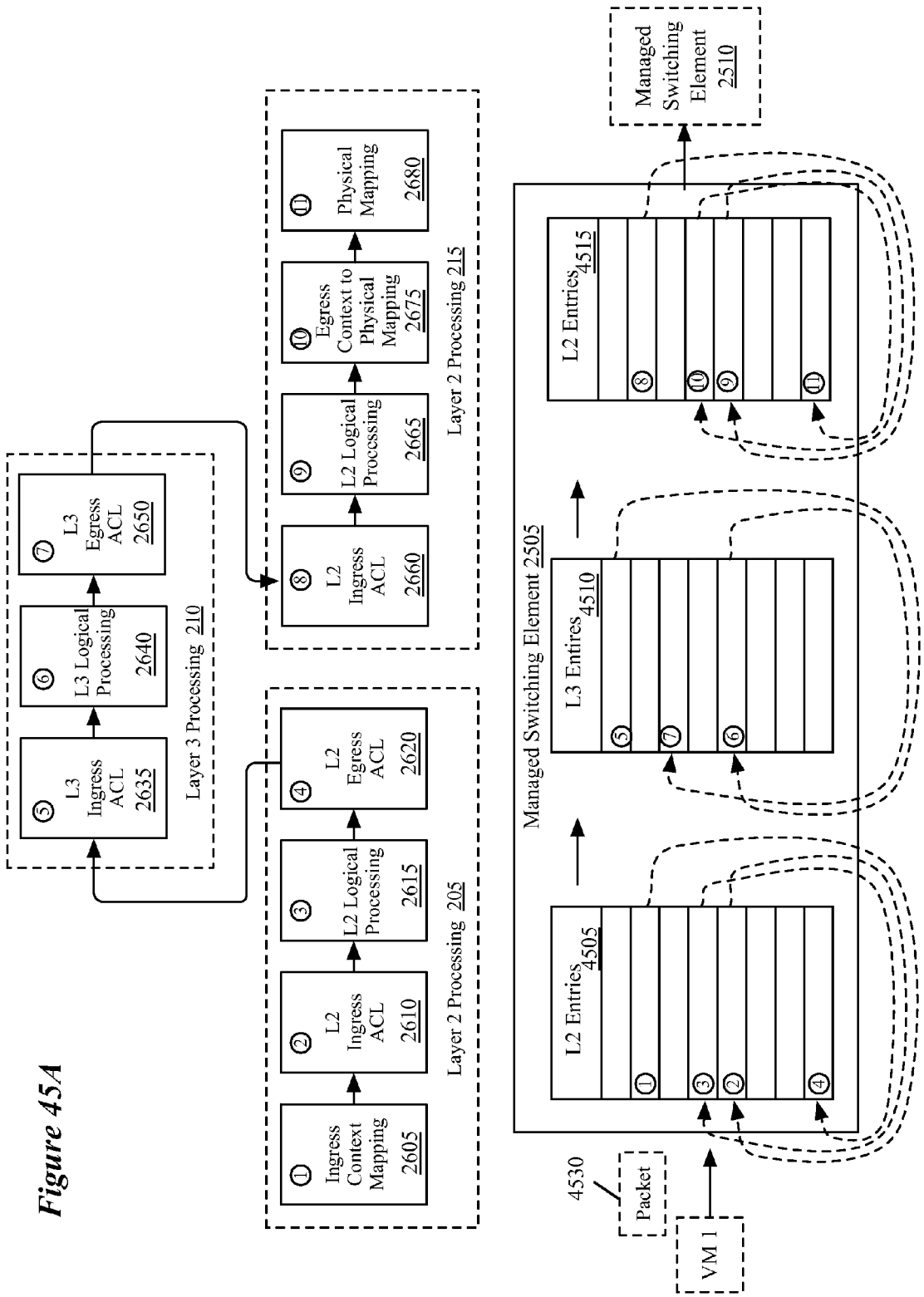
FIGS. 45A-45B conceptually illustrate an example operation of logical switches, a logical router, and managed switching elements described above by reference to FIG. 44.
Figure 45B:
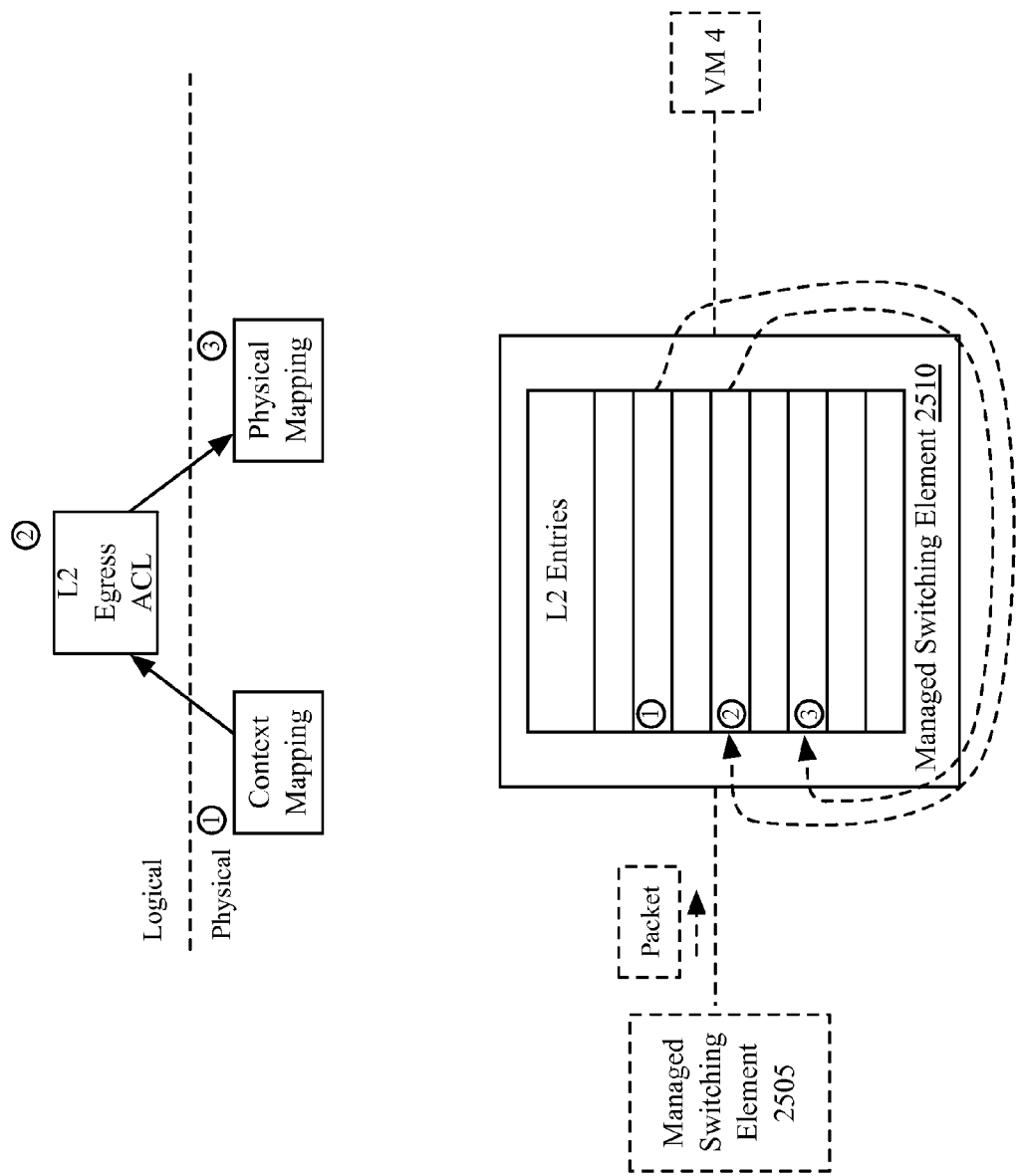

FIGS. 44-45B illustrate a distributed logical router implemented in several managed switching elements based on flow entries of the managed switching elements. In particular, FIGS. 44-45B illustrate that some of the destination L2 processing is performed by a last hop managed switching element (i.e., the switching element that sends a packet directly to a destination machine).

FIG. 44 conceptually illustrates an example of performing some logical processing at the last hop switching element. Specifically, FIG. 44 illustrates that the managed switching element 2505 that is coupled to a source machine for a packet performs most of the logical processing pipeline 200 and the managed switching element 2510 that is coupled to a destination machine performs some of the logical processing pipeline 200. The figure illustrates the logical router 225 and the logical switches 220 and 230 in the left half of the figure. This figure illustrates the managed switching elements 2505 and 2510 in the right half of the figure. The figure illustrates VMs 1-4 in both the right and the left halves of the figure.

In some embodiments, a managed switching element does not keep all the information (e.g., flow entries in lookup tables) to perform the entire logical processing pipeline 200. For instance, the managed switching element of these embodiments does not maintain the information for determining access control with respect to a logical port of the destination logical network through which to send the packet to the destination machine of the packet.

An example packet flow along the managed switching elements 2505 and 2510 will now be described. When VM 1 that is coupled to the logical switch 220 sends a packet to VM 4 that is coupled to the logical switch 230, the packet is first sent to the managed switching element 2505. The managed switching element 2505 then performs the L2 processing 205 and the L3 processing 210 on the packet.

The managed switching element 2505 then performs a portion of the L2 processing 215. Specifically, the managed switching element 2505 determines access control for the packet. For instance, the managed switching element 2505 determines that the packet does not have network addresses (e.g., source/destination MAC/IP addresses, etc.) that will cause the logical switch 230 to reject the packet that came through port Y of the logical switch 230. The managed switching element 2505 then determines that port 1 of the logical switch 230 is the port through which to send the packet out to the destination, VM 4. However, the managed switching element 2505 does not determine access control for the packet with respect to port 1 of the logical switch 230 because the managed switching element 2505, in some embodiments, does not have information (e.g., flow entries) to perform the egress ACL 2670.

The managed switching element 2505 then performs a mapping lookup to determine a physical port to which the logical port 1 of the logical switch 230 is mapped. In this example, the managed switching element 2505 determines that logical port 1 of the logical switch 230 is mapped to port 5 of the managed switching element 2510. The managed switching element 2505 then performs a physical lookup to determine operations for forwarding the packet to the physical port. In this example, the managed switching element 2505 determines that the packet should be sent to VM 4 through port 5 of the managed switching element 2510. The managed switching element 2505 in this example modifies the logical context of the packet before sending it out along with the packet to VM 4.

The managed switching element 2505 sends the packet to the managed switching element 2510. In some cases, the managed switching element 2505 sends the packet over the tunnel that is established between the managed switching elements 2505 and 2510 (e.g., the tunnel that terminates at port 3 of the managed switching element 2505 and port 3 of the managed switching element 2510). When the tunnel is not available, the managed switching elements 2505 sends the packet to a pool node (not shown) so that the packet can reach the managed switching element 2510.

When the managed switching element 2510 receives the packet, the managed switching element 2510 performs the egress ACL 2670 on the packet based on the logical context of the packet (the logical context would indicate that it is the egress ACL 2670 that is left to be performed on the packet). For instance, the managed switching element 2510 determines that the packet does not have network addresses that will cause the logical switch 230 not to send the packet through the port 1 of the logical switch 230. The managed switching element 2510 then sends the packet to VM 4 through port 5 of the managed switching element 2510 as determined by the managed switching element 2505 that performed the L2 processing 215.

FIGS. 45A-45B conceptually illustrate an example operation of the logical switches 220 and 230, the logical router 225, and the managed switching elements 2505 and 2510 described above by reference to FIG. 44. Specifically, FIG. 45A illustrates an operation of the managed switching element 2505, which implements the logical router 225, logical switch 220, and a portion of logical router 230. FIG. 45B illustrates an operation of the managed switching element 2510 that implements a portion of logical switch 230.

As shown in the bottom half of FIG. 45A, the managed switching element 2505 includes L2 entries 4505 and 4515 and L3 entries 4510. These entries are flow entries that a controller cluster (not shown) supplies to the managed switching element 2505. Although these entries are depicted as three separate tables, the tables do not necessarily have to be separate tables. That is, a single table may include all these flow entries.

When VM 1 that is coupled to the logical switch 220 sends a packet 4530 to VM 4 that is coupled to the logical switch 230, the packet is first sent to the managed switching element 2505 through port 4 of the managed switching element 2505. The managed switching element 2505 performs an L2 processing on the packet based on the forwarding tables 4505-4515 of the managed switching element 2505. In this example, the packet 4530 has a destination IP address of 1.1.2.10, which is the IP address of VM 4. The packet 4530's source IP address is 1.1.1.10. The packet 4530 also has VM 1's MAC address as a source MAC address and the MAC address of the logical port 1 (e.g., 01:01:01:01:01:01) of the logical router 225 as a destination MAC address.

The operation of the managed switching element 2505 until the managed switching element identifies an encircled 9 and performs L2 logical processing 2665 is similar to the operation of the managed switching element 2505 in the example of FIG. 30A, except that the managed switching element 2505 in the example of FIG. 45A is performed on packet 4530.

Based on the logical context and/or other fields stored in the packet 4530's header, the managed switching element 2505 then identifies a record indicated by an encircled 10 (referred to as "record 10") in the L2 entries 4515 that implements the context mapping of the stage 2675. In this example, the record 10 identifies port 5 of the managed switching element 2510 to which VM 4 is coupled as the port that corresponds to the logical port (determined at stage 2665) of the logical switch 230 to which the packet 4530 is to be forwarded. The record 10 additionally specifies that the packet 4530 be further processed by the forwarding tables (e.g., by sending the packet 4530 to a dispatch port).

Based on the logical context and/or other fields stored in the packet 4530's header, the managed switching element 2505 then identifies a record indicated by an encircled 11 (referred to as "record 11") in the L2 entries 4515 that implements the physical mapping of the stage 2680. The record 11 specifies port 3 of the managed switching element 2505 as a port through which the packet 4530 is to be sent in order for the packet 4530 to reach the managed switching element 2510. In this case, the managed switching element 2505 is to send the packet 4530 out of port 3 of managed switching element 2505 that is coupled to the managed switching element 2510.

As shown in FIG. 45B, the managed switching element 2510 includes a forwarding table that includes rules (e.g., flow entries) for processing and routing the packet 4530. When the managed switching element 2510 receives the packet 4530 from the managed switching element 805, the managed switching element 2510 begins processing the packet 4530 based on the forwarding tables of the managed switching element 2510. The managed switching element 2510 identifies a record indicated by an encircled 1 (referred to as "record 1") in the forwarding tables that implements the context mapping. The record 1 identifies the packet 4530's logical context based on the logical context that is stored in the packet 4530's header. The logical context specifies that the packet 4530 has been processed up to the stage 2665 by the managed switching element 805. As such, the record 1 specifies that the packet 4530 be further processed by the forwarding tables (e.g., by sending the packet 4530 to a dispatch port).

Next, the managed switching element 2510 identifies, based on the logical context and/or other fields stored in the packet 4530's header, a record indicated by an encircled 2 (referred to as "record 2") in the forwarding tables that implements the egress ACL. In this example, the record 2 allows the packet 4530 to be further processed and, thus, specifies the packet 4530 be further processed by the forwarding tables (e.g., by sending the packet 4530 to a dispatch port). In addition, the record 2 specifies that the managed switching element 2510 store the logical context (i.e., the packet 4530 has been processed for L2 egress ACL of the logical switch 230) of the packet 4530 in the set of fields of the packet 4530's header.

Next, the managed switching element 2510 identifies, based on the logical context and/or other fields stored in the packet 4530's header, a record indicated by an encircled 3 (referred to as "record 3") in the forwarding tables that implements the physical mapping. The record 3 specifies the port 5 of the managed switching element 2510 through which the packet 4530 is to be sent in order for the packet 4530 to reach VM 4. In this case, the managed switching element 2510 is to send the packet 4530 out of port 5 of managed switching element 2510 that is coupled to VM 4. In some embodiments, the managed switching element 2510 removes the logical context from the packet 4530 before sending the packet to VM 4.

Figure 46:
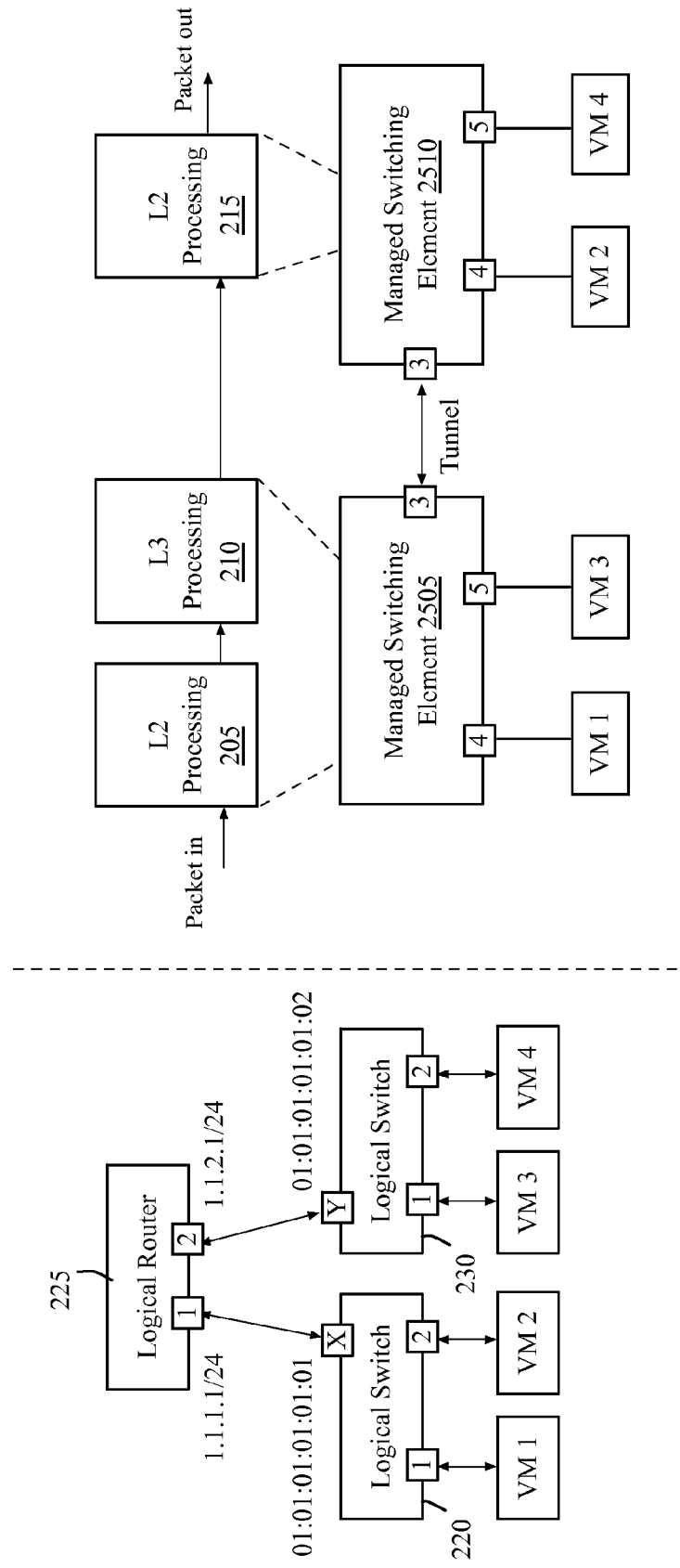
FIG. 46 conceptually illustrates an example of performing some logical processing at the last hop switching element.
Figure 47A:
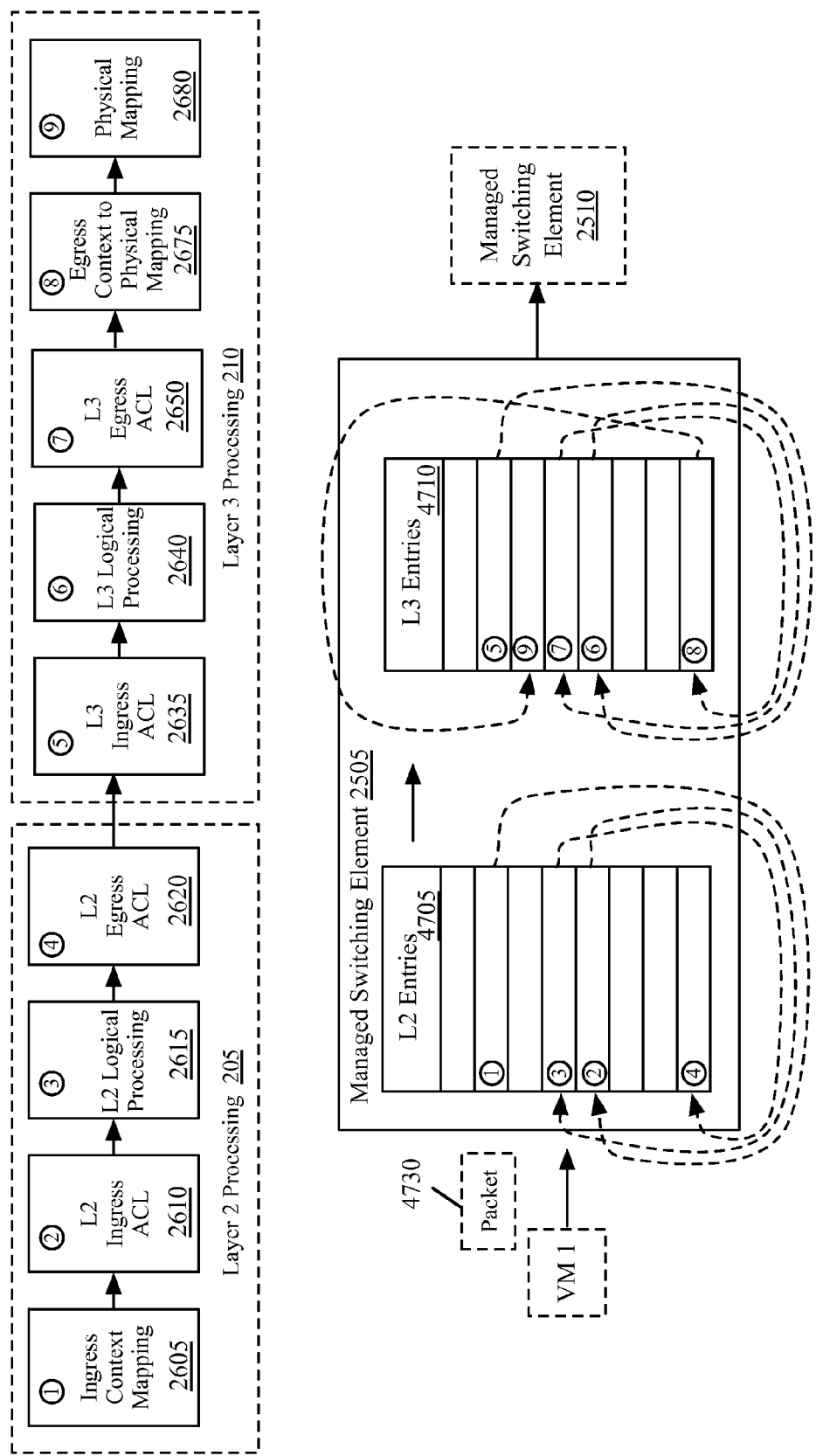
FIGS. 47A-47B conceptually illustrate an example operation of logical switches, a logical router, and managed switching elements described above by reference to FIG. 46.
Figure 47B:
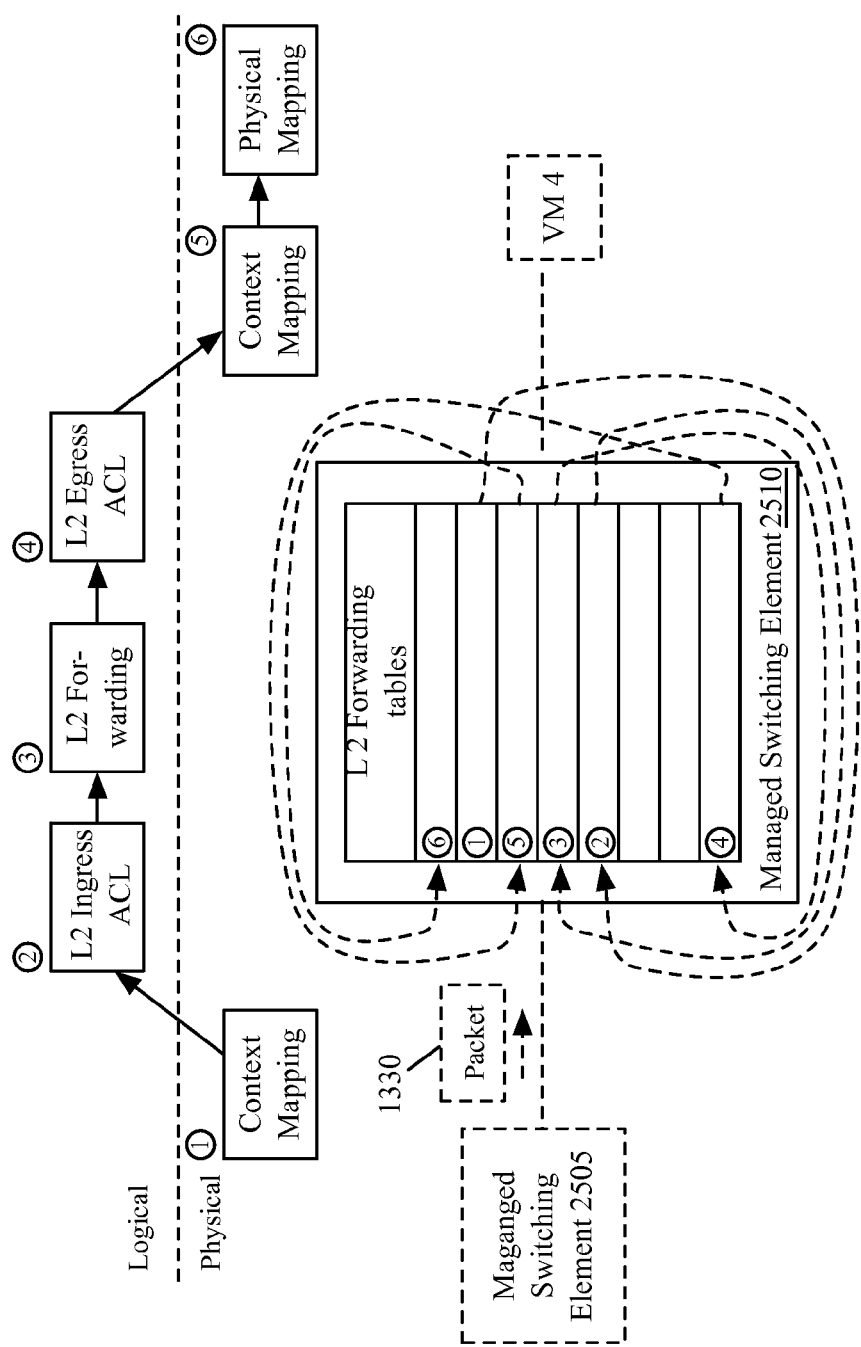

FIGS. 46-47B illustrate a distributed logical router implemented in several managed switching elements based on flow entries of the managed switching elements. In particular, FIGS. 46-47B illustrate that the source L2 processing 205 and L3 processing 210 are performed by a first hop managed switching element (i.e., the switching element that receives a packet directly from a source machine) and the entire destination L2 processing 215 is performed by a last hop managed switching element (i.e., the switching element that sends a packet directly to a destination machine).

FIG. 46 conceptually illustrates an example of performing some logical processing at the last hop switching element. Specifically, FIG. 46 illustrates that the managed switching element 2505 that is coupled to a source machine for a packet performs the L2 processing 205 and the L3 processing 210 and the managed switching element 2510 that is coupled to a destination machine performs the L2 processing 215. That is, the managed switching element 2505 performs L2 forwarding for the source logical network and the L3 routing and the L2 forwarding for the destination logical network is performed by the managed switching element 2510. The figure illustrates the logical router 225 and the logical switches 220 and 230 in the left half of the figure. This figure illustrates the managed switching elements 2505 and 2510 in the right half of the figure. The figure illustrates VMs 1-4 in both the right and the left halves of the figure.

In some embodiments, a managed switching element does not keep all the information (e.g., flow entries in lookup tables) to perform the entire logical processing pipeline 200. For instance, the managed switching element of these embodiments does not maintain the information for performing logical forwarding for the destination logical network on the packet.

An example packet flow along the managed switching elements 2505 and 2510 will now be described. When VM 1 that is coupled to the logical switch 220 sends a packet to VM 4 that is coupled to the logical switch 230, the packet is first sent to the managed switching element 2505. The managed switching element 2505 then performs the L2 processing 205 and the L3 processing 210 on the packet.

The managed switching element 2505 sends the packet to the managed switching element 2510. In some cases, the managed switching element 2505 sends the packet over the tunnel that is established between the managed switching elements 2505 and 2510 (e.g., the tunnel that terminates at port 3 of the managed switching element 2505 and port 3 of the managed switching element 2510). When the tunnel is not available, the managed switching elements 2505 sends the packet to a pool node (not shown) so that the packet can reach the managed switching element 2510.

When the managed switching element 2510 receives the packet, the managed switching element 2510 performs the L2 processing 215 on the packet based on the logical context of the packet (the logical context would indicate that it is the entire L2 processing 215 that is left to be performed on the packet). The managed switching element 2510 then sends the packet to VM 4 through port 5 of the managed switching element 2510.

FIGS. 47A-47B conceptually illustrate an example operation of the logical switches 220 and 230, the logical router 225, and the managed switching elements 2505 and 2510 described above by reference to FIG. 46. Specifically, FIG. 47A illustrates an operation of the managed switching element 2505, which implements the logical switch 220 and the logical router 225. FIG. 47B illustrates an operation of the managed switching element 2505 that implements the logical switch 230.

As shown in the bottom half of FIG. 47A, the managed switching element 2505 includes L2 entries 4705 and L3 entries 4710. These entries are flow entries that a controller cluster (not shown) supplies to the managed switching element 2505. Although these entries are depicted as two separate tables, the tables do not necessarily have to be separate tables. That is, a single table may include all these flow entries.

When VM 1 that is coupled to the logical switch 220 sends a packet 4730 to VM 4 that is coupled to the logical switch 230, the packet is first sent to the managed switching element 2505 through port 4 of the managed switching element 2505. The managed switching element 2505 performs an L2 processing on the packet based on the forwarding tables 4705-4710 of the managed switching element 2505. In this example, the packet 4730 has a destination IP address of 1.1.2.10, which is the IP address of VM 4. The packet 4730's source IP address is 1.1.1.10. The packet 4730 also has VM 1's MAC address as a source MAC address and the MAC address of the logical port 1 (e.g., 01:01:01:01:01:01) of the logical router 225 as a destination MAC address.

The operation of the managed switching element 2505 until the managed switching element identifies an encircled 7 and performs L3 egress ACL with respect to the port 2 of the logical router 225 is similar to the operation of the managed switching element 2505 in the example of FIG. 47A, except that the managed switching element 2505 in the example of FIG. 47A is performed on packet 4730.

Based on the logical context and/or other fields stored in the packet 4730's header, the managed switching element 2505 then identifies a record indicated by an encircled 8 (referred to as "record 8") in the L2 entries 4710 that implements the physical mapping of the stage 2680. The record 8 specifies that the logical switch 230 is implemented in the managed switching element 2510 and the packet should be sent to the managed switching element 2510.

Based on the logical context and/or other fields stored in the packet 4730's header, the managed switching element 2505 then identifies a record indicated by an encircled 9 (referred to as "record 9") in the L2 entries 4715 that implements the physical mapping of the stage 2680. The record 9 specifies port 3 of the managed switching element 2505 as a port through which the packet 4730 is to be sent in order for the packet 4730 to reach the managed switching element 2510. In this case, the managed switching element 2505 is to send the packet 4730 out of port 3 of managed switching element 2505 that is coupled to the managed switching element 2510.

As shown in FIG. 47B, the managed switching element 2510 includes a forwarding table that includes rules (e.g., flow entries) for processing and routing the packet 4730. When the managed switching element 2510 receives the packet 4730 from the managed switching element 2510, the managed switching element 2510 begins processing the packet 4730 based on the forwarding tables of the managed switching element 2510. The managed switching element 2510 identifies a record indicated by an encircled 1 (referred to as "record 1") in the forwarding tables that implements the context mapping. The record 1 identifies the packet 4730's logical context based on the logical context that is stored in the packet 4730's header. The logical context specifies that the L2 processing 205 and the L3 processing 210 have been performed on the packet 4730 by the managed switching element 810. The record 1 specifies that the packet 4730 be further processed by the forwarding tables (e.g., by sending the packet 4730 to a dispatch port).

Based on the logical context and/or other fields stored in the packet 4730's header, the managed switching element 2510 identifies a record indicated by an encircled 2 (referred to as "record 2") in the L2 forwarding table that implements the L2 ingress ACL. In this example, the record 2 allows the packet 4730 to come through the logical port Y of the logical switch 230 (not shown) and, thus, specifies the packet 4730 be further processed by the managed switching element 2510 (e.g., by sending the packet 4730 to a dispatch port). In addition, the record 2 specifies that the managed switching element 2510 store the logical context (i.e., the packet 4730 has been processed by the stage 4762 of the processing pipeline 4700) of the packet 4730 in the set of fields of the packet 4730's header.

Next, the managed switching element 2510 identifies, based on the logical context and/or other fields stored in the packet 4730's header, a record indicated by an encircled 3 (referred to as "record 3") in the L2 forwarding table that implements the logical L2 forwarding. The record 3 specifies that a packet with the MAC address of VM 4 as destination MAC address should be forwarded through a logical port 2 of the logical switch 230 that is connected to VM 4.

The record 3 also specifies that the packet 4730 be further processed by the forwarding tables (e.g., by sending the packet 4730 to a dispatch port). Also, the record 3 specifies that the managed switching element 2510 store the logical context (i.e., the packet 4730 has been processed by the stage 4766 of the processing pipeline 4700) in the set of fields of the packet Next, the managed switching element 2510 identifies, based on the logical context and/or other fields stored in the packet 4730's header, a record indicated by an encircled 4 (referred to as "record 4") in the forwarding tables that implements the egress ACL. In this example, the record 4 allows the packet 4730 to be further processed and, thus, specifies the packet 4730 be further processed by the forwarding tables (e.g., by sending the packet 4730 to a dispatch port). In addition, the record 4 specifies that the managed switching element 2510 store the logical context (i.e., the packet 4730 has been processed for L2 egress ACL of the logical switch 230) of the packet 4730 in the set of fields of the packet 4730's header.

Based on the logical context and/or other fields stored in the packet 4730's header, the managed switching element 2505 then identifies a record indicated by an encircled 5 (referred to as "record 5") in the L2 entries 4715 that implements the context mapping. In this example, the record 5 identifies port 5 of the managed switching element 2510 to which VM 4 is coupled as the port that corresponds to the logical port 2 of the logical switch 230 to which the packet 4730 is to be forwarded. The record 5 additionally specifies that the packet 4730 be further processed by the forwarding tables (e.g., by sending the packet 4730 to a dispatch port).

Next, the managed switching element 2510 identifies, based on the logical context and/or other fields stored in the packet 4730's header, a record indicated by an encircled 6 (referred to as "record 6") in the forwarding tables that implements the physical mapping. The record 6 specifies the port 5 of the managed switching element 2510 through which the packet 4730 is to be sent in order for the packet 4730 to reach VM 4. In this case, the managed switching element 2510 is to send the packet 4730 out of port 5 of managed switching element 2510 that is coupled to VM 4. In some embodiments, the managed switching element 2510 removes the logical context from the packet 4730 before sending the packet to VM 4.

The execution of all the pipelines on the logical path of a packet has implications to the distributed lookups, namely ARP and learning. As the lookups can now be executed by any edge switching element having a logical port attached to the logical network, the total volume of the lookups is going to exceed the lookups executed on a similar physical topology; even though the packet would head towards the same port, differing senders cannot share the cached lookup state, as the lookups will be initiated on different managed edge switching elements. Hence, the problems of flooding are amplified by the logical topology and a unicast mapping based approach for lookups is preferred in practice.

By sending a special lookup packet towards a cloud of mapping servers (e.g., pool or root nodes), the source edge switching element can do the necessary lookups without resorting to flooding. In some embodiments, the mapping server benefits from heavy traffic aggregate locality (and hence good cache hit ratios on client side) as well as from datapath-only implementation resulting in excellent throughput.

Figure 48:
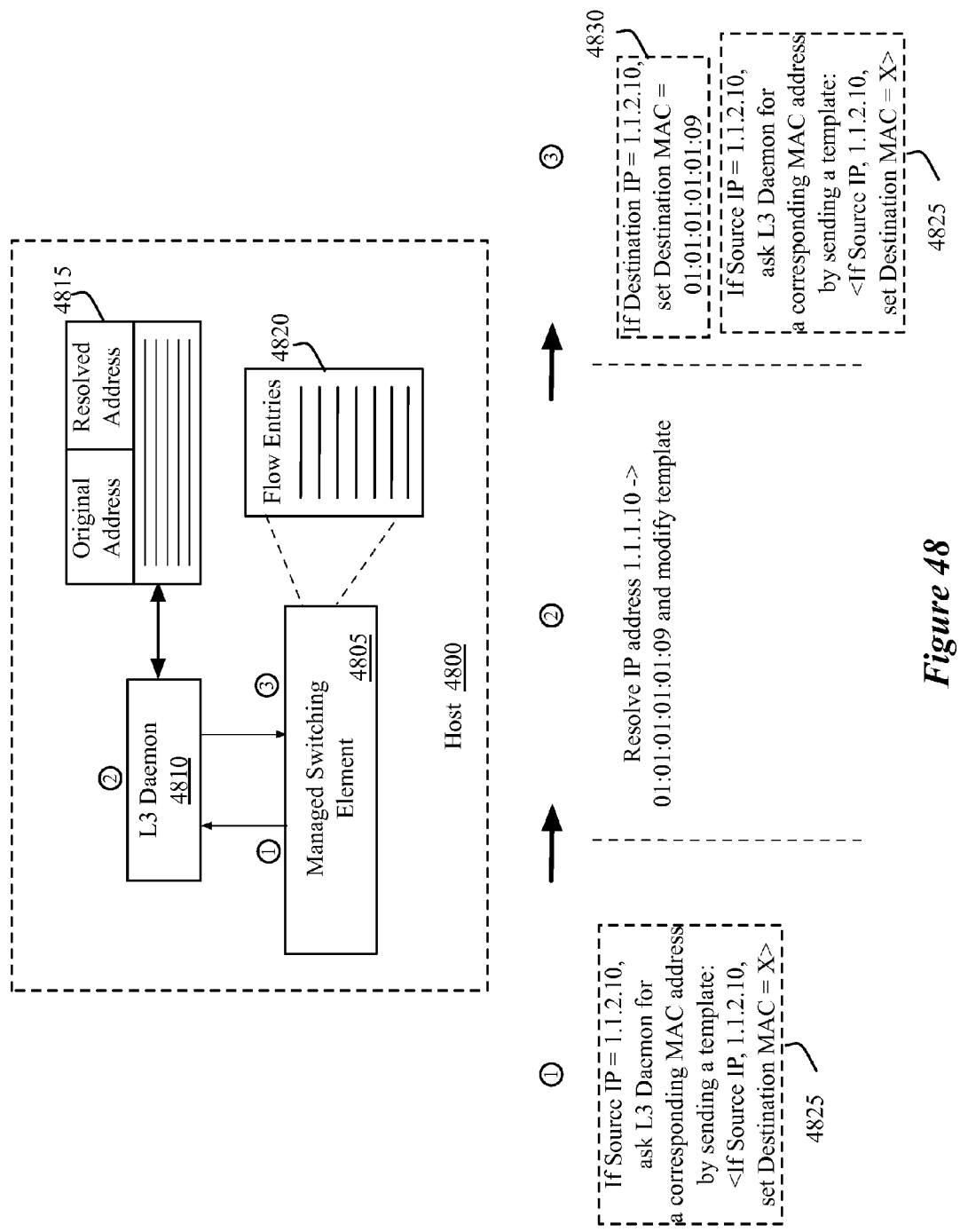
FIG. 48 conceptually illustrates an example software architecture of a host on which a managed switching element runs.

FIG. 48 conceptually illustrates an example software architecture of a host 4800 on which a managed switching element runs. Specifically, this figure illustrates that the host 4800 also runs an L3 daemon that resolves an L3 address (e.g., an IP address) into an L2 address (e.g., a MAC address) for a packet that the L3 daemon receives from the managed switching element. This figure illustrates that the host 4800 includes a managed switching element 4805, a forwarding table 4820, an L3 daemon 4810, and a mapping table 4815 in the top half of the figure. This figure also illustrates flow entries 4825 and 4830.

The flow entries 4825 and 4830 each has a qualifier and an action. The text illustrated as flow entries 4825 and 4830 may not be an actual format. Rather, the text is just a conceptual illustration of a qualifier and an action pair. In some embodiments, flow entries have priorities and a managed switching element takes the action of the flow entry with the highest priority when qualifiers for more than one flow entry are satisfied.

The host 4800, in some embodiments, is a machine operated by an operating system (e.g., Windows™ and Linux™) that is capable of running a set of software applications. The managed switching element 4805 of some embodiment is a software switching element (e.g., Open vSwitch) that executes in the host 4800. As mentioned above, a controller cluster (not shown) configures a managed switching element by supplying flow entries that specify the functionality of the managed switching element. The managed switching element 4805 of some embodiments does not itself generate flow entries and ARP requests.

The managed switching element 4805 of some embodiments runs all or part of the logical processing pipeline 200 described above. In particular, the managed switching element 4805 is a managed switching element (e.g., the managed switching elements 1720 or 2505) that performs the L3 processing 210 to route packets received from the machines as necessary, based on flow entries in the forwarding table 4820.

In some embodiments, the managed switching element 4805 is an edge switching element that receives a packet from a machine (not shown) that is coupled to the managed switching element. In some such embodiments, one or more virtual machines (not shown) are running in the host 4800 and are coupled to the managed switching elements 4805. In other embodiments, the managed switching element is a second-level managed switching element.

When the managed switching element 4805 receives a packet that is the very first packet being sent to a destination machine that is in another logical network (or the packet itself is an ARP request), the managed switching element 4805 of these embodiments would not yet know the MAC address of the destination machine. In other words, the managed switching element 4805 would not know the mapping between the next-hop IP address and the destination MAC address. In order to resolve the next-hop IP address into the destination MAC address, the managed switching element 4805 of some embodiments requests the destination MAC address of the packet from the L3 daemon 4810.

The L3 daemon 4810 of some embodiments is a software application running on the host 4800. The L3 daemon 4810 maintains the table 4815 which includes mappings of IP and MAC addresses. When the managed switching element 4805 asks for a destination MAC address that corresponds to a next-hop IP address, the L3 daemon looks up the mapping table 4815 to find the destination MAC address to which the source IP address is mapped. (In some cases, the destination MAC address to which the source IP address is mapped is the MAC address of the next-hop logical router).

The managed switching element 4805 and the L3 daemon 4810 of different embodiments uses different techniques to ask for and supply addresses. For instance, the managed switching element 4805 of some embodiments sends a packet, which has a destination IP address but does not have a destination MAC address, to the L3 daemon. The L3 daemon 4810 of these embodiments resolves the IP address into a destination MAC address. The L3 daemon 4810 sends the packet back to the managed switching element 4805, which will perform logical forwarding and/or routing to send the packet towards the destination machine. In some embodiments, the managed switching element 4805 initially sends metadata, along the packet that contains a destination IP address to resolve, to the L3 daemon 4810. This metadata includes information (e.g., register values, logical pipeline state, etc.) that the managed switching element 4805 uses to resume performing the logical processing pipeline when the managed switching element 4805 receives the packet back from the L3 daemon 4810.

In other embodiments, the managed switching element 4805 requests a destination address by sending a flow template, which is a flow entry that does not have actual value for the destination MAC addresses, to the L3 daemon 4810. The L3 daemon 4810 finds the destination MAC addresses to fill in the flow template by looking up the mapping table 4815. The L3 daemon 4810 then sends the flow template that is filled in with actual destination MAC addresses back to the managed switching element 4810 by putting the filled-in flow template into the forwarding table 4820. In some embodiments, the L3 daemon assigns the filled-in flow template a priority value that is higher than the priority value of the flow template that is not filled in.

When the mapping table 4815 has an entry for the destination IP address and the entry has the destination MAC address mapped to the destination IP address, the L3 daemon 4810 uses the destination MAC address to write in the packet or fill in the flow template. When there is no such entry, the L3 daemon generates an ARP request and broadcasts the ARP packet to other hosts or VMs that run L3 daemons. In particular, the L3 daemon of some embodiments only sends the ARP requests to those hosts or VMs to which the next-hop logical L3 router may be attached. The L3 daemon receives a response to the ARP packet that contains the destination MAC address from one of the hosts or VMs that received the ARP packet. The L3 daemon 4810 maps the destination IP address to the destination MAC address and adds this mapping to the mapping table 4815. In some embodiments, the L3 daemon 4810 sends a unicast packet periodically to another L3 daemon that responded to the ARP request to check the validity of the destination MAC address. In this manner, the L3 daemon 4810 keeps the IP and MAC addresses mapping up to date.

In some embodiments, when the L3 daemon 4810 still fails to find a resolved address after looking up the flow entries and sending ARP requests to other L3 daemon instances, the L3 daemon would specify in the flow template to drop the packet or the L3 daemon itself will drop the packet.

When the managed switching element 4805 receives an ARP packet from another host or VM, the managed switching element 4805 of some embodiments does not forward the ARP packet to the machines that are coupled to the managed switching element. The managed switching element 4800 in these embodiments sends the ARP packet to the L3 daemon. The L3 daemon maintains in the mapping table 4815 mapping between IP addresses and MAC addresses that are locally available (e.g., IP addresses and MAC addresses of the machines that are coupled to the managed switching element 4805). When the mapping table 4815 has an entry for the IP address of the received ARP packet and the entry has a MAC address of a VM that is coupled to the managed switching element 4805, the L3 daemon sends the MAC address, in the response to the ARP packet, to the host or VM (i.e., the L3 daemon of the host or VM) from which the ARP packet originates.

An example operation of the managed switching element 4805 and the L3 daemon 4810 will now be described in terms of three different stages 1-3 (encircled 1-3). In this example, the managed switching element 4805 is a managed edge switching element that receives a packet to forward and route from a machine (not shown). The managed switching element 4805 receives a packet and performs the logical processing 200 based on the flow entries in the forwarding table 4820.

When the packet is the very first packet that bears the IP address of the destination machine or the packet is an ARP request from a source machine, the managed switching element 4820 (at stage 1) identifies the flow entry 4825 and performs the action specified in the flow entry 4825. As shown, the flow entry 4825 indicates that a flow template having a destination IP address 1.1.2.10 to be resolved to a destination MAC X should be sent to the L3 daemon 4810. In this example, the flow entry 4825 has a priority value of N, which is a number in some embodiments.

At stage 2, the L3 daemon 4810 receives the flow template and finds out that 1.1.2.10 is to be resolved to 01:01:01:01:01:09 by looking up the mapping table 4815. The L3 daemon fills out the flow template and inserts the filled-in template (now the flow entry 4830) into the forwarding table 4830. In this example, the L3 daemon assigns a priority of N+1 to the filled-in template.

At stage 3, the managed switching element 4810, in some embodiments, uses the flow entry 4830 to set the destination MAC address for the packet. Also, for the packets that the managed switching element 4810 subsequently processes, the managed switching element 4805 uses flow entry 4830 over the flow entry 4825 when a packet has the destination IP address of 1.1.2.10.

In some embodiments, the L3 daemon 4810 and the managed switching element runs in a same virtual machine that is running on the host 4800 or in different virtual machines running on the host 4800. In some embodiments, the L3 daemon 4810 runs in the user space of a virtual machine. The L3 daemon 4810 and the managed switching element may also run in separate hosts.

In some embodiments, the managed switching element 4805 does not rely on the L3 daemon 4810 to resolve addresses. In some such embodiments, the control cluster (not shown in FIG. 48) may statically configure the flow entries 4820 such that the flow entries 4820 include the mappings between IP addresses to MAC addresses obtained through API calls (i.e., inputs) or DHCP.

Figure 49:
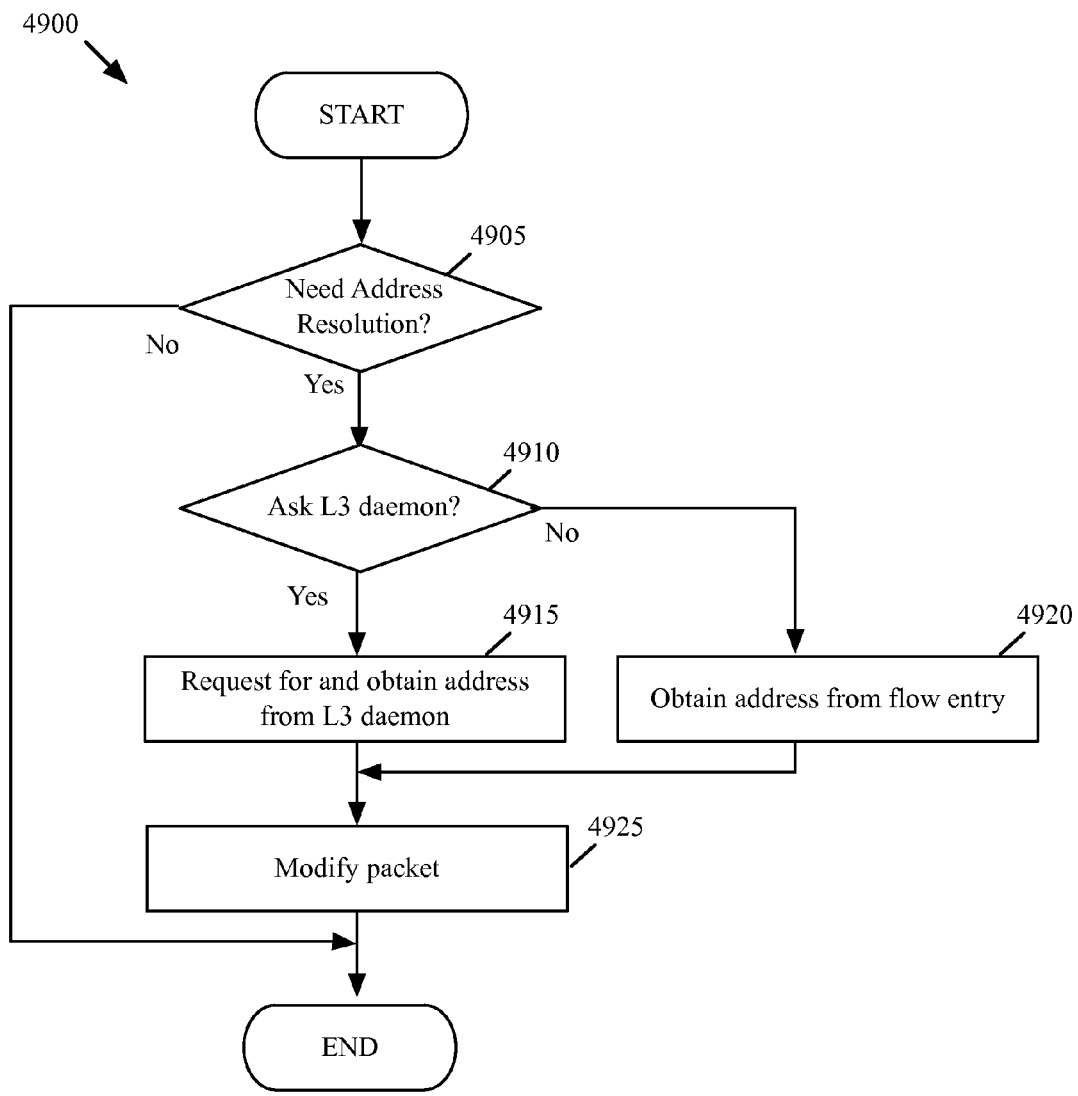
FIG. 49 conceptually illustrates a process that some embodiments perform to resolve network addresses.

FIG. 49 conceptually illustrates a process 4900 that some embodiments perform to resolve network addresses. In some embodiments, the process 4900 is performed by a managed switching element that performs an L3 processing 210 to route packets at L3 (e.g., the managed switching elements 1720, 2505, or 3105). The process 4900, in some embodiments, starts when the process receives a packet that is to be logically routed at L3.

The process 4900 begins by determining (at 4905) whether the packet needs address resolution (e.g., resolving a destination IP address to a destination MAC address). In some embodiments, the process determines whether the packet needs L3 processing based on flow entry. The flow entry, of which the qualifier matches the information stored in the packet's header or logical context, specifies that the packet needs address resolution.

When the process 4900 determines (at 4905) that the packet does not need address resolution, the process ends. Otherwise, the process 4900 determines (at 4910) whether the process 4900 needs to request an address into which to resolve a packet's address (e.g., destination IP address) from an L3 daemon. In some embodiments, the process 4900 determines whether the process needs to ask the L3 daemon based on the flow entry. For instance, the flow entry may specify that the address into which to resolve the packet's address should be obtained by requesting for the resolved address from the L3 daemon. In some embodiments, the process determines that the L3 daemon should provide the resolved address when the flow entry is a flow template that has an empty field for the resolved address or some other value in the field for indicating the resolved address should be obtained from the L3 daemon.

When the process determines (at 4910) that the process does not need to request for an address from the L3 daemon, the process obtains (at 4920) the resolved address from the flow entry. For instance, the flow entry would provide the translated address. The process then proceeds to 4925, which will be described further below. When the process determines (at 4910) that the process needs to request for an address from the L3 daemon, the process 4900 at 4915 requests for and obtains the resolved address from the L3 daemon. In some embodiments, the process 4900 requests for the resolved address by sending a flow template to the L3 daemon. The L3 daemon would fill the flow template with the resolved address and place that filled-in flow template in the forwarding table (not shown) that the process uses.

Next, the process 4900 modifies the packet with the resolved address. In some embodiments, the process modifies an address field in the header of the packet. Alternatively or conjunctively, the process modifies the logical context to replace the packet's address with the resolved address. The process then ends.

Figure 50:
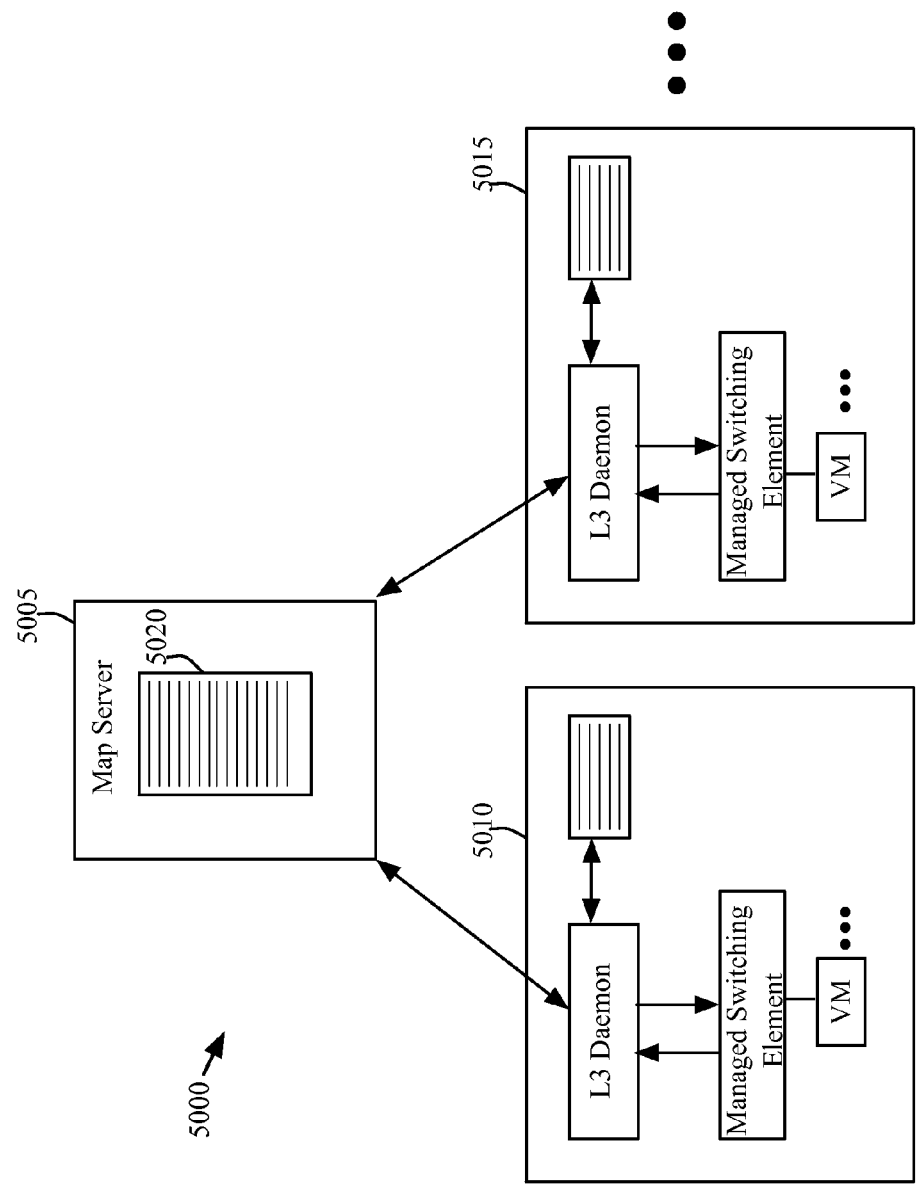
FIG. 50 illustrates a map server that allows several hosts (or VMs) that each run an L3 daemon to avoid broadcasting ARP requests.

FIG. 50 illustrates network architecture 5000 of some embodiments. Specifically, this figure illustrates a map server that allows several hosts (or VMs) that each run an L3 daemon to avoid broadcasting ARP requests. This figure illustrates a set of hosts (or VMs) including 5005, 5010, and 5015.

The hosts 5010 and 5015 are similar to the host 4805 described above by reference to FIG. 48 in that each of the hosts 5010 and 5010 runs an L3 daemon, a managed switching element, and one or more VMs.

The host 5005 runs a map server. The map server 5005 of some embodiments maintains a global mapping table 5020 that includes all the entries of all mapping tables maintained by L3 daemons running in every host in the network that runs a managed edge switching element. In some embodiments, an L3 daemon in the network sends the entries of mapping between locally available IP addresses and MAC addresses mappings. Whenever there is a change to the machines coupled to a managed switching element of a host (e.g., when a VM fails or is coupled to or de-coupled from the managed switching element), the L3 daemon of the host updates the respective local mapping table accordingly and also sends the updates (e.g., by sending a special "publish" packet containing the updates) to the map server 5005 so that the map server 5005 keeps the global mapping table 5005 updated with the change.

In some embodiments, the L3 daemon running in each host that runs a managed edge switching element does not broadcast an ARP packet when the local mapping does not have an entry for a destination IP address to resolve. Instead, the L3 daemon consults the map server 5005 to resolve the destination IP address into the destination MAC address. The map server 5005 resolves the destination IP address into a destination MAC address by looking up the global mapping table 5020. In the case that the map server 5005 cannot resolve the IP address (e.g., when the global mapping table 5020 does not have an entry for the IP address or the map server 5005 fails), the L3 daemon will resort to broadcasting an ARP packet to other hosts that run managed edge switching elements. In some embodiments, the map server 5005 is implemented in the same host or VM in which a second-level managed switching element (e.g., a pool node) is implemented.

Figure 51:
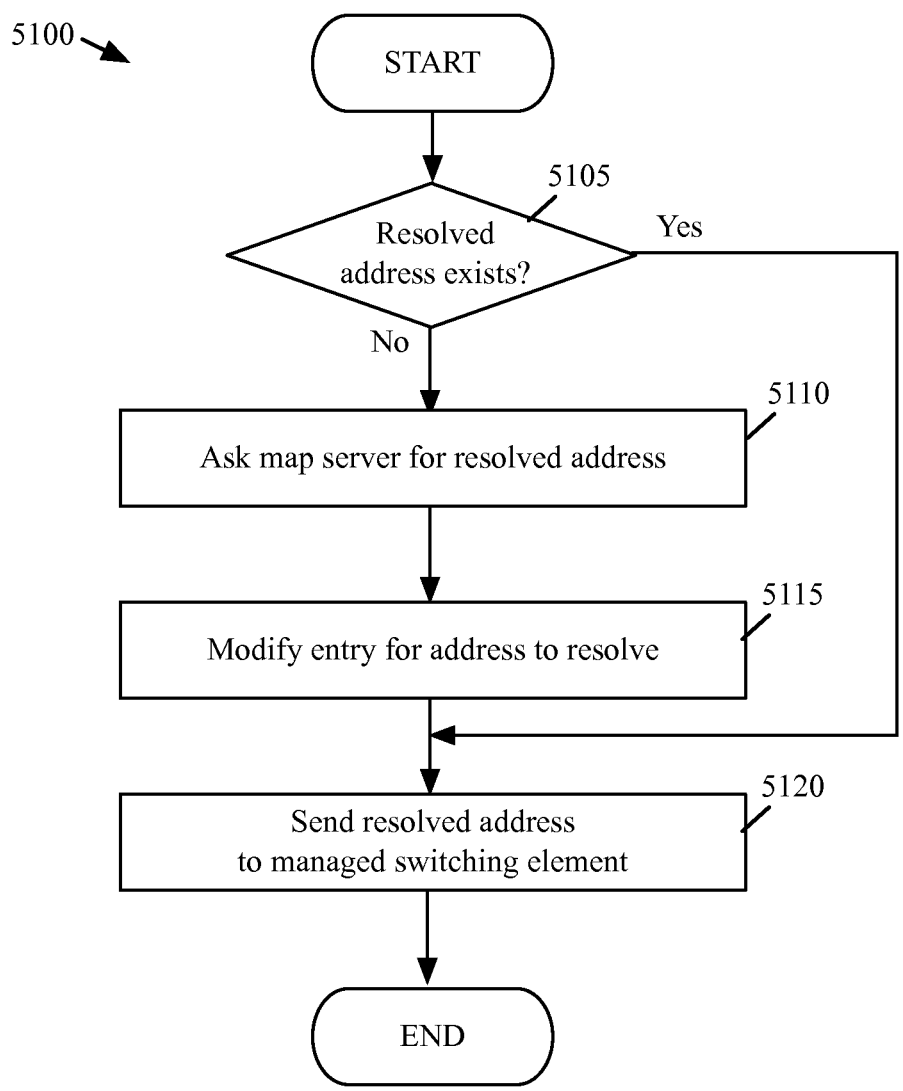
FIG. 51 illustrates a process that some embodiments perform to maintain a mapping table that includes mappings of IP and MAC addresses.

FIG. 51 illustrates a process 5100 that some embodiments perform to maintain a mapping table that includes mappings of IP and MAC addresses. In some embodiments, the process 5100 is performed by an L3 daemon that requests for resolved addresses from a mapping server. The mapping server in these embodiments maintains a global mapping table that includes mappings of IP and MAC addresses for a set of managed switching elements. The process 5100, in some embodiments, starts when the process receives a particular address to resolve from a managed switching element.

The process begins by determining (at 5105) whether the process has a resolved address for the particular address received from the managed switching element. In some embodiments, the process looks up a local mapping table that includes mappings of IP and MAC addresses to determine whether the process has a resolved address for the particular address.

When the process 5100 determines that the process has a resolved address, the process proceeds to 5120, which will be described further below. Otherwise, the process 5100 requests for and obtains a resolved address from the map server. The process 5100 then modifies (at 5115) the local mapping table with the resolved address obtained from the mapping server. In some embodiments, the process 5100 inserts a new mapping of the resolved address and the particular address into the local mapping table.

The process 5100 then sends the resolved address to the managed switching element. In some embodiments, the process 5100 modifies the packet that has the particular address. In other embodiments, the process 5100 modifies the flow template that the managed switching element had sent as a request for the resolved address. The process then ends.

Figure 52:
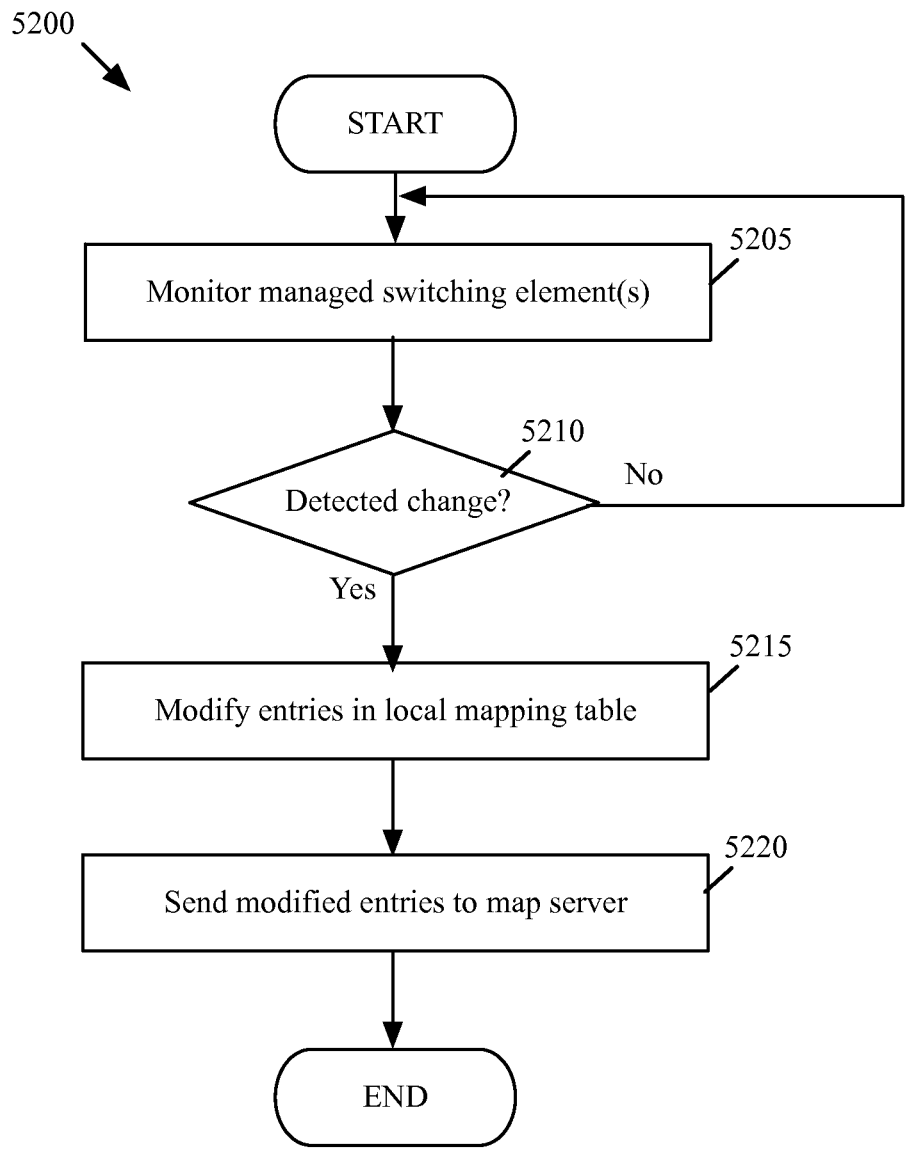
FIG. 52 illustrates a process that some embodiments perform to maintain a mapping table that includes mappings of IP and MAC addresses.

FIG. 52 illustrates a process 5200 that some embodiments perform to maintain a mapping table that includes mappings of IP and MAC addresses. In some embodiments, the process 5200 is performed by an L3 daemon that maintains a local mapping table and sends updates to a mapping server. The mapping server in these embodiments maintains a global mapping table that includes mappings of IP and MAC addresses for a set of managed switching elements. The process 5200, in some embodiments, starts when the L3 daemon starts running.

The process 5200 begins by monitoring (at 5205) a set of managed switching elements. In particular, the process 5200 monitors for coupling and decoupling of machines to and from a managed switching element or any address change for the machines coupled to a managed switching element. In some embodiments, the set of managed switching elements includes those managed switching elements that are running on the same host or virtual machine on which the L3 daemon is running.

Next, the process 5200 determines (at 5210) whether there has been such a change to a managed switching element that the process monitors. When the process determines (at 5210) that there has not been a change, the process 5200 loops back to 5205 to keep monitoring the set of managed switching elements. Otherwise, the process modifies (at 5215) the corresponding entries in the local mapping table. For instance, when a VM migrates and gets coupled to one of the managed switching element in the set, the process inserts a mapping of the IP address and the MAC address of the migrated VM into the local mapping table.

The process 5200 then sends the updated mapping to the map server so that the map server can update the global mapping table with the new and/or modified mapping of the IP address and MAC address. The process then ends.

VIII. Flow Generation and Flow Processing

As described above, the managed switching elements of some embodiments implement logical switches and logical routers based on flow tables supplied to the managed switching elements by the controller cluster (one or more controller instances) of some embodiments. In some embodiments, the controller cluster generates these flow entries by performing table mapping operations based on the inputs or network events the controller cluster detects. Details of these controller clusters and their operations are described in U.S. patent application Ser. No. 13/177,533, and in the above-incorporated U.S. patent application Ser. No. 13/589,077.

As mentioned in U.S. patent application Ser. No. 13/589, 077, the network control system in some embodiments is a distributed control system that includes several controller instances that allow the system to accept logical datapath sets from users and to configure the switching elements to implement these logical datapath sets. In some embodiments, one type of controller instance is a device (e.g., a general-purpose computer) that executes one or more modules that transform the user input from a logical control plane to a logical forwarding plane, and then transform the logical forwarding plane data to physical control plane data. These modules in some embodiments include a control module and a virtualization module. A control module allows a user to specify and populate logical datapath set, while a virtualization module implements the specified logical datapath set by mapping the logical datapath set onto the physical switching infrastructure. In some embodiments, the control and virtualization applications are two separate applications, while in other embodiments they are part of the same application.

From the logical forwarding plane data for a particular logical datapath set, the virtualization module of some embodiments generates universal physical control plane (UPCP) data that is generic for any managed switching element that implements the logical datapath set. In some embodiments, this virtualization module is part of a controller instance that is a master controller for the particular logical datapath set. This controller is referred to as the logical controller.

In some embodiments, the UPCP data is then converted to customized physical control plane (CPCP) data for each particular managed switching element by a controller instance that is a master physical controller instance for the particular managed switching element, or by a chassis controller for the particular managed switching element, as further described in U.S. patent application Ser. No. 13/589,077. When the chassis controller generates the CPCP data, the chassis controller obtains the UPCP data from the virtualization module of the logical controller through the physical controller.

Irrespective of whether the physical controller or chassis controller generate the CPCP data, the CPCP data for a particular managed switching element needs to be propagated to the managed switching element. In some embodiments, the CPCP data is propagated through a network information base (NIB) data structure, which in some embodiments is an object-oriented data structure. Several examples of using the NIB data structure are described in U.S. patent application Ser. Nos. 13/177,529 and 13/177,533, which are incorporated herein by reference. As described in these applications, the NIB data structure is also used in some embodiments to may serve as a communication medium between different controller instances, and to store data regarding the logical datapath sets (e.g., logical switching elements) and/or the managed switching elements that implement these logical datapath sets.

However, other embodiments do not use the NIB data structure to propagate CPCP data from the physical controllers or chassis controllers to the managed switching elements, to communicate between controller instances, and to store data regarding the logical datapath sets and/or managed switching elements. For instance, in some embodiments, the physical controllers and/or chassis controllers communicate with the managed switching elements through OpenFlow entries and updates over the configuration protocol. Also, in some embodiments, the controller instances use one or more direct communication channels (e.g., RPC calls) to exchange data. In addition, in some embodiments, the controller instances (e.g., the control and virtualization modules of these instance) express the logical and/or physical data in terms of records that are written into the relational database data structure. In some embodiments, this relational database data structure are part of the input and output tables of a table mapping engine (called nLog) that is used to implement one or more modules of the controller instances.

Figure 53:
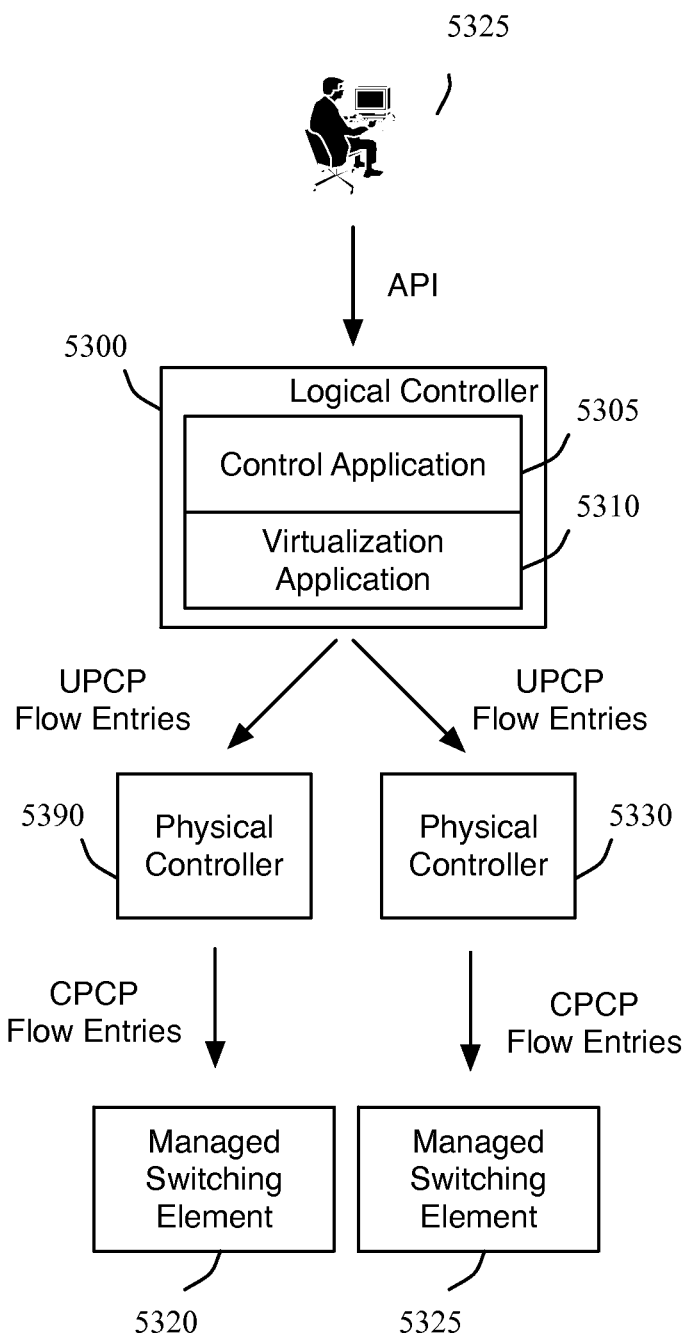
FIG. 53 conceptually illustrates a controller instance of some embodiments generate flows by performing table mapping operations on tables using a table mapping processor (not shown) such as an nLog.

FIG. 53 conceptually illustrates three controller instances of a controller cluster of some embodiments. These three controller instances include a logical controller 5300 for generating UPCP data from logical control plane (LCP) data received as API calls, and physical controllers 5390 and 5330 for customizing the UPCP data specific to managed switching elements 5320 and 5325, respectively. Specifically, the logical controller 5300 of some embodiments generates universal flows by performing table mapping operations on tables using a table mapping processor (not shown) such as an nLog. An nLog engine is described in U.S. patent application Ser. Nos. 13/177,533. This figure also illustrates a user 5325 and managed switching elements 5320 and 5325.

As shown, the logical controller 5300 includes a control application 5305 and a virtualization application 5310. In some embodiments, the control application 5305 is used to receive the logical control plane data, and to convert this data to logical forwarding plane data that is then supplied to the virtualization application 5310. The virtualization application 5310 generates universal physical control plane data from logical forwarding plane data.

In some embodiments, some of the logical control plane data are converted from the inputs. In some embodiments, the logical controller 5300 supports a set of API calls. The logical controller has an input translation application (not shown) that translates the set of API calls into LCP data. Using the API calls, the user can configure logical switches and logical routers as if the user is configuring physical switching elements and routers.

The physical controllers 5390 and 5330 are the masters of the managed switching elements 5320 and 5325, respectively. The physical controller 5390 and 5330 of some embodiments receive the UPCP data from the logical controller 5300 and converts the UPCP data to CPCP data for the managed switching elements 5320 and 5325, respectively. The physical controller 5390 then sends the CPCP data for the managed switching element 5320 to the managed switching element 5320. The physical controller 5330 sends the CPCP data for the managed switching element 5325 to the managed switching element 5325. The CPCP data for the managed switching elements 5320 and 5325 are in the form of flow entries. The managed switching elements 5320 and 5325 then perform forwarding and routing the packets based on the flow entries. As described in U.S. patent application Ser. No. 13/177,533, this conversion of LCP data to the LFP data and then to the CPCP data is performed by using an nLog engine.

Even though FIG. 53 illustrates two physical controllers generating CPCP data from UPCP data for two different managed switching elements, one of ordinary skill will realize that in other embodiment the physical controllers serve to simply relay the UPCP data to each switching element's chassis controller, which in turn generates that switching element's CPCP data and pushes this data to it switching element.

Figure 54:
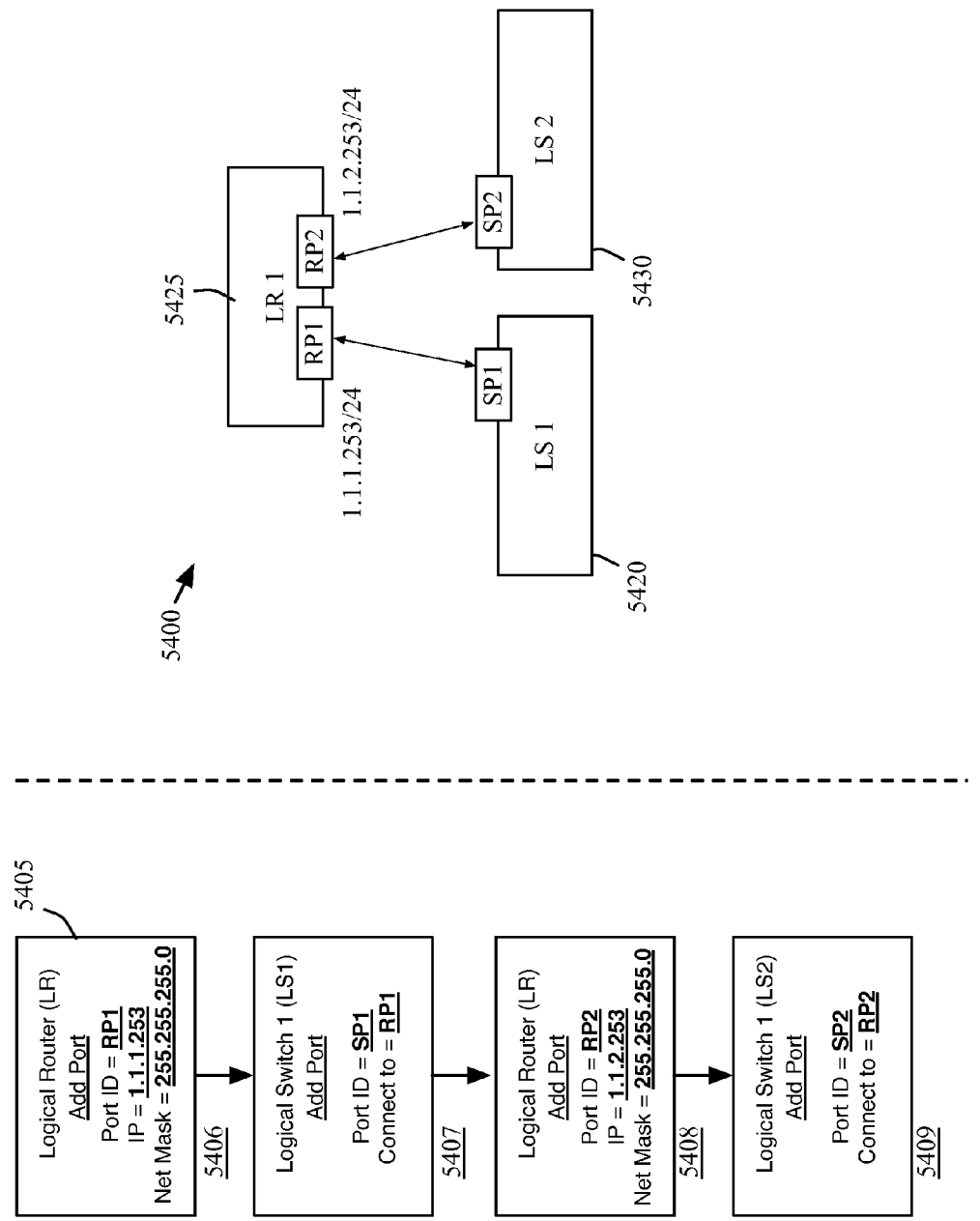
FIG. 54 illustrates an example architecture and a user interface.

FIG. 54 illustrates an example architecture 5400 and a user interface 5405. Specifically, this figure illustrates that the user sends to a controller application in order to configure logical switches and routers in a desired way. This figure illustrates a user interface (UI) 5405 in four stages 5406-5409 in the left half of the figure. This figure also illustrates the architecture 5400, which includes a logical router 5425 and two logical switches 5420 and 5430 in the right half of the figure.

The UI 5405 is an example interface through which the user can enter inputs and receive responses from a controller instance in order to manage the logical switches and routers. In some embodiments, the UI 5405 is provided as a web application and thus can be opened up with a web browser. Alternatively or conjunctively, the control application of some embodiments may allow the user to enter and receive inputs through a command line interface.

The left half of the figure illustrates that the user enters inputs to set up logical ports in logical switches and logical routers that are to be implemented by a set of managed switching elements of the network that the controller instance manages. In particular, the user adds a logical port to a logical router, LR, by supplying (at stage 5406) the port's identifier, "RP1," an IP address of "1.1.1.253" to associate with the port, and a net mask "255.255.255.0." The user also adds a logical port to a logical switch, LS1, by supplying (at 5407) a port identifier, "SP1," and specifying that the port is to be connected to the logical port RP1 of the logical router. The user also adds another logical port to the logical router LR by supplying (at stage 5408) the port's identifier, "RP2," an IP address of "1.1.2.253" to associate with the port, and a net mask "255.255.255.0." The user also adds another logical port to the logical switch LS2 by supplying (at 5409) a port identifier, "SP2," and specifying that the port is to be connected to the logical port RP2 of the logical router. The right half of the figure illustrates the ports added to the logical router and logical switches.

FIGS. 55-62 conceptually illustrates an example operation of the control application 5305. These figures illustrate a set of tables that the control application 5305 uses and modifies in order to generate flow entries to be supplied to managed switching elements. Specifically, the managed switching elements (not shown) implement the logical ports added to the logical switches 5420 and 5430 and the logical router 5400 based on the inputs described above by reference to FIG. 54. The figure illustrates the control application 5305, the virtualization application 5310, and the physical controller 5330.

The control application 5305 as shown includes input translation 5505, input tables 5510, a rules engine 5515, output tables 5520, a exporter 5525.

The input translation 5505, in some embodiments, interacts with a management tool with which a user can view and/or modify a logical network state. Different embodiments provide different management tools to the user. For instance, the input translation 5505, in some embodiments, provides a graphical tool such as the UI 5405 described above by reference to FIG. 54. Instead of, or in conjunction with, a graphical tool, other embodiments may provide the user with a command-line tool or any other type of management tool. The input translation 5505 receives inputs from the user through the management tool and processes the received inputs to create, populate and/or modify one or more input tables 5510.

The input tables 5510 are similar to the input tables described in U.S. patent application Ser. No. 13/288,908, now published as U.S. Patent Publication 2013/0058350, which is incorporated herein by reference. An input table in some cases represents the state of the logical switches and the logical routers that the user is managing. For instance, an input table 5530 is a table that stores IP addresses in classless inter-domain routing (CIDR) format, associated with logical ports of logical switches. The control application modifies input tables with inputs that the control application receives through the management tool or with any network events that the control application detects. After the control application 5305 modifies input tables, the control application 5305 uses the rules engine 5515 to process the modified input tables.

The rules engine 5515 of different embodiments performs different combinations of database operations on different sets of input tables to populate and/or modify different sets of output tables 5520. For instance, the rules engine 5515 modifies a table 5535 to associate a MAC address to a logical port of a logical router when the input table 5530 is changed to indicate that the logical port of the logical router is created. The output table 5565 includes flow entries that specify the actions for the managed switching elements that implement the logical switches and logical routers to perform on the network data that is being routed/forwarded. In addition to the tables 5530-5560, the rules engine 5515 may use other input tables, constants tables, and functions tables to facilitate the table mapping operation of the rules engine 5515.

The output tables may also be used as input tables to the rules engine 5515. That is, a change in the output tables may trigger another table mapping operation to be performed by the rules engine 5515. Therefore, the entries in the tables 5530-5560 may be resulted from performing table mapping operations and may also provide inputs to the rules engine 5515 for another set of table mapping operations. As such, the input tables and the output tables are depicted in a single dotted box in this figure to indicate the tables are input and/or output tables.

The table 5535 is for storing pairings of logical ports of logical routers and the associated MAC addresses. The table 5540 is a logical routing table for a logical router to use when routing the packets. In some embodiments, the table 5540 will be sent to the managed switching element that implements the logical router. The table 5550 is for storing next-hop identifiers and IP addresses for logical ports of logical routers. The table 5555 is for storing connections between logical ports of logical switches and logical ports of logical routers. The exporter 5525 publishes or sends the modified output tables in the output tables 5520 to a virtualization application 5310.

Figure 55:
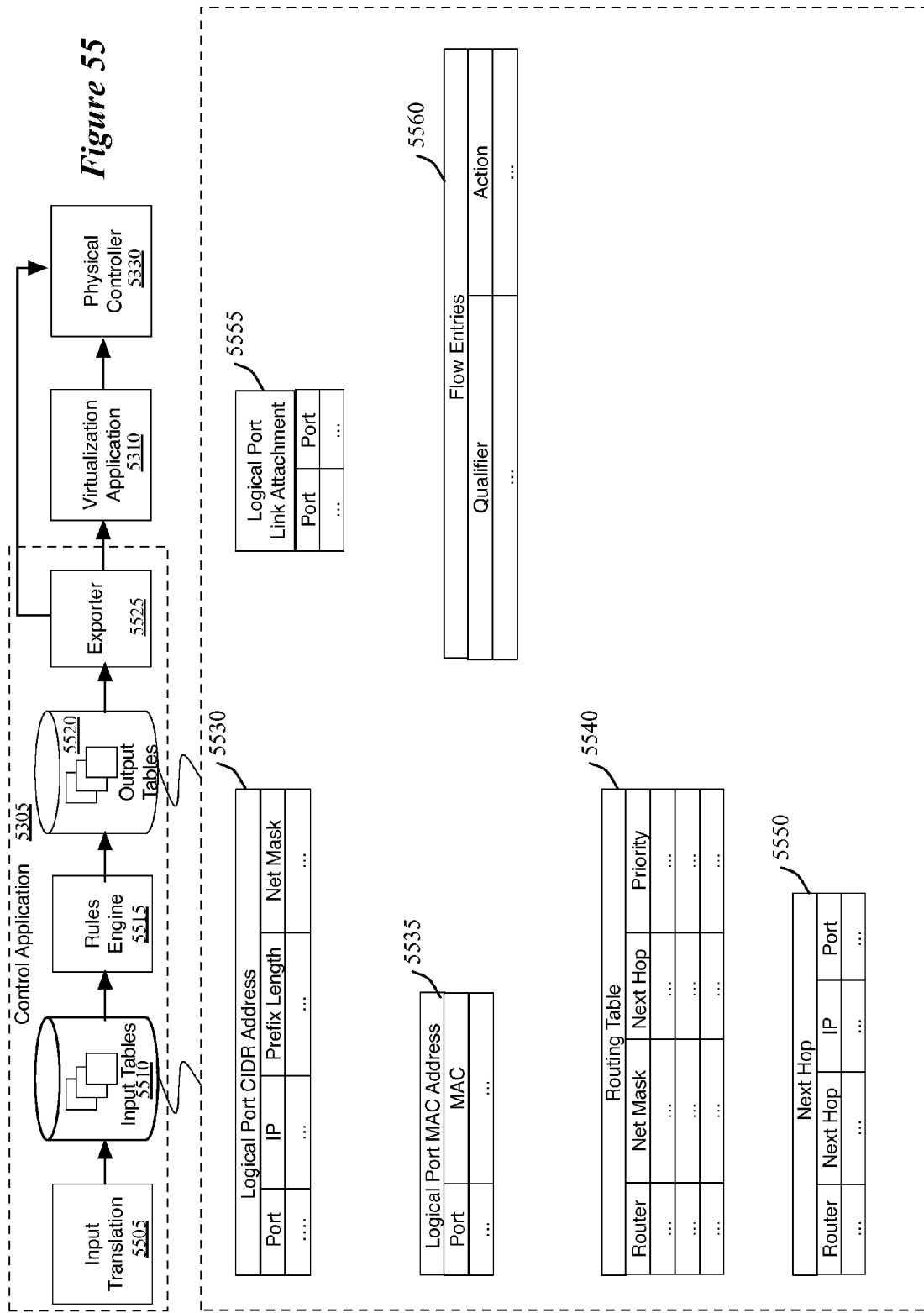
FIG. 55 illustrates tables before a stage described above by reference to FIG. 54.

FIG. 55 illustrates the tables 5530-5565 before the stage 5406 described above by reference to FIG. 54. The entries in the tables are depicted as dots to indicate there are some existing entries in these tables.

Figure 56:
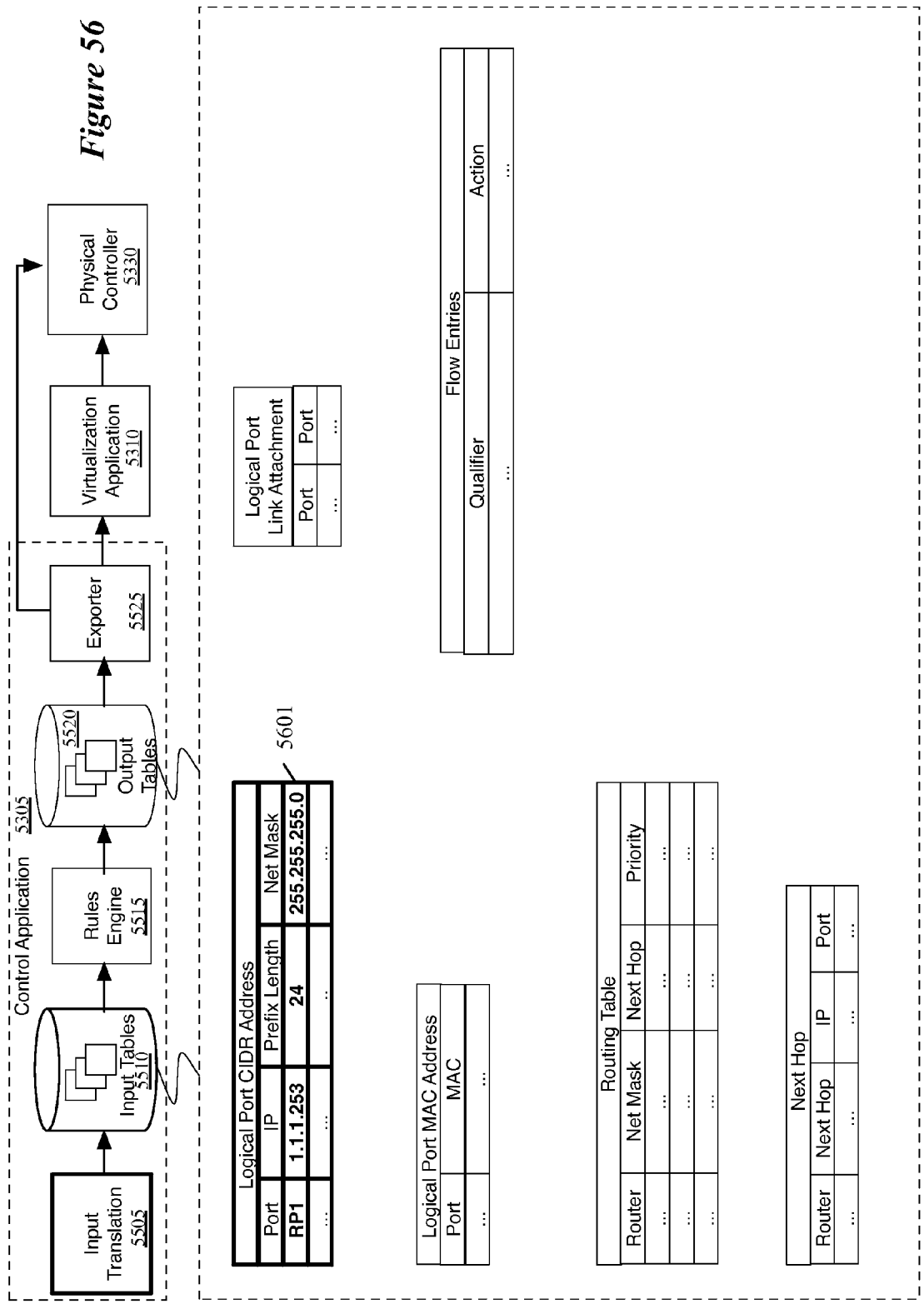
FIG. 56 illustrates tables after the user supplies a logical port's identifier, an IP address to associate with the port, and a net mask to add the logical port to the logical router.

FIG. 56 illustrates the tables 5530-5565 after the stage 5406. That is, this figure illustrates the tables 5530-5565 after the user supplies a logical port's identifier, "RP1," an IP address of "1.1.1.253" to associate with the port, and a net mask "255.255.255.0." to add the logical port to the logical router 5425, identified as "LR." Here, the table 5530 is updated with a new entry by the input translation 5505. The new entry (or row) 5601 indicates a logical port identified as "RP1" is added and the IP addresses associated with this port is specified by the IP address 1.1.1.253, a prefix length 24, and the net mask 255.255.255.0.

Figure 57:
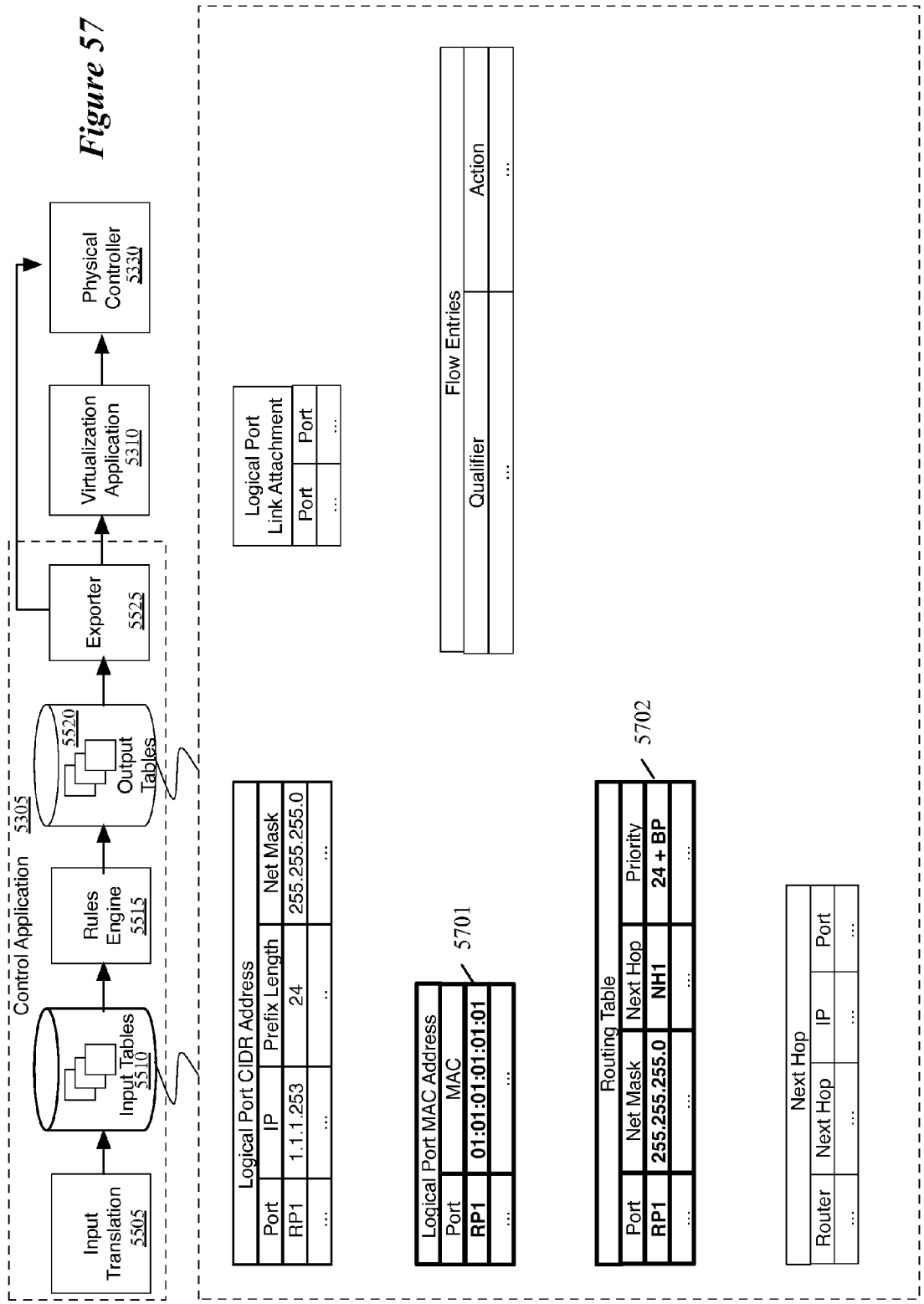
FIG. 57 illustrates a result of a set of table mapping operations.

The rules engine 5515 detects this update to the table 5530 and performs a set of table mapping operations to update the tables 5535 and 5540. FIG. 57 illustrates the result of this set of table mapping operations. Specifically, this figure illustrates that the table 5535 has a new row 5701, which indicates that the logical port RP1 is now associated with a MAC address 01:01:01:01:01:01. This MAC address is generated by the rules engine 5515 while performing the table mapping operations using other tables or functions (not shown).

FIG. 57 also illustrates that the table 5540 has a new row 5702, which is an entry in the routing table for the logical router 5425. The logical router 5425 (the managed switching element that implements the logical router 5425) will look up this table 5540 to make a routing decision. The row 5702 specifies that the next hop for the logical port RP1 has a unique identifier "NH1." The row 5702 also includes a priority assigned to this row in the routing table. This priority is used for determining which row should be used to make a routing decision when there are multiple matching rows in the routing table. In some embodiments, the value for the priority for a row in an entry is prefix length plus a basic priority value "BP."

Figure 58:
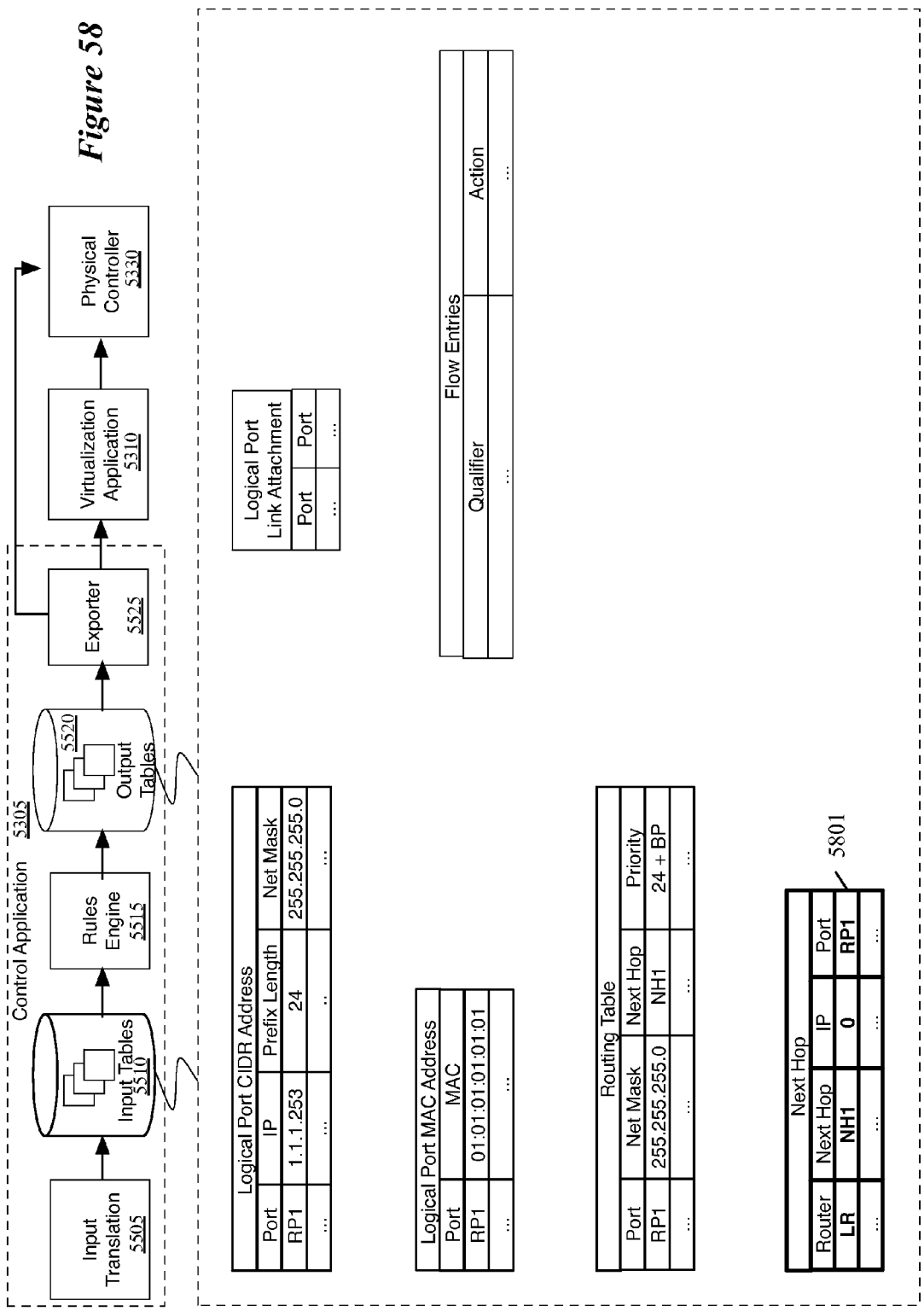
FIG. 58 illustrates a result of a set of table mapping operations.

The rules engine 5515 detects the update to the table 5540 and performs a set of table mapping operations to update the table 5550. FIG. 58 illustrates the result of this set of table mapping operations. Specifically, this figure illustrates that the table 5550 has a new row 5801, which indicates that the IP address of the next hop for the logical port RP1 of the logical router 5425 is a given packet's destination IP address. ("0" in this row means that the next hop's IP is the destination of the given packet that would be routed through RP1 of the logical router.)

Figure 59:
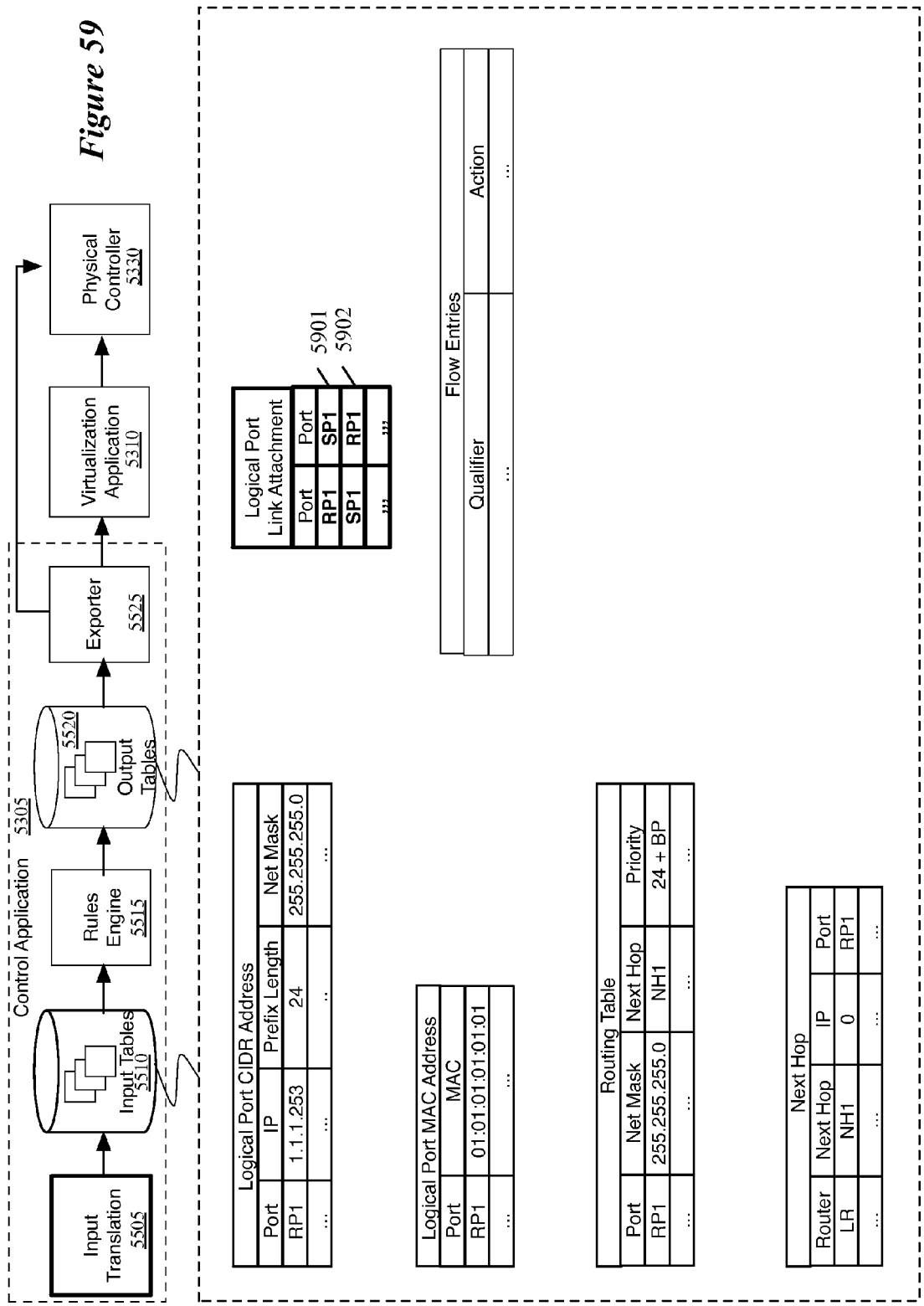
FIG. 59 illustrates tables after the stage described above by reference to FIG. 54.

FIG. 59 illustrates the tables 5530-5560 after the stage 5407 described above by reference to FIG. 54. That is, this figure illustrates the tables 5530-5565 after the user supplies a logical port's identifier, "SP1," to add the logical port to the logical switch 5420 (LS1) and links this port to the logical port RP1 of the logical router 5425. Here, the table 5555 is updated with two new rows by the input translation 5505. The new row 5901 indicates that a logical port identified as "SP1" (of the logical switch 5420) is attached to the logical port RP1 (of the logical router 5425). Also, the new row 5902 indicates that the logical port RP1 is attached to the logical port SP1. This link connects L2 processing and L3 processing portions of the logical processing pipeline 200 described above.

Figure 60:
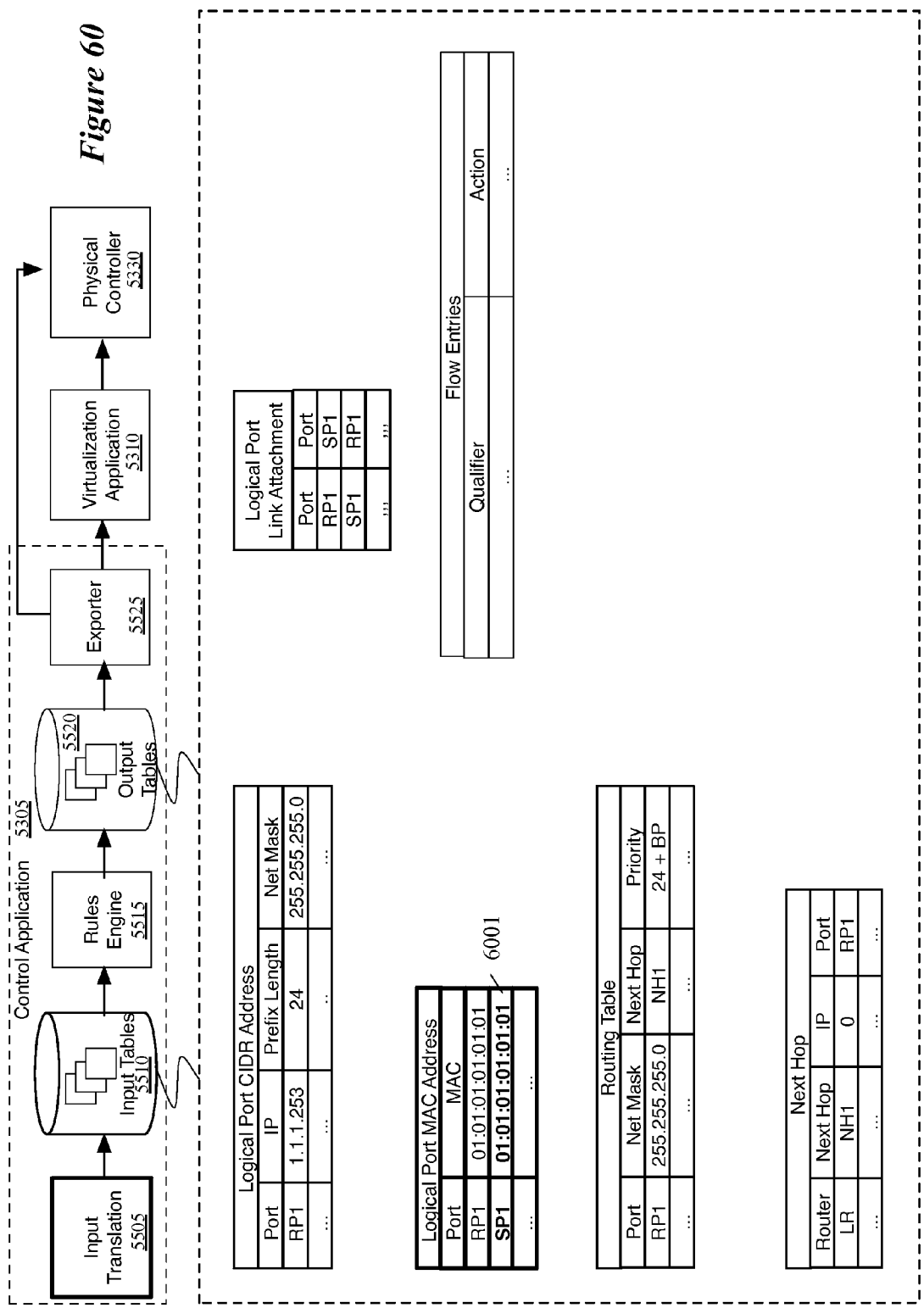
FIG. 60 illustrates a result of a set of table mapping operations.

The rules engine 5515 detects the updates to the table 5555 and performs a set of table mapping operations to update the table 5535. FIG. 60 illustrates the result of this set of table mapping operations. Specifically, this figure illustrates that the table 5535 has a new row 6001, which indicates that the logical port SP1 is now associated with a MAC address 01:01:01:01:01:01 because SP1 and RP1 are now linked.

Figure 61:
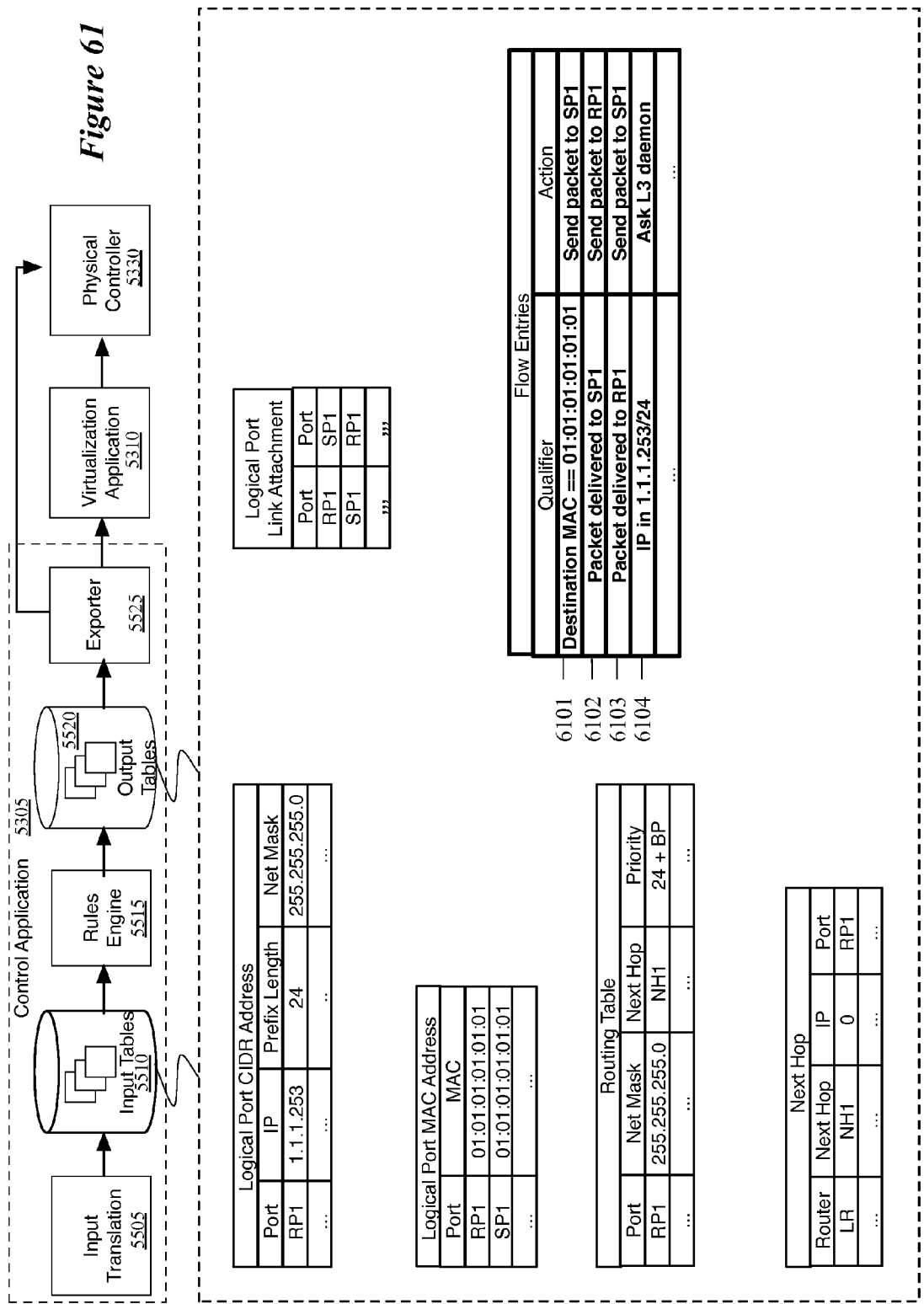
FIG. 61 illustrates a result of a set of table mapping operations.

The rules engine 5515 detects the updates to the table 5555 and performs a set of table mapping operations to update the table 5560. FIG. 61 illustrates the result of this set of table mapping operations. Specifically, this figure illustrates that the table 5550 has four new rows (flow entries) 6101-6104. The row 6101 is a flow entry indicating that packets whose destination MAC addresses is 01:01:01:01:01:01 are to be sent to the logical port SP 1 (of the logical switch 5420). The row 6102 is a flow entry indicating that any packet delivered to the logical port SP1 is to be sent to the logical port RP1. The row 6103 is a flow entry indicating that any packet delivered to the logical port RP1 is to be sent to the logical port SP1. The row 6104 is a flow entry indicating that a packet with an IP address that falls within the range of IP addresses specified by 1.1.1.253/24 should request for MAC address by asking an L3 daemon.

Figure 62:
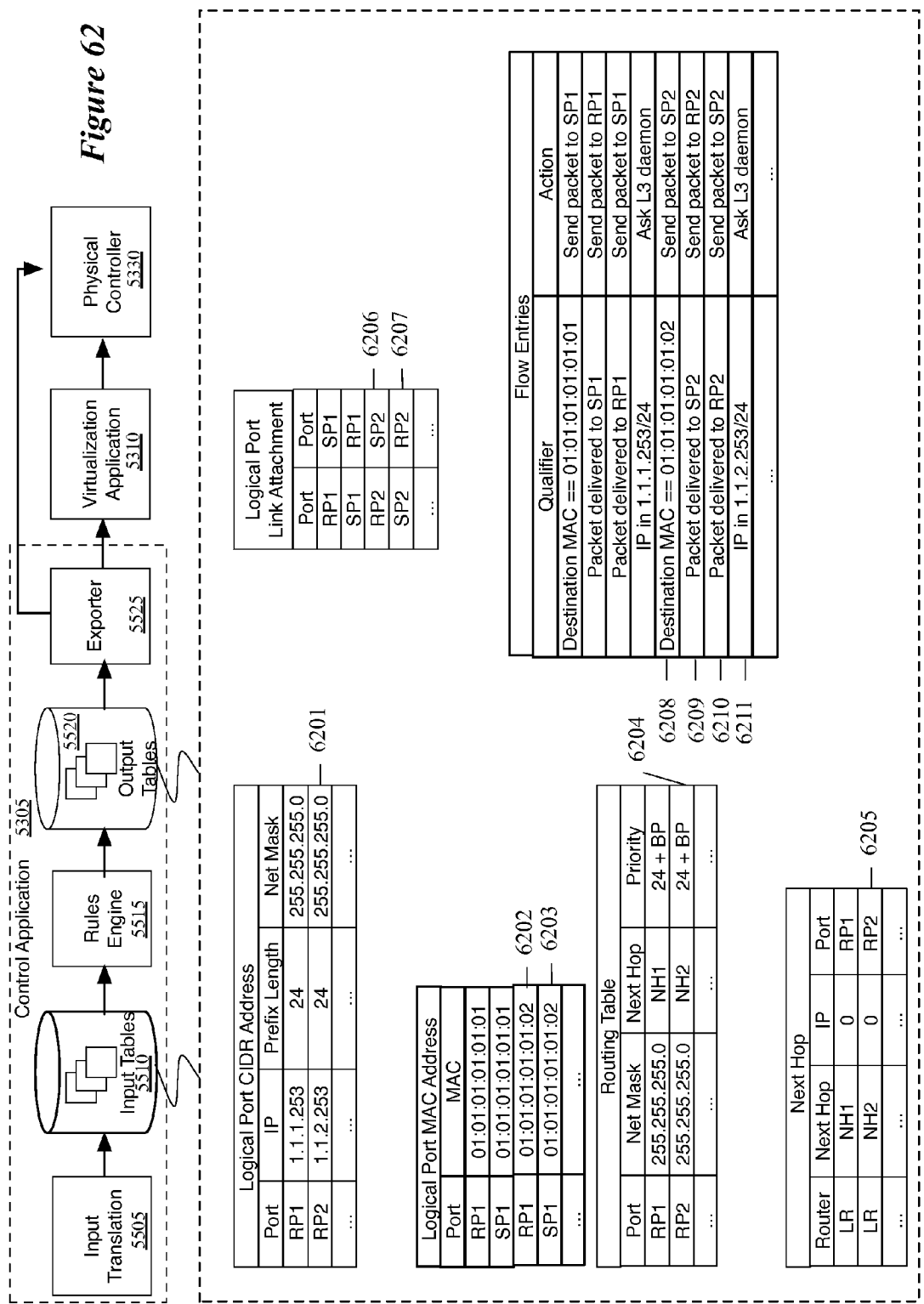
FIG. 62 illustrates new rows added to some of the tables after stages described above by reference to FIG. 61.

FIG. 62 illustrates new rows 6201-6209 added to some of the tables after stages 5408 and 5409 described above. For simplicity of description, the intermediate illustration of table updates by the rules engine 5515 is omitted.

The new row 6201 indicates a logical port identified as "RP2" is added and the IP addresses associated with this port is specified by the IP address 1.1.2.253, a prefix length 24, and the net mask 255.255.255.0. The new row 6202, which indicates that the logical port RP2 is now associated with a MAC address 01:01:01:01:01:02. The new row 6203, which indicates that the logical port SP2 is associated with a MAC address 01:01:01:01:01:02. The new row 6204, which is an entry in the routing table for the logical router 5430. The row 6204 specifies that the next hop for the logical port RP2 has a unique identifier "NH2." The row 6204 also includes a priority assigned to this row in the routing table.

The new row 6205 indicates that the IP address of the next hop for the logical port RP2 of the logical router 5425 is a given packet's destination IP address. The new row 6206 indicates that a logical port identified as "SP2" (of the logical switch 5430) is attached to the logical port RP2 (of the logical router 5425). Also, the new row 6207 indicates that the logical port RP2 is attached to the logical port SP2.

The row 6208 is a flow entry indicating that packets whose destination MAC addresses is 01:01:01:01:01:02 are to be sent to the logical port SP2 (of the logical switch 5430). The row 6209 is a flow entry indicating that any packet delivered to the logical port SP2 is to be sent to the logical port RP2. The row 6210 is a flow entry indicating that any packet delivered to the logical port RP2 is to be sent to the logical port SP2. The row 6211 is a flow entry indicating that a packet with an IP address that falls within the range of IP addresses specified by 1.1.2.253/24 should request for MAC address by asking an L3 daemon.

These flow entries shown in FIG. 62 are LFP data. This LFP data will be sent to the virtualization application 5310, which will generate UPCP data from the LFP data. Then, the UPCP data will be sent to the physical controller 5330 which will customize the UPCP data for the managed switching element 5325 (not shown in FIG. 62). Finally, the physical controller 5330 will send the CPCP data to the managed switching element 5325.

Figure 63:
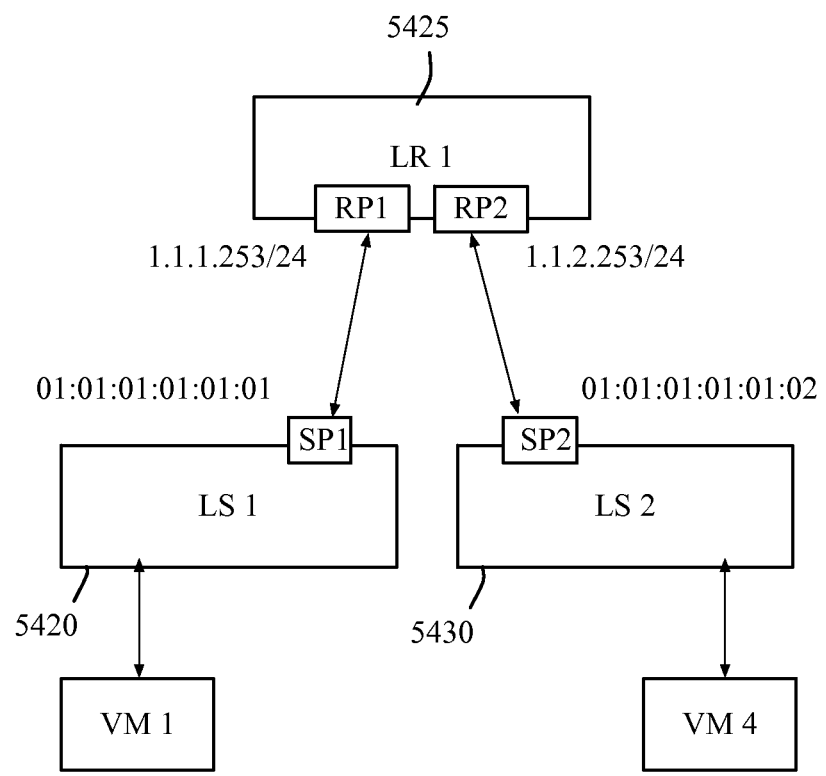
FIG. 63 illustrates a architecture after a control application generates logical data by performing a table mapping operations as described above by reference to FIGS. 55-62.

FIG. 63 illustrates the architecture 5400 after the control application 5305 generates logical data by performing the table mapping operations as described above by reference to FIGS. 55-62. As shown in FIG. 63, the ports RP1 and RP2 are associated with ranges of IP addresses specified by 1.1.1.253/24 and 1.1.2.253/24, respectively. Also, the ports SP1 and SP2 are associated with MAC addresses 01:01:01:01:01:01 and 01:01:01:01:01:02, respectively. This figure also illustrates VM 1 that is coupled to the logical switch 5420 and VM 2 that is coupled to the logical switch 5430.

An example operation of the logical switches 5420 and 5430, the logical router 5425, and VMs 1 and 2 will now be described. This example assumes that a set of managed switching elements that implement the logical router 5425 and the logical switches 5420 and 5430 have all the flow entries 6101-6104 and 6208-6211. This example also assumes that the logical data produced by the control application 5305 are converted to physical control plane data by the virtualization application 5310 and that the physical control plane data is received by the managed switching elements and converted into physical forwarding data.

When VM 1 intends to send a packet to VM 4, VM 1 first broadcasts an ARP request to resolve the logical router 5425's MAC address. This ARP packet has a source IP address of VM 1, which is 1.1.1.10 in this example, and a destination IP address of VM 4, which is 1.1.2.10 in this example. This broadcast packet has the broadcast MAC address "ff:ff:ff:ff:ff:ff" as the destination MAC address and the packet's target protocol address is 1.1.1.253. This broadcast packet (the ARP request) is replicated to all ports of the logical switch 5320 including the logical port SP1. Then, based on flow entry 6102, this packet is sent to RP1 of the logical router 5325. The packet is then sent to an L3 daemon (not shown) according to the flow entry 6104 because the destination IP address 1.1.2.10 falls in the range of IP addresses specified by 1.1.2.253/24 (i.e., because the target protocol address is 1.1.1.253). The L3 daemon resolves the destination IP address to a MAC address 01:01:01:01:01:01, which is the MAC address of RP1. The L3 daemon sends the ARP response with this MAC address back to VM 1.

VM 1 then sends a packet to VM 4. This packet has VM 1's MAC address as the source MAC address, RP1's MAC address (01:01:01:01:01:01) as a destination MAC address, VM 1's IP address (1.1.1.10) as the source IP address, and VM 4's IP address (1.1.2.10) as the destination IP address.

The logical switch 5420 then forwards this packet to SP1 according to the flow entry 6101 which indicates that a packet with the destination MAC address of 01:01:01:01:01:01 is to be sent to SP1. When the packet reaches SP1, the packet is then send to RP1 according to the flow entry 6102, which indicates that any packet delivered to SP1 to be sent to RP1.

This packet is then sent to the ingress ACL stage of the logical router 5425, which in this example allows the packet to go through RP1. Then the logical router 5425 routes the packet to the next hop, NH2, according to the entry 6204. This routing decision is then loaded to a register (of the managed switching element that implements the logical router 5425). This packet is then fed into the next hop lookup process, which uses the next hop's ID, NH2, to determine the next-hop IP address and the port the packet should be sent to. In this example, the next hop is determined based on the row 6205 which indicates that NH2's address is the destination IP address of the packet and the port the packet should be sent to is RP2.

The packet then is fed into a MAC resolution process to resolve the destination IP address (1.1.2.10) to MAC address of VM 4. The L3 daemon resolves the MAC address and puts back a new flow entry (e.g., by filling in a flow template with the resolved MAC address) into the managed switching element that implements the logical router 5425. According to this new flow, the packet now has VM 4's MAC address as the destination MAC address and the MAC address of RP2 (01:01:01:01:01:02) of the logical router 5425.

The packet then goes through the egress ACL stage of the logical router 5425, which in this example allows the packet to exit through RP2. The packet is then sent to SP2 according to the flow entry 6210, which indicates that any packet delivered to RP2 is to be sent to SP2. Then the L2 processing for the logical switch 5330 will send the packet to VM 4.

IX. Modification to Managed Edge Switching Element Implementation

While all the LDPS processing is pushed to the managed edge switching elements, only the interfaces to actual attached physical port integration address interoperability issues in some embodiments. These interfaces, in some embodiments, implement the standard L2/L3 interface for the host IP/Ethernet stack. The interfaces between the logical switches and logical routers remain internal to the virtualization application, and hence do not need to implement exactly the same protocols as today's routers to exchange information.

The virtualization application, in some embodiments, has the responsibility to respond to the ARP requests sent to the first-hop router's IP address. Since the logical router's MAC/IP address bindings are static, this introduces no scaling issues. The last-hop logical router, in some embodiments, does not have a similar, strict requirement: as long as the MAC and IP address(es) of the attached port are made known to the virtualization application, it can publish them to the internal lookup service not exposed for the endpoints but only used by the logical pipeline execution. There is no absolute need to send ARP requests to the attached port.

Some embodiments implement the required L3 functionality as an external daemon running next to the Open vSwitch. In some embodiments, the daemon is responsible for the following operations:

Responding to ARP requests. In some embodiments, Open vSwitch feeds ARP requests to the daemon and the daemon creates a response. Alternatively, some embodiments use flow templating to create additional flow entries in the managed edge switching elements. Flow templating is the use of a set of rules to generate a series of flow entries dynamically based on packets received. In some such embodiments, the responses are handled by the Open vSwitch itself.

Establishing any stateful (NAT, ACL, load-balancing) per-flow state. Again, if the flow templating is flexible enough, more can be moved for the Open vSwitch to handle.

Initiating the distributed lookups. Distributed lookups (e.g., ARP, learning) are initiated to the mapping service as necessary when feeding traffic through its sequence of logical pipelines. This will involve queuing of IP packets in some embodiments.

For generating ARP requests when integrating with external physical networks, some embodiments assume that the packet can be dropped to the local IP stack by using the LOCAL output port of OpenFlow.

Mapping service itself is implemented, in some embodiments, by relying on the datapath functionality of the Open vSwitch: daemons at the managed edge switching elements publish the MAC and IP address bindings by sending a special 'publish' packet to the mapping service nodes, which will then create flow entries using the flow templating. The 'query' packets from the managed edge switching elements will be then responded to by these FIB entries, which will send the packet to the special IN_PORT after modifying the query packet enough to become a response packet.

X. Logical Switching Environment

Several embodiments described above and below provide network control systems that completely separate the logical forwarding space (i.e., the logical control and forwarding planes) from the physical forwarding space (i.e., the physical control and forwarding planes). These control systems achieve such a separation by using a mapping engine to map the logical forwarding space data to the physical forwarding space data. By completely decoupling the logical space from the physical space, the control systems of these embodiments allow the logical view of the logical forwarding elements to remain unchanged while changes are made to the physical forwarding space (e.g., virtual machines are migrated, physical switches or routers are added, etc.).

More specifically, the control system of some embodiments manages networks over which machines (e.g. virtual machines) belonging to several different users (i.e., several different users in a private or public hosted environment with multiple hosted computers and managed forwarding elements that are shared by multiple different related or unrelated users) may exchange data packets for separate LDP sets. That is, machines belonging to a particular user may exchange data with other machines belonging to the same user over a LDPS for that user, while machines belonging to a different user exchange data with each other over a different LDPS implemented on the same physical managed network. In some embodiments, a LDPS (also referred to as a logical forwarding element (e.g., logical switch, logical router), or logical network in some cases) is a logical construct that provides switching fabric to interconnect several logical ports, to which a particular user's machines (physical or virtual) may attach.

In some embodiments, the creation and use of such LDP sets and logical ports provides a logical service model that to an untrained eye may seem similar to the use of a virtual local area network (VLAN). However, various significant distinctions from the VLAN service model for segmenting a network exist. In the logical service model described herein, the physical network can change without having any effect on the user's logical view of the network (e.g., the addition of a managed switching element, or the movement of a VM from one location to another does not affect the user's view of the logical forwarding element). One of ordinary skill in the art will recognize that all of the distinctions described below may not apply to a particular managed network. Some managed networks may include all of the features described in this section, while other managed networks will include different subsets of these features.

In order for the managed forwarding elements within the managed network of some embodiments to identify the LDPS to which a packet belongs, the network controller clusters automatedly generate flow entries for the physical managed forwarding elements according to user input defining the LDP sets. When packets from a machine on a particular LDPS are sent onto the managed network, the managed forwarding elements use these flow entries to identify the logical context of the packet (i.e., the LDPS to which the packet belongs as well as the logical port towards which the packet is headed) and forward the packet according to the logical context.

In some embodiments, a packet leaves its source machine (and the network interface of its source machine) without any sort of logical context ID. Instead, the packet only contains the addresses of the source and destination machine (e.g., MAC addresses, IP addresses, etc.). All of the logical context information is both added and removed at the managed forwarding elements of the network. When a first managed forwarding element receives a packet directly from a source machine, the forwarding element uses information in the packet, as well as the physical port at which it received the packet, to identify the logical context of the packet and append this information to the packet. Similarly, the last managed forwarding element before the destination machine removes the logical context before forwarding the packet to its destination. In addition, the logical context appended to the packet may be modified by intermediate managed forwarding elements along the way in some embodiments. As such, the end machines (and the network interfaces of the end machines) need not be aware of the logical network over which the packet is sent. As a result, the end machines and their network interfaces do not need to be configured to adapt to the logical network. Instead, the network controllers configure only the managed forwarding elements. In addition, because the majority of the forwarding processing is performed at the edge forwarding elements, the overall forwarding resources for the network will scale automatically as more machines are added (because each physical edge forwarding element can only have so many machines attached).

In the logical context appended (e.g., prepended) to the packet, some embodiments only include the logical egress port. That is, the logical context that encapsulates the packet does not include an explicit user ID. Instead, the logical context captures a logical forwarding decision made at the first hop (i.e., a decision as to the destination logical port). From this, the user ID (i.e., the LDPS to which the packet belongs) can be determined implicitly at later forwarding elements by examining the logical egress port (as that logical egress port is part of a particular LDPS). This results in a flat context identifier, meaning that the managed forwarding element does not have to slice the context ID to determine multiple pieces of information within the ID.

In some embodiments, the egress port is a 32-bit ID. However, the use of software forwarding elements for the managed forwarding elements that process the logical contexts in some embodiments enables the system to be modified at any time to change the size of the logical context (e.g., to 64 bits or more), whereas hardware forwarding elements tend to be more constrained to using a particular number of bits for a context identifier. In addition, using a logical context identifier such as described herein results in an explicit separation between logical data (i.e., the egress context ID) and source/destination address data (i.e., MAC addresses). While the source and destination addresses are mapped to the logical ingress and egress ports, the information is stored separately within the packet. Thus, at managed switching elements within a network, packets can be forwarded based entirely on the logical data (i.e., the logical egress information) that encapsulates the packet, without any additional lookup over physical address information.

In some embodiments, the packet processing within a managed forwarding element involves repeatedly sending packets to a dispatch port, effectively resubmitting the packet back into the switching element. In some embodiments, using software switching elements provides the ability to perform such resubmissions of packets. Whereas hardware forwarding elements generally involve a fixed pipeline (due, in part, to the use of an ASIC to perform the processing), software forwarding elements of some embodiments can extend a packet processing pipeline as long as necessary, as there is not much of a delay from performing the resubmissions.

In addition, some embodiments enable optimization of the multiple lookups for subsequent packets within a single set of related packets (e.g., a single TCP/UDP flow). When the first packet arrives, the managed forwarding element performs all of the lookups and resubmits in order to fully process the packet. The forwarding element then caches the end result of the decision (e.g., the addition of an egress context to the packet, and the next-hop forwarding decision out a particular port of the forwarding element over a particular tunnel) along with a unique identifier for the packet that will be shared with all other related packets (i.e., a unique identifier for the TCP/UDP flow). Some embodiments push this cached result into the kernel of the forwarding element for additional optimization. For additional packets that share the unique identifier (i.e., additional packets within the same flow), the forwarding element can use the single cached lookup that specifies all of the actions to perform on the packet. Once the flow of packets is complete (e.g., after a particular amount of time with no packets matching the identifier), in some embodiments the forwarding element flushes the cache. This use of multiple lookups, in some embodiments, involves mapping packets from a physical space (e.g., MAC addresses at physical ports) into a logical space (e.g., a logical forwarding decision to a logical port of a logical switch) and then back into a physical space (e.g., mapping the logical egress context to a physical outport of the switching element).

Such logical networks, that use encapsulation to provide an explicit separation of physical and logical addresses, provide significant advantages over other approaches to network virtualization, such as VLANs. For example, tagging techniques (e.g., VLAN) use a tag placed on the packet to segment forwarding tables to only apply rules associated with the tag to a packet. This only segments an existing address space, rather than introducing a new space. As a result, because the addresses are used for entities in both the virtual and physical realms, they have to be exposed to the physical forwarding tables. As such, the property of aggregation that comes from hierarchical address mapping cannot be exploited. In addition, because no new address space is introduced with tagging, all of the virtual contexts must use identical addressing models and the virtual address space is limited to being the same as the physical address space. A further shortcoming of tagging techniques is the inability to take advantage of mobility through address remapping.

XI. Electronic System

Figure 64:
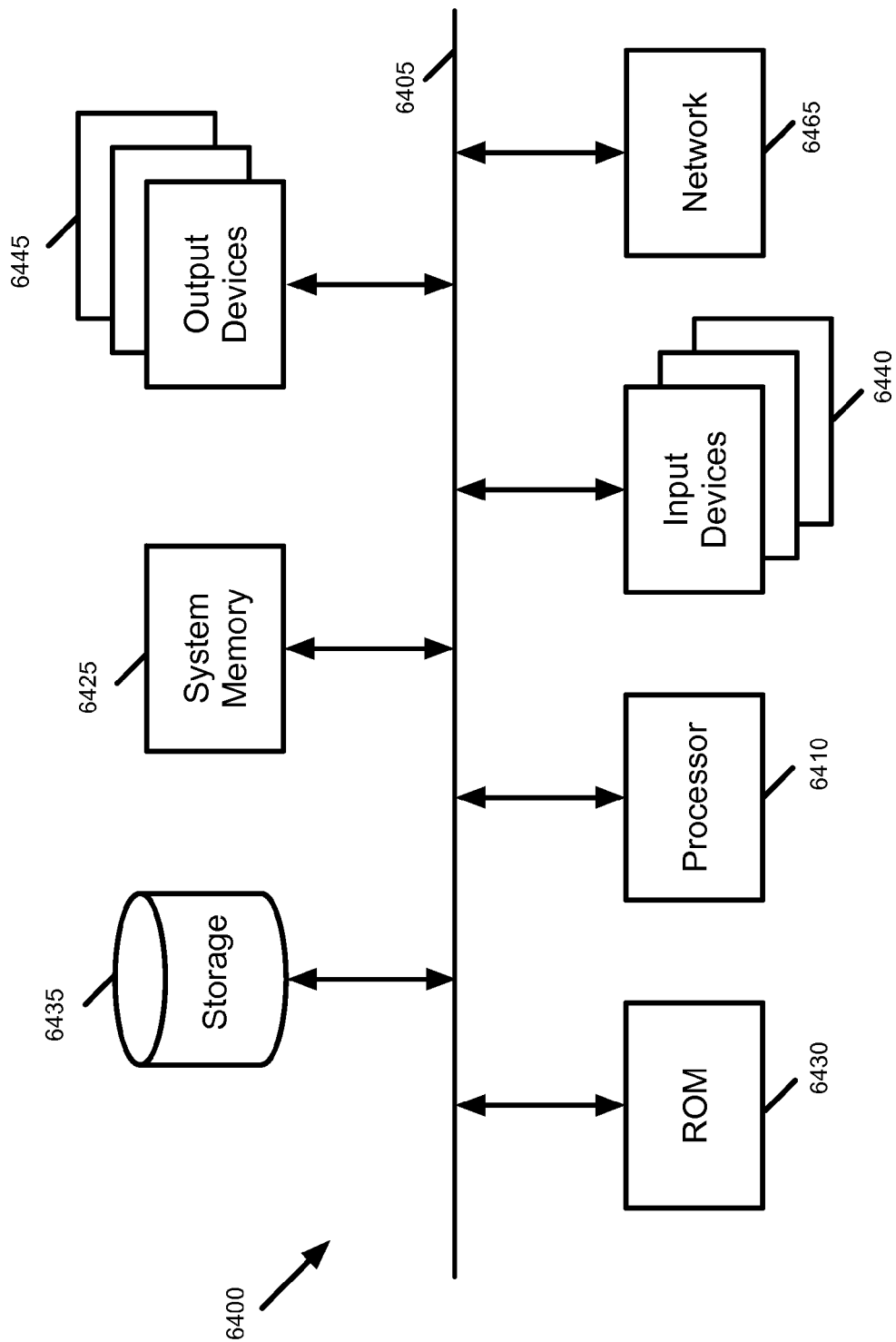
FIG. 64 conceptually illustrates an electronic system with which some embodiments of the invention are implemented.

FIG. 64 conceptually illustrates an electronic system 6400 with which some embodiments of the invention are implemented. The electronic system 6400 can be used to execute any of the control, virtualization, or operating system applications described above. The electronic system 6400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 6400 includes a bus 6405, processing unit(s) 6410, a system memory 6425, a read-only memory 6430, a permanent storage device 6435, input devices 6440, and output devices 6445.

The bus 6405 collectively represents all system, peripheral, and chipset buses that communicatively connect the numerous internal devices of the electronic system 6400. For instance, the bus 6405 communicatively connects the processing unit(s) 6410 with the read-only memory 6430, the system memory 6425, and the permanent storage device 6435.

From these various memory units, the processing unit(s) 6410 retrieve instructions to execute and data to process in order to execute the processes of the invention. The processing unit(s) may be a single processor or a multi-core processor in different embodiments.

The read-only-memory (ROM) 6430 stores static data and instructions that are needed by the processing unit(s) 6410 and other modules of the electronic system. The permanent storage device 6435, on the other hand, is a read-and-write memory device. This device is a non-volatile memory unit that stores instructions and data even when the electronic system 6400 is off. Some embodiments of the invention use a mass-storage device (such as a magnetic or optical disk and its corresponding disk drive) as the permanent storage device 6435.

Other embodiments use a removable storage device (such as a floppy disk, flash drive, etc.) as the permanent storage device. Like the permanent storage device 6435, the system memory 6425 is a read-and-write memory device. However, unlike storage device 6435, the system memory is a volatile read-and-write memory, such a random access memory. The system memory stores some of the instructions and data that the processor needs at runtime. In some embodiments, the invention's processes are stored in the system memory 6425, the permanent storage device 6435, and/or the read-only memory 6430. From these various memory units, the processing unit(s) 6410 retrieve instructions to execute and data to process in order to execute the processes of some embodiments.

The bus 6405 also connects to the input and output devices 6440 and 6445. The input devices enable the user to communicate information and select commands to the electronic system. The input devices 6440 include alphanumeric keyboards and pointing devices (also called "cursor control devices"). The output devices 6445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 64, bus 6405 also couples electronic system 6400 to a network 6465 through a network adapter (not shown). In this manner, the computer can be a part of a network of computers (such as a local area network ("LAN"), a wide area network ("WAN"), or an Intranet, or a network of networks, such as the Internet. Any or all components of electronic system 6400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 14, 16, 32, 35, 49, 51, and 52) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. For a managed forwarding element that processes packets in a host machine according to a set of flow entries stored in a set of forwarding tables, a method comprising:
receiving a packet from an end machine that operates on the host machine;
when the packet matches a template flow entry with a set of data fields unpopulated, sending the template flow entry to a flow entry generating module that operates on the host machine;
receiving a new flow entry with the set of data fields populated from the flow entry generating module; and
storing the new flow entry received from the flow entry generating module in a forwarding table, wherein the new flow entry has a higher priority than the template flow entry such that subsequent packets are processed according to the new flow entry rather than the template flow entry without sending the template flow entry to the flow entry generating module.

2. The method of claim 1, wherein the flow entry generating module and the managed forwarding element are separate software applications configured in the host.

3. The method of claim 1, wherein the set of unpopulated data fields comprises a source network address field to use for network address translation (NAT) of the packet, wherein processing subsequent packets with the new flow entry comprises performing NAT on the subsequent packets to replace a source network address of the packets with a source network address populated in the new flow entry by the flow entry generating module.

4. The method of claim 1, wherein the set of unpopulated data fields comprises a destination data link layer address to use for address resolution of the packet, wherein processing subsequent packets comprises performing address resolution on the subsequent packets to replace a destination data link layer address of the packets with the data link layer address populated in the new flow entry by the flow entry generating module.

5. The method of claim 1, wherein the flow entry generating module maintains and uses a lookup list from which to populate the set of unpopulated data fields of the template flow entry.

6. The method of claim 5, wherein (i) the host machine is a first host machine and the lookup list is a local lookup list, (ii) a second host machine maintains and uses a global lookup list of information that is collected from other host machines, and (iii) the flow entry generating module asks the second host machine for information that does not exist in the local lookup list.

7. The method of claim 1,
wherein the set of unpopulated data fields comprises a destination network address field to use for destination network address translation (DNAT) of the packet,
wherein processing subsequent packets with the new flow entry comprises performing DNAT on the subsequent packets to replace a destination network address of the packets with the destination network address populated in the new flow entry by the flow entry generating module.

8. A non-transitory machine readable medium storing a program which when executed by at least one processing unit processes packets in a host machine according to a set of flow entries stored in a set of forwarding tables, the program comprising sets of instructions for:
receiving a packet from an end machine that operates on the host machine;
when the packet matches a template flow entry with a set of data fields unpopulated, sending the template flow entry to a flow entry generating module that operates on the host machine;
receiving a new flow entry with the set of data fields populated from the flow entry generating module; and
storing the new flow entry received from the flow entry generating module in a forwarding table, wherein the new flow entry has a higher priority than the template flow entry such that subsequent packets are processed according to the new flow entry rather than the template flow entry without sending the template flow entry to the flow entry generating module.

9. The non-transitory machine readable medium of claim 8, wherein the set of unpopulated data fields comprises a source network address field to use for network address translation (NAT) of the packet, wherein the set of instructions for processing subsequent packets with the new flow entry comprises a set of instructions for performing NAT on the subsequent packets to replace a source network address of the packets with a source network address populated in the new flow entry by the flow entry generating module.

10. The non-transitory machine readable medium of claim 8, wherein the set of unpopulated data fields comprises a destination data link layer address to use for address resolution of the packet, wherein the set of instructions for processing subsequent packets comprises a set of instructions for performing address resolution on the subsequent packets to replace a destination data link layer address of the packets with the data link layer address populated in the new flow entry by the flow entry generating module.

11. The non-transitory machine readable medium of claim 8, wherein the flow entry generating module maintains and uses a lookup list from which to populate the set of unpopulated data fields of the template flow entry.

12. The non-transitory machine readable medium of claim 11, wherein (i) the host machine is a first host machine and the lookup list is a local lookup list, (ii) a second host machine maintains and uses a global lookup list of information that is collected from other host machines, and (iii) the flow entry generating module asks the second host machine for information that does not exist in the local lookup list.

13. The non-transitory machine readable medium of claim 8,
wherein the set of unpopulated data fields comprises a destination network address field to use for destination network address translation (DNAT) of the packet,
wherein the set of instructions for processing subsequent packets with the new flow entry comprises a set of instructions for performing DNAT on the subsequent packets to replace a destination network address of the packets with the destination network address populated in the new flow entry by the flow entry generating module.

14. A computer configured as a host machine for hosting a set of end machines that are sources and destinations of network traffic, the computer comprising:
a set of processing units; and
a machine readable medium storing:
a flow entry generating module for execution by at least one processing unit in the set of processing units, the flow entry generating module configured to create a new flow entry based on a template flow entry by populating a set of data fields of the template flow entry; and
a software forwarding element for execution by at least one processing unit in the set of processing units, the software forwarding element configured (i) to process packets from the end machines operating on the host machine, (ii) to send the template flow entry to the flow entry generating module when packets match the template flow entry with a set of data fields unpopulated, (iii) to receive the new flow entry from the flow entry generating module with the set of data fields populated, and (iv) to store the new flow entry received from the flow entry generating module in a forwarding table, wherein the new flow entry has a higher priority than the template flow entry such that subsequent packets are processed according to the new flow entry rather than the template flow entry without sending the template flow entry to the flow entry generating module.

15. The computer of claim 14, wherein the set of unpopulated data fields for a particular template flow entry, comprises a source network address field to use for network address translation (NAT) of packets received from a particular end machine, wherein the software forwarding element receives a new flow entry for performing NAT on subsequent packets from the particular end machine to replace a source network address of the particular end machine with a source network address populated in the new flow entry.

16. The computer of claim 14, wherein the set of unpopulated data fields for a particular template flow entry comprises a destination data link layer address field to use for address resolution of the packet, wherein the software forwarding receives a new flow entry for performing address resolution on subsequent packets sent to a particular destination network address to replace destination data link layer addresses of the packets with the data link layer address populated in the new flow entry.

17. The computer of claim 15, wherein the flow entry generating module is configured to maintain and use a lookup list from which to obtain the information to populate the sets of data fields.

* * * * *